US012552754B1

(12) United States Patent
Arce Saez et al.

(10) Patent No.: US 12,552,754 B1
(45) Date of Patent: Feb. 17, 2026

(54) LEFLUTROZOLE COMPOSITIONS OF MATTER AND PROCESSES FOR PREPARATION

(71) Applicant: ReproNovo SA, Lausanne (CH)

(72) Inventors: Joan-Carles Arce Saez, Dragør (DK); Crilles Casper Larsen, Mountain Lakes, NJ (US)

(73) Assignee: ReproNovo SA, Lausanne (CH)

( * ) Notice: Subject to any disclaimer, the term of this patent is extended or adjusted under 35 U.S.C. 154(b) by 0 days.

(21) Appl. No.: 19/278,180

(22) Filed: Jul. 23, 2025

Related U.S. Application Data

(60) Provisional application No. 63/822,012, filed on Jun. 11, 2025.

(51) Int. Cl.
| | |
|---|---|
| *C07D 249/08* | (2006.01) |
| *A61K 31/4196* | (2006.01) |
| *A61P 15/08* | (2006.01) |

(52) U.S. Cl.
CPC ........ *C07D 249/08* (2013.01); *A61K 31/4196* (2013.01); *A61P 15/08* (2018.01)

(58) Field of Classification Search
None
See application file for complete search history.

(56) References Cited

U.S. PATENT DOCUMENTS

| | | | |
|---|---|---|---|
| 4,978,672 A | 12/1990 | Bowman et al. | |
| 5,227,393 A | 7/1993 | Lang et al. | |
| 5,376,669 A * | 12/1994 | Lang | A61P 35/00 |
| | | | 548/255 |
| 5,457,209 A | 10/1995 | Lang et al. | |
| 5,637,605 A | 6/1997 | Lang et al. | |
| 9,295,668 B2 | 3/2016 | Taylor et al. | |
| 9,370,505 B2 | 6/2016 | Taylor et al. | |
| 9,750,724 B2 | 9/2017 | Taylor et al. | |
| 10,064,844 B2 | 9/2018 | Taylor et al. | |
| 2007/0259935 A1 | 11/2007 | Westheim | |
| 2019/0192485 A1 | 6/2019 | Parkin et al. | |

FOREIGN PATENT DOCUMENTS

| | | |
|---|---|---|
| EP | 0490816 A2 | 6/1992 |
| EP | 2753312 B1 | 12/2016 |
| EP | 2753313 B1 | 12/2016 |
| WO | WO-03/082254 A1 | 10/2003 |
| WO | WO-2013/036562 A1 | 3/2013 |
| WO | WO-2013/036563 A1 | 3/2013 |
| WO | WO-2018/033759 A1 | 2/2018 |

OTHER PUBLICATIONS

"Definition of 'Dispersible tablet'," Collins English Dictionary, <https://www.collinsdictionary.com/us/dictionary/english/dispersible-tablet>, retrieved Apr. 13, 2021 (3 pages).
"Guidance for Industry. Drug Metabolism/Drug Interaction Studies in the Drug Development Process: Studies In Vitro," Department of Health and Human Services, U.S. Food and Drug Administration, Center for Drug Evaluation and Research, Center for Biologics Evaluation and Research, Apr. 1997 (13 pages).
Basic Operation I, New Experimental Chemistry Lecture 1, Incorporated Chemical Society of Japan Part, Jun. 10, 1985, Ver. 6, p. 341 to p. 351.
Basis of Experiment/Information, Basic Part I, Experimental Chemistry Lecture 1, Incorporated Chemical Society of Japan Part, Ver. 5, Sep. 25, 2003, p. 208 to p. 211.
Caira, "Crystalline Polymorphism of Organic Compounds," Topics in Current Chemistry, vol. 198. Springer Verlag Berlin Heidelberg, 165-166 (1998) (3 pages).
Caira, "Crystalline polymorphism of organic compounds," Topics in Current Chemistry, vol. 198. Springer Verlag Berlin Heidelberg, 163-208 (1998).
Chaudhari et al., "Pharmaceutical Excipients: a Review," International Journal of Advances in Pharmacy, Biology and Chemistry. 1(1):21-34 (2012).
Corporation Chemical Society of Japan and experimental science lecture 1 Basic operation I, Maruzen Co., Ltd., Nov. 5, 1990, 4th edition, 184-186th page.
Form F-1 Registration Statement Under The Securities Act of 1993, Mereo Biopharma Group PLC. Mar. 23, 2018 (272 pages).
Guideline for Trials, Bioequivalence to Generic Drugs, Feb. 29, 2012, Pharmaceutical Safety and Environmental Health bureau, Ministry of Health, Labor and Welfare, PFXB/ELD Notification No. 0229.10, Appendix 1.
H de Boer, et al. "Letrozole normalizes serum testosterone in severely obese men with hypogonadotropic hypogonadism," Diabetes Obes Metab. 7(3):211-215 (May 2005).
Hörig et al., "From bench to clinic and back: Perspective on the 1st IQPC Translational Research conference," J Trans Med. 2(1):44 (2004) (8 pages).
Jonat et al. "Mechanism of Glidants: Investigation of the effect of different colloidal silicon dioxide types on powder flow by atomic force and scanning electron microscopy," J Pharm Sci. Oct. 2004;93(10):2635-44.
Lang et al. "Structure-activity relationships and binding model of novel aromatase inhibitors," J Steroid Biochem Mol Biol. 44(4-6):421-428 (Mar. 1993).
Leder et al. "Effects of Aromatase Inhibition in Elderly Men with Low or Borderline-Low Serum Testosterone Levels," The Journal of Clinical Endocrinology & Metabolism. 89(3);1174-1180 (Mar. 2004).
Lynch et al., "The Effect of Cytochrome P450 Metabolism on Drug Response, Interactions, and Adverse Effects," Am Fam Physician. 76:391-396 (2007).

(Continued)

*Primary Examiner* — Craig D Ricci
(74) *Attorney, Agent, or Firm* — Clark & Elbing LLP

(57) ABSTRACT

The present disclosure relates to crystalline forms of leflutrozole and methods to prepare crystalline leflutrozole, in one of several forms and of high purity. Also provided are compositions comprising crystalline leflutrozole, and use of the crystalline leflutrozole compounds or compositions in methods of treating disease in subjects in need thereof.

8 Claims, 61 Drawing Sheets

(56) References Cited

OTHER PUBLICATIONS

Maruzen Pla-Net Corporation, Sep. 20, 2002, the 305-317th page.
Organic Polymer Biochemistry, Basic Part IV, Experimental Chemistry Lecture 4, Incorporated Chemical Society of Japan Part, Ver. 5, Sep. 25, 2003, p. 95 to p. 108.
Q & A, Guideline for Trials, Bioequivalence to Generic Drugs, Feb. 29, 2012, Pharmaceutical Safety and Environmental Health bureau, Ministry of Health, Labor and Welfare, Office Notification Appendix 1.
Rowe et al., Handbook of Pharmaceutical Excipients, Sixth Edition. Pharmaceutical Press and APhA. (2009) (917 pages).
Rydzewski, Chapter 1: The Drug Discovery Business to Date—1. 4.8 Chiral Switching. Real World Drug Discovery: a Chemist's Guide to Biotech and Pharmaceutical Research. Elsevier, Ltd.p. 42-43 (2008).
Schäfer et al., "Failure is an option: learning from unsuccessful proof-of-concept trials," Drug Discov Today. 13(21-22):913-6 (2008).
Shetty et al. "Effect of estrogen deprivation on the reproductive physiology of male and female primates," J Steroid Biochem Mol Biol. 61(3-6):157-166 (Apr. 1997).
Shetty et al. "Effect of long-term treatment with aromatase inhibitor on testicular function of adult male bonnet monkeys (M. radiata)," Steroids. 63(7-8):414-420 (Jul.-Aug. 1998).
Jones et al.; "OR18-4 Beneficial Effect on Sperm Production of Leflutrozole in Men with Obesity-Associated Secondary Hypogonadotropic Hypogonadism: Results from a Phase II Study," Journal of the Endocrine Society, vol. 3, Issue Supplement 1, Apr. 2019. (2 Pages).
Jones et al. "Leflutrozole in male obesity-associated hypogonadotropic hypogonadism: Ph 2b double-blind randomised controlled trial," European Journal of Endocrinology. 189(3):297-308 (Aug. 2023) (12 pages).

* cited by examiner

LEFLUTROZOLE COMPOSITIONS OF MATTER AND PROCESSES FOR PREPARATION

BACKGROUND OF THE INVENTION

Leflutrozole is a selective, non-steroidal, and reversible aromatase inhibitor which blocks the aromatase enzyme (CYP19), thereby restricting the conversion of testosterone to estradiol and androstenedione to estrone. The administration of leflutrozole is expected to be useful in the treatment of obesity-associated hypogonadotropic hypogonadism, as these subjects have increased estradiol levels resulting from overexpressed aromatase in adipose tissues. The higher aromatase activity results in decreased testosterone levels in these subjects, that ultimately may result in reductions in fertility.

Current therapies for testosterone deficiency are limited. Most hypogonadal men are treated with intramuscular injections of testosterone every 2 to 4 weeks, typically requiring a visit to a health care provider. Some men choose testosterone gels or patches that are usually applied daily.

In consideration of all problems and disadvantages connected with the so far known treatment options for male hypogonadism and testosterone deficiency, in particular hypogonadotropic hypogonadism, it would be highly advantageous to provide a new treatment option overcoming the aforementioned drawbacks and indeed provide relief or at least improvement for these patients. Therefore, a need exists for new crystalline forms of leflutrozole suitable for use in a medicament for treating hypogonadism. The present invention provides the crystalline forms of leflutrozole, processes for making the same, its incorporation into pharmaceutical compositions, and use of leflutrozole in methods of treatment of disease in order to meet this unmet need.

SUMMARY OF THE INVENTION

This disclosure presents crystalline forms of the aromatase inhibitor, leflutrozole, and its methods of preparation, as well as the incorporation of the crystalline form into pharmaceutical compositions suitable for the treatment of diseases or disorders in a subject in need thereof.

In an aspect, there is presented a crystalline Form A of leflutrozole having X-ray powder diffraction peaks at a diffraction angle 2θ (°) of 9.1±0.2, 16.8±0.2, and 26.1±0.2.

In some embodiments, the crystalline Form A of leflutrozole is the crystalline form having additional X-ray powder diffraction peaks at a diffraction angle 2θ (°) of 13.9±0.2, 15.6±0.2, 21.1±0.2, and 24.9±0.2.

In some embodiments, the crystalline Form A of leflutrozole is the crystalline Form A having additional X-ray powder diffraction peaks at a diffraction angle 2θ (°) of 22.6±0.2, 23.8±0.2, 26.8±0.2, 28.4±0.2, 31.4±0.2, and 32.5±0.2

In some embodiments, the crystalline Form A of leflutrozole is the crystalline Form A having additional X-ray powder diffraction peaks at a diffraction angle 2θ (°)

In some embodiments, the crystalline Form A of leflutrozole is the crystalline Form A having the X-ray powder diffraction spectrum as shown in FIG. 1.

In some embodiments, the crystalline Form A of leflutrozole is the crystalline Form A with peaks at diffraction angle 2θ (°) that are collected by irradiating with Cu Kα. In some embodiments, the crystalline Form A of leflutrozole is the crystalline Form A with peaks at diffraction angle 2θ (°) that are collected by irradiating with Cu Kα, at a voltage of between 20 and 50 kV. In some embodiments, the crystalline Form A of leflutrozole is the crystalline Form A with peaks at diffraction angle 2θ (°) that are collected by irradiating with Cu Kα, at a voltage of between 25 and 45 kV. In some embodiments, the crystalline Form A of leflutrozole is the crystalline Form A with peaks at diffraction angle 2θ (°) that are collected by irradiating with Cu Kα, at a voltage of between 30 and 40 kV.

In some embodiments, the crystalline Form A of leflutrozole is the crystalline Form A having a differential scanning calorimetry (DSC) endotherm at about 169° C.

In some embodiments, the crystalline Form A of leflutrozole is the crystalline Form A having the differential scanning calorimetry curve substantially as depicted in FIG. 3.

In some embodiments, the crystalline Form A of leflutrozole is the crystalline Form A exhibiting $^1$H nuclear magnetic resonance (NMR) peaks centered at a chemical shift (δ) of about 7.7 ppm, about 8.0, about 8.3, and about 8.7 ppm.

In some embodiments, the crystalline Form A of leflutrozole is the crystalline Form A characterized by a $^1$H NMR spectrum substantially as depicted in FIG. 4.

In some embodiments, the crystalline Form A of leflutrozole is the crystalline Form A exhibiting infrared spectroscopy (FT-IR) absorbances of about 3131 $cm^{-1}$, about 3105 $cm^{-1}$, about 2925 $cm^{-1}$, about 2854 $cm^{-1}$, about 2230 $cm^{-1}$, about 1680 $cm^{-1}$, and about 1511 $cm^{-1}$.

In some embodiments, the crystalline Form A of leflutrozole is the crystalline Form A characterized by the infrared spectrum substantially as depicted in FIG. 5.

In some embodiments, the crystalline Form A of leflutrozole is the crystalline Form A that exhibits a weight loss of from 0.01% to 5% when heated from 30° C. to 300° C. as measured by thermogravimetric analysis. In some embodiments, the crystalline Form A of leflutrozole is the crystalline Form A that exhibits a weight loss of about 0.05% when heated from 30° C. to 300° C. as measured by thermogravimetric analysis.

In some embodiments, the crystalline Form A of leflutrozole is the crystalline Form A that exhibits a thermogravimetric analysis curve substantially as depicted in FIG. 6.

In some embodiments, the crystalline Form A of leflutrozole is the crystalline Form A that has a particle size distribution ($D_{90}$) of less than 35 µm. In some embodiments, the crystalline Form A of leflutrozole is the crystalline Form A having a particle size distribution $D_{10}$ of about 1 µm, a $D_{50}$ of about 4 µm, and a $D_{90}$ of about 11 µm.

In some embodiments, the crystalline Form A of leflutrozole is the crystalline Form A of leflutrozole that is obtainable by recrystallization from a solvent. In some embodiments, the crystalline Form A of leflutrozole is the crystalline Form A of leflutrozole that is obtainable by recrystallization from ethanol.

In some embodiments, the crystalline Form A of leflutrozole is a crystalline form of leflutrozole that is anhydrous.

In another aspect, there is presented crystalline Form A of leflutrozole that has a differential scanning calorimetry (DSC) endotherm of 169° C.

In another aspect, there is presented crystalline Form A of leflutrozole having (a) the X-ray powder diffraction (XRPD) spectrum as shown in FIG. 1 and optionally at least one of the following properties:
  (a) an X-ray powder diffraction (XRPD) spectrum as shown in FIG. 1;
  (b) an X-ray powder diffraction (XRPD) pattern with characteristic peaks at a diffraction angle 2θ (°) of 9.1±0.2, 16.8±0.2, and 26.1±0.2;

(c) the same X-ray powder diffraction (XRPD) pattern after storage at 80° C. and 75% relative humidity for at least a week;
(d) the same XRPD pattern after storage at 25° C. and 95% relative humidity for at least a week;
(e) a differential scanning calorimetry (DSC) endotherm at about 169° C.;
(f) a differential scanning calorimetry curve substantially as depicted in FIG. 3;
(g) $^1$H nuclear magnetic resonance (NMR) peaks centered at a chemical shift (δ) of about 7.7 ppm, about 8.0, about 8.3, and about 8.7 ppm;
(h) a $^1$H NMR spectrum substantially as depicted in FIG. 4;
(i) infrared spectroscopy (FT-IR) absorbances of about 3131 cm$^{-1}$, about 3105 cm$^{-1}$, about 2925 cm$^{-1}$, about 2854 cm$^{-1}$, about 2230 cm$^{-1}$, about 1680 cm$^{-1}$, and about 1511 cm$^{-1}$;
(j) an infrared spectrum substantially as depicted in FIG. 5;
(k) a weight loss of from 0.01% to 5% when heated from 30° C. to 300° C. as measured by thermogravimetric analysis;
(l) a thermogravimetric analysis curve substantially as depicted in FIG. 6;
(m) a particle size distribution ($D_{90}$) of less than 35 μm;
(n) non-hygroscopicity; or
(o) combinations thereof.

In another aspect, there is presented a solid form of leflutrozole, comprising crystalline Form A of leflutrozole, wherein the crystalline Form A of leflutrozole is present at greater than about 80% by weight of the solid form. In some embodiments, the solid form of leflutrozole comprises crystalline Form A of leflutrozole, wherein the crystalline Form A of leflutrozole is present at greater than about 90% by weight of the solid form. In some embodiments, the solid form of leflutrozole comprises crystalline Form A of leflutrozole, wherein the crystalline Form A of leflutrozole is present at greater than about 95% by weight of the solid form. In some embodiments, the solid form of leflutrozole comprises crystalline Form A of leflutrozole, wherein the crystalline Form A of leflutrozole is present at greater than about 97% by weight of the solid form.

In another aspect, there is presented leflutrozole in crystalline form, having the formula $C_{17}H_{10}FN_5$, and being in the form of an asymmetric unit comprising four $C_{17}H_{10}FN_5$ formula units. In another aspect, there is presented Crystalline Form A of leflutrozole, characterized by unit cell parameters substantially equal to the following cell dimensions:
a=16.060 (4) Å
b=12.087 (3) Å
c=7.387 (2) Å
α=90 degrees
β=95.827 (15) degrees
γ=90 degrees
Space group=P2$_1$/c
molecules per asymmetric unit=4

In another aspect, there is presented a pharmaceutical composition comprising a crystalline Form A of leflutrozole and one or more pharmaceutically acceptable excipients, wherein the crystalline Form A of leflutrozole has a particle size distribution ($D_{90}$) of less than 35 μm.

In some embodiments, the crystalline Form A of leflutrozole has X-ray powder diffraction peaks at a diffraction angle 2θ (°) of 9.1±0.2, 16.8±0.2, and 26.1±0.2. In some embodiments, the crystalline Form A of leflutrozole has additional X-ray powder diffraction peaks at a diffraction angle 2θ (°) of 13.9±0.2, 15.6±0.2, 21.1±0.2, and 24.9±0.2. In some embodiments, the crystalline Form A of leflutrozole has additional X-ray powder diffraction peaks at a diffraction angle 2θ (°) of 10.9±0.2, 14.4±0.2, 18.0±0.2, 18.5±0.2, 24.6±0.2, 27.4±0.2, 28.0±0.2, and 29.3±0.2. In some embodiments, the crystalline Form A of leflutrozole has additional X-ray powder diffraction peaks at a diffraction angle 2θ (°) of 22.6±0.2, 23.8±0.2, 26.8±0.2, 28.4±0.2, 31.4±0.2, and 32.5±0.2. In some embodiments, the crystalline Form A of leflutrozole has the X-ray powder diffraction spectrum as shown in FIG. 1. In some embodiments, the crystalline Form A of leflutrozole has peaks at diffraction angle 2θ (°) collected by irradiating with Cu Kα.

In some embodiments, the crystalline Form A of leflutrozole has a differential scanning calorimetry (DSC) endotherm at about 169° C. In some embodiments, the crystalline Form A of leflutrozole has the differential scanning calorimetry curve substantially as depicted in FIG. 3.

In some embodiments, the crystalline Form A of leflutrozole has $^1$H nuclear magnetic resonance (NMR) peaks centered at a chemical shift (δ) of about 7.7 ppm, about 8.0, about 8.3, and about 8.7 ppm. In some embodiments, the crystalline Form A of leflutrozole is characterized by a 1H NMR spectrum substantially as depicted in FIG. 4.

In some embodiments, the crystalline Form A of leflutrozole exhibits infrared spectroscopy (FT-IR) absorbances of about 3131 cm$^{-1}$, about 3105 cm$^{-1}$, about 2925 cm$^{-1}$, about 2854 cm$^{-1}$, about 2230 cm$^{-1}$, about 1680 cm$^{-1}$, and about 1511 cm$^{-1}$. In some embodiments, the crystalline Form A of leflutrozole is characterized by the infrared spectrum substantially as depicted in FIG. 5.

In some embodiments, the crystalline Form A of leflutrozole exhibits a weight loss of from 0.01% to 5% when heated from 30° C. to 300° C. as measured by thermogravimetric analysis. In some embodiments, the crystalline Form A of leflutrozole exhibits a weight loss of about 0.05% when heated from 30° C. to 300° C. as measured by thermogravimetric analysis.

In some embodiments, the crystalline Form A of leflutrozole exhibits a thermogravimetric analysis curve substantially as depicted in FIG. 6.

In some embodiments, the crystalline Form A of leflutrozole has a particle size distribution of $D_{10}$ of about 1 μm, a $D_{50}$ of about 4 μm, and a $D_{90}$ of about 11 μm.

In some embodiments, the crystalline Form A of leflutrozole is obtainable by recrystallization from a solvent. In some embodiments, the crystalline Form A of leflutrozole is obtainable by recrystallization from ethanol. In some embodiments, the crystalline Form A of leflutrozole is anhydrous.

In some embodiments of the above pharmaceutical compositions, the crystalline Form A of leflutrozole has (a) the X-ray powder diffraction (XRPD) spectrum as shown in FIG. 1 and optionally at least one of the following properties:
(a) an X-ray powder diffraction (XRPD) spectrum as shown in FIG. 1;
(b) an X-ray powder diffraction (XRPD) pattern with characteristic peaks at a diffraction angle 2θ (°) of 9.1±0.2, 16.8±0.2, and 26.1±0.2;
(c) the same X-ray powder diffraction (XRPD) pattern after storage at 80° C. and 75% relative humidity for at least a week;
(d) the same XRPD pattern after storage at 25° C. and 95% relative humidity for at least a week;

(e) a differential scanning calorimetry (DSC) endotherm at about 169° C.;
(f) a differential scanning calorimetry curve substantially as depicted in FIG. 3;
(g) $^1$H nuclear magnetic resonance (NMR) peaks centered at a chemical shift (δ) of about 7.7 ppm, about 8.0, about 8.3, and about 8.7 ppm;
(h) a $^1$H NMR spectrum substantially as depicted in FIG. 4;
(i) infrared spectroscopy (FT-IR) absorbances of about 3131 cm$^{-1}$, about 3105 cm$^{-1}$, about 2925 cm$^{-1}$, about 2854 cm$^{-1}$, about 2230 cm$^{-1}$, about 1680 cm$^{-1}$, and about 1511 cm$^{-1}$;
(j) an infrared spectrum substantially as depicted in FIG. 5;
(k) a weight loss of from 0.01% to 5% when heated from 30° C. to 300° C. as measured by thermogravimetric analysis;
(l) a thermogravimetric analysis curve substantially as depicted in FIG. 6;
(m) a particle size distribution (D$_{90}$) of less than 35 μm;
(n) non-hygroscopicity; or
(o) combinations thereof.

In some embodiments of the above pharmaceutical compositions, the crystalline Form A of leflutrozole is present at greater than about 80% by weight of the solid form. In some embodiments of the above pharmaceutical compositions, the crystalline Form A of leflutrozole is present at greater than about 90% by weight of the solid form. In some embodiments of the above pharmaceutical compositions, the crystalline Form A of leflutrozole is present at greater than about 95% by weight of the solid form. In some embodiments of the above pharmaceutical compositions, the crystalline Form A of leflutrozole is present at greater than about 97% by weight of the solid form.

In some embodiments of the above pharmaceutical compositions, the crystalline Form A has the formula C$_{17}$H$_{10}$FN$_5$ and is in the form of an asymmetric unit comprising four C$_{17}$H$_{10}$FN$_5$ formula units.

In some embodiments of the above pharmaceutical compositions, the crystalline Form A of leflutrozole is characterized by unit cell parameters substantially equal to the following cell dimensions:
a=16.060 (4) Å
b=12.087 (3) Å
c=7.387 (2) Å
α=90 degrees
β=95.827 (15) degrees
γ=90 degrees
Space group=P2$_1$/c
molecules per asymmetric unit=4

In another aspect, there is presented a pharmaceutical composition comprising crystalline Form A of leflutrozole of any of the aforementioned embodiments, and one or more pharmaceutically acceptable excipients.

In some embodiments, the pharmaceutical composition comprises from 0.02 to 3% of crystalline Form A of leflutrozole by weight. In some embodiments, the leflutrozole has a purity of at least 97%. In some embodiments, the purity is determined by high performance liquid chromatography (HPLC).

In some embodiments, the pharmaceutical composition comprises leflutrozole that is substantially free of the compound of formula (II):

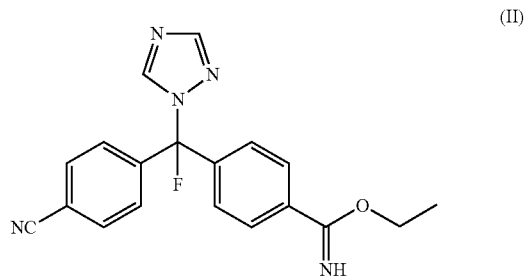 [SMILES: CCOC(=N)c1ccc(C(F)(c2ccc(C#N)cc2)n2cncn2)cc1]

In some embodiments, the pharmaceutical composition comprises leflutrozole that is substantially free of the compound of formula (III):

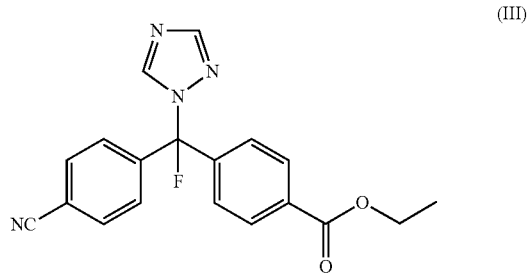 [SMILES: CCOC(=O)c1ccc(C(F)(c2ccc(C#N)cc2)n2cncn2)cc1]

In some embodiments, the pharmaceutical composition comprises leflutrozole that is substantially free of the compound of formula (IV):

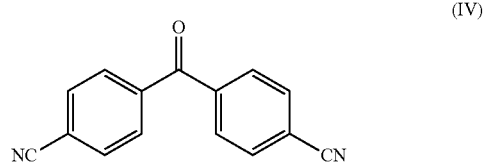 [SMILES: N#Cc1ccc(C(=O)c2ccc(C#N)cc2)cc1]

In some embodiments, the pharmaceutical composition comprises leflutrozole that is substantially free of the compound of formula (V):

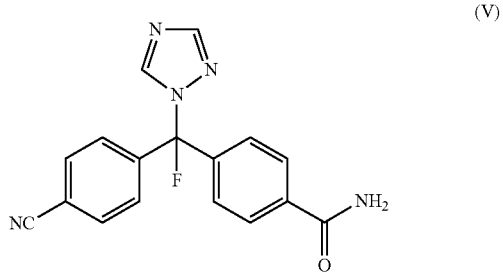 [SMILES: N#Cc1ccc(C(F)(c2ccc(C(N)=O)cc2)n2cncn2)cc1]

In some embodiments, the pharmaceutical composition comprises leflutrozole that is substantially free of solvent. In some embodiments, the pharmaceutical composition comprises leflutrozole that is substantially free of water. In some embodiments, the pharmaceutical composition comprises leflutrozole that is substantially free of ethanol. In some embodiments, the pharmaceutical composition comprises leflutrozole that is substantially free of N,N-dimethylformamide (DMF).

In some embodiments, the pharmaceutical composition is formulated for oral administration to a subject. In some embodiments, the pharmaceutical composition is in the form of a capsule or tablet.

In some embodiments, the pharmaceutical composition is formulated for intravenous administration to a subject.

In some embodiments, the pharmaceutical composition comprises from 0.02 to 3% of crystalline Form A of leflutrozole by weight. In some embodiments, the pharmaceutical composition comprises crystalline Form A of leflutrozole present in an amount from 0.001 to 10.0 mg.

In some embodiments, the pharmaceutical composition comprises one or more fillers. In some embodiments, the one or more fillers is selected from lactose monohydrate, microcrystalline cellulose, and maize starch. In some embodiments, the pharmaceutical composition comprises from 70 to 95% filler by weight. In some embodiments, the pharmaceutical composition comprises from 55 to 70% lactose monohydrate by weight. In some embodiments, the pharmaceutical composition comprises from 10 to 25% microcrystalline cellulose by weight. In some embodiments, the pharmaceutical composition comprises from 7.5 to 15% maize starch by weight.

In some embodiments, the pharmaceutical composition from 4 to 6% disintegrant by weight. In some embodiments, the disintegrant is sodium starch glycolate. In some embodiments, the pharmaceutical composition comprises about 5% sodium starch glycolate by weight.

In some embodiments, the pharmaceutical composition comprises from 0.02 to 2% lubricant by weight. In some embodiments, the lubricant is magnesium stearate. In some embodiments, the pharmaceutical composition comprises about 1% magnesium stearate by weight.

In some embodiments, the pharmaceutical composition comprises from 0.01 to 1% glidant by weight. In some embodiments, the glidant is colloidal silicon dioxide. In some embodiments, the pharmaceutical composition comprises about 0.5% colloidal silicon dioxide by weight.

In another aspect, there is presented a method of preparing crystalline Form A of leflutrozole of any of the aforementioned embodiments, the method comprising:
i. reacting a solution of letrozole in a solvent with a base to generate a solution of letrozole carbanion;
ii. treating the solution of letrozole carbanion with a fluorinating agent to yield a reaction mixture;
iii. quenching the reaction mixture; and
iv. isolating the leflutrozole.

In a related aspect, there is presented a method of preparing crystalline Form A of leflutrozole of any of the aforementioned embodiments represented by formula (I):

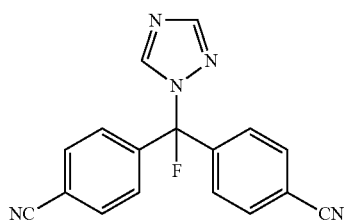

(I)

wherein the method comprises reacting a precursor represented by formula (VI)

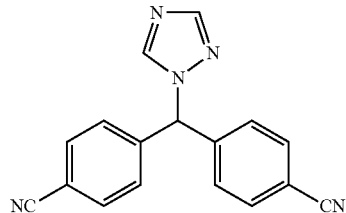

(VI)

with a fluorinating agent and a base in a solvent, thereby fluorinating the compound of formula VI to form an alkyl fluoride.

In some embodiments, the base is added in at least 5 separate portions. In some embodiments, the fluorinating agent is added in at least 5 separate portions. In some embodiments, the fluorinating agent is added in at least 10 separate portions. In some embodiments, the reaction temperature is about −15° C.

In some embodiments of the above, the method is described by the more detailed steps of:
i. adding a first portion of base to a solution of letrozole at about −15° C. under inert atmosphere;
ii. monitoring the reaction temperature until the solution returns to about −15° C.;
iii. adding the second portion of the base to the solution at about −15° C.;
iv. repeating previous steps i.-iii. until all portions of the base have been added, thereby generating a solution of letrozole carbanion;
v. adding a first portion of fluorinating agent to the solution of letrozole carbanion at about −15° C.;
vi. monitoring the reaction temperature until the solution returns to about −15° C.;
vii. adding the second portion of fluorinating agent to the solution at about −15° C.; and
viii. repeating previous steps v.-vii. until all portions of the fluorinating agent have been added, thereafter generating a reaction mixture;
ix. quenching the reaction mixture; and
x. isolating the leflutrozole.

In some embodiments, the method further comprises recrystallizing the leflutrozole. In some embodiments, the leflutrozole is recrystallized from ethanol. In some embodiments, the recrystallization is performed a second time. In some embodiments, the recrystallization is repeated until the total amount of impurities is ≤2.0% as determined by HPLC peak area.

In some embodiments, the base is sodium ethoxide.

In some embodiments, the fluorinating agent is 1-(Chloromethyl)-4-fluoro-1,4-diazabicyclo[2.2.2]octane-1,4-diium ditetrafluoroborate.

In some embodiments, the solvent is N,N-dimethylformamide (DMF). In some embodiments, the DMF has less than 0.1% water content by weight.

In some embodiments, the quenching of the reaction mixture is an inverse quench. In some embodiments, the reaction is quenched with a solution of aqueous ammonium chloride.

In some embodiments, the ratio of letrozole to sodium ethoxide is from 1:1 to 1:1.4. In some embodiments, the ratio of letrozole to sodium ethoxide is from 1.15 to 1.35.

In some embodiments, the ratio of letrozole to fluorinating agent is from 1.2 to 1.5. In some embodiments, the ratio of letrozole to fluorinating agent is from 1.25 to 1.45.

In some embodiments, the method further comprises micronizing the leflutrozole. In some embodiments, the micronization is performed by jet milling. In some embodiments, the leflutrozole is micronized to a particle size distribution ($D_{90}$) of less than 35 µm.

In another aspect, there is presented a method of treating a disease or disorder in a subject in need thereof, the method comprising administering to the subject crystalline Form A of leflutrozole of any of the foregoing embodiments (e.g., in a therapeutically effective amount), or the pharmaceutical composition of any of the foregoing embodiments (e.g., in a therapeutically effective amount). In some embodiments, the disease or disorder is selected from infertility, decreased libido, erectile dysfunction, sleep apnea, low bone mineral density, loss of body hair, fatigue, impaired cognition, depression, insulin resistance, glucose intolerance, lipid abnormalities, and endometriosis. In some embodiments, the disease or disorder is hypogonadotropic hypogonadism. In some embodiments, the hypogonadotropic hypogonadism is obesity-associated. In some embodiments, the hypogonadism is not associated with intrinsic damage to the subject's hypothalamus or pituitary gland.

In some embodiments, the infertility is male infertility. In some embodiments, the subject is diagnosed as having oligospermia. In some embodiments, the subject is diagnosed as having hypogonadism. In some embodiments, the hypogonadism is a primary hypogonadism. In some embodiments, the hypogonadism is a secondary hypogonadism. In some embodiments, the secondary hypogonadism is hypogonadotropic hypogonadism. In some embodiments, the hypogonadotropic hypogonadism is obesity-associated. In some embodiments, the male infertility is caused by oligospermia. In some embodiments, the oligospermia is caused by hypogonadism. In some embodiments, the hypogonadism is a primary hypogonadism. In some embodiments, the hypogonadism is a secondary hypogonadism. In some embodiments, the secondary hypogonadism is hypogonadotropic hypogonadism. In some embodiments, the subject is diagnosed as having erectile dysfunction. In some embodiments, the hypogonadism is not associated with intrinsic damage to the subject's hypothalamus or pituitary gland.

In some embodiments, the infertility is female infertility. In some embodiments, the subject is diagnosed as having endometriosis. In some embodiments, the endometriosis is refractory endometriosis. In some embodiments, the subject is diagnosed as being post-menopausal. In some embodiments, the infertility is caused by endometriosis. In some embodiments, the endometriosis is refractory endometriosis. In some embodiments, the infertility is caused by being post-menopausal.

In some embodiments, the subject is diagnosed as having a decreased libido. In some embodiments, the subject is diagnosed as having a sleep apnea. In some embodiments, the subject is diagnosed as having low bone mineral density. In some embodiments, the subject is diagnosed as experiencing loss of body hair. In some embodiments, the subject is diagnosed as having fatigue. In some embodiments, the subject is diagnosed as having impaired cognition. In some embodiments, the subject is diagnosed as having depression. In some embodiments, the subject is diagnosed as having insulin resistance. In some embodiments, the subject is diagnosed as having glucose intolerance. In some embodiments, the subject is diagnosed as having lipid abnormalities.

In some embodiments, the disease or disorder is decreased libido. In some embodiments, the disease or disorder is erectile dysfunction. In some embodiments, the disease or disorder is sleep apnea. In some embodiments, the disease or disorder is low bone mineral density. In some embodiments, the disease or disorder is loss of body hair. In some embodiments, the disease or disorder is fatigue. In some embodiments, the disease or disorder is impaired cognition. In some embodiments, the disease or disorder is depression. In some embodiments, the disease or disorder is endometriosis. In some embodiments, the disease or disorder is insulin resistance. In some embodiments, the disease or disorder is glucose intolerance. In some embodiments, the disease or disorder is lipid abnormalities.

In some embodiments, the disclosure provides a method of increasing the level of testosterone in a subject in need thereof, the method comprising administering to the subject the crystalline Form A of leflutrozole of any of the foregoing embodiments (e.g., in a therapeutically effective amount), or the pharmaceutical composition of any of the foregoing embodiments (e.g., in a therapeutically effective amount). In some embodiments, the testosterone level becomes normalized in the subject. In some embodiments, the normalization occurs within 1 week.

In some embodiments, the disclosure provides a method of reducing the level of estradiol in a subject in need thereof, the method comprising administering to the subject the crystalline Form A of leflutrozole of any of the foregoing embodiments (e.g., in a therapeutically effective amount), or the pharmaceutical composition of any of the foregoing embodiments (e.g., in a therapeutically effective amount).

In some embodiments, the disclosure provides a method of increasing the level of luteinizing hormone (LH) in a subject in need thereof, the method comprising administering to the subject the crystalline Form A of leflutrozole of any of the foregoing embodiments (e.g., in a therapeutically effective amount), or the pharmaceutical composition of any of the foregoing embodiments (e.g., in a therapeutically effective amount).

In some embodiments, the disclosure provides a method of increasing the level of follicle stimulating hormone (FSH) in a subject in need thereof, the method comprising administering to the subject the crystalline Form A of leflutrozole of any of the foregoing embodiments (e.g., in a therapeutically effective amount), or the pharmaceutical composition of any of the foregoing embodiments (e.g., in a therapeutically effective amount).

In some embodiments, the disclosure provides a method of increasing the total motile sperm count in a subject in need thereof, the method comprising administering to the subject the crystalline Form A of leflutrozole of any of the foregoing embodiments (e.g., in a therapeutically effective amount), or the pharmaceutical composition of any of the foregoing embodiments (e.g., in a therapeutically effective amount).

In some embodiments, the disclosure provides a method of increasing the semen volume of a subject in need thereof, the method comprising administering to the subject the crystalline Form A of leflutrozole of any of the foregoing embodiments (e.g., in a therapeutically effective amount), or the pharmaceutical composition of any of the foregoing embodiments (e.g., in a therapeutically effective amount).

In some embodiments, the disclosure provides a method of inhibiting aromatase (CYP19) activity in a subject in need thereof, the method comprising administering to the subject the crystalline Form A of leflutrozole of any of the foregoing embodiments (e.g., in a therapeutically effective amount), or the pharmaceutical composition of any of the foregoing embodiments (e.g., in a therapeutically effective amount).

In some embodiments of any of the aforementioned methods, the subject is diagnosed as having oligospermia. In some embodiments, the subject is diagnosed as having erectile dysfunction. In some embodiments, the subject is diagnosed as having endometriosis. In some embodiments, the subject is diagnosed as having decreased libido. In some embodiments, the subject is diagnosed as having sleep apnea. In some embodiments, the subject is diagnosed as having low bone mineral density. In some embodiments, the subject is diagnosed as experiencing loss of body hair. In some embodiments, the subject is diagnosed as having fatigue. In some embodiments, the subject is diagnosed as having impaired cognition. In some embodiments, the subject is diagnosed as having depression. In some embodiments, the subject is diagnosed as having insulin resistance. In some embodiments, the subject is diagnosed as having glucose intolerance. In some embodiments, the subject is diagnosed as having lipid abnormalities.

In some embodiments, the disease or disorder selected from oligospermia, erectile dysfunction, decreased libido, sleep apnea, low bone mineral density, loss of body hair, fatigue, impaired cognition, depression, insulin resistance, glucose intolerance, lipid abnormalities, and endometriosis. In some embodiments, the disease or disorder selected from hypogonadism and refractory endometriosis. In some embodiments, the hypogonadism is not associated with intrinsic damage to the subject's hypothalamus or pituitary gland.

In some embodiments of any of the aforementioned methods, the subject is human. In some embodiments, the subject is male.

In some embodiments, the subject has a body-mass index (BMI) of at least 25 kg/m$^2$.

In some embodiments, the subject has a serum testosterone level of less than 300 ng/dl prior to the administering. In some embodiments, following administration of the crystalline leflutrozole or a pharmaceutical composition comprising the same, the testosterone level in the subject is increased from less than 300 ng/dl to between 300 and 1000 ng/dL.

In some embodiments, following administration of the crystalline leflutrozole or a pharmaceutical composition comprising the same, the estradiol level in the subject is decreased from more than 20 μg/mL to less than 15 μg/mL.

In some embodiments, following administration of the crystalline leflutrozole or a pharmaceutical composition comprising the same, the level of luteinizing hormone in the subject is increased from less than 0.75 mIU/mL to between 0.75 and 15 mIU/mL.

In some embodiments, following administration of the crystalline leflutrozole or a pharmaceutical composition comprising the same, the level of follicle stimulating hormone in the subject is increased from less than 1 mIU/mL to between 1 and 15 mIU/mL.

In some embodiments, following administration of the crystalline leflutrozole or a pharmaceutical composition comprising the same, the semen volume of a semen sample obtained from the subject is increased by between 0.5 and 2.0 mL.

In some embodiments, following administration of the crystalline leflutrozole or a pharmaceutical composition comprising the same, the total motile sperm count in a semen sample obtained from the subject is increased from less than 15×10$^6$/mL to more than 20×10$^6$/mL.

In some embodiments, following administration of the crystalline leflutrozole or a pharmaceutical composition comprising the same, the level of inhibin B in the subject is increased by 7 to 15 ng/L.

In some embodiments, the effective amount of crystalline leflutrozole is from 0.01 to 10 mg. In some embodiments, the effective amount of crystalline leflutrozole is about 0.1 mg. In some embodiments, the effective amount of crystalline leflutrozole is about 1.0 mg. In some embodiments, the effective amount of crystalline leflutrozole is about 3 mg. In some embodiments, the effective amount of crystalline leflutrozole is up to 10 mg.

In some embodiments, the administration occurs once weekly. In some embodiments, the administration continues for at least 12 weeks. In some embodiments, the administration continues for up to 36 weeks.

In some embodiments, the bone mineral density in the lumbar spine of the subject decreases by less than 5% during the treatment period. In some embodiments, the bone mineral density in the lumbar spine of the subject decreases by less than 3% during the treatment period.

Definitions

As used herein the singular forms "a," "an," and, "the" include plural reference unless the context clearly dictates otherwise.

The term "about" when modifying a numerical value or range herein includes normal variation encountered in the field, and includes plus or minus 1-10% (e.g., 1%, 2%, 3%, 4%, 5%, 6%, 7%, 8%, 9% or 10%) of the numerical value or end points of the numerical range. Thus, a value of about 10 includes all numerical values from 9 to 11. All numerical ranges described herein include the endpoints of the range unless otherwise noted, and all numerical values in-between the end points, to the first significant digit.

As used herein, the term "administering" means to provide a compound or other therapy, remedy, or treatment such that an individual internalizes a compound. Administering a compound is the process by which a subject becomes exposed to a therapeutic compound or composition of the disclosure.

As used herein, the term "compound" is meant to include all stereoisomers, geometric isomers, tautomers, and isotopes of the structures depicted, unless otherwise specified. All compounds may be found together with other substances such as water and solvents (e.g., in the form of hydrates and solvates) or, more preferably, can be isolated and/or generated in anhydrous form. For example, the term "solvate," as used herein, means a compound or a salt thereof that further includes a stoichiometric or non-stoichiometric amount of a solvent bound by non-covalent intermolecular forces. Exemplary solvents are volatile, non-toxic, and/or acceptable for administration to humans in trace amounts. The term "hydrate" as used herein means a compound or a salt thereof that further includes a stoichiometric or non-stoichiometric amount of water bound by non-covalent intermolecular forces. Alternatively, the term "anhydrous" refers to a compound or crystalline form thereof that excludes all solvent molecules, including water. The term "compound" is also meant to be agnostic as to how the compound is formed, be it synthetically or biologically. For example, a compound of the present disclosure may be produced in the body through metabolism.

As used herein, the term "crystalline" refers to material which has an ordered solid-state structure with repeating units of atoms or molecules organized in a lattice. This contrasts with amorphous solids, which instead have atoms or molecules arranged in a disordered structure, lacking repetition or having their particles arranged randomly with no pattern. The arrangement of molecules or atoms into a repeating unit cell imparts different physical properties of the solid when in a crystalline or amorphous form. For example, crystalline material may have more well-defined melting points or be more stable in terms of liability to oxidation and ability to absorb water (hygroscopicity). Disordered or amorphous material may be further evidence of trace impurities which restricts organization of the molecules into a lattice structure, and crystalline material may be determined to be substantially free of molecules that restrict crystallization as described by the compounds of the disclosure. Crystalline material may be characterized by any number of physical techniques, including X-ray powder diffractometry (XRPD), thermogravimetric analysis (TGA), or differential scanning calorimetry (DSC), among any other suitable methods.

As used herein, the term "hypogonadism" refers to a group of disorders that are indicated by improper or absent levels of sex hormones due to malfunction in the sex glands, organs, or tissues. Hypogonadisms may develop as a result of lifestyle factors, such as excess body weight, e.g. being overweight or obese (BMI>25 kg/m$^2$); circumstances surrounding fasting, or abstaining from food, or of weight loss potentially associated with stress are also implicated in hypogonadisms. Reduction in sex hormones may also be caused by injury to the respective organs or glands, genetic factors, the progression to menopause in females, other therapeutic treatments such as those for cancers, or as a byproduct of autoimmune disorders or viral infections. A hypogonadism may be primary or secondary. A primary hypogonadism refers to conditions where the subject has malfunctioning sex organs, e.g. the testes in a male, such that they no longer appropriately produce sex hormones. A primary hypogonadism may be diagnosed by persistently low testosterone levels that coincide with above-normal luteinizing hormone (LH) levels (or follicle stimulating hormone/FSH). A secondary hypogonadism refers to the subset of subjects who have a malfunctioning hypothalamus or pituitary gland, and hormone production is not regulated due to insufficient chemical signaling. Secondary hypogonadisms (e.g. hypogonadotropic), such as those caused by obesity, may be diagnosed by both a low sperm count and either normal or low levels of LH or FSH. In some embodiments, the hypogonadism is not associated with intrinsic damage to the subject's hypothalamus or pituitary gland.

As used herein, the terms "in need of treatment" and "in need thereof" when referring to treatment, are used interchangeably to mean a judgment made by a caregiver (e.g., physician, nurse, or nurse practitioner in the case of humans; veterinarian in the case of animals, including non-human mammals) that an individual or animal requires or will benefit from treatment. This judgment is made based on a variety of factors that are in the realm of a caregiver's expertise, but that includes the knowledge that the individual or animal is ill, or will become ill, as the result of a disease, condition or disorder that is treatable by the compounds of the disclosure. Accordingly, the compounds of the disclosure can be used in a protective or preventive manner; or compounds of the disclosure can be used to alleviate, inhibit, or ameliorate the disease, condition, or disorder.

As used herein, the term "individual" refers to any animal, including mammals such as mice, rats, and other rodents, rabbits, dogs, cats, swine, cattle, sheep, horses, primates, and humans. In some embodiments, "individual" refers to humans.

As used herein, the term "level" refers to a measure of a compound, as compared to a reference. The reference can be any useful reference, as defined herein. By a "decreased level" or an "increased level" of a compound is meant a decrease or increase in compound level, as compared to a reference (e.g., a decrease or an increase by about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 150%, about 200%, about 300%, about 400%, about 500%, or more; a decrease or an increase of more than about 10%, about 15%, about 20%, about 50%, about 75%, about 100%, or about 200%, as compared to a reference; a decrease or an increase by less than about 0.01-fold, about 0.02-fold, about 0.1-fold, about 0.3-fold, about 0.5-fold, about 0.8-fold, or less; or an increase by more than about 1.2-fold, about 1.4-fold, about 1.5-fold, about 1.8-fold, about 2.0-fold, about 3.0-fold, about 3.5-fold, about 4.5-fold, about 5.0-fold, about 10-fold, about 15-fold, about 20-fold, about 30-fold, about 40-fold, about 50-fold, about 100-fold, about 1000-fold, or more). A level of a compound may be expressed in mass/vol (e.g., g/dl, mg/ml, µg/ml, ng/ml) or percentage relative to total compound in a sample, or by any other suitable units of measure as described by the disclosure (such as mIU).

As used herein, the term "lipid abnormality" refers to a condition where the subject has levels of a lipid that is outside a typical range as determined by a physician. Examples of lipid abnormalities include, but are not limited to, high LDL cholesterol levels, low HDL cholesterol levels, elevated levels of triglycerides, familial hypercholesterolemia, sitosterolemia, chylomicronemia, dyslipidemia, elevated levels of lipoproteins, apolipoprotein A-I deficiency, ABCA1 deficiency (e.g. Tangier disease), abetalipoproteinemia, hypobetalipoproteinemia, chylomicron retention disease, CETP deficiency, cholesteryl ester storage disease (e.g. LAL deficiency), lipodystrophy, or cerebral tendinous xanthomatosis (CTX).

As used herein, the term "micronization" refers to the process by which a solid material has its particle size reduced, to make it more suitable for use in a composition or for administration to the subject. The micronization process may be used to reduce the particle size of the solid to enhance formulation by making the particles more uniform. The process by which micronization occurs often involves physical displacement or processing of a solid material. Physical disruptions and agitation of a crystalline material may yield defects to the crystalline structure. Milling is one process by which micronization can occur, in which a mechanical device receives a bulk solid or formulation and may cut, compress, or otherwise impact the solid material such that the solid is further split into particles having a more uniform size distribution.

As used herein, the term "mIU" refers to "milli-international units" and refers to one-thousandth of the agreed-upon international unit relevant to the object being measured, as familiar to those of skill in the art. As an example from the disclosure, the methods of treatment may cause increases in semen volume produced in a male subject. As such an endpoint from the methods of treatment is typically measured in volume, the appropriate unit would be liters (L) or milliliters (mL). Accordingly, the mIU for a liquid may be mL, and alternative international units may be applied as familiar to the skilled artisan.

As used herein, the term "oligospermia" refers to the condition of a subject who displays a low sperm count. The sperm count may be considered lower than normal if sperm count is under, e.g., $20 \times 10^6$/mL, or under $15 \times 10^6$/mL of the composition of semen. A complete loss of sperm production is referred to as azoospermia, and subjects presenting such condition are also contemplated to be within the scope of the disclosed methods of treatment.

As used herein, the term "particle size distribution" refers to the range or distance in which the majority of particles in a given distribution are collected. For instance, a $D_{90}$ refers to the particle size distribution for 90% of particles in a mixture. In the context of the disclosure, a mixture of particles of leflutrozole may be micronized or milled to reduce their particle size. The distribution of these particles may typically be of >35 μm, but after being micronized, 90% or more of the particles may be of ≤35 μm in size. Thus, a sample of leflutrozole particles which has a $D_{90}$ of ≤35 μm indicates that 90% or more of the particles in the mixture are smaller than 35 μm. Particle size characterization may also extend to $D_{50}$, for 50% of particles, or $D_{10}$, for 10% of particles, for example.

As used herein, the term "pharmaceutical composition" refers to a specific composition comprising at least one active ingredient, including but not limited to, solids, crystalline forms (e.g. an anhydrous form, a hydrate, or another solvate), and compounds of the present disclosure, whereby the composition is amenable to investigation for a specified, efficacious outcome in a mammal (for example, without limitation, a human). A pharmaceutical composition typically includes both an active substance, such as a compound or crystalline form of the disclosure, and one or more pharmaceutically acceptable excipients that improve the pharmacological properties of the active substance. The excipients included may also improve pharmacokinetic properties in order to improve variables such as absorption, excretion, drug release, tissue exposure, metabolism of the active substance, or any other property suitable for improving administration. Excipients may also be included in order to improve the processability of a compound or composition of the disclosure. For example, inclusion of certain excipients may improve the ability of the active compound to become formulated as a powder due to the addition of certain glidants or binders. Those of ordinary skill in the art will understand and appreciate the techniques appropriate for determining whether an active ingredient has a desired efficacious outcome based upon the needs of the artisan.

As used herein, the term "prescribing" refers to order, authorize, or recommend the use of a drug or other therapy, remedy, or treatment. In some embodiments, a health care provider orally advises, recommends, or authorizes the use of a compound, dosage regimen, or other treatment to an individual. The health care provider may or may not provide a written prescription for the compound, dosage regimen, or treatment. Further, the health care provider may or may not provide the compound or treatment to the individual. For example, the health care provider can advise the individual where to obtain the compound without providing the compound. In some embodiments, a health care provider can provide a written prescription for the compound, dosage regimen, or treatment to the individual. A prescription can be written on paper or recorded on electronic media. In addition, a prescription can be called in (oral) or faxed in (written) to a pharmacy or a dispensary. In some embodiments, a sample of the compound or treatment is given to the individual. As used herein, giving a sample of a compound constitutes an implicit prescription for the compound. Different health care systems around the world use different methods for prescribing and administering compounds or treatments, and these methods are encompassed by the disclosure herein. A health care provider can include, for example, a physician, nurse, nurse practitioner, or other health care professional who can prescribe or administer compounds (or composition) for the disorders disclosed herein. In addition, a health care provider can include anyone who can recommend, prescribe, administer, or prevent an individual from receiving a compound or composition, including, for example, an insurance provider.

As used herein, the terms "prevent," "preventing," and "prevention" refer to the elimination or reduction of the occurrence or onset of one or more symptoms associated with a particular disorder. For example, the terms "prevent," "preventing," and "prevention" can refer to the administration of therapy on a prophylactic or preventative basis to an individual who may ultimately manifest at least one symptom of a disorder but who has not yet done so. Such individuals can be identified on the basis of risk factors that are known to correlate with the subsequent occurrence of the disease, such as the presence of a biomarker. Alternatively, prevention therapy can be administered as a prophylactic measure without prior identification of a risk factor. Delaying the onset of the at least one episode and/or symptom of a disorder can also be considered prevention or prophylaxis.

As used herein, the term "retention time" refers to the time required for a compound to pass from the point of injection to the detector. More specifically, an impurity can be identified by its position in a HPLC chromatogram, which is conventionally measured in minutes between injection of the sample on the column and elution of the particular component through the detector, known as the "retention time" ("RT"). This time period varies daily based upon the condition of the instrumentation and many other factors. To mitigate the effect that such variations have upon accurate identification of an impurity, practitioners use "relative retention time" ("RRT") to identify impurities. The RRT of an impurity is its retention time divided by the retention time of the main peak, in this embodiment, leflutrozole.

As used herein, the term "substantially pure" refers to a compound provided in a form which is substantially free of other compounds. The terms "substantially free of" may be characterizing the compound or composition having less than a described amount of another material or another compound, typically determined by HPLC analysis of a sample. In the context of the present disclosure, substantially pure leflutrozole will often, but not necessarily, refer to any compound, substance, or composition containing leflutrozole in which the leflutrozole has ≤2.0% of total impurities (e.g. other compounds) as determined by HPLC total peak area. Examples of said "other compounds" include, but are not limited to, compounds described by Formulae II-V. Thus, the crystalline forms of leflutrozole and compositions including the same, as found in the disclosure, are substantially free of alternative compounds, such as those described by Formulae II-V.

As used herein, the term "therapeutically effective amount" refers to the amount of active compound or pharmaceutical agent that elicits the biological or medicinal response in a tissue, system, animal, or human that is being sought by an individual, researcher, veterinarian, medical doctor, or other clinician or caregiver, which can include one or more of the following:

1. preventing the disorder, for example, preventing a disease, condition, or disorder in an individual who may be predisposed to the disease, condition, or disorder but does not yet experience or display the relevant pathology or symptomatology;
2. inhibiting the disorder, for example, inhibiting a disease, condition, or disorder in an individual who is experiencing or displaying the relevant pathology or symptomatology (i.e., arresting further development of the pathology and/or symptomatology); and
3. ameliorating the disorder, for example, ameliorating a disease, condition, or disorder in an individual who is experiencing or displaying the relevant pathology or symptomatology (i.e., reversing the pathology and/or symptomatology).

In some embodiments, the term "therapeutically effective amount" refers to the amount of active compound or pharmaceutical agent that elicits the biological or medicinal response in a tissue, system, animal, or human that is being sought by an individual, researcher, veterinarian, medical doctor, or other clinician or caregiver, which includes preventing the disorder, for example, preventing a disease, condition, or disorder in an individual who may be predisposed to the disease, condition, or disorder but does not yet experience or display the relevant pathology or symptomatology.

As used herein, the terms "treat," "treating," and "treatment" refer to the administration of therapy to an individual who already manifests, or who has previously manifested, at least one symptom of a disease, disorder, condition, dependence, or behavior. For example, "treating" can include any of the following with respect to a disease, disorder, condition, dependence, or behavior: alleviating, abating, ameliorating, improving, inhibiting (e.g., arresting the development), relieving, or causing regression. "Treating" can also include treating the symptoms, preventing additional symptoms, preventing the underlying physiological causes of the symptoms, or stopping the symptoms (either prophylactically and/or therapeutically) of a disease, disorder, condition, dependence, or behavior. For example, the term "treating" in reference to a disorder means a reduction in severity of one or more symptoms associated with a particular disorder. Therefore, treating a disorder does not necessarily mean a reduction in severity of all symptoms associated with a disorder and does not necessarily mean a complete reduction in the severity of one or more symptoms associated with a disorder. For example, successful treatment in the indication of disease infertility may be indicated by change in level of testosterone from less than 300 ng/dl to between 300 ng/dL and 1000 ng/dL. Treatment success for administering leflutrozole to subjects with decreased libido may experience an increased libido as self-reported by the subject. Subjects receiving treatment for erectile dysfunction may receive any of the aforementioned compounds or pharmaceutical compositions, and efficacy may be reported anecdotally by the subject. Improvements in the treatment of sleep apnea may be correlated with testosterone levels, as an improvement in sleep quality would lead to fewer disruptions of testosterone level normalization that would occur overnight during normal, uninterrupted, sleep patterns. Bone mineral density (BMD) changes may be monitored by dual-energy X-ray absorption (DEXA) scans, and subjects with low BMD prior to treatment may experience an improvement as determined by body composition in the scan (e.g. an increase in bone mineral density). A subject experiencing loss of hair or reduced shaving may experience hair growth or increased shaving frequency following treatment with any of the aforementioned compounds or pharmaceutical compositions. Subjects experiencing fatigue, impaired cognition, or depression may receive leflutrozole or compositions comprising leflutrozole, and the improvements in those symptoms may be self-reported by the subject in order to determine efficacy. Insulin resistance, glucose intolerance, and lipid abnormalities are examples where metabolites or other biomarkers may be used to monitor the subject's response to treatment with leflutrozole. A patient with endometriosis may be evaluated based on a biomarker as well, e.g. estradiol, in order to determine the efficacy of treatment.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination. In addition, subcombinations of uses and medical indications listed in the embodiments describing such uses and medical indications described herein, are also specifically embraced by the present invention just as if each subcombination of uses and medical indications was individually and explicitly recited herein.

DETAILED DESCRIPTION OF THE INVENTION

The present disclosure relates to the compound leflutrozole, (4-[(4-cyanophenyl)-fluoro-(1,2,4-triazol-1-yl)methyl] benzonitrile). The structure of leflutrozole is shown in Formula (I):

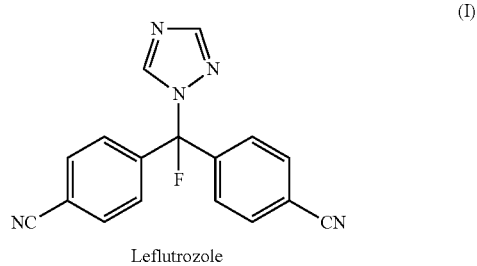 [SMILES: N#Cc1ccc(C(F)(c2ccc(C#N)cc2)n2cncn2)cc1]

Leflutrozole (I)

Without being limited by mechanism, leflutrozole acts as an aromatase inhibitor, thereby inhibiting conversion of androgens into estrogens (for example, the aromatization of testosterone to estradiol). The sections that follow describe exemplary crystalline forms of leflutrozole suitable for use as a medicament, methods of preparing the same, and methods of treatment of disorders that utilize the compounds and compositions of the disclosure.

Crystalline Forms of Leflutrozole

In an aspect, the disclosure provides crystalline forms of leflutrozole. In some cases, crystalline Form A of leflutrozole is substantially free of solvent and is anhydrous. Alternative crystal forms of leflutrozole are also described in the Examples, below. Crystalline forms described herein can be identified by their unique solid-state signature with respect to, for example, differential scanning calorimetry (DSC) profile, X-ray powder diffraction (XRPD), or other solid-state methods (e.g. thermogravimetric analysis (TGA)).

In an aspect, there is presented a crystalline Form A of leflutrozole having X-ray powder diffraction peaks at a diffraction angle 2θ (°) of 9.1±0.2, 16.8±0.2, and 26.1±0.2. In some embodiments, the crystalline Form A of leflutrozole has at least one peak at diffraction angle 2θ (°) of 9.1±0.2, 16.8±0.2, and 26.1±0.2, 13.9±0.2, 15.6±0.2, 21.1±0.2, or 24.9±0.2 as measured by X-ray powder diffractometry. In some embodiments, the crystalline Form A of leflutrozole is the anhydrous form of leflutrozole. Anhydrous leflutrozole may be characterized by a crystalline lattice structure that is substantially free of solvent molecules, including water, as determined by XRPD. The crystalline Form A of leflutrozole may have at least one peak of 9.1±0.2, 16.8±0.2, and 26.1±0.2. Any of the previous crystalline forms of leflutrozole may additionally have peaks at 13.9±0.2, 15.6±0.2, 21.1±0.2, 24.9±0.2, 10.9±0.2, 14.4±0.2, 18.0±0.2, 18.5±0.2, 24.6±0.2, 27.4±0.2, 28.0±0.2, or 29.3±0.2. In some embodiments, the crystalline Form A of leflutrozole has one or more (e.g. two or more, three or more, four or more, etc.) peaks selected from 9.1±0.2, 16.8±0.2, 26.1±0.2, 13.9±0.2, 15.6±0.2, 21.1±0.2, 24.9±0.2, 10.9±0.2, 14.4±0.2, 18.0±0.2, 18.5±0.2, 24.6±0.2, 27.4±0.2, 28.0±0.2, or 29.3±0.2. In some embodiments, the crystalline Form A of leflutrozole has additional X-ray powder diffraction peaks at a diffraction angle 2θ (°) of 22.6±0.2, 23.8±0.2, 26.8±0.2, 28.4±0.2, 31.4±0.2, and 32.5±0.2. In some embodiments, the crystalline Form A of leflutrozole has an endotherm at about 169° C. in the differential scanning calorimetry (DSC) profile. The crystalline Form A of leflutrozole may be the form having the X-ray powder diffraction spectrum as shown in FIG. 1.

Figure 1:
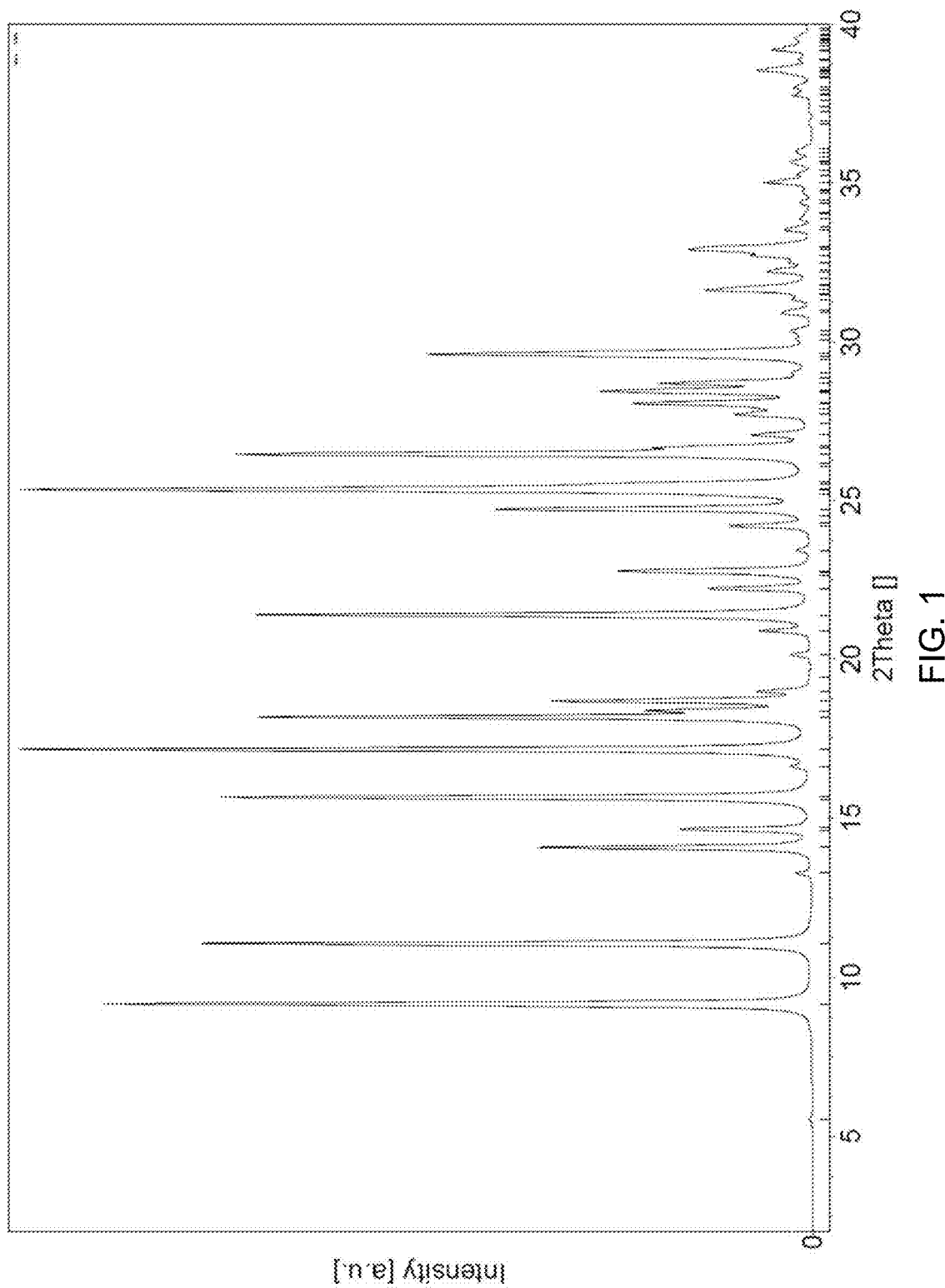
FIG. 1 is X-ray powder diffractogram for crystalline Form A leflutrozole.

FIG. 1 shows the X-ray diffraction diagram of the anhydrous form of leflutrozole. The most intense peak in the X-ray diffraction diagram is observed at an angle of diffraction 2θ of about 26.1±0.2°. The crystalline anhydrous leflutrozole is characterized by the 2θ peak positions of at least about 9.1±0.2°, about 16.8±0.2°, and about 26.1±0.2°. In a substantially pure sample, being substantially free of any impurities as set forth in the embodiments of the invention (e.g. synthetic byproducts or degradation products), of crystalline anhydrous leflutrozole, peaks can be observed at angles of diffraction 2θ as set forth in Table 1.

TABLE 1

Peak List of Leflutrozole Form A.

| 2θ (°) | Intensity |
|---|---|
| 9.09 | 76.99 |
| 10.94 | 45.97 |
| 13.88 | 57.07 |
| 14.42 | 24.61 |
| 15.56 | 82.94 |
| 16.84 | 89.53 |
| 18.01 | 46.49 |
| 18.54 | 34.26 |
| 21.09 | 77.17 |
| 22.62 | 27.88 |
| 23.76 | 20.14 |
| 24.56 | 48.00 |
| 24.89 | 89.17 |
| 26.08 | 100.00 |
| 26.76 | 14.60 |
| 27.39 | 27.38 |
| 28.00 | 25.76 |
| 28.36 | 19.94 |
| 29.28 | 42.22 |
| 31.43 | 14.60 |
| 32.46 | 16.18 |

Figure 7:
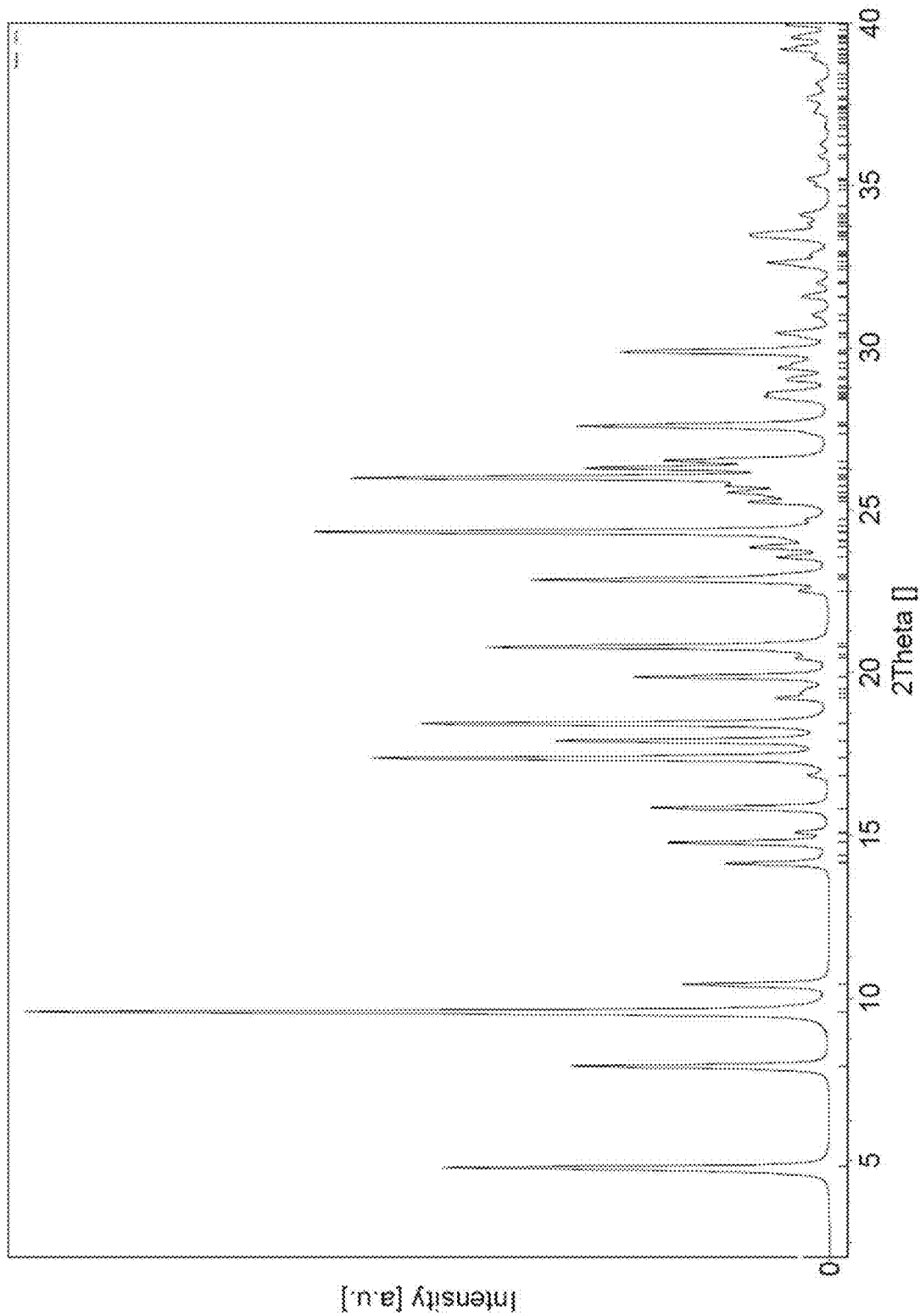
FIG. 7 is an exemplary X-ray powder diffractogram for the crystalline Form B of leflutrozole.

Alternative crystal forms of leflutrozole include crystalline Form B of leflutrozole, which is an acetone solvate of leflutrozole. Form B of leflutrozole may be characterized by a crystalline lattice structure that contains additional solvent molecules, i.e. acetone, as determined by XRPD. The ratio of leflutrozole to acetone in Form B of leflutrozole may be 1:1. The crystalline form of leflutrozole may be the form having the X-ray powder diffraction spectrum as shown in FIG. 7. FIG. 7 shows the X-ray diffraction diagram of Form B of leflutrozole.

Figure 8:
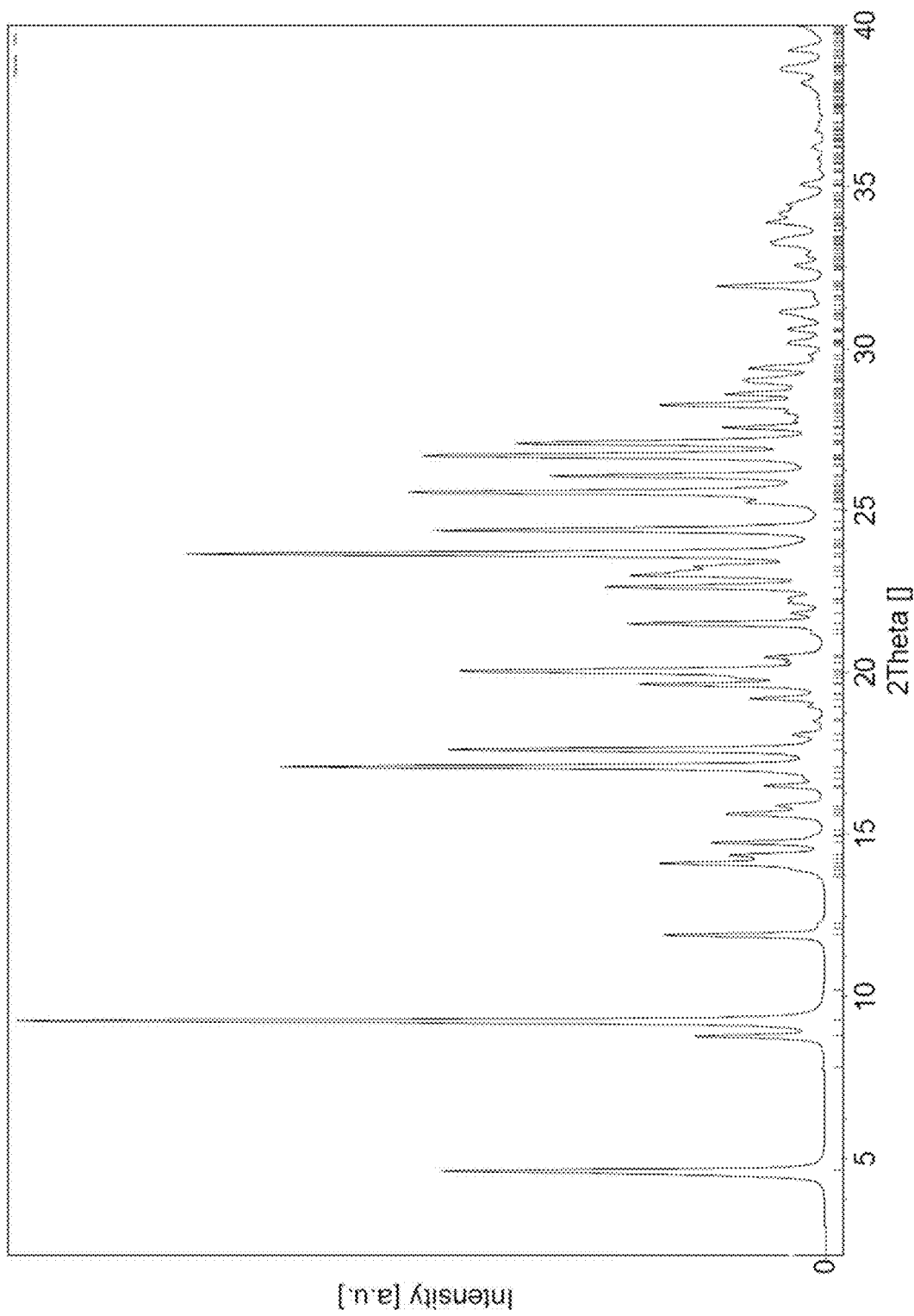
FIG. 8 is an exemplary X-ray powder diffractogram for the crystalline Form C of leflutrozole.

Alternative crystal forms of leflutrozole include crystalline Form C of leflutrozole, which is an ethyl acetate solvate of leflutrozole. Form C of leflutrozole may be characterized by a crystalline lattice structure that contains additional solvent molecules, i.e. ethyl acetate, as determined by XRPD. The ratio of leflutrozole to ethyl acetate in Form C of leflutrozole may be 1:1. The crystalline Form C of leflutrozole may be the form having the X-ray powder diffraction spectrum as shown in FIG. 8. FIG. 8 shows the X-ray diffraction diagram of an ethyl acetate solvate of leflutrozole.

Figure 9:
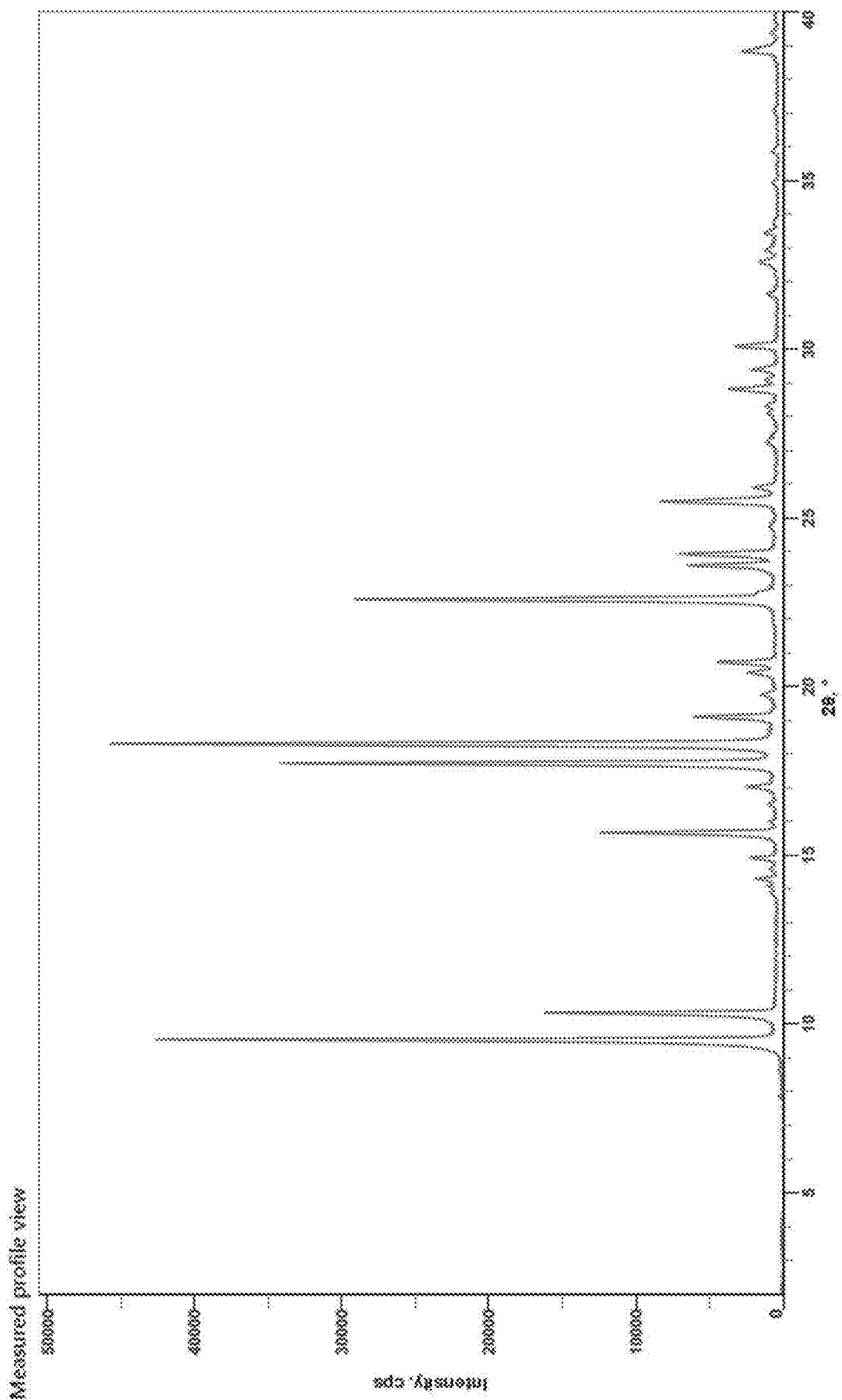
FIG. 9 is an exemplary X-ray powder diffractogram for the crystalline Form D of leflutrozole.

Still other crystal forms of leflutrozole include crystalline Form D of leflutrozole. Form D of leflutrozole may be characterized by a crystalline lattice structure. The crystalline Form D of leflutrozole is characterized by the X-ray powder diffraction spectrum as shown in FIG. 9, which shows an exemplary X-ray powder diffraction spectrum for the Form D polymorph. Crystalline Form D of leflutrozole has XRPD peaks that can be observed at angles of diffraction 2θ as set forth in Table 2.

TABLE 2

Peak List of Leflutrozole Form D.

| 2θ (°) | Intensity |
|---|---|
| 3.86 | 1.65 |
| 7.84 | 1.48 |
| 9.55 | 79.36 |
| 10.34 | 34.72 |
| 14.31 | 4.52 |
| 14.61 | 1.73 |
| 14.92 | 4.01 |
| 15.67 | 23.97 |
| 16.00 | 0.75 |
| 16.49 | 0.69 |
| 17.04 | 3.77 |
| 17.73 | 68.29 |
| 18.30 | 100.00 |
| 19.10 | 13.00 |
| 19.74 | 2.51 |
| 20.41 | 4.56 |
| 20.71 | 8.99 |
| 22.58 | 55.99 |
| 22.78 | 7.64 |
| 22.97 | 0.30 |
| 23.58 | 13.86 |
| 23.92 | 16.96 |
| 24.70 | 1.25 |
| 25.48 | 20.55 |
| 25.88 | 3.12 |
| 27.21 | 1.98 |
| 27.43 | 0.24 |
| 27.93 | 0.77 |
| 28.08 | 1.24 |
| 28.28 | 1.57 |
| 28.80 | 7.90 |
| 29.08 | 1.96 |
| 29.39 | 4.00 |
| 30.07 | 6.77 |
| 31.59 | 1.62 |
| 32.56 | 4.09 |
| 32.92 | 2.40 |
| 33.11 | 0.23 |
| 33.16 | 0.63 |
| 33.43 | 2.20 |
| 33.72 | 0.94 |
| 34.89 | 0.77 |
| 35.84 | 0.76 |
| 38.56 | 0.58 |
| 38.81 | 7.44 |
| 39.35 | 0.67 |

Figure 10:
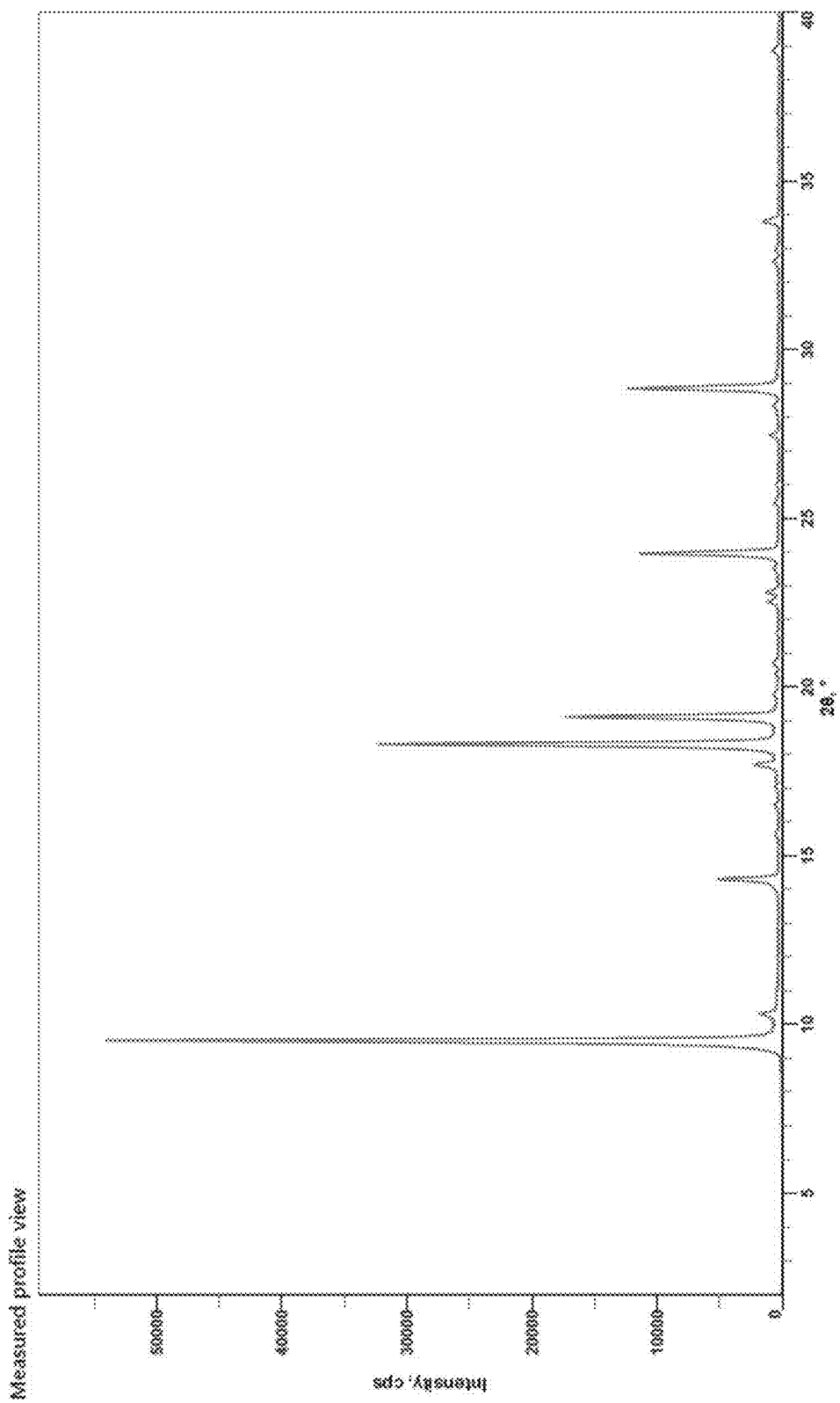
FIG. 10 is an exemplary X-ray powder diffractogram for the crystalline Form E of leflutrozole.

Alternative crystal forms of leflutrozole include crystalline Form E of leflutrozole. Form E of leflutrozole may be characterized by a crystalline lattice structure. The crystalline Form E of leflutrozole is characterized by the X-ray powder diffraction spectrum as shown in FIG. 10, which is an exemplary X-ray powder diffraction spectrum of the Form E polymorph. Crystalline Form E of leflutrozole has XRPD peaks that can be observed at angles of diffraction 2θ as set forth in Table 3.

TABLE 3

Peak List of Leflutrozole Form E.

| 2θ (°) | Intensity |
|---|---|
| 9.54 | 100.00 |
| 10.28 | 10.63 |
| 14.29 | 10.79 |
| 15.61 | 0.56 |
| 16.53 | 0.61 |
| 17.69 | 3.54 |
| 18.30 | 64.97 |
| 19.11 | 33.58 |
| 19.74 | 0.82 |
| 20.69 | 1.08 |
| 22.50 | 1.54 |
| 22.78 | 1.89 |
| 23.46 | 0.69 |
| 23.95 | 22.61 |
| 25.41 | 1.01 |
| 27.46 | 1.20 |
| 28.32 | 1.04 |
| 28.84 | 25.10 |
| 31.80 | 0.16 |
| 32.60 | 1.14 |
| 32.93 | 0.48 |
| 33.76 | 2.98 |

Figure 11:
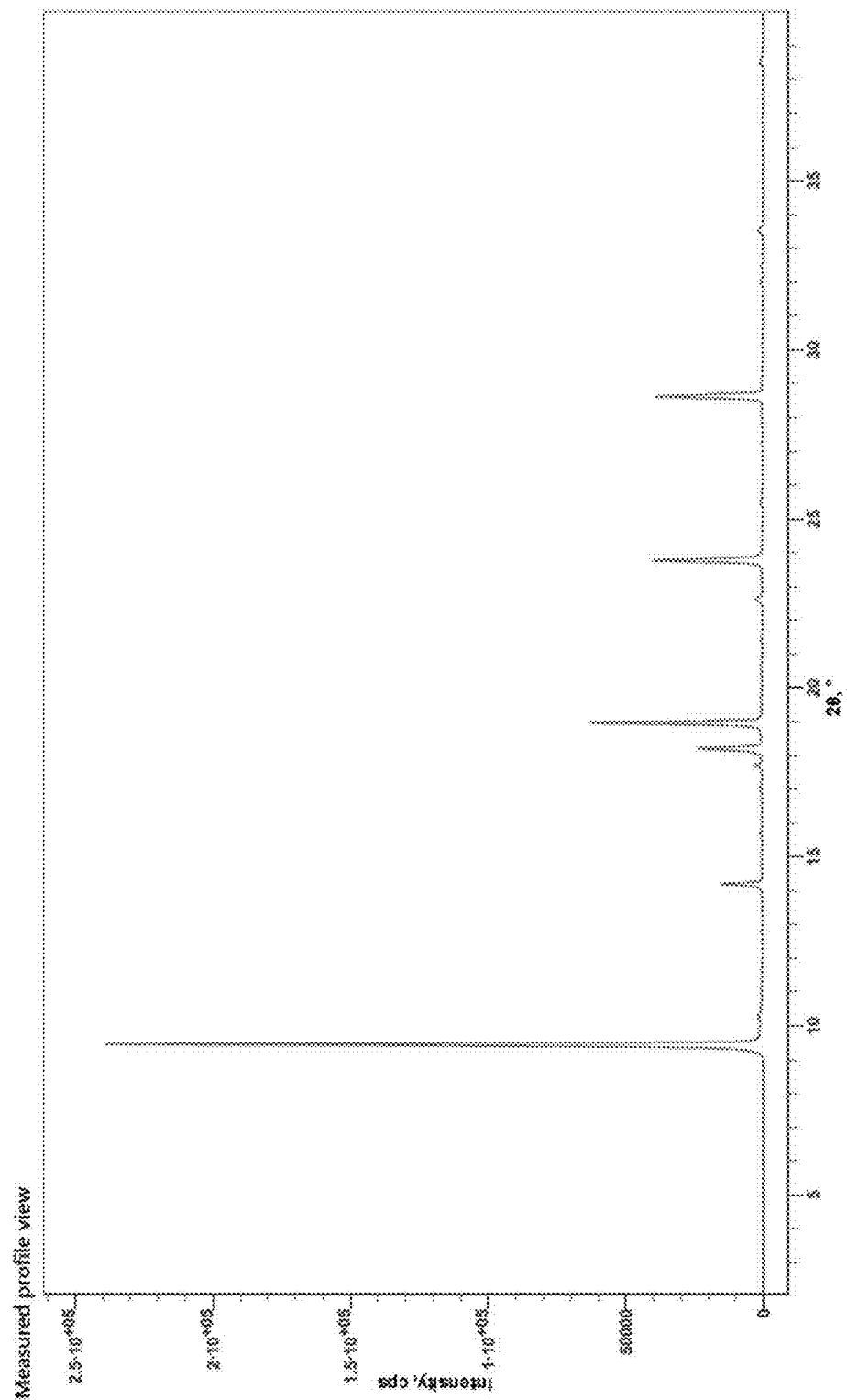
FIG. 11 is an exemplary X-ray powder diffractogram for the crystalline Form F of leflutrozole.

Alternative crystal forms of leflutrozole include crystalline Form F of leflutrozole. Form F of leflutrozole may be characterized by a crystalline lattice structure. The crystalline Form F of leflutrozole is characterized by an X-ray powder diffraction spectrum as shown in FIG. 11, which is an exemplary X-ray powder diffraction spectrum for the Form F polymorph. Crystalline Form F of leflutrozole has XRPD peaks that can be observed at angles of diffraction 2θ as set forth in Table 4.

TABLE 4

Peak List of Leflutrozole Form F.

| 2θ (°) | Intensity |
|---|---|
| 9.46 | 100.00 |
| 10.54 | 5.32 |
| 14.19 | 7.30 |
| 15.65 | 0.46 |
| 17.10 | 0.60 |
| 17.68 | 1.40 |
| 18.20 | 13.46 |
| 18.95 | 33.29 |
| 20.67 | 0.70 |
| 21.43 | 0.21 |
| 22.60 | 1.27 |
| 23.75 | 22.99 |
| 25.43 | 0.39 |
| 25.76 | 0.17 |
| 25.91 | 0.07 |
| 27.28 | 0.18 |
| 28.60 | 23.40 |
| 30.12 | 0.21 |
| 31.98 | 0.42 |
| 32.45 | 0.46 |
| 32.86 | 0.07 |
| 33.49 | 1.19 |
| 36.80 | 0.26 |
| 38.46 | 0.86 |
| 38.66 | 0.29 |

Figure 12:
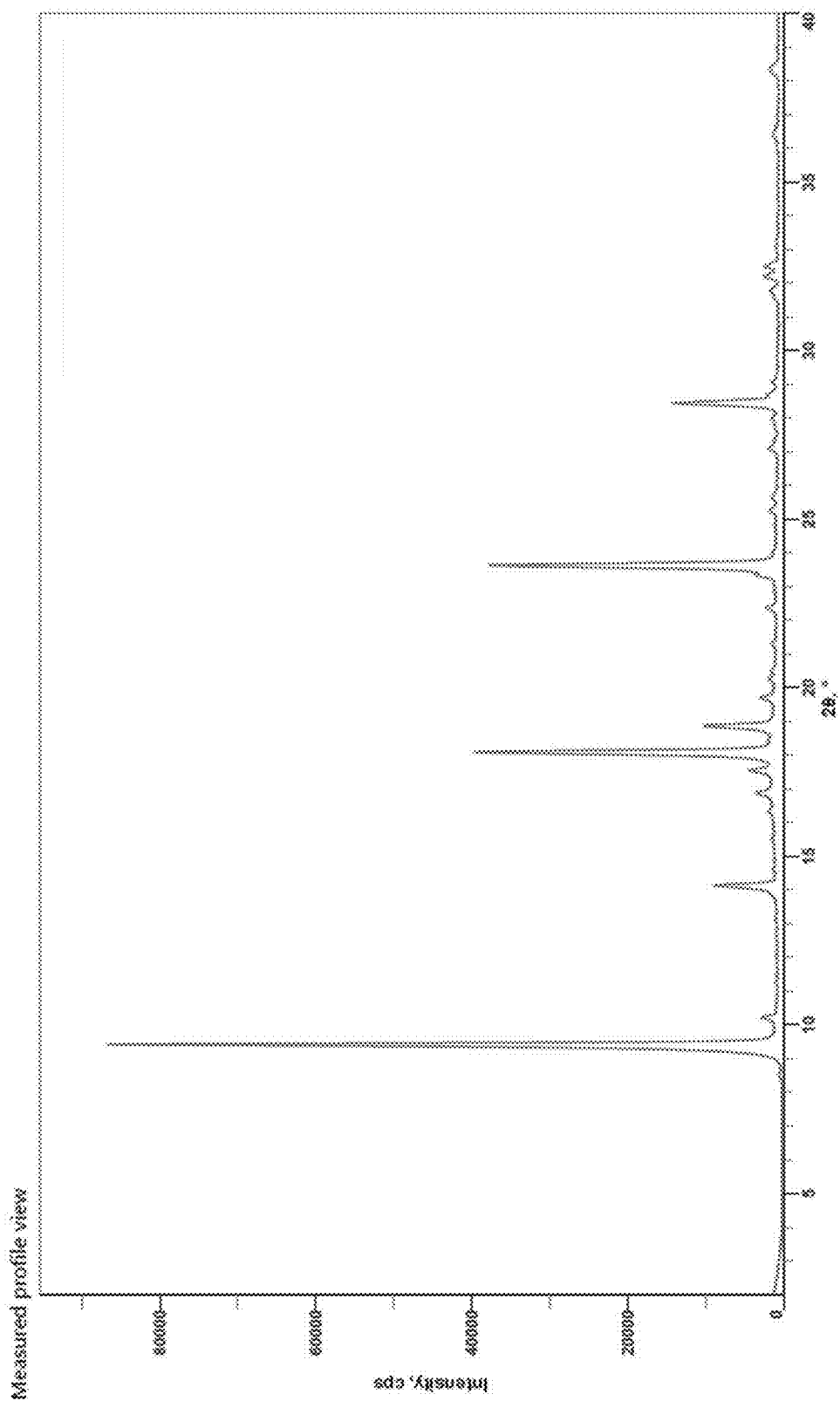
FIG. 12 is an exemplary X-ray powder diffractogram for the crystalline Form G of leflutrozole.

Alternative crystal forms of leflutrozole include crystalline Form G of leflutrozole. Form G of leflutrozole may be characterized by a crystalline lattice structure. The crystalline Form G of leflutrozole is characterized by the X-ray powder diffraction spectrum as shown in FIG. 12, which is an exemplary X-ray powder diffraction spectrum for the Form G polymorph. Crystalline Form G of leflutrozole has XRPD peaks that can be observed at angles of diffraction 2θ as set forth in Table 5.

TABLE 5

Peak List of Leflutrozole Form G.

| 2θ (°) | Intensity |
|---|---|
| 5.72 | 3.42 |
| 9.43 | 100.00 |
| 10.19 | 7.56 |
| 14.13 | 10.55 |
| 15.52 | 0.30 |
| 16.31 | 0.97 |
| 16.88 | 3.11 |
| 17.54 | 3.03 |
| 18.08 | 50.45 |
| 18.86 | 12.40 |
| 19.71 | 2.26 |
| 20.23 | 1.58 |
| 21.31 | 0.53 |
| 22.37 | 1.50 |
| 23.32 | 2.07 |
| 23.61 | 52.35 |
| 25.20 | 1.25 |
| 25.59 | 1.04 |
| 27.07 | 2.31 |
| 27.98 | 1.53 |
| 28.43 | 19.03 |
| 28.69 | 1.35 |
| 29.06 | 1.03 |
| 31.72 | 2.34 |
| 32.18 | 2.56 |
| 32.48 | 2.22 |
| 35.99 | 0.44 |
| 36.35 | 2.12 |
| 38.31 | 2.83 |

Figure 13:
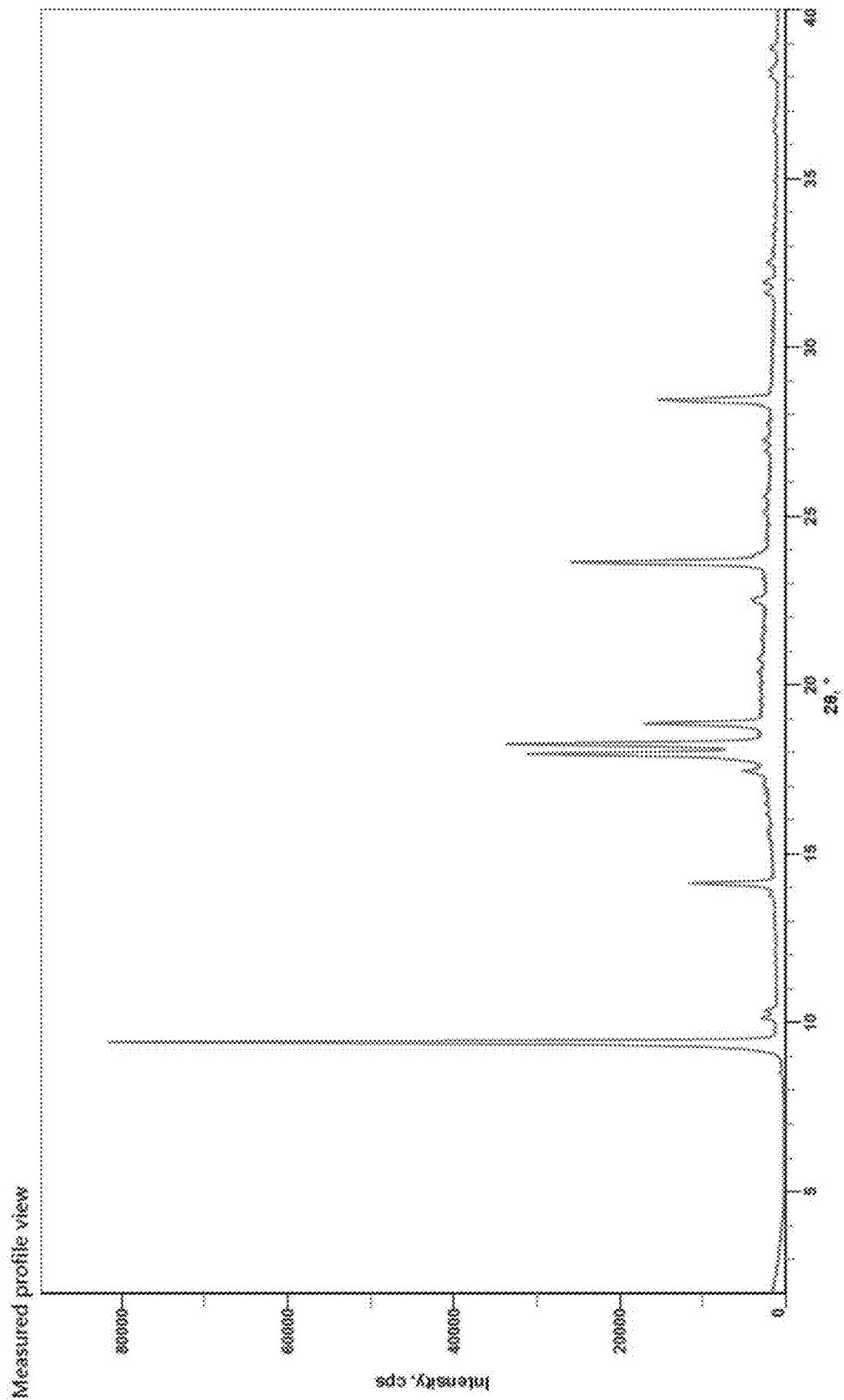
FIG. 13 is an exemplary X-ray powder diffractogram for the crystalline Form H of leflutrozole.

Alternative crystal forms of leflutrozole include crystalline Form H of leflutrozole. Form H of leflutrozole may be characterized by a crystalline lattice structure. The crystalline Form H of leflutrozole is characterized by the X-ray powder diffraction spectrum of FIG. 13, which is an exemplary X-ray powder diffraction spectrum of the Form H polymorph. Crystalline Form H of leflutrozole has XRPD peaks that can be observed at angles of diffraction 2θ as set forth in Table 6.

TABLE 6

Peak List of Leflutrozole Form H.

| 2θ (°) | Intensity |
|---|---|
| 6.41 | 3.48 |
| 9.41 | 100.00 |
| 10.14 | 3.65 |
| 10.35 | 4.81 |
| 13.79 | 0.36 |
| 14.13 | 12.44 |
| 17.43 | 2.27 |
| 17.94 | 41.17 |
| 18.20 | 46.48 |
| 18.86 | 18.46 |
| 20.80 | 0.84 |
| 22.49 | 2.78 |
| 23.61 | 33.84 |
| 23.82 | 2.62 |
| 25.07 | 0.74 |
| 25.55 | 1.19 |
| 26.89 | 0.84 |
| 27.20 | 1.11 |
| 27.69 | 0.57 |
| 28.43 | 21.38 |
| 31.37 | 0.07 |
| 31.57 | 1.78 |

TABLE 6-continued

Peak List of Leflutrozole Form H.

| 2θ (°) | Intensity |
|---|---|
| 31.89 | 1.89 |
| 32.49 | 1.46 |
| 32.83 | 0.39 |
| 33.32 | 0.35 |
| 36.37 | 0.59 |
| 36.67 | 0.74 |
| 38.00 | 1.53 |
| 38.19 | 1.57 |
| 38.81 | 1.49 |

Figure 14:
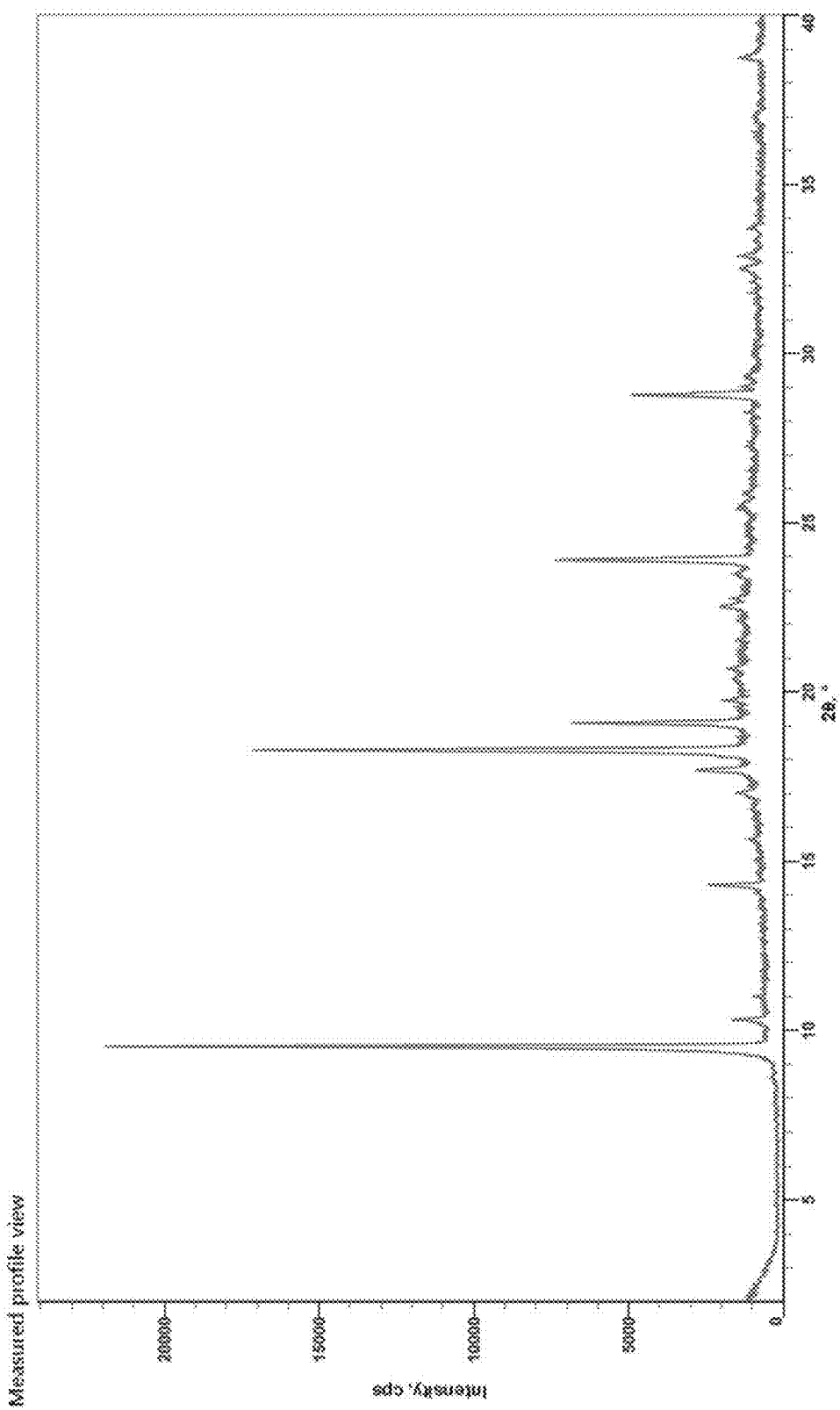
FIG. 14 is an exemplary X-ray powder diffractogram for the crystalline Form I of leflutrozole.

Alternative crystal forms of leflutrozole include crystalline Form I of leflutrozole. Form I of leflutrozole may be characterized by a crystalline lattice structure. The crystalline Form I of leflutrozole is characterized by an X-ray powder diffraction spectrum as shown in FIG. 14, which is an exemplary X-ray powder diffraction spectrum for the Form I polymorph. Crystalline Form I of leflutrozole has XRPD peaks that can be observed at angles of diffraction 2θ as set forth in Table 7.

TABLE 7

Peak List of Leflutrozole Form I.

| 2θ (°) | Intensity |
|---|---|
| 9.54 | 100.00 |
| 10.33 | 7.86 |
| 10.98 | 6.40 |
| 14.29 | 8.04 |
| 17.03 | 2.37 |
| 17.68 | 9.17 |
| 18.27 | 80.05 |
| 19.08 | 28.06 |
| 19.76 | 2.83 |
| 20.70 | 7.71 |
| 22.49 | 5.50 |
| 22.74 | 1.71 |
| 23.46 | 2.32 |
| 23.89 | 34.10 |
| 25.41 | 7.30 |
| 28.24 | 1.18 |
| 28.77 | 21.67 |
| 29.01 | 1.71 |
| 29.33 | 2.66 |
| 32.12 | 0.98 |
| 32.50 | 5.15 |
| 32.88 | 3.63 |
| 33.68 | 1.78 |
| 38.71 | 5.62 |

Figure 15:
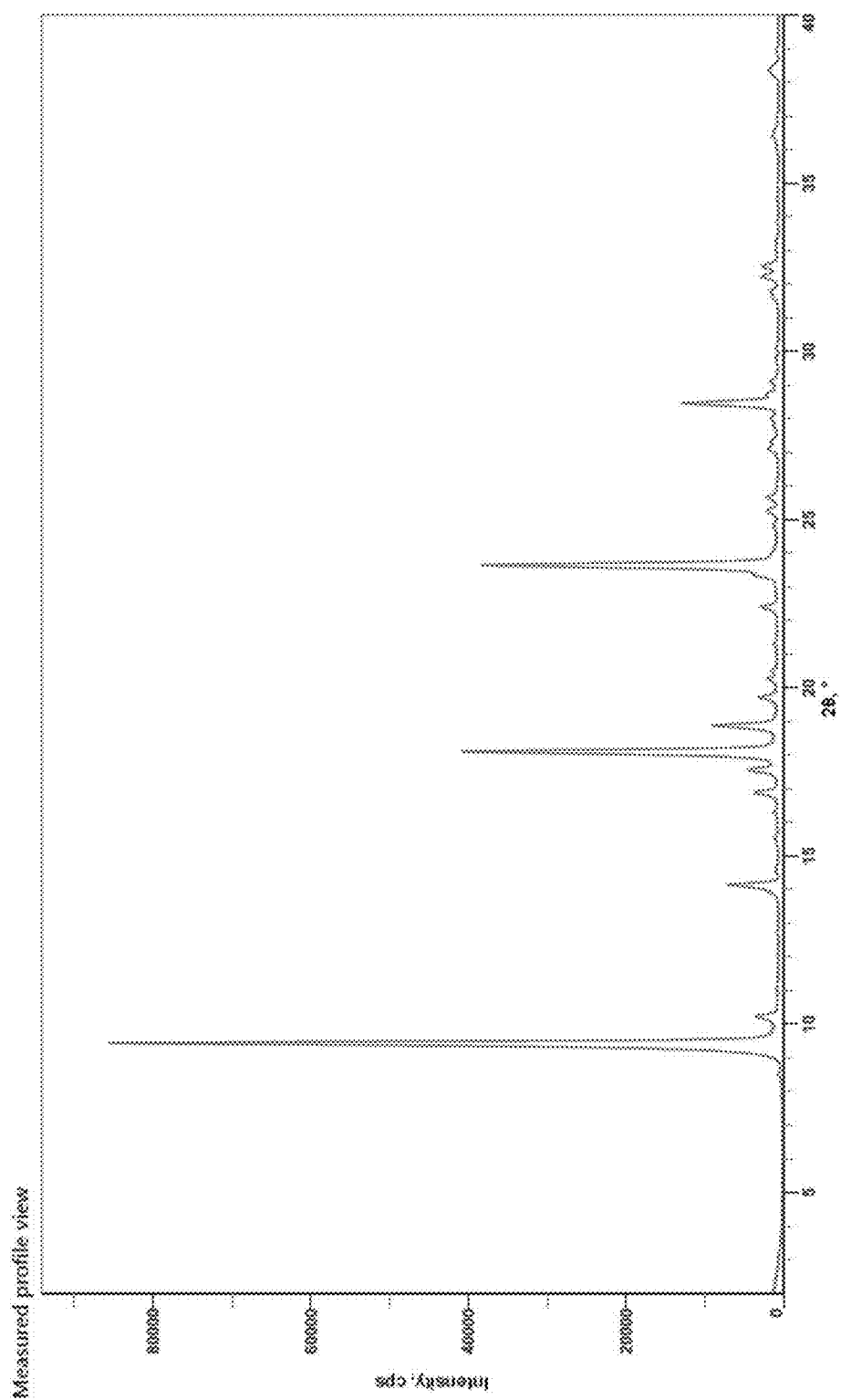
FIG. 15 is an exemplary X-ray powder diffractogram for the crystalline Form J of leflutrozole.

Alternative crystal forms of leflutrozole include crystalline Form J of leflutrozole. Form J of leflutrozole may be characterized by a crystalline lattice structure. The crystalline Form J of leflutrozole is characterized by the X-ray powder diffraction spectrum as shown in FIG. 15, which is an exemplary X-ray powder diffraction spectrum for the Form J polymorph. Crystalline Form J of leflutrozole has XRPD peaks that can be observed at angles of diffraction 2θ as set forth in Table 8.

TABLE 8

Peak List of Leflutrozole Form J.

| 2θ (°) | Intensity |
|---|---|
| 9.46 | 100.00 |
| 10.23 | 5.95 |

TABLE 8-continued

Peak List of Leflutrozole Form J.

| 2θ (°) | Intensity |
|---|---|
| 14.13 | 8.47 |
| 15.51 | 0.36 |
| 16.30 | 0.33 |
| 16.87 | 3.40 |
| 17.55 | 3.46 |
| 18.10 | 48.52 |
| 18.87 | 10.47 |
| 19.72 | 2.67 |
| 20.24 | 1.53 |
| 20.48 | 0.62 |
| 21.32 | 0.43 |
| 22.21 | 0.21 |
| 22.36 | 1.90 |
| 23.34 | 2.60 |
| 23.63 | 48.25 |
| 24.78 | 0.48 |
| 25.21 | 1.62 |
| 25.61 | 1.74 |
| 27.23 | 2.33 |
| 27.97 | 1.77 |
| 28.44 | 14.06 |
| 28.71 | 1.96 |
| 29.08 | 1.21 |
| 31.72 | 2.15 |
| 32.20 | 2.74 |
| 32.50 | 2.51 |
| 36.34 | 2.22 |
| 36.93 | 0.21 |
| 38.33 | 2.66 |
| 38.90 | 0.29 |

In some embodiments, the crystalline form of leflutrozole is anhydrous (e.g., crystalline Form A of leflutrozole described herein). In some embodiments, leflutrozole may adopt a solvated crystalline form (e.g., a solvate represented by crystalline Form B or C, among others described herein). For instance, the crystal polymorph of leflutrozole may be free of solvent (i.e., anhydrous) or may be a solvate, in which case the solvent present in the crystal structure alongside leflutrozole may be, e.g., acetone or ethyl acetate, among others.

In some embodiments, the crystalline Form A of leflutrozole is present in a pharmaceutical composition containing micronized particles of crystalline leflutrozole, such that the composition has a particle size distribution ($D_{90}$) of ≤35 μm. In some embodiments, the crystalline leflutrozole is milled using techniques known in the art. Accordingly, milled Form A leflutrozole may have a $D_{10}$, $D_{50}$, and $D_{90}$, of about 1 μm, 4 μm, and 11 μm, respectively.

In some instances, the crystalline Form A of leflutrozole may be obtainable by recrystallization from an appropriate solvent. For example, Form A of leflutrozole may be obtained by recrystallization from ethanol. However, if alternative solvents are used, such as acetone or ethyl acetate, a crystalline solvate may instead be obtained. Thus, there is provided crystalline Form A of leflutrozole obtainable by recrystallization from a solvent. In some embodiments, the crystalline form of leflutrozole obtainable by recrystallization from a solvent is Form A. In some embodiments, the crystalline form of leflutrozole obtainable by recrystallization from a solvent is a solvate, e.g. Form B or Form C. In some embodiments, the recrystallization solvent is selected from methanol, ethanol, isopropanol, acetone, ethyl acetate, N,N-dimethylformamide, N,N-dimethylacetamide, dimethyl sulfoxide, tetrahydrofuran, 2-methyltetrahydrofuran, tetrahydropyran, toluene, benzene, 1,4-dioxane, and diethyl ether. In some embodiments, the recrystallization solvent is ethanol. In some embodiments, the recrystallization solvent is acetone. In some embodiments, the recrystallization solvent is ethyl acetate.

Methods of Preparation

In an aspect, the disclosure provides a process for preparation of crystalline leflutrozole. The crystalline leflutrozole product may be anhydrous, such as Form A. Previously, the compound was made by treating letrozole with potassium hexamethyldisilazane (a strong, non-nucleophilic base with an approximate pKa of 26) and then reacted with an excess of fluorinating agent, in this case, N-fluorodimethylsaccharinsultam (also known as 2-fluoro-3,3-dimethyl-2,3-dihydro-1,2-benzisothiazole 1,1-dioxide) in THF at −78° C. There is a need for an improved process to prepare leflutrozole and more specifically, to prepare leflutrozole in a highly pure and crystalline form. The present invention provides compounds, compositions, and methods to meet these critical needs.

The process used to prepare crystalline leflutrozole comprises deprotonating letrozole starting material with a suitable base in an appropriate organic solvent, reacting the letrozole carbanion with an electrophilic fluorine source (thereby generating a crude leflutrozole product), quenching the reaction, and recrystallization to achieve purity of the leflutrozole product. The base used for deprotonation may be, for example, sodium methoxide, sodium ethoxide, sodium isopropoxide, potassium tert-butoxide, sodium hydride, potassium hydride, lithium hexamethyldisilazane, sodium hexamethyldisilazane, potassium hexamethyldisilazane, n-butyllithium, or any other suitable base as familiar to one of skill in the art. The solvent may be, for example, N,N-dimethylformamide, N,N-dimethylacetamide, dimethyl sulfoxide, tetrahydrofuran, 2-methyltetrahydrofuran, tetrahydropyran, toluene, benzene, 1,4-dioxane, or diethyl ether. The electrophilic fluorine source may be, for example, N-fluorodimethylsaccharinsultam or 1-(Chloromethyl)-4-fluoro-1,4-diazabicyclo[2.2.2]octane-1,4-diium ditetrafluoroborate (Selectfluor™). Quenching of the reaction mixture is typically performed with a mildly acidic reverse quench (the reaction mixture is poured onto the quenching media instead of addition of the quenching reagent to the reaction mixture) to effect neutralization of the reaction mixture and termination of the reaction. For instance, aqueous solutions of ammonium chloride could be considered for acidifying the reaction in a normal quench (addition of ammonium chloride solution to the reaction mixture) or an inverse quench (the reaction mixture is added to the ammonium chloride solution). Following a quench, an appropriate recrystallization solvent may be chosen to increase the purity of the obtained crude leflutrozole. The recrystallization may be achieved using a solvent such as ethanol, acetone, or ethyl acetate, and may occur with particular methods controlling temperature as familiar to the skilled artisan.

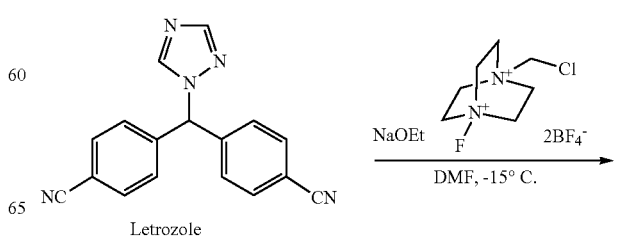

Letrozole

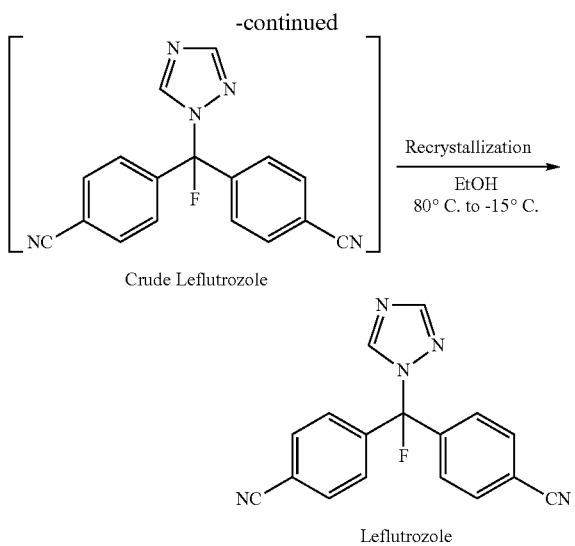

Crude Leflutrozole

Recrystallization
EtOH
80° C. to -15° C.

Leflutrozole

The choice of solvent for recrystallization may affect the physicochemical properties of the solid crystalline product obtained, such as through the production of different crystalline polymorphs. For example, recrystallization from ethanol provides crystalline Form A leflutrozole, which is anhydrous and has no other solvent molecules present in the crystal structure. However, the choice of acetone or ethyl acetate instead results in residual solvent molecules being present in the crystal structure, leading to solvates such as Form B or Form C being obtained.

In some embodiments, the process further comprises recrystallizing the leflutrozole more than once to remove impurities. Impurities may be detected by any physical technique as familiar to one of skill in the art. Typically, high-performance liquid chromatography (HPLC) is used to determine the relative amounts of impurities in an obtained sample of leflutrozole product. In cases where any one impurity or the total amount of impurities is present in an unacceptable amount, such as by being greater than a target percentage by HPLC area in the product, then multiple recrystallizations may be considered to improve the leflutrozole purity. For example, if the amount of an impurity as described in the present disclosure is greater than 1% of the HPLC total peak area following a first recrystallization, then a second recrystallization of the crystalline leflutrozole can be performed. For a given impurity, the threshold for unacceptable amount of total HPLC peak area may be 0.1%, where an additional recrystallization is recommended when greater than 0.1% peak area impurity is detected. In some cases, the total amount of impurities may be greater than 2% of the total HPLC peak area, and in such instances an additional recrystallization is recommended.

Purity

The disclosure provides a method of preparing high purity leflutrozole, comprising:
  i. reacting letrozole and sodium ethoxide in a solvent to yield a solution of letrozole carbanion;
  ii. treating the solution with a fluorinating reagent to yield a reaction mixture;
  iii. inverse quenching the reaction mixture by adding the reaction mixture to an ammonium chloride solution; and
  iv. isolating the leflutrozole In some cases, the process or method for preparing leflutrozole in high purity or quality is achieved by dividing the reagents into portions prior to addition and combining the reagents with the reaction mixture in a portion wise fashion, so as to control reaction temperature or mixing. For instance, a total amount of sodium ethoxide may be divided into at least 5 portions and added sequentially while monitoring the reaction temperature so as to prevent a sizable exotherm. Accordingly, an aspect of the invention includes preparing leflutrozole by dividing the total amount of sodium ethoxide into at least 5 portions and the total amount of fluorinating agent into 10 portions. In some embodiments, the leflutrozole is prepared with 5 portions of sodium ethoxide and 10 portions of fluorinating reagent by:
  i. adding a first portion of sodium ethoxide to a solution of letrozole at about −15° C. under inert atmosphere;
  ii. monitoring the reaction temperature until the solution returns to about −15° C.;
  iii. adding the second portion of the sodium ethoxide to the solution at about −15° C.;
  iv. repeating the previous steps i.-iii. until all portions of the sodium ethoxide are added, thereby generating a solution of letrozole carbanion;
  v. adding a first portion of fluorinating agent to the solution of letrozole carbanion at about −15
  vi. monitoring the reaction temperature until the solution returns to about −15° C.;
  vii. adding the second portion of fluorinating agent to the solution at about −15° C.; and
  viii. repeating the previous steps v.-vii. until all portions of the fluorinating agent are added, thereafter generating a solution of leflutrozole; and
  ix. isolating the leflutrozole.

In some embodiments, the method further comprises recrystallizing the leflutrozole. The method may further comprise additional recrystallizations in order to obtain leflutrozole that is substantially free of alternative compounds. In some embodiments, the method further comprises micronizing the leflutrozole.

In some embodiments, the high purity leflutrozole is prepared having ≥98% purity relative to the presence of other compounds; the combined total of all impurities is ≤2.0% of the total HPLC area. In some cases, the high purity leflutrozole is defined as being leflutrozole substantially free of an amount of the compound of formula (II):

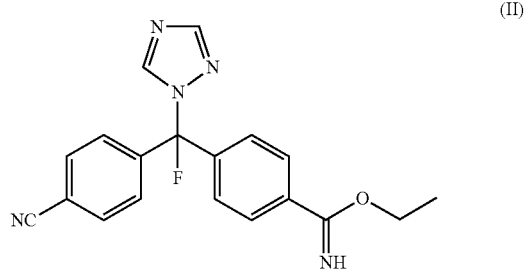 [SMILES: CCOC(=N)c1ccc(C(F)(c2ccc(C#N)cc2)n2cncn2)cc1]

(II)

In some embodiments, the leflutrozole being substantially free of the compound of formula (II) has ≤0.2% of the impurity by HPLC area percentage. In some cases, the leflutrozole substantially free of the compound of formula (II) was prepared at a reaction temperature below −10° C.

In some embodiments, the high purity leflutrozole is defined as leflutrozole being substantially free of an amount of the compound of formula (III):

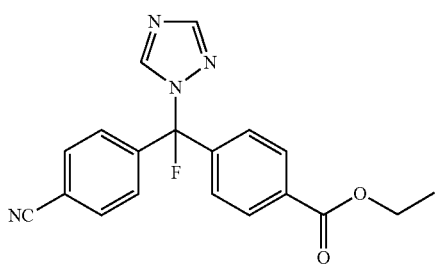 [SMILES: CCOC(=O)c1ccc(C(F)(c2ccc(C#N)cc2)n2cncn2)cc1]

(III)

In some embodiments, the leflutrozole being substantially free of the compound of formula (III) has ≤0.5% of the impurity by HPLC area percentage. In some embodiments, the leflutrozole being substantially free of the compound of formula (III) has ≤0.1% of the impurity by HPLC area percentage.

Also provided is a method of preparing high-purity leflutrozole, being leflutrozole substantially free of the compound 4,4'-carbonyl-bis-benzonitrile (formula (IV)):

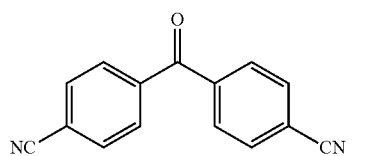

(IV)

In some embodiments, the leflutrozole being substantially free of the compound of formula (IV) has ≤0.1% of the impurity by HPLC area percentage.

In some embodiments, the high purity leflutrozole is defined as leflutrozole being substantially free of an amount of the compound of formula (V):

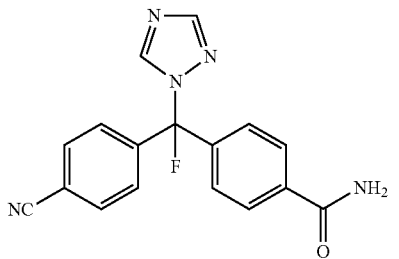

(V)

In some embodiments, the leflutrozole being substantially free of the compound of formula (V) has ≤0.5% of the impurity by HPLC area percentage. In some embodiments, the leflutrozole being substantially free of the compound of formula (V) has ≤0.1% of the impurity by HPLC area percentage.

In some embodiments, the leflutrozole is substantially free of impurities (e.g. having ≤2.0% total impurities by HPLC peak area). The high purity leflutrozole may be substantially free of water, i.e. anhydrous. The high-purity leflutrozole is stable for more than 36 months at room temperature and does not develop an individual impurity of >0.8% HPLC peak area. Similarly, the total amount of impurities over this period remains at ≤2.0% of the total HPLC peak area.

In some embodiments, the leflutrozole is milled (e.g. micronized) using techniques known in the art. In some embodiments, the final drug substance has a $D_{10}$, $D_{50}$ and Deo of about 1 µm, 4 µm and 11 µm respectively, with a target particle size of $D_{90} \leq 35$ µm. Dissolution experiments with capsules prepared using drug substance with particle sizes up to $D_{90} \leq 35$ µm have shown no influence on dissolution. Accordingly, also provided is a mixture of particles of anhydrous leflutrozole, such as high purity leflutrozole, having a particle size distribution $D_{90} \leq 35$ µm. In some embodiments, the mixture has a $D_{50}$ of ≤10 µm.

The reactions of the processes described herein can be carried out in suitable solvents which can be readily selected by one skilled in the art of organic synthesis. Suitable solvents can be substantially nonreactive with the starting materials (reactants), the intermediates, or products at the temperatures at which the reactions are carried out, e.g., temperatures which can range from the solvent's freezing temperature to the solvent's boiling temperature. A given reaction can be carried out in one solvent or a mixture of more than one solvent. Depending on the particular reaction step, suitable solvents for a particular reaction step can be selected. In some embodiments, reactions can be carried out in the absence of solvent, such as when at least one of the reagents is a liquid or gas. In some embodiments, the solvent comprises acetonitrile, dichloromethane (DCM), N,N-dimethylformamide (DMF), N,N-dimethylacetamide (DMA), dimethyl sulfoxide (DMSO), 1,4-dioxane, 2-methyltetrahydrofuran, and/or tetrahydrofuran. In some embodiments, the solvent comprises DMF. In some embodiments, the solvent is DMF with no more than 0.14% w/w water.

The reaction stoichiometry or ratio of reagents may vary between batches without detriment to the yield or purity of the obtained leflutrozole. The timing of steps, and other variables such as reaction temperature, may be adjusted but still be considered within the scope of the invention, as familiar to the skilled artisan. In some embodiments, the ratio of letrozole to sodium ethoxide is from about 1:1 to about 1:1.5. In some embodiments, the ratio of letrozole to sodium ethoxide is about 1:1.15 to about 1:1.2. In some embodiments, the ratio of letrozole to the fluorinating agent is from about 1:1 to about 1:1.5. In some embodiments, the ratio of letrozole to sodium ethoxide is about 1.25 to about 1.35. In some embodiments, the ratio of letrozole to sodium ethoxide is about 1.3. In some embodiments, the reaction temperature for deprotonation is from about -12 to about -18° C. In some embodiments, the sodium ethoxide is added over a period of about 15 to about 30 minutes. In some embodiments, the reaction temperature for fluorination is from about -12 to about -18° C. In some embodiments, the fluorinating agent is added over a period of from about 15 to about 45 minutes. In some cases, the fluorinating agent is Selectfluor™.

The processes described herein can be monitored and/or evaluated according to any suitable method known in the art. For example, product formation can be monitored by spectroscopic means, such as nuclear magnetic resonance spectroscopy (e.g., $^1H$ or $^{13}C$), infrared spectroscopy, spectrophotometry (e.g., UV-visible), or mass spectrometry, or by chromatography such as high-performance liquid chromatography (HPLC) or thin layer chromatography (TLC).

The reactions of the processes described herein can be carried out at appropriate temperatures which can be readily determined by one skilled in the art. Reaction temperatures will depend on, for example, the melting and boiling points of the reagents and solvent, if present; the thermodynamics of the reaction (e.g., vigorously exothermic reactions may need to be carried out at reduced temperatures); and the kinetics of the reaction (e.g., a high activation energy barrier may need elevated temperatures).

The reactions of the processes described herein can be carried out in air or under an inert atmosphere. Typically, reactions containing reagents or products that are substantially reactive with air can be carried out using air-sensitive synthetic techniques that are well known to one skilled in the art. For example, the use of an inert atmosphere (e.g. nitrogen or argon) may be suitable for the preparation of anhydrous leflutrozole due to the water and air sensitivity of the reagents utilized. Upon carrying out preparation of compounds according to the processes described herein, the usual isolation and purification operations such as concentration, filtration, extraction, solid-phase extraction, recrystallization, chromatography, and the like may be used, to isolate the desired products.

Pharmaceutical Compositions

Leflutrozole

In an aspect, there is presented a pharmaceutical composition comprising the crystalline Form A of leflutrozole and at least one pharmaceutically acceptable excipient (e.g. carrier). Also provided are pharmaceutical compositions comprising the high purity leflutrozole (Form A), the mixture of particles of leflutrozole, or anhydrous Form A of leflutrozole as described herein and one or more pharmaceutically acceptable excipients. The pharmaceutically acceptable excipients that may be present in the pharmaceutical compositions of the present invention include, but are not limited to, diluents, binders, disintegrants, fillers, lubricants, colorants, flavors, pH adjusters, buffers, stabilizers, viscolizers, antiadherents, preservatives, glidants, acidulants, artificial and natural sweeteners, and the like. Pharmaceutical compositions can be formulated, for example, for oral administration in unit dosage form (e.g., a tablet, capsule, caplet, gelcap, suspension, solution, or syrup); for topical administration (e.g., as a cream, gel, lotion, transdermal patch, or ointment); for intravenous administration (e.g., as a sterile solution free of particulate emboli and in a solvent system suitable for intravenous use); or in any other pharmaceutically acceptable formulation. Some embodiments include a method of producing a pharmaceutical composition comprising admixing high purity leflutrozole, the mixture of particles of leflutrozole, crystalline Form A of leflutrozole, or any crystalline form of leflutrozole as encompassed by the disclosure with at least one pharmaceutically acceptable excipient. Formulations may be prepared by any suitable method, typically by uniformly mixing the active compound(s) with liquids or finely divided solid carriers, or both, in the required proportions.

A compound of the present disclosure can be formulated into pharmaceutical compositions using techniques well known to those in the art. Suitable pharmaceutically acceptable carriers, outside those mentioned herein, are known in the art; for example, see Remington, *The Science and Practice of Pharmacy,* 20th Edition, 2000, Lippincott Williams & Wilkins, (Editors: Gennaro et al.). While it is possible that, for use in the prophylaxis or treatment, a compound of the disclosure may, in an alternative use, be administered as a raw or pure chemical, it is preferable however to present the compound or active ingredient as a pharmaceutical formulation or composition further comprising at least one pharmaceutically acceptable excipient.

The pharmaceutical compositions are preferably in unit dosage forms. In such form, the preparation is subdivided into unit doses containing appropriate quantities of the active component. The unit dosage form can be a packaged preparation, the package containing discrete quantities of preparation, such as packeted tablets, capsules and powders in vials, sachets or ampoules. Also, the unit dosage form can be a capsule, tablet, cachet, or lozenge itself, or it can be the appropriate number of any of these in packaged form.

Fillers

Fillers (also referred to as diluents or binders) employed in the compositions of the present invention include, but are not limited to, microcrystalline cellulose, maltodextrin, calcium hydrogen phosphate, polyethylene glycol, polyvinylpyrrolidone, maize starch, xanthan gum, corn starch, Cutina HR, pregelatinized starch, partially pregelatinized starch, hydroxyethyl cellulose, hydroxypropyl methylcellulose, hydroxypropyl cellulose, lactose monohydrate, or combinations thereof.

Disintegrants

Exemplary disintegrants that may be employed in the compositions of the present invention include, but are not limited to, sodium starch glycolate, sodium carboxymethyl cellulose, carmellose, carmellose calcium, croscarmellose sodium, cross-linked alginic acid, crospovidone, polyvinylpyrrolidone, methyl cellulose, starch, crosslinked starch, pregelatinized starch, partially pregelatinized starch, glycerin fatty acid ester, or combinations thereof.

Lubricants

Lubricants that may be employed in the compositions of the present invention include, but are not limited to, magnesium stearate, sodium stearate, hydrogenated vegetable oils, silicon dioxide, Aerosil 200, talc, boric acid, sodium benzoate, sodium acetate, sodium chloride, DL-leucine, polyethylene glycol, waxes, calcium stearate, zinc stearate, sodium stearyl fumarate, sodium oleate, sodium lauryl sulfate, magnesium lauryl sulfate, or combinations thereof.

Glidants

A glidant is an excipient that improves the flow properties powders or granulates by decreasing interparticle friction and cohesion. Potentially suitable glidants include, without limitation, silicon dioxide, in particular colloidal silicon dioxide, anhydrous colloidal silica, peptized silica, talc, magnesium trisilicate, or powdered cellulose. In one embodiment, the glidant is colloidal silicon dioxide. The glidant may, for example, be present in the pharmaceutical composition contained in a tablet in an amount from 0.1 to 5% w/w, or about 0.1 to about 3% w/w, relative to the total weight of the tablet. If two or more glidants are present in the tablet, these amounts refer to the total amount of the glidants. According to a further preferred embodiment, the tablet comprises about 0.2 to 2% w/w of colloidal silicon dioxide.

Solid Oral Dosage Form of Crystalline Leflutrozole

In an aspect, the crystalline Form A of leflutrozole is formulated to be suitable for oral administration. In some cases, the crystalline anhydrous leflutrozole and one or more pharmaceutically acceptable excipients are formulated as to be suitable for oral administration. In some embodiments, the formulation suitable for oral administration is a tablet. In some embodiments, the formulation of Form A of leflutrozole is a composition formulated for an immediate release dosage form. In some embodiments, the tablet comprises an amount of a micronized particles of leflutrozole and at least one pharmaceutically acceptable excipient. In some embodiments, the micronized particles of leflutrozole comprise Form A of leflutrozole. An anhydrous Form A of leflutrozole that has been prepared by recrystallization may be further milled or processed into micronized particles suitable for uniform dispensing prior to mixing or packaging of the pharmaceutical composition. The leflutrozole may be combined with one or more excipients as described in the disclosure.

Routes of Administration

Oral Administration as a Solid or Capsule

The leflutrozole may be prepared as a solid suitable for oral administration. Conventional excipients, such as binding agents, fillers, acceptable wetting agents, tableting lubricants and disintegrants may be used in tablets and capsules for oral administration. Alternatively, the oral preparations may be in the form of dry powder that can be reconstituted with water or another suitable liquid vehicle before use. In the case of dry powders suitable for reconstitution in liquid vehicles, additional additives such as suspending or emulsifying agents, non-aqueous vehicles (including edible oils), preservatives and flavorings and colorants may be added to the liquid preparations.

The leflutrozole hard gelatin capsules are an immediate release dosage form for oral administration. The dosage form is a hard gelatin capsule containing a white to yellowish powder in a pink opaque capsule, size 1. Three strengths are provided, containing 0.1 mg, 1 mg or 10 mg leflutrozole per hard gelatin capsule. Lower strengths may be prepared by dissolving the 0.1 mg strength hard gelatin capsule in water and applying the appropriate portion of the admixed total volume. For example, a dosage strength of 0.01 mg (10 μg) may be prepared by suspending the 0.1 mg strength capsule in 100 ml of water and administering 10 mL of the admixed suspension or solution to the subject. The excipients used to prepare leflutrozole hard gelatin capsules are lactose monohydrate, microcrystalline cellulose, corn starch, sodium starch glycolate, magnesium stearate, colloidal silicon dioxide. All the excipients of the leflutrozole hard gelatin capsules comply with the requirements of the applicable compendial monographs (Ph.Eur., NF). Lactose is pharmaceutical grade derived from milk sourced from healthy animals in the same conditions as milk collected for human consumption. The lactose is prepared with the use of calf rennet and no other material of ruminant origin. The magnesium stearate is of vegetable origin. The composition of the capsule is gelatin, titanium dioxide (E171, CI77891) and iron oxide, red (E172, CI77491). The hard gelatin capsule shell is a non-compendial component with all its individual constituents meeting the requirements of the pharmacopoeias and/or international standards.

In some embodiments, the capsule is a size 3 hard gelatin capsule. In some embodiments, the capsule is a size 2 hard gelatin capsule. In some embodiments, the capsule is a size 1 hard gelatin capsule. In some embodiments, the capsule is a size 0 hard gelatin capsule. In some embodiments, the pharmaceutical composition meets the content uniformity requirements of Ph.Eur. 2.9.40, JP and USP <905> harmonized procedure.

Liquid Formulations and Suspensions for Oral Administration

The crystalline leflutrozole can be used in the preparation of liquid formulations, such as in the form of a solution, suspension, or emulsion. Liquid preparations for oral administration may be in the form of solutions, emulsions, aqueous or oily suspensions, and syrups. Additional additives such as suspending or emulsifying agents, non-aqueous vehicles (including edible oils), preservatives and flavorings and colorants may be added to the liquid preparations. Formulations suitable for oral administration can consist of (a) capsules, sachets, tablets, lozenges, and troches, each containing a predetermined amount of the active ingredient, as solids or granules; (b) powders; (c) liquid solutions, such as an effective amount of the compound dissolved in diluents, such as water, saline, or orange juice; (d) suspensions in an appropriate liquid; and (e) suitable emulsions. Preferred are solid oral dosage forms such as capsule forms, tablet forms, and powder forms. Capsule forms can be of the ordinary hard- or soft-shelled gelatin type containing, for example, surfactants, lubricants, and inert fillers, such as lactose, sucrose, calcium phosphate, and cornstarch. Tablet forms can include one or more of lactose, sucrose, mannitol, corn starch, potato starch, alginic acid, microcrystalline cellulose, acacia, gelatin, guar gum, colloidal silicon dioxide, croscarmellose sodium, talc, magnesium stearate, calcium stearate, zinc stearate, stearic acid, and other excipients, colorants, diluents, buffering agents, disintegrating agents, moistening agents, preservatives, flavoring agents, and pharmacologically compatible carriers. Lozenge forms can comprise the active ingredient in a flavor, usually sucrose and acacia or tragacanth, as well as pastilles comprising the active ingredient in an inert base, such as gelatin and glycerin, or sucrose and acacia, emulsions, gels, and the like containing, in addition to the active ingredient, such carriers as are known in the art. In some instances, the composition is administered as a dry powder that is reconstituted as a liquid prior to administration to the subject, thereby forming a solution or suspension.

Topical Administration and Transdermal Patches

Topical pharmaceutical formulations, including those that are useful for transdermal drug release, are suitable in the context of the invention for application to skin. Said pharmaceutical formulations include those suitable for oral, rectal, nasal, topical (including buccal and sub-lingual), vaginal or parenteral (including intramuscular, subcutaneous and intravenous) administration or in a form suitable for administration by a transdermal patch. Transdermal patches dispense a drug at a controlled rate by presenting the drug for absorption in an efficient manner with minimal degradation of the drug. Typically, transdermal patches comprise an impermeable backing layer, a single pressure sensitive adhesive and a removable protective layer with a release liner. One of ordinary skill in the art will understand and appreciate the techniques appropriate for manufacturing a desired efficacious transdermal patch based upon the needs of the artisan. Topically applied compositions are generally in the form of liquids, creams, pastes, lotions and gels. Topical administration includes application to the oral mucosa, which includes the oral cavity, oral epithelium, palate, gingival, and the nasal mucosa. In some embodiments, the composition contains at least one crystalline leflutrozole and a suitable vehicle or carrier. It may also contain other components, such as an anti-irritant. The carrier can be a liquid, solid or semi-solid. In embodiments, the composition is an aqueous solution. Alternatively, the composition can be a dispersion, emulsion, gel, lotion or cream vehicle for the various components. In one embodiment, the primary vehicle is water or a biocompatible solvent that is substantially neutral or that has been rendered substantially neutral. The liquid vehicle can include other materials, such as buffers, alcohols, glycerin, and mineral oils with various emulsifiers or dispersing agents as known in the art to obtain the desired pH, consistency and viscosity. It is possible that the compositions can be produced as solids, such as powders or granules. The solids can be applied directly or dissolved in water or a biocompatible solvent prior to use to form a solution that is substantially neutral or that has been rendered substantially neutral and that can then be applied to the target site. In embodiments of the invention, the vehicle for topical application to the skin can include water, buffered solutions, various alcohols, glycols such as glycerin, lipid materials such as fatty acids, mineral oils, phosphoglycerides, collagen, gelatin and silicone-based materials.

Injectable Solutions

Parenteral (e.g. injectable) dosage forms may be prepared by dissolving the compound of the disclosure in a suitable liquid vehicle and filter sterilizing the solution before filling and sealing an appropriate vial or ampule. The solutions may then be administered to a subject to treat a disease or condition by injection into a blood vessel or to the target site, as appropriate.

Dosage

Dosage Amounts

In one aspect, provided herein are dosage amounts and regimens for the administration of leflutrozole in appropriate amounts to treat a disorder in a subject. The dose when using the compounds of the present disclosure can vary within wide limits and as is customary and is known to the physician, it is to be tailored to the individual conditions in each individual case. It depends, for example, on the nature and severity of the illness to be treated, on the condition of the subject, on the compound employed or on whether an acute or chronic disease state is treated or prophylaxis conducted or on whether further active compounds are administered in addition to the compounds of the present disclosure. Representative doses of the present disclosure include, but not limited to, from 0.001 to 10.0 mg. Depending on the individual and as deemed appropriate from the subject's physician or caregiver it may be necessary to deviate upward or downward from the doses described herein. For example, the dose administered to the subject may be 0.001 mg (1 μg), 0.01 mg, 0.1 mg, 0.2 mg, 0.3 mg, 0.4 mg, 0.5 mg, 0.6 mg, 0.7 mg, 0.8 mg, 0.9 mg, 1.0 mg, 1.5 mg, 2.0 mg, 2.5 mg, 3.0 mg, 4.0 mg, 5 mg, or 10 mg. Accordingly, the acceptable amount of leflutrozole to be administered may be present in an amount from 0.001 mg to 10 mg in the composition, not accounting for the weight of pharmaceutically acceptable excipients that also are part of the composition. In some instances, smaller amounts may be administered or prepared from a single unit dose form.

The amount of active ingredient required for use in treatment will vary not only with the particular crystalline form selected but also with the route of administration, the nature of the condition being treated and the age and condition of the subject and will ultimately be at the discretion of the attendant physician or clinician. In general, one skilled in the art understands how to extrapolate in vivo data obtained in a model system, typically an animal model, to another, such as a human. In some circumstances, these extrapolations may merely be based on the weight of the animal model in comparison to another, such as a mammal, preferably a human, however, more often, these extrapolations are not simply based on weights but rather incorporate a variety of factors. Representative factors include the type, age, weight, sex, diet and medical condition of the subject, the severity of the disease, the route of administration, pharmacological considerations such as the activity, efficacy, pharmacokinetic and toxicology profiles of the particular compound employed, whether a drug delivery system is utilized, on whether an acute or chronic disease state is being treated or if prophylaxis conducted, or on whether further active compounds are administered that are incompatible with leflutrozole administration, such that the dose amounts administered to a subject may be reduced in order to mitigate the effects of simultaneous treatment of disorders unrelated to the present disclosure.

Dosage Regimens

In some cases, sustained treatment with leflutrozole is required in a subject on account of the reversibility of observed effects. The disease or condition to be treated may also be chronic, requiring repeated administration over several weeks, months, or years, or even for the entirety of the remainder of a subject's lifetime. In some embodiments, the dose amount administered to the subject is administered every week, every two weeks, every three weeks, every four weeks, every five weeks, every six weeks, every seven weeks, or every eight weeks. Alternatively, the dose may be administered every month. In some instances, the dose amount to be administered during a given dosing period may be administered in several smaller doses to total a desired target dose, depending on the needs of the subject. For example, a dose amount administered during a dosing period of one week provides a total amount of the crystalline leflutrozole will be administered during a one-week period, for instance a prescribed 1.0 mg dose administered weekly may sometimes be administered in the form of two separated 0.5 mg administrations during the one-week period. The two 0.5 mg administrations might occur once in the morning and once at night (e.g. twice in one day), such that the administration period comprises once twice daily/once weekly dosing. Alternatively, the first of two 0.5 mg administrations might occur on day 1 of the one-week administration period (7 days), and the second of two 0.5 mg administrations might occur on day 3. In such cases, the second 0.5 mg administration may occur on day 1, day 2, day 3, day 4, day 5, day 6, or day 7 during a one-week administration period.

In some embodiments, the compound is administered according to a dosing regimen having a dosing periodicity selected from about one dose once weekly to about one dose once every month. However, the pharmaceutical compositions may also be formulated for administration at any frequency of administration, including once every 5 days, once every 3 days, once every 2 days, twice a day, three times a day, four times a day, five times a day, six times a day, eight times a day, every hour, or any greater frequency. In some embodiments, the compound is administered according to a dosing regimen having a dosing periodicity of one dose once weekly.

In some embodiments, the desired dose is administered as divided doses administered at appropriate intervals, for example, as two, three, four or more sub-doses per day. The sub-dose itself may be further divided, e.g., into a number of discrete and loosely spaced administrations. If appropriate, depending on individual behavior, it may be necessary to deviate upward or downward from the daily dose indicated.

The dosage regimen for treating a disease condition with the compounds and/or compositions of this disclosure is selected in accordance with a variety of factors as cited above. Thus, the actual dosage regimen employed may vary widely and therefore may deviate from a preferred dosage regimen and one skilled in the art will recognize that dosage and dosage regimen outside these typical ranges can be tested and, where appropriate, may be used in the methods of this disclosure.

Variable Dosing Adjusted by Titre

Many of the diseases or conditions to be treated in the disclosure may be monitored by phenotypic metabolites or biomarkers that serve as observable indicators as to the effectiveness of a given treatment. Accordingly, administration of the compounds or pharmaceutical compositions of the disclosure may be used in methods of treating disorders where the subject is monitored for the expression of hormones, proteins, or other suitable molecules for measuring a desired treatment outcome as familiar to the skilled artisan. For example, the administration of crystalline Form A of leflutrozole may be for use in treating obesity-associated hypogonadotropic hypogonadism, which is typically characterized by low serum testosterone levels. In some cases, the hypogonadism is not associated with intrinsic damage to the subject's hypothalamus or pituitary gland. While receiving treatment, the dose amount of leflutrozole to be administered may be adjusted according to a response measurement of a biomarker in comparison to some previous measurement. A subject may require varied or steadily increasing doses to be administered in order to normalize serum testosterone levels, up to the dose that results in normalization. Normalized serum testosterone levels may be defined as between 300 to 1000 ng/dl (10.4 to 35 nmol/L), and anything outside this range may be considered abnormal (e.g. "low" being <300 ng/dl and "high" being >1000 ng/dL). Subjects displaying low serum testosterone may initially receive 0.1 mg of crystalline leflutrozole, but if such dose fails to restore serum testosterone to normal levels after 1 week, a second dose during the treatment period of 0.2 mg may be administered, and so on. An example of such an escalating dose to determine the appropriate dose for subject may comprise administering 0.1 mg leflutrozole during week 1 of a treatment period to a subject with 100 ng/dl serum testosterone, 0.3 mg during week two of a treatment period where the same subject now measures at 250 ng/dl serum testosterone, and 1.0 mg during week three of a treatment period where the same subject now measures at 450 ng/dl serum testosterone. However, in the event that resulting serum testosterone becomes high following the 1.0 mg dose being administered to said subject, the dose may then be reduced back down to <1.0 mg leflutrozole. For instance, if the aforementioned subject has a serum testosterone measurement of >1000 ng/dl following a 1.0 mg dose administration, the dose may be reduced to, for example, 0.1 mg, 0.2 mg, 0.3 mg, 0.4 mg, or 0.5 mg, as determined by a physician and the subject's response to treatment.

In some instances, the compound is administered via a titration scheme. In some embodiments, the titration scheme comprises the up-titration of the dose, e.g., if the initial dose has an insufficient effect, until an optimized dose is administered. In some embodiments, the dose is up-titrated if the subject does not normalize testosterone levels or significantly increase FSH or LH after the first weeks of treatment. In some embodiments, the titration scheme comprises the down-titration of the dose, e.g., if the subject experiences side effects, until an optimized dose is administered. In some embodiments, the dose is down-titrated if the subject has an adverse effect on blood pressure, hematocrit, polycythemia, and the like.

Methods of Treatment
Infertility

The disclosure provides a method of treating diseases or disorders in a subject in need thereof, the treatment comprises administering an appropriate amount of a crystalline form leflutrozole or a pharmaceutical composition of the disclosure. For instance, the crystalline leflutrozole serving as an aromatase inhibitor is suitable for the treatment of infertility. Thus, there is presented methods of treating infertility in a subject in need thereof, where the method comprises administering an appropriate amount of crystalline leflutrozole. In some cases, the crystalline leflutrozole is Form A of leflutrozole. Treating infertility in male subjects is contemplated. Infertility in male subjects may be caused by reductions in sperm count (e.g. oligospermia), semen quality, sperm motility, semen volume, testosterone levels, luteinizing hormone (LH), follicle stimulating hormone (FSH), or by elevated levels of estradiol in a subject that is associated with high body mass index (BMI, high being≥25 kg/m$^2$). Thus, the methods of treatment may be for treating infertility in an overweight or obese male subject. As a result of any of the methods of treatment, levels of biomarkers may become normalized after treatment in comparison to a baseline measurement. For instance, sperm count may be increased after initiating treatment with anhydrous leflutrozole, maintained for the duration of the treatment period or until treatment discontinues.

Obesity-Associated Hypogonadotropic Hypogonadism in Males

The disclosure describes, in part, methods of treating obesity-associated hypogonadotropic hypogonadism (OHH) in overweight or obese male subjects. Overweight or obese men may suffer from overexpression of aromatase (CYP19) due to heightened presence of adipose tissue, where aromatase is highly expressed. Excess adipose tissue leads to overexpression of aromatase and an associated increase in its measured activity, thus resulting in higher levels of estradiol in a subject. In males, the excess estradiol may feedback a hypothalamic pituitary axis, suppressing gonadotropic secretion and thereby suppressing testicular testosterone production and spermatogenesis. Severe obesity is associated with androgen deficiency in males. The consequences of testosterone deficiency in males may be decreased libido, decreased spontaneous erections (or erectile dysfunction), decreased fertility (infertility), loss of body hair and reduced shaving, low bone mineral density (BMD), increased risk of fractures, decreased muscle mass and strength, fatigue, or impacts on mood and cognition. Furthermore, metabolic abnormalities may result from androgen deficiencies, including but not limited to insulin resistance, glucose intolerance, and lipid abnormalities that may contribute to incidences of metabolic syndrome or cardiovascular disease. As the mechanism of aromatase activity is the conversion of androgens to estrogens, there is thus a need for the treatment of OHH males by inhibiting aromatase activity. Accordingly, leflutrozole (an aromatase inhibitor) may be administered for such purpose to normalize levels of testosterone in a subject.

In some cases, the diseases or disorder to be treated is hypogonadotropic hypogonadism (HH). In some embodiments, the hypogonadotropic hypogonadism may be obesity-associated. Thus, there is provided the treatment of OHH males by administration of leflutrozole or a pharmaceutical composition comprising leflutrozole. The leflutrozole may be administered in sufficiently pure crystalline form as a solid or in the form of any of the compositions described elsewhere in the disclosure. Some embodiments relate to the treatment of male subjects with total serum testosterone levels below 300 ng/dL and in need of increased testosterone levels. In some embodiments, the method comprises administering to said subject an effective amount of crystalline leflutrozole. The crystalline leflutrozole as used in any of the methods of treatment may be anhydrous leflutrozole, or alternatively a solvate of leflutrozole. In cases where the HH is obesity-associated, the subject may have a body-mass index (BMI) of ≥30 kg/m$^2$. However, HH may be present in non-obese subjects who are still understood to be within the scope of the methods of treatment as determined by serum testosterone levels and being characterized as overweight. Thus, subjects may have a BMI of 25 kg/m$^2$ or greater and are within the scope of the methods of the disclosure if they have sufficiently low serum testosterone levels. In some embodiments, the hypogonadism is not associated with intrinsic damage to the subject's hypothalamus or pituitary gland.

In some embodiments, the disclosure provides a method of treating HH in a subject having a BMI of between 25 and 50 kg/m². In some cases, the disclosure provides a method of treating HH in a subject having a serum testosterone of <300 ng/dl. In some embodiments, the testosterone level is increased by at least 10% in comparison to the testosterone level prior to administration of any of the compounds or compositions of the disclosure. In some embodiments, the testosterone level of the subject becomes normalized following administration of the leflutrozole (e.g. is raised to between 300 and 1000 ng/dL). For example, a subject initiating treatment with a serum testosterone level of 239±52 mg/dL prior to administration of crystalline leflutrozole may experience an increase in serum testosterone to 514±188 ng/dL after four weeks of treatment with crystalline leflutrozole. A sustained effect can be observed for as long as 12 weeks, until monitoring of the patient is discontinued, or until the end of the treatment period. An inverse effect may be observed for estradiol levels in a subject due to the reduction in aromatase activity that coincides with crystalline leflutrozole administration. Accordingly, there is also provided methods for reducing estradiol levels in a subject by administering crystalline leflutrozole, where the amount of estradiol decreases by between 25 and 55% as compared to prior to the first administration (e.g. prior to start of treatment, or baseline) during the treatment period. For example, estradiol levels measured in a subject may change from 26±7.2 ng/L at baseline to 18.2±9.6 by week 12 of the treatment period.

Some embodiments concern the production of luteinizing hormone (LH) or follicle-stimulating hormone (FSH). Both LH and FSH are glycoprotein hormones that act together to regulate the secretion of testosterone. LH stimulates the production of testosterone by action on Leydig cells, whereas FSH regulates the differentiation of spermatocytes and is critical to the initiation of spermatogenesis. Obese males may have dysregulated LH and FSH production on account of the increased aromatase activity causing a decrease in basal testosterone levels. The reduction in testosterone is associated with a decrease in the production of inhibins, proteins that in turn would downregulate FSH synthesis. Thus, a negative feedback look develops where subjects experience reduced FSH levels and therefore cannot upregulate the production of testosterone in response to obesity-associated increases in aromatase activity. The two major hormones LH and FSH may be increased in production because of crystalline leflutrozole treatment, thus in turn increasing testosterone production and spermatogenesis. The disclosure therefore provides methods for increasing levels of luteinizing hormone in a subject in need thereof, wherein the method comprises administering an appropriate amount of crystalline leflutrozole. In some embodiments, the methods are for increasing levels of follicle stimulating hormone in a subject in need thereof, the method comprising administering crystalline leflutrozole. In some cases, the leflutrozole administered for increasing or decreasing the levels of a biomarker within a subject may be administered as a leflutrozole composition.

In some embodiments, the subject needs prevention or treatment of one or more disorders selected from metabolic syndrome, type II diabetes, obesity, cardiovascular disease, insulin resistance, glucose intolerance and dyslipidemia. In some embodiments, the subject is in need of one or more of improved insulin sensitivity, improved glucose metabolism and an improved lipid profile.

In some embodiments, the subject is in need of the prevention or treatment of one or more disorders selected from the group consisting of decreased libido, decreased spontaneous erections, erectile dysfunction, decreased fertility, decreased spermatogenesis, decreased semen quality, loss of body hair, reduced shaving, lack of energy, fatigue, impaired cognition, depression, changes in mood, low bone mineral density, increased risk of fractures, decreased muscle mass, decreased muscle strength, increased abdominal fat mass and limited body performance capacity.

In some embodiments, the subject is in need of one or more of increased muscle mass and strength, a normalized body composition, a decrease in abdominal fat mass, an improved sexual function and desire, increased fertility and increased bone mineral density.

The doses expected to be administered as part of the methods of treatment described herein are between 0.001 and 10.0 mg per dose. In some embodiments, the effective amount of the leflutrozole is from 0.001 to 5.0 mg per dose. In some embodiments, crystalline leflutrozole in the amount of 0.001 to 1.0 mg is administered to the subject. In some embodiments, crystalline leflutrozole in the amount of 0.05 mg is administered to the subject. In some embodiments, crystalline leflutrozole in the amount of 0.1 mg is administered to the subject. In some embodiments, crystalline leflutrozole in the amount of 0.3 mg is administered to the subject. In some embodiments, crystalline leflutrozole in the amount of 1.0 mg is administered to the subject.

The subject may be experiencing one or more lowered levels of sexual function as a result of OHH symptoms. Such deficiencies in sexual function may be characterized by a low volume of semen, low spermatozoa count, low sperm concentration, reduced sperm motility, low total motile sperm count, or oligospermia.

Oligospermia is a symptom in OHH males that is characterized by low sperm count, typically being less than 15-20 million per milliliter of semen. In some embodiments, the subject has severe oligospermia (defined as <20 million per ejaculate). In some cases, the level of inhibin B present in a subject increases by between 7-15 ng/L when treated with the compositions of the invention. Inhibin B is a biomarker that is reflective of decreases in estradiol levels and thus increases in inhibin B levels are consistent with aromatase inhibition.

Other uses of the disclosed compounds and methods will become apparent to those skilled in the art based upon, inter alia, a review of this disclosure. As will be recognized, the steps of the methods of the present invention need not be performed any particular number of times or in any particular sequence. Additional objects, advantages and novel features of this invention will become apparent to those skilled in the art upon examination of the following examples thereof, which are illustrative and not limiting.

Endometriosis in Females

Endometriosis is defined as ectopic endometrial tissue, commonly associated with localized pain. The ectopic tissue is usually found on pelvic organs and tissues and probably originates by retrograde movement of endometrial cells sloughed during menses through the fallopian tubes. Symptomatic endometriosis is estrogen-dependent and thus almost exclusively a disease of women of childbearing potential.

Several studies have supported the concept that patients with refractory endometriosis respond at least partially to aromatase inhibitors, which act to suppress estrogen levels by restricting the conversion of testosterone to estradiol by aromatase. Thus, endometriosis and refractory cases thereof are considered to be conditions suitable for treatment by the compositions of the invention.

EXAMPLES

The following examples are put forth to provide those of ordinary skill in the art with a description of how the compositions and methods described herein may be used, made, and evaluated, and are intended to be purely exemplary of the invention and are not intended to limit the scope of what the inventors regard as their invention.

Example 1: Preparation of Crystalline Leflutrozole Form A from Letrozole

Synthesis of Leflutrozole from Letrozole

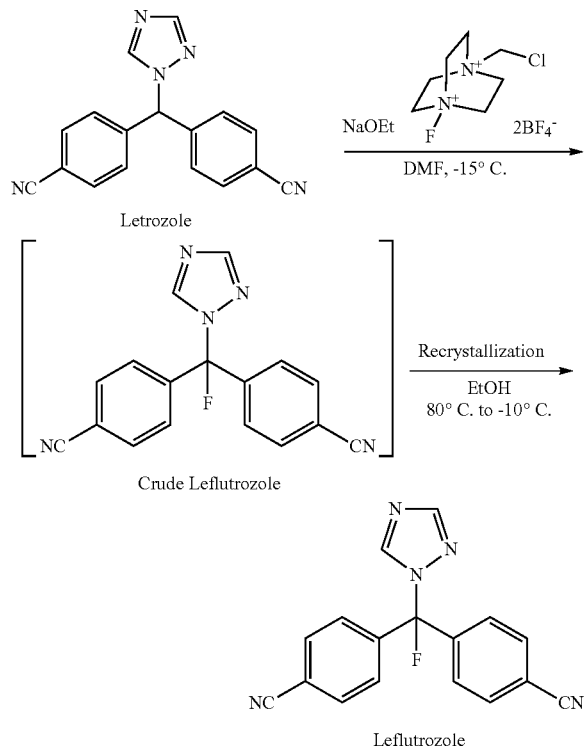

In the processes of the disclosure, leflutrozole may be synthesized, e.g., in a single step synthesis from letrozole via deprotonation by sodium ethoxide in dimethylformamide and subsequently fluorinated in the 4,4' position with the electrophilic fluorination reagent 1-(Chloromethyl)-4-fluoro-1,4-diazabicyclo[2.2.2]octane-1,4-diium ditetrafluoroborate (Selectfluor™). The crude product is then recrystallized.

To prepare crystalline Form A of leflutrozole, letrozole (1.0 eq) was charged to a reactor. DMF (9.0 eq.) was added, and the mixture was stirred for at least 30 minutes at 20 to 25° C. until a clear solution was obtained. Up to 0.14% water in the DMF is tolerated. The reactor was cooled to about -15° C. Under an inert atmosphere, sodium ethoxide (1.20 eq.) was added in at least 5 portions within approximately 30 to 70 minutes at high agitation. The reaction mixture turns red upon deprotonation of the letrozole. The reaction was then stirred at about -15° C. for 15 minutes. The reactor was cooled to about -17° C. and Selectfluor™ (1.30 eq.) was added in at least 10 portions within approximately 60 to 90 minutes. The reactor was cooled to about -17° C. for each portion. The mixture was stirred at about -17° C. for 60 to 70 minutes. To quench, 3.5% aqueous ammonium chloride was added while maintaining the temperature at ≤5° C. The mixture was then stirred at 0 to 5° C. for at least two hours. The mixture was filtered and the remaining solid was washed with water at 15 to 25° C. and then with cold (0° C.) ethanol. The solid was dried at ≤60° C. To recrystallize, the crude product (1.0 eq.) was added to a reactor with ethanol (64 L/kg) at a temperature of ≤25° C. The mixture was heated to reflux (80±3° C.) and stirred for approximately 15 to 30 minutes until the solids completely dissolved. The reactor was stirred for up to 4 hours and then cooled to 60±2° C. The mixture was seeded with leflutrozole micronized or seeds suspended in ethanol. The mixture was slowly cooled to -10° C. over about 12 hours and then stirred before filtration. The solids were washed with cold ethanol and then dried at ≤80° C.

In some instances, milling of the material as part of further processing may be necessary to generate uniform particles. Particle size and particle size distribution of the drug substance can be highly important for pharmaceutical drug development. For example, particle size distribution can be critical to flowability, dissolution, stability, and bioavailability. Especially, for BioPharmaceutical Classification System (BCS) class II and IV compounds with low solubility, the available surface area may significantly impact the dissolution rate. The larger the surface area of the drug substance per gram of drug the faster its dissolution rate may be, thereby potentially leading to increased bioavailability. Particle surface area is a function of particles size, so the smaller the particle size, the larger the surface area and the greater the dissolution rate and potentially, the bioavailability of the drug (all other factors being equal). Particle sizes ideal for the pharmaceutical compositions of the invention are a $D_{90}$ of ≤35 μm, or sometimes ≤15 μm, with a $D_{50}$ of ≤10 μm, or sometimes ≤5 μm. Milling of leflutrozole may be performed using, for example, a MC50 Spiral Jet Mill, fed by a K-Tron T20 Feeder.

In some embodiments, leflutrozole is milled using techniques known in the art. In some embodiments, the final drug substance has a $D_{10}$, $D_{50}$ and $D_{90}$ of about 1 μm, 4 μm and 11 μm respectively, with a target particle size of $D_{90}$≤35 μm. Dissolution experiments with capsules prepared using drug substance with particle sizes up to $D_{90}$≤35 μm have shown no influence on dissolution. Accordingly, also provided is a mixture of particles of Form A leflutrozole, such as high purity leflutrozole, having a particle size distribution $D_{90}$≤35 μm. In some embodiments, the mixture has a $D_{50}$ of ≤10 μm. Particle size distribution is determined by laser light diffraction by using known methods.

Determination of Leflutrozole Polymorphism

Figure 20:
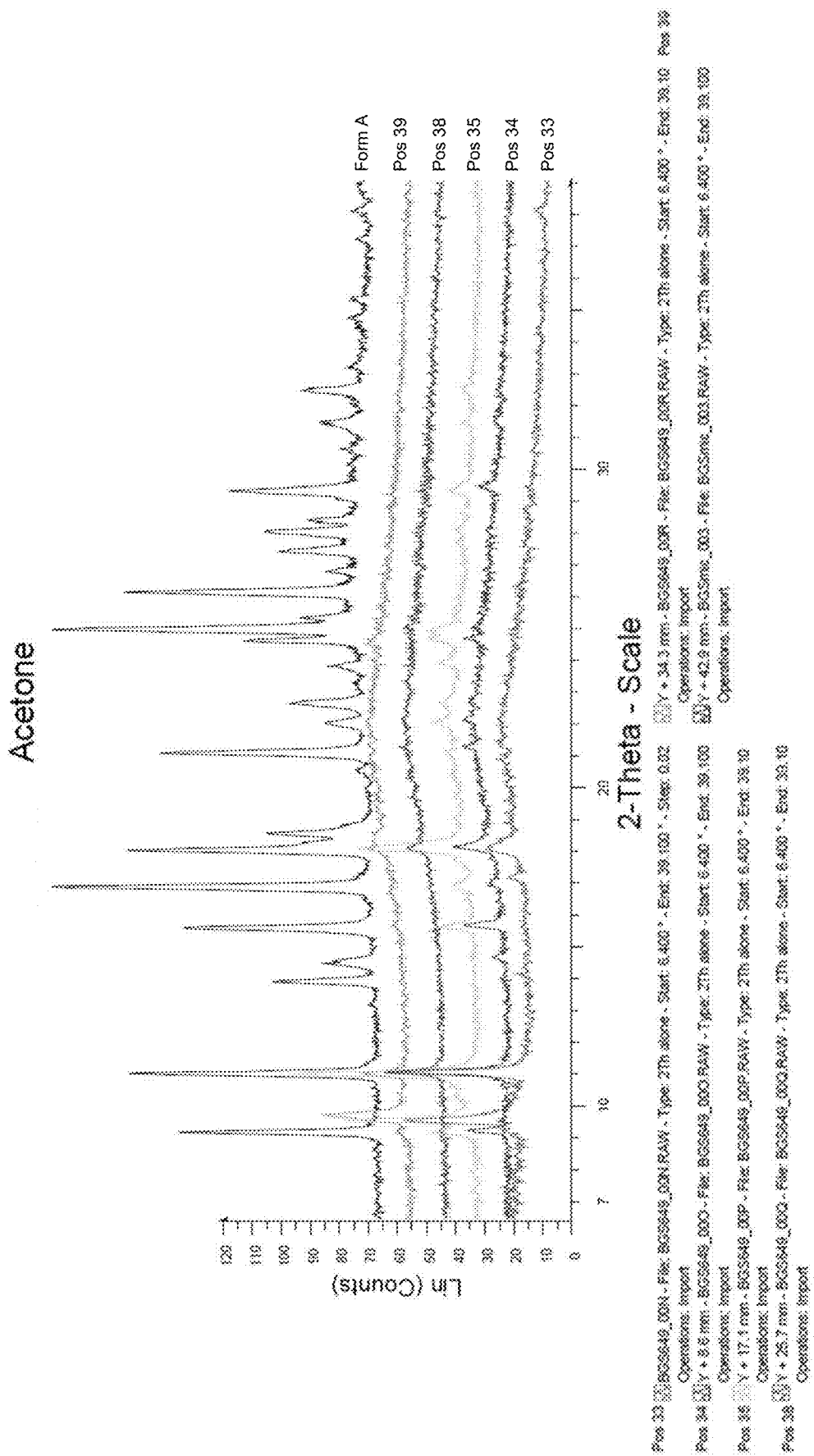
FIG. 20 is an exemplary X-ray powder diffractogram comparison between Form A leflutrozole and material obtained from recrystallization with solvent mixtures containing acetone.
Figure 21:
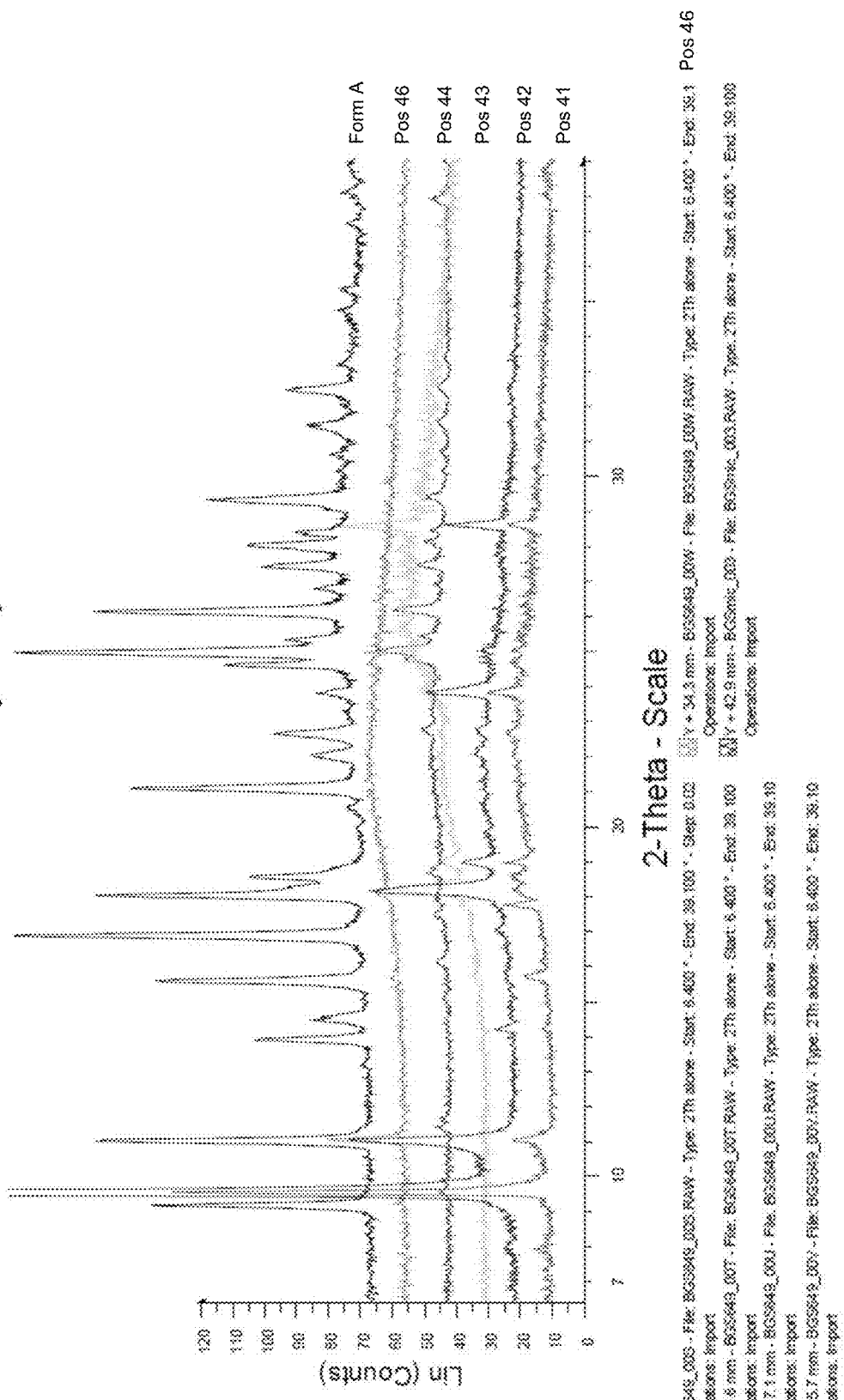
FIG. 21 is an exemplary X-ray powder diffractogram comparison between Form A leflutrozole and material obtained from recrystallization with solvent mixtures containing methyl ethyl ketone.
Figure 22:
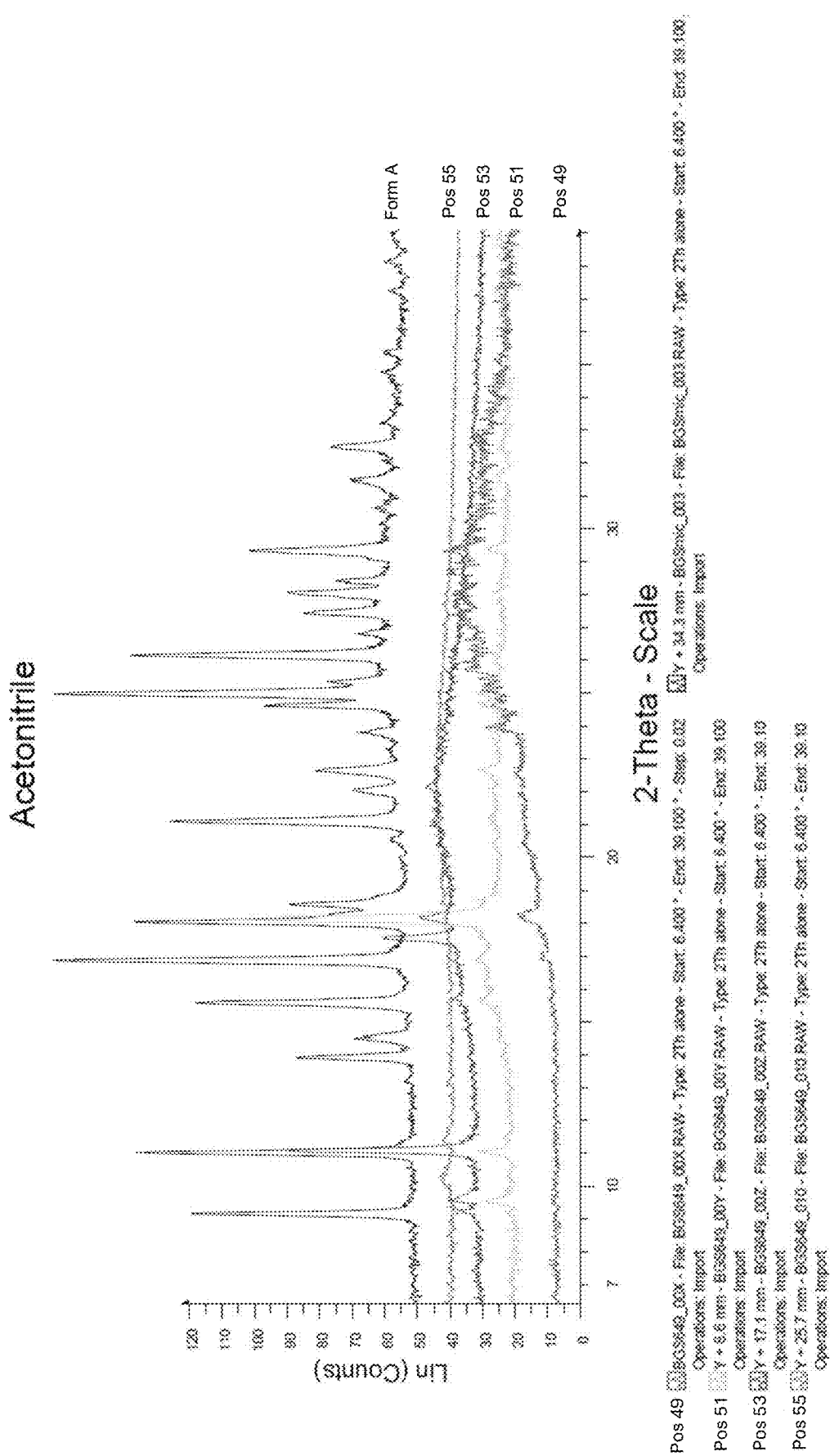
FIG. 22 is an exemplary X-ray powder diffractogram comparison between Form A leflutrozole and material obtained from recrystallization with solvent mixtures containing acetonitrile.
Figure 23:
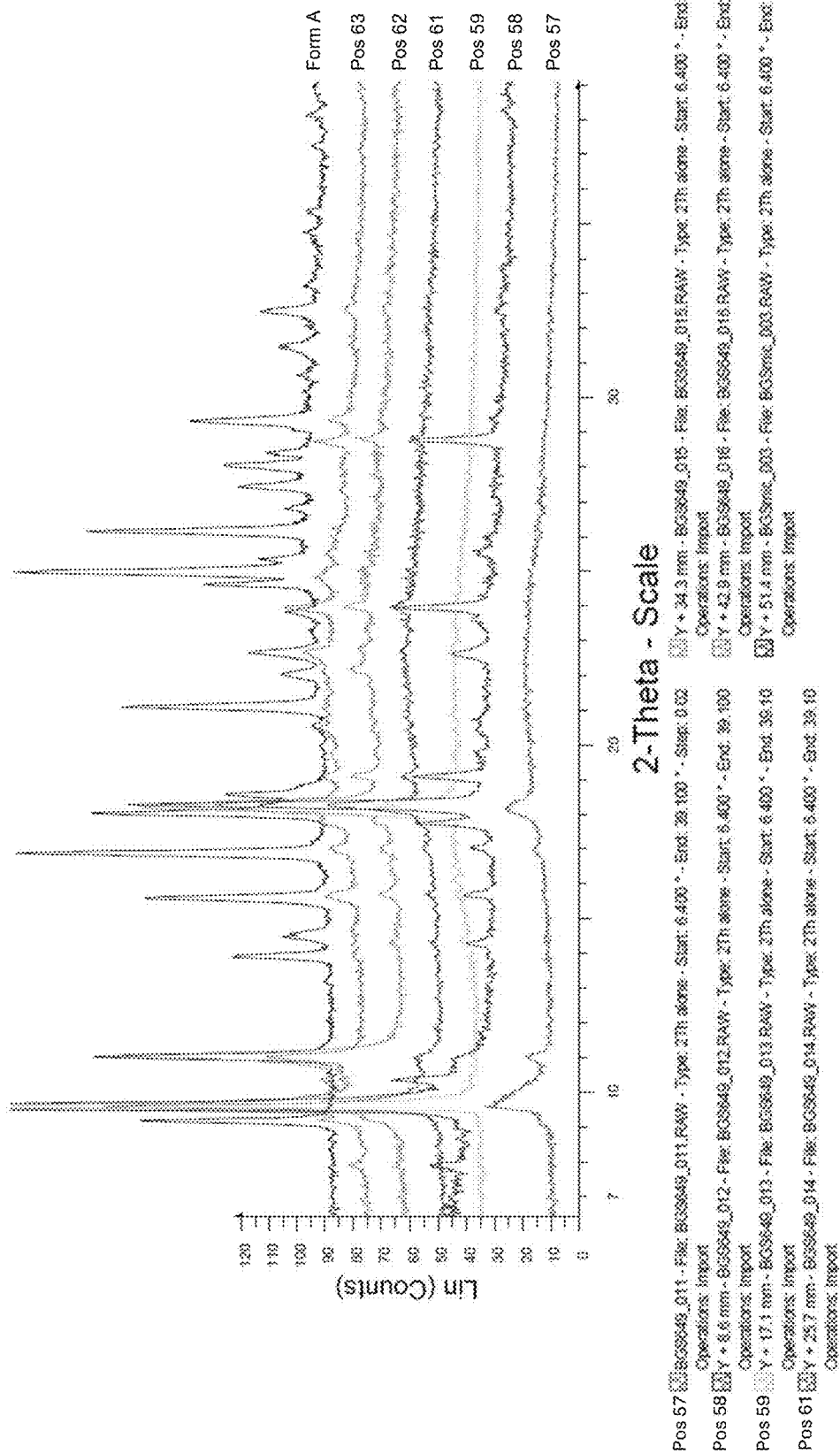
FIG. 23 is an exemplary X-ray powder diffractogram comparison between Form A leflutrozole and material obtained from recrystallization with solvent mixtures containing tetrahydrofuran.
Figure 24:
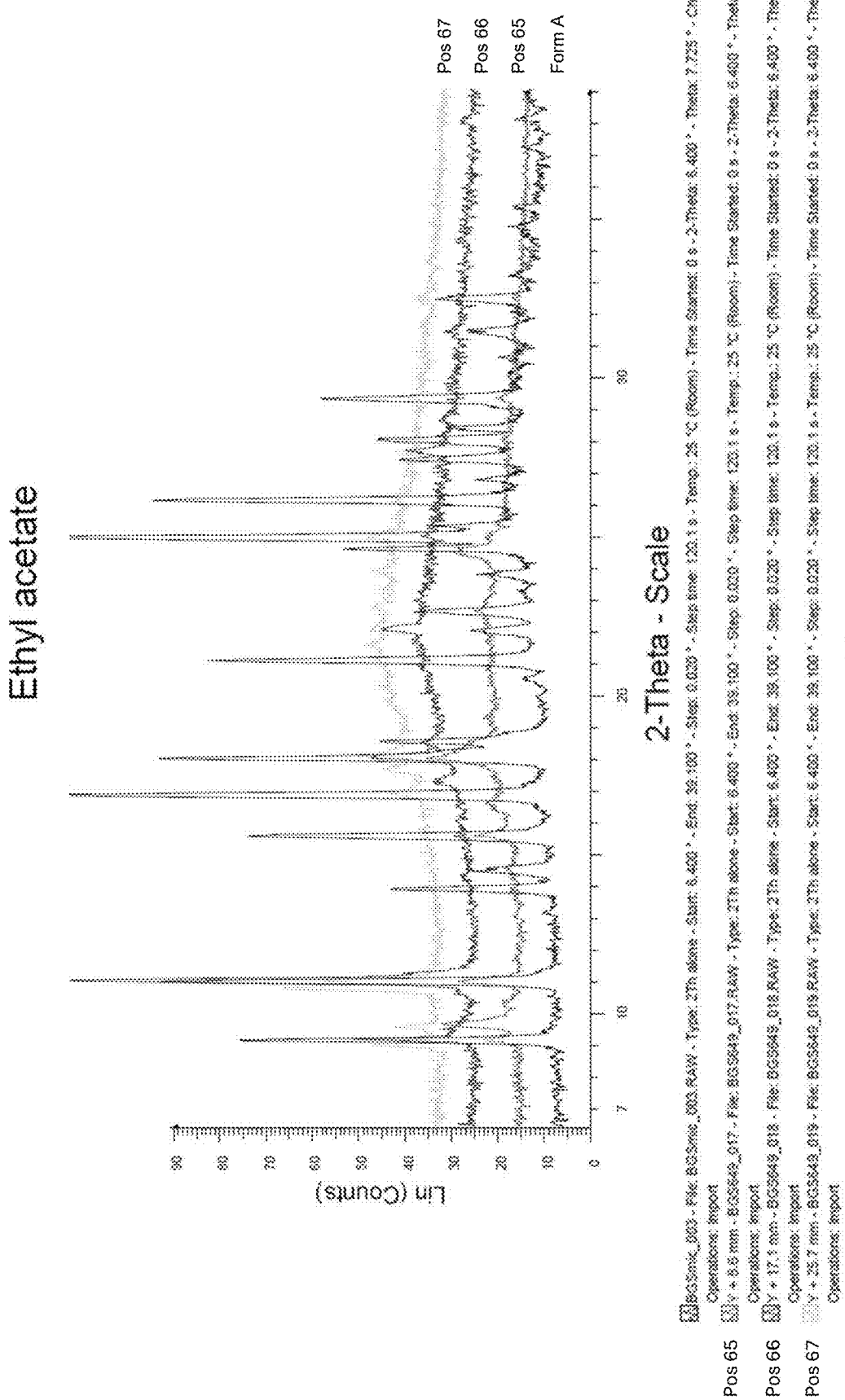
FIG. 24 is an exemplary X-ray powder diffractogram comparison between Form A leflutrozole and material obtained from recrystallization with solvent mixtures containing ethyl acetate.
Figure 25:
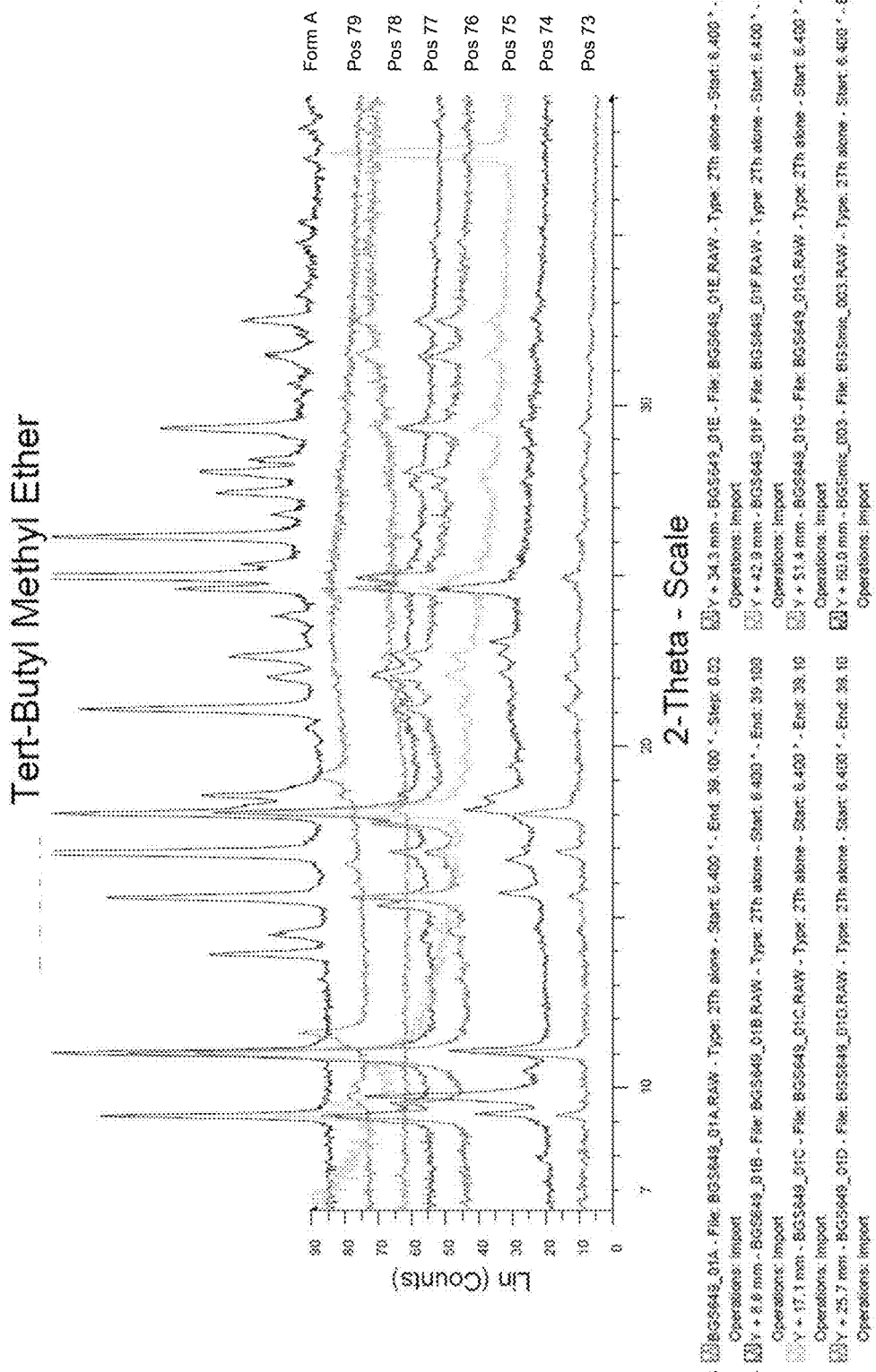
FIG. 25 is an exemplary X-ray powder diffractogram comparison between Form A leflutrozole and material obtained from recrystallization with solvent mixtures containing tert-butyl methyl ether.
Figure 26:
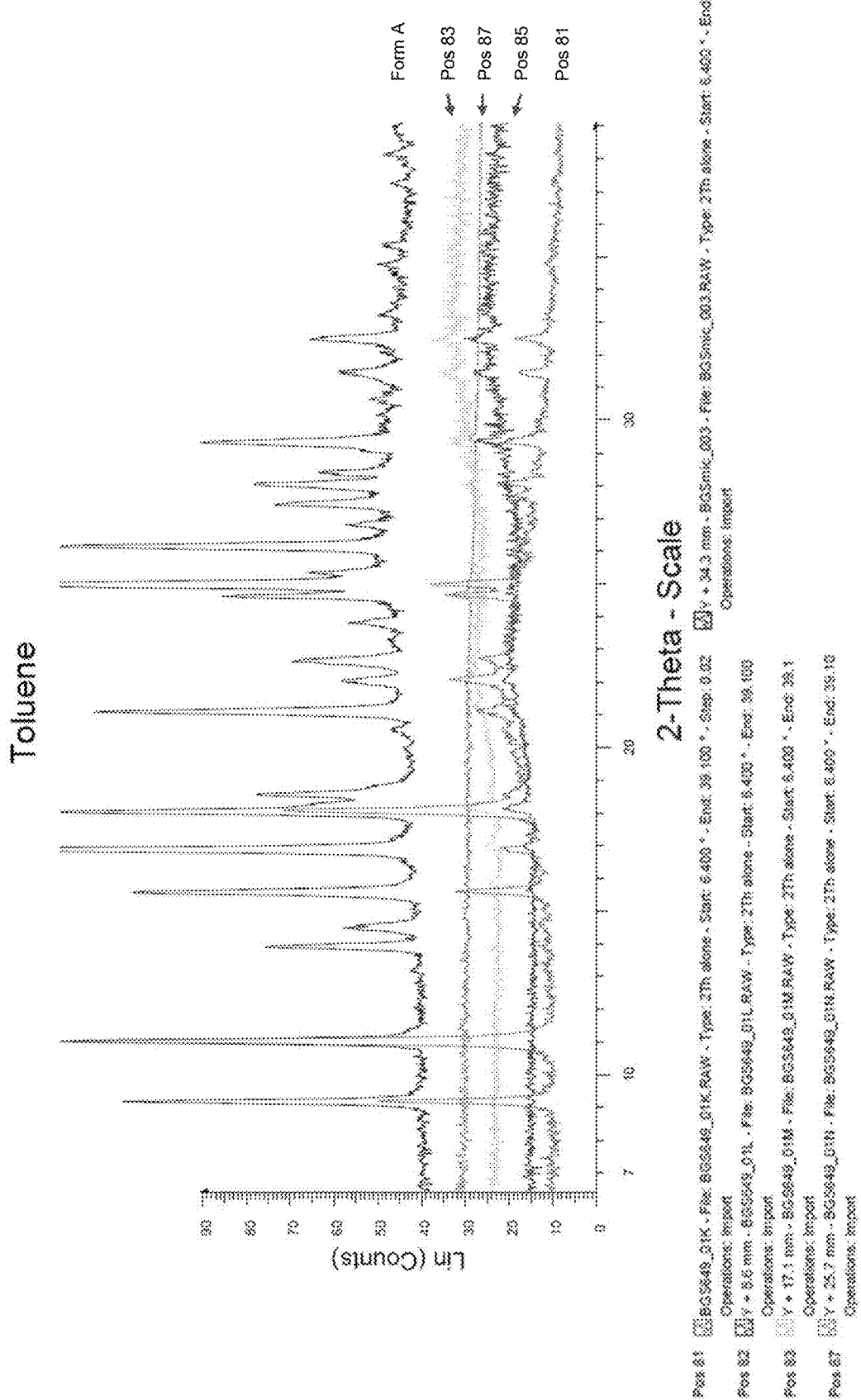
FIG. 26 is an exemplary X-ray powder diffractogram comparison between Form A leflutrozole and material obtained from recrystallization with solvent mixtures containing toluene.

Leflutrozole has no ionizable group, therefore it was not possible to form salts. A screening endeavor for polymorphism of leflutrozole was performed using the robotic Zinsser Crissy platform housing 0.5 mg leflutrozole per well with addition of 87 different solvents or solvent combinations, followed by shaking the covered plate for 8 h at room temperature, evaporation at room temperature for 10 h, and evaporation under Nitrogen flux for 12 h. The combinations of solvents and their positions in the wells are indicated below, in Table 9. Comparisons of the most stable and crystalline material, Form A, obtained by recrystallization from ethanol to material that was obtained by recrystallization from the solvent mixtures of the study are presented in FIG. 16-FIG. 26. An overlap of the Form A X-ray powder diffractogram with that of material from other wells corresponds to the positions of the wells described in Table 9. Data corresponding to wells 78-onward are not presented and represent other solvent systems that were captured as part of the study. The comparative XRPD diffractograms display overlaps between solvents with comparable physicochemical properties. For instance, FIG. 20 shows the comparison between Form A isolated from ethanol with samples corresponding to positions 33, 34, 35, 38, and 39; these samples in Table 9 correspond to attempted recrystallizations from both Acetone and methyl ethyl ketone (MEK), and the figure for comparison highlights how no substantially crystalline material was obtained from acetone or the chemically comparable solvent MEK.

TABLE 9

Leflutrozole Polymorphism Recrystallization Screening Solvents

| Pos | Ratio | Solvents | Pos | Ratio | Solvents | Pos | Ratio | Solvents |
|---|---|---|---|---|---|---|---|---|
| 1 | 1:0 | Methanol | 2 | 2:1 | Methanol Water | 3 | 1:1 | Methanol Water |
| 4 | 1:1 | Methanol Hexane | 5 | 1:1 | Methanol Heptane | 6 | 1:1 | Methanol MTBE |
| 7 | 1:1 | Methanol Toluene | 8 | 1:0 | Ethanol | 9 | 2:1 | Ethanol Water |
| 10 | 1:1 | Ethanol Water | 11 | 1:1 | Ethanol Hexane | 12 | 1:1 | Ethanol Heptane |
| 13 | 1:1 | Ethanol MTBE | 14 | 1:1 | Ethanol Toluene | 15 | 1:0 | Isopropanol |
| 16 | 2:1 | Isopropanol Water | 17 | 1:1 | Isopropanol Water | 18 | 1:1 | Isopropanol Hexane |
| 19 | 1:1 | Isopropanol Heptane | 20 | 1:1 | Isopropanol MTBE | 21 | 1:1 | Isopropanol Toluene |
| 22 | 1:0 | 3-Methyl-Butanol | 23 | 2:1 | 3-Methyl-Butanol Water | 24 | 1:1 | 3-Methyl-Butanol Water |
| 25 | 1:1 | 3-Methyl-Butanol Hexane | 26 | 1:1 | 3-Methyl-Butanol Heptane | 27 | 1:1 | 3-Methyl-Butanol MTBE |
| 28 | 1:1 | 3-Methyl-Butanol Toluene | 29 | 1:0 | Acetone | 30 | 2:1 | Acetone Water |
| 31 | 1:1 | Acetone Water | 32 | 1:1 | Acetone Hexane | 33 | 1:1 | Acetone Heptane |
| 34 | 1:1 | Acetone MTBE | 35 | 1:1 | Acetone Toluene | 36 | 1:0 | MEK |
| 37 | 2:1 | MEK Water | 38 | 1:1 | MEK Water | 39 | 1:1 | MEK Hexane |
| 40 | 1:1 | MEK Heptane | 41 | 1:1 | MEK MTBE | 42 | 1:1 | MEK Toluene |
| 43 | 1:0 | Acetonitrile | 44 | 2:1 | Acetonitrile Water | 45 | 1:1 | Acetonitrile Water |
| 46 | 1:1 | Acetonitrile Hexane | 47 | 1:1 | Acetonitrile Heptane | 48 | 1:1 | Acetonitrile MTBE |
| 49 | 1:1 | Acetonitrile Toluene | 50 | 1:0 | THF | 51 | 2:1 | THF Water |
| 52 | 1:1 | THF Water | 53 | 1:1 | THF Hexane | 54 | 1:1 | THF Heptane |
| 55 | 1:1 | THF MTBE | 56 | 1:1 | THF Toluene | 57 | 1:0 | Ethyl Acetate |
| 58 | 2:1:1 | Ethyl Acetate Water Methanol | 59 | 2:2:1 | Ethyl Acetate Water Ethanol | 60 | 1:1 | Ethyl Acetate Hexane |
| 61 | 1:1 | Ethyl Acetate Heptane | 62 | 1:1 | Ethyl Acetate MTBE | 63 | 1:1 | Ethyl Acetate Toluene |
| 64 | 1:0 | MTBE | 65 | 2:1:1 | MTBE Water Methanol | 66 | 2:2:1 | MTBE Water Ethanol |
| 67 | 1:1 | MTBE Hexane | 68 | 1:1 | MTBE Heptane | 69 | 2:1 | MTBE Methanol |
| 70 | 2:1 | MTBE Ethanol | 71 | 1:0 | Toluene | 72 | 2:1:1 | Toluene Water Methanol |
| 73 | 2:2:1 | Toluene Water Ethanol | 74 | 1:1 | Toluene Hexane | 75 | 1:1 | Toluene Heptane |
| 76 | 2:1 | Toluene Methanol | 77 | 2:1 | Toluene Ethanol | 78 | — | |

Pos = position, as indicated in FIG. 16-FIG. 26;
MTBE = methyl tert-butyl ether;
MEK = methyl ethyl ketone;
Ratios indicate proportions of solvents listed from top to bottom.

The obtainable solid residues were analyzed by XRPD in comparison to the starting material. Crystalline as well as amorphous material was found. The only anhydrous crystalline form identified in this particular screening experiment was obtained by recrystallization from ethanol, and was assigned as leflutrozole Form A. Other crystalline forms of leflutrozole that were identified from this experiment exhibited reduced thermodynamic stability relative to crystalline Form A. For example, other crystalline forms identified from this study revealed crystal structures with reduced crystal density, which is a proxy for thermodynamic stability, and displayed the presence of solvent molecules.

Given the diversity of crystal forms identified in this study, leflutrozole therefore displays polymorphic crystalline behavior, adopting a variety of different crystalline forms. Anhydrous Form A and two solvate structures, acetone and ethyl acetate (Form B and Form C, respectively), were characterized for further development. Other solvates identified from the study include, but are not limited to, the THF, DMF, and dioxane solvates. However, only Form A and the two solvates Form B and C were sufficiently stable and crystalline such that high-quality characterization was able to be performed in this experiment.

Figure 2:
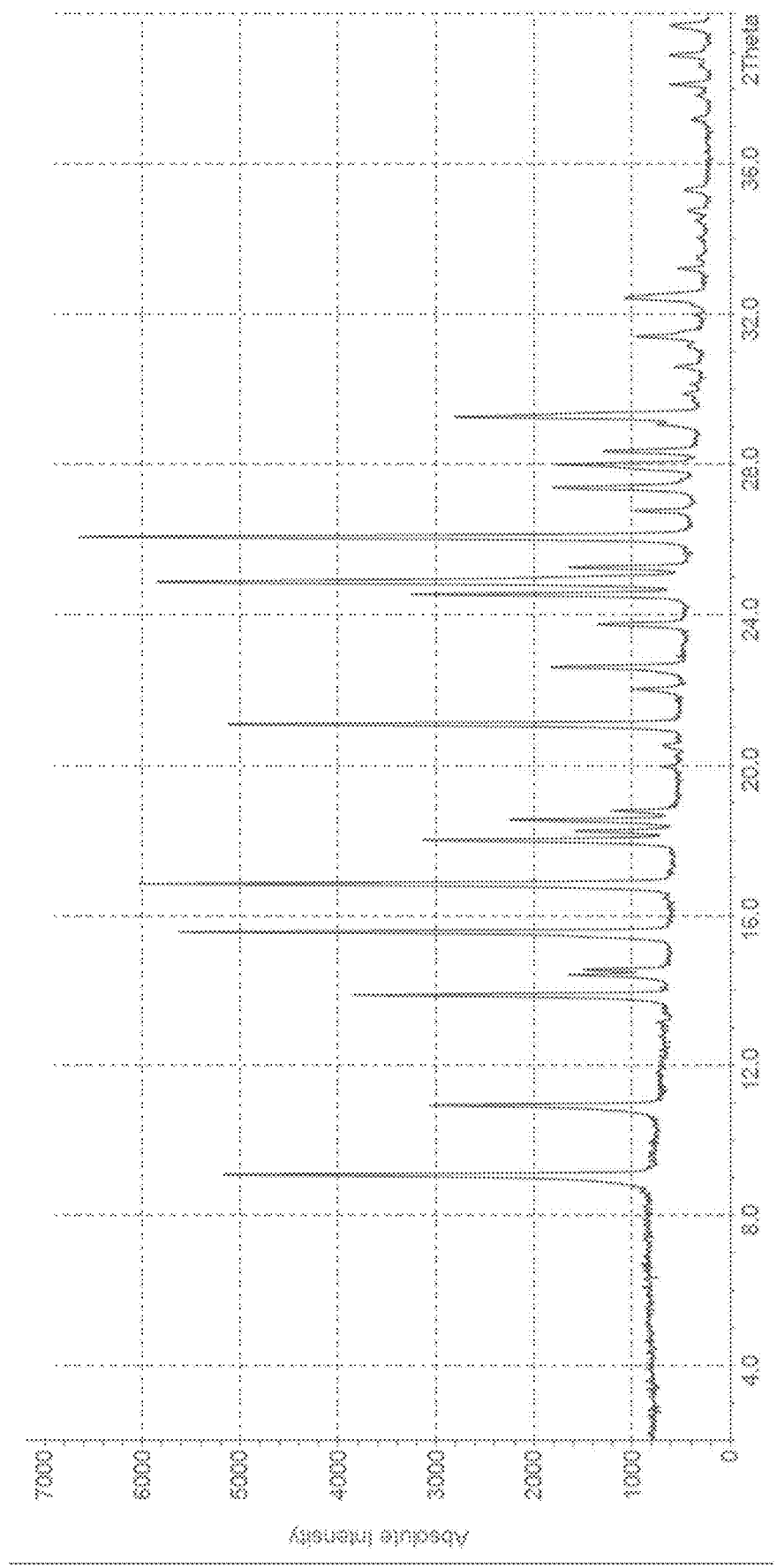
FIG. 2 is a second X-ray powder diffractogram for crystalline Form A leflutrozole, collected under different conditions.

The crystalline forms were characterized by X-ray powder diffraction (XRPD) with a Bruker D8 Advance, irradiating with Cu Kα (30 kV, 40 mA). A second sample was collected irradiating at 40 kV, and 40 mA, and corresponds to the X-ray powder diffractogram of FIG. 2.

TABLE 10

Characterization of crystalline Form A, B, and C of leflutrozole.

| | Form A Leflutrozole | Form B Leflutrozole | Form C Leflutrozole |
|---|---|---|---|
| Crystal System | Monoclinic | Monoclinic | Monoclinic |
| Space Group | $P2_1/c$ | $C2/c$ | $P2_1/n$ |
| a, Å | 16.060(4) | 37.366(9) | 7.387(2) |
| b, Å | 12.087(3) | 11.727(3) | 11.831(2) |
| c, Å | 7.387(2) | 7.404(2) | 38.191(7) |
| α, β, γ | 90, 95.827(15), 90 | 90, 99.137(10), 90 | 90, 91.583(12), 90 |
| V, Å$^3$ | 1426.5(6) | 3203.2(14) | 3336.5(12) |
| $D_{calc}$, g/cm$^3$ | 1.412 | 1.378 | 1.383 |
| Z | 4 | 8 | 8 |

The density of the leflutrozole Form A is 1.412 g/cm$^3$ showing that the solid-state structure is very stable. The solvate structures have densities of 1.378 g/cm$^3$ (acetone) and 1.383 g/cm$^3$ (ethyl acetate), indicating reduced lattice density—and hence, reduced stability-relative to Form A. These data demonstrate that solvates Form B or Form C are less thermodynamically stable forms compared to leflutrozole Form A.

In this experiment, the Form A polymorph of leflutrozole was the only crystalline form to be produced in anhydrous form, being free from co-crystallized solvent, water, salts, or other substances. The data from this experiment demonstrate that the Form A polymorph, which has both a higher crystal density and significantly lower unit cell volume (V, Å$^3$) relative to Forms B and C, possesses a more stable crystal lattice structure than the Form B and C polymorphs. Form A is not expected to undergo a form change when exposed to heat, as no solvent molecules are a part of the crystalline framework that may become volatile. Furthermore, the XRPD data indicate that the non-covalent interactions may be stronger in the anhydrous form due to the improved ability of leflutrozole molecules, when substantially free of solvent, to pack more closely together. It is expected that the intermolecular forces responsible for maintaining the anhydrous form are greater than that of forms with co-crystallized solvent molecules, thus resulting in stronger lattice energy and greater thermodynamic stability.

Crystalline Form A

An anhydrous crystal structure, Form A, substantially free of any contaminating solvent, was isolated and characterized from the well corresponding to where ethanol was used as the recrystallization media. Ethanolic recrystallization of synthetic leflutrozole provided a material that displayed no hydrogen bonds in its crystal structure. Only weak intermolecular interactions are found, and the packing scheme of the solid-state structures mainly obey van der Waals interactions.

Crystalline leflutrozole Form A was characterized by infrared spectroscopy (FT-IR) in Nujol mull with a wavelength range from 4000 to 400 cm$^{-1}$. IR spectra were collected with an FT-IR Bruker IFS 55, housing a TGS detector. Form A of leflutrozole has the infrared spectra as understood by the peaks set forth in the following table.

TABLE 11

Infrared absorbances for crystalline anhydrous leflutrozole.

| Wavelength (cm$^{-1}$) | Assignments |
|---|---|
| 3131, 3105 | ν C—H aromatic |
| 2925, 2854 | nujol |
| 2230 | ν CN |
| 1608, 1511 | ν C=C aromatic, ν C=N triazole ring |
| 1462, 1372 | δ C—H aliphatic |
| 1279, 1228 | ν C—N, ν C—F |
| 911, 836, 826, 684, 658, 572 | out-of-plane δ-CH of substituted benzene ring |

ν = stretching vibration;
δ = deformation vibration.

Figure 4:
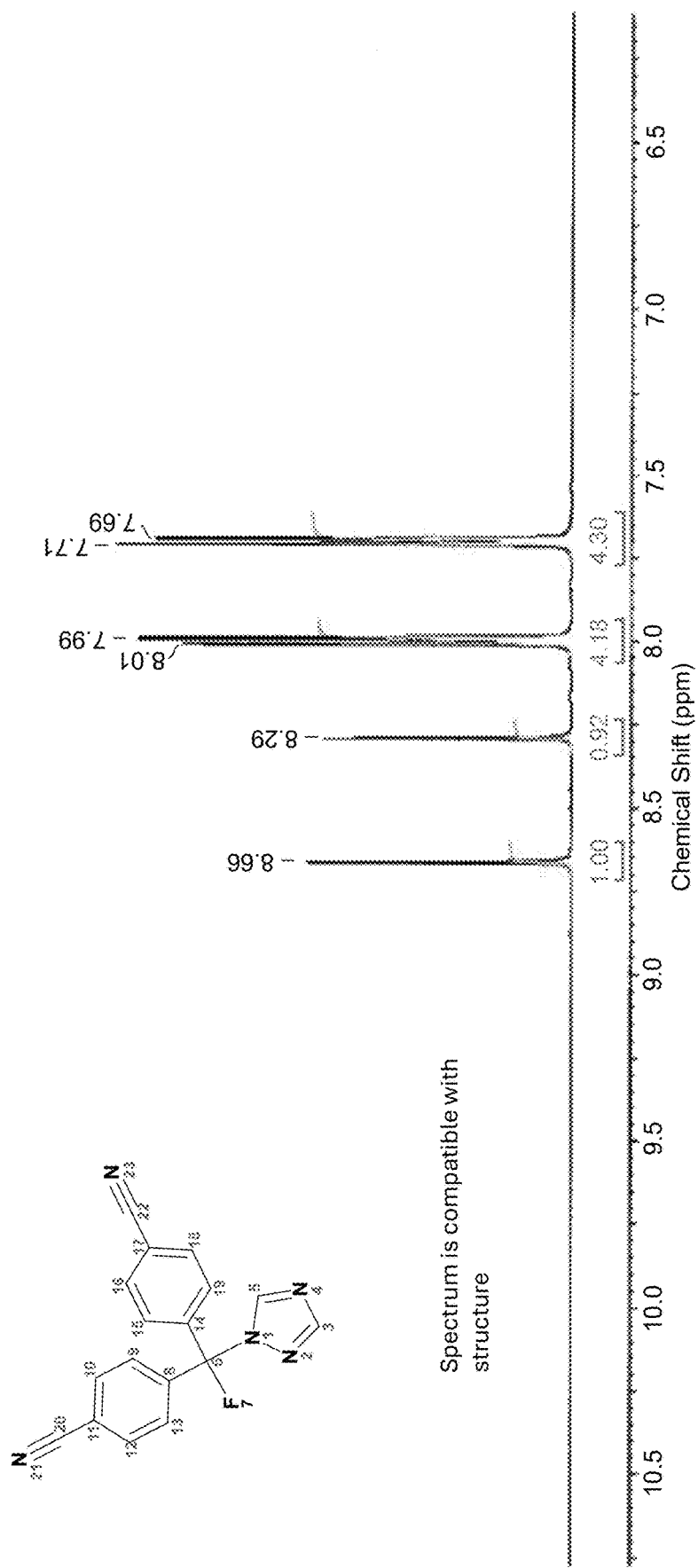
FIG. 4 is an exemplary $^1$H Nuclear Magnetic Resonance (NMR) spectrum for crystalline Form A of leflutrozole.

The crystalline Form A of leflutrozole has the $^1$H-NMR peaks as set forth by the assignments in the following table, and as familiar to one of skill in the art. Measurements were collected with a 500 MHz spectrometer and the anhydrous leflutrozole sample was prepared in DMSO-d$_6$. The associated proton NMR spectrum for crystalline Form A of leflutrozole is shown in FIG. 4.

TABLE 12

Proton NMR assignment for anhydrous leflutrozole.

| Chemical Shift, δ | Multiplicity | Coupling Constant | Proton(s) |
|---|---|---|---|
| 7.70 | d | J = 8.39 Hz | 3 |
| 8.00 | d | J = 8.24 Hz | 3 |
| 8.29 | s | — | 1 |
| 8.66 | s | — | 1 |

Figure 27:
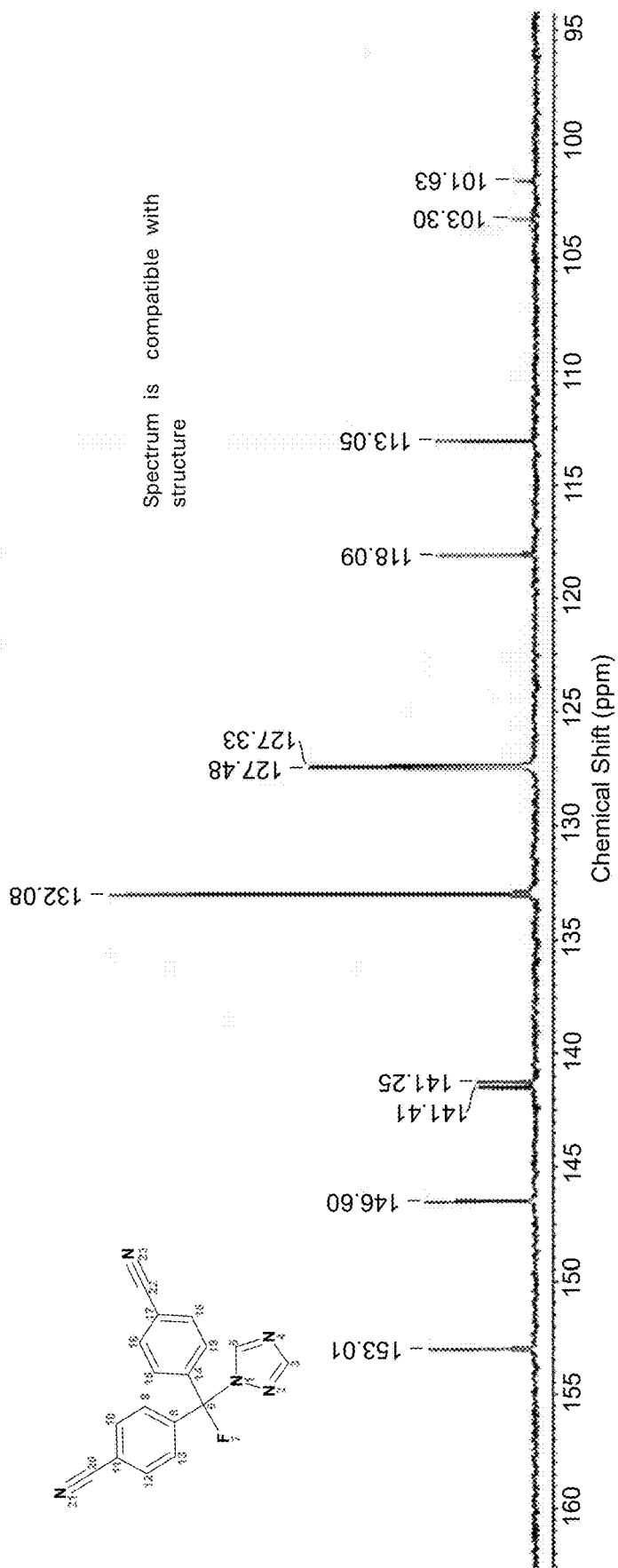
FIG. 27 is an exemplary $^{13}$C Nuclear Magnetic Resonance (NMR) spectrum for crystalline Form A of leflutrozole.

The crystalline Form A of leflutrozole has the 13C-NMR peaks as set forth by the assignments in the following table, and as familiar to one of skill in the art. Measurements were collected with a 126 MHz spectrometer and the Form A leflutrozole sample was prepared in DMSO-d$_6$. The associated carbon NMR spectrum for crystalline anhydrous leflutrozole is shown in FIG. 27.

TABLE 13

Carbon NMR assignment for anhydrous leflutrozole.

| Chemical Shift, o | Multiplicity | Coupling Constant | Carbon |
|---|---|---|---|
| 102.46 | d | J = 210.39 Hz | 1 |
| 127.41 | d | J = 6.94 Hz | 5 |
| 141.36 | d | J = 28.21 Hz | 1 |

Figure 3:
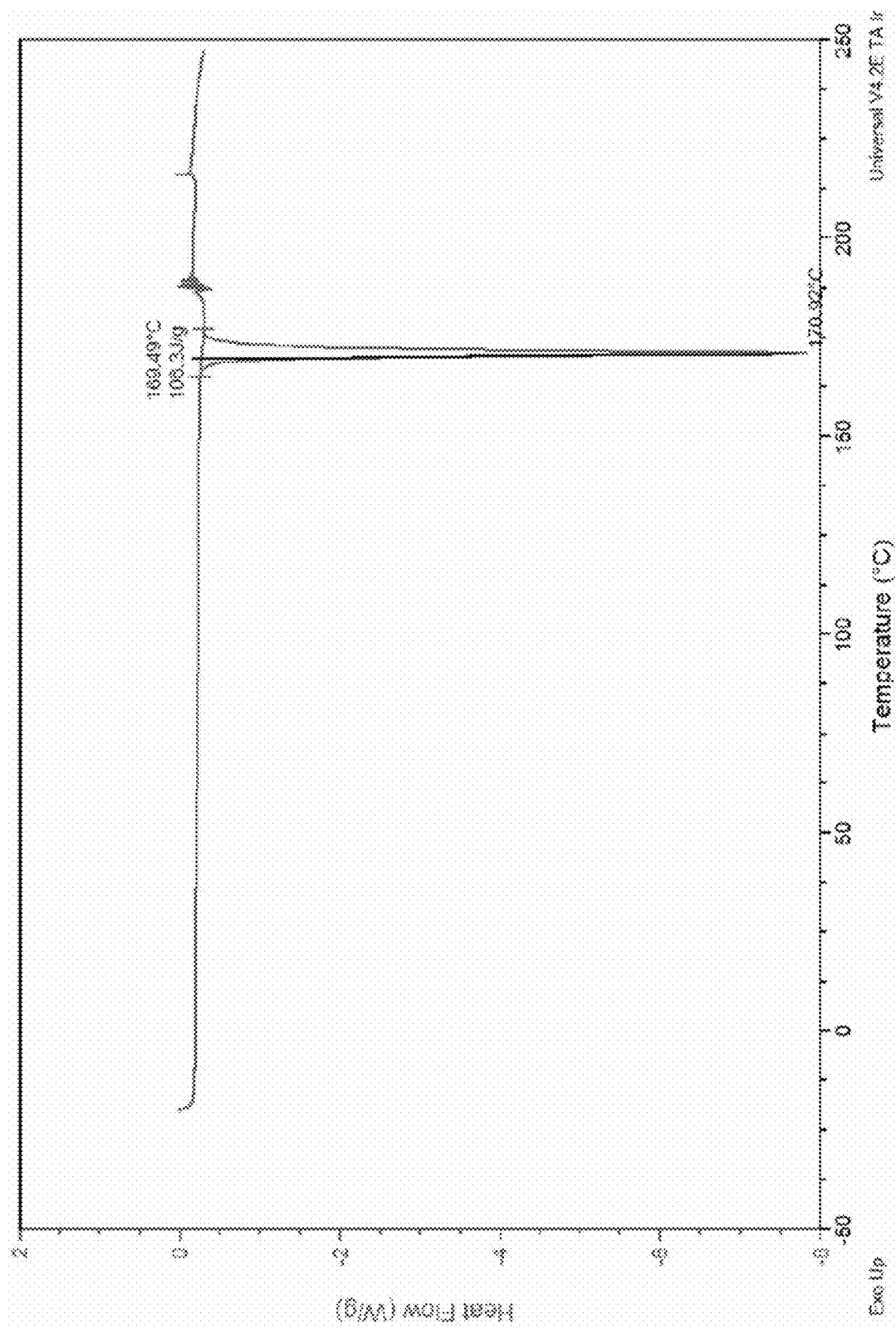
FIG. 3 is an exemplary differential scanning calorimetry curve for crystalline Form A of leflutrozole.

Differential scanning calorimetry (DSC) scan of leflutrozole Form A was performed at a scan rate of 10° C./min over a temperature range of 30°–220° C., with 50 mL/min of nitrogen flow. DSC data were collected on a Perkin-Elmer DSC7/Mettler DSC822e. Endothermicity (ΔH of 112 J/g, melting enthalpy) was found at 167.2° C. The DSC curve for anhydrous leflutrozole is shown in FIG. 3. A melting point of 169° C. was determined from these DSC experiments. Thermogravimetric analysis (TGA) of leflutrozole was performed at a scan rate of 20° C./min over a temperature range of 30° C.-300° C., shown further in FIG. 6. No significant loss of crystalline water, solvent, or sign of decomposition was found. Loss on drying was found to be <0.05%. The ultraviolet absorption spectrum of Form A of leflutrozole was measured in methanol at a concentration of 1.275 mg/100 mL in the wavelength range from 200 to 400 nm. Maximum absorption was 238 nm with a molar absorption coefficient of 1.3347 (au). Purity by HPLC for Form A leflutrozole is measured at 99.7%, and 99.6% via DSC.

Figure 28:
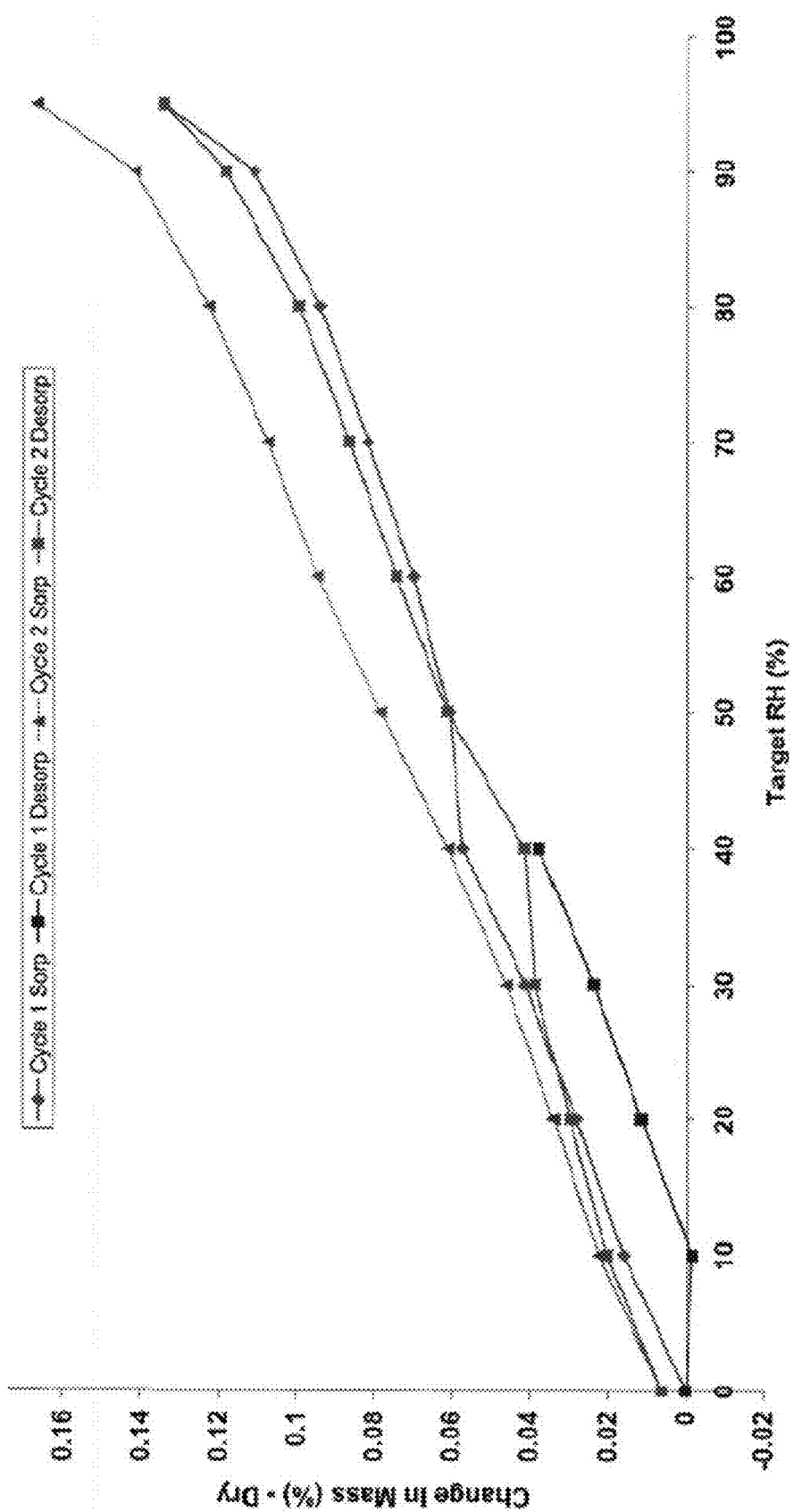
FIG. 28 is an exemplary dynamic vapor sorption curve for crystalline Form A of leflutrozole.

Crystalline Form A leflutrozole was determined to be non-hygroscopic. Dynamic vapor sorption (DVS) experiments revealed that maximum water uptake was <0.2% at 25° C., at up to 95% relative humidity (RH), as in FIG. 28.

Alternative Crystalline Forms

Figure 16:
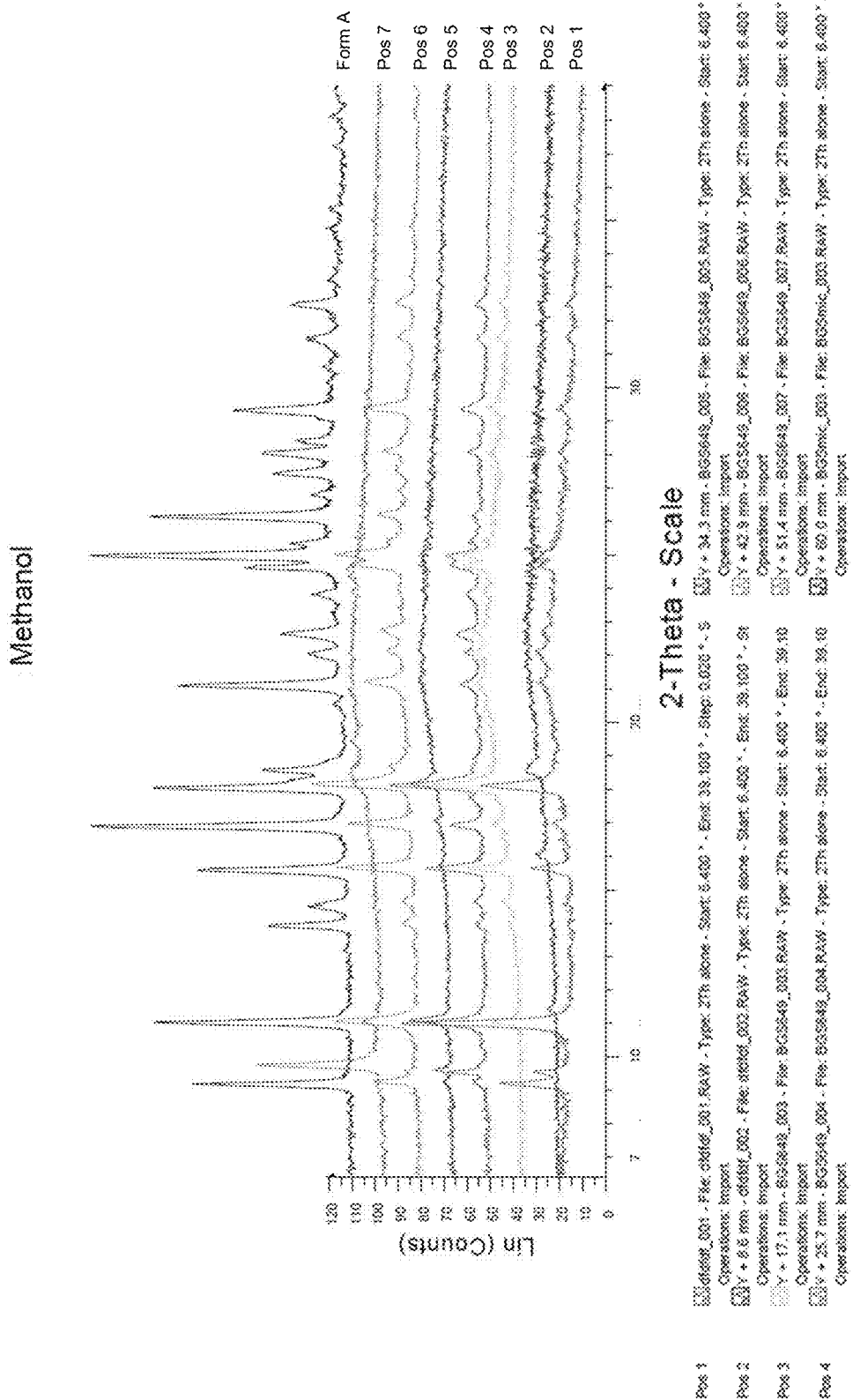
FIG. 16 is an exemplary X-ray powder diffractogram comparison between Form A of leflutrozole and material obtained from recrystallization with solvent mixtures containing methanol.
Figure 17:
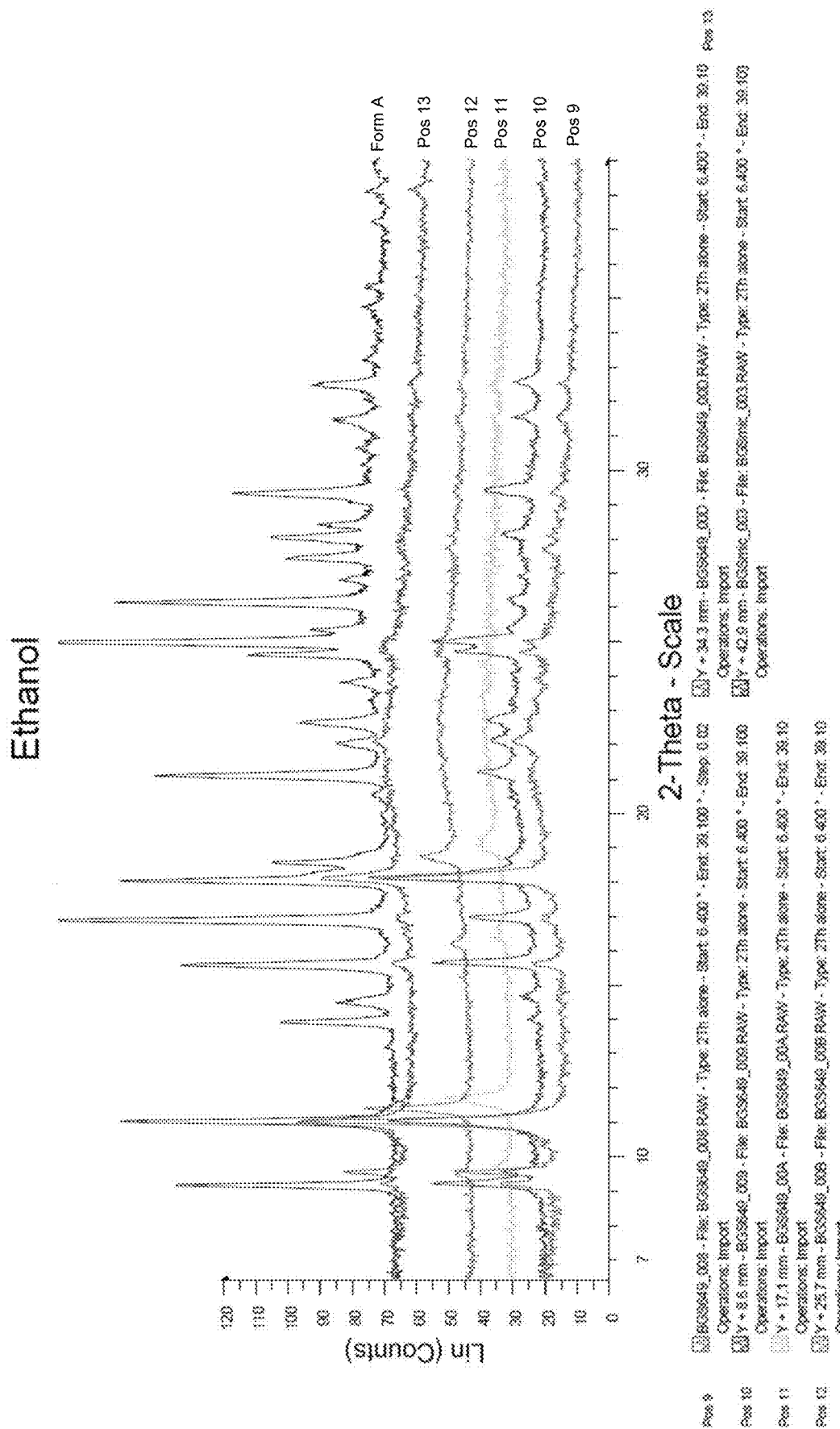
FIG. 17 is an exemplary X-ray powder diffractogram comparison between Form A leflutrozole and material obtained from recrystallization with solvent mixtures containing ethanol.
Figure 18:
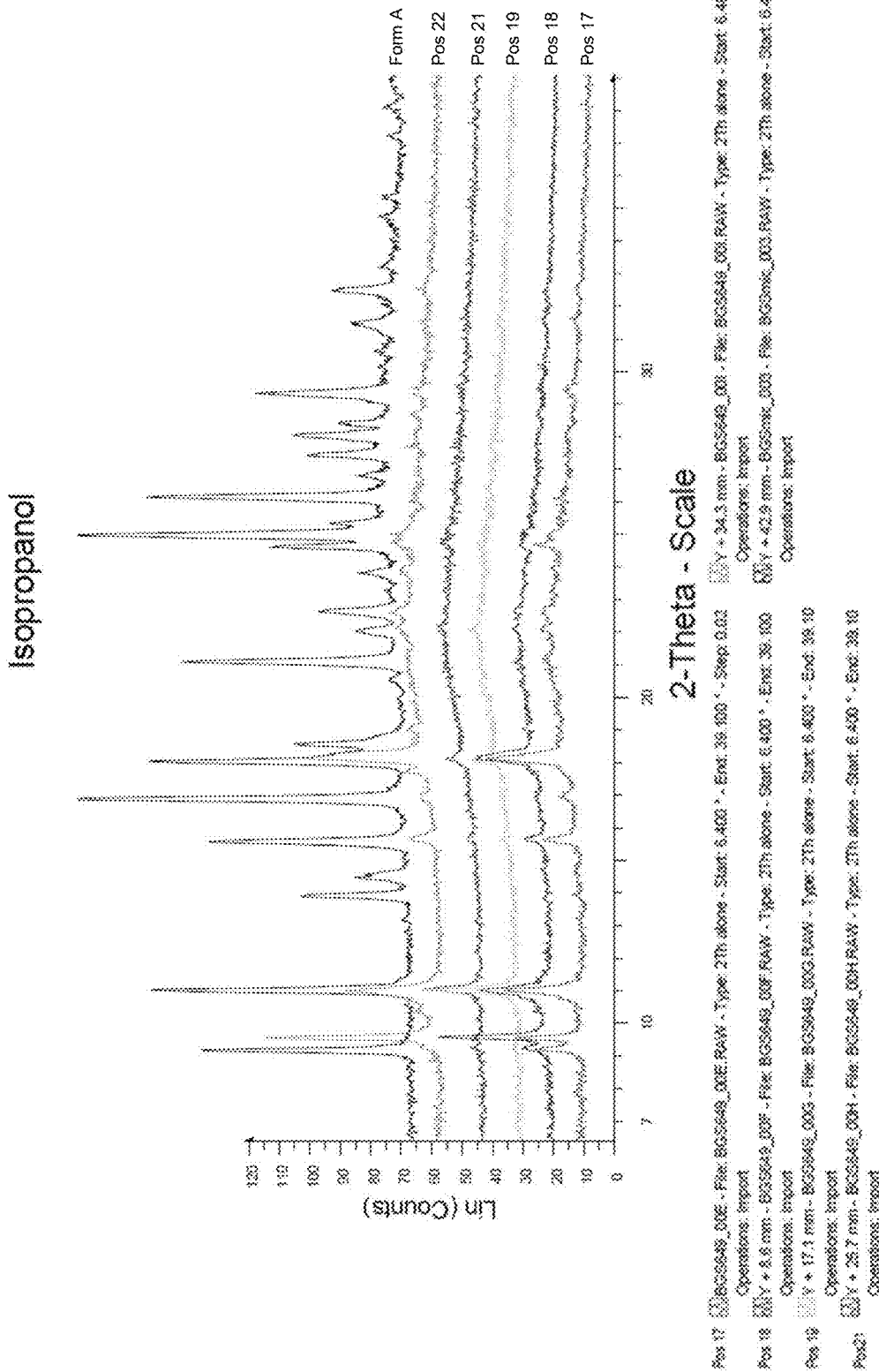
FIG. 18 is an exemplary X-ray powder diffractogram comparison between Form A leflutrozole and material obtained from recrystallization with solvent mixtures containing isopropanol.
Figure 19:
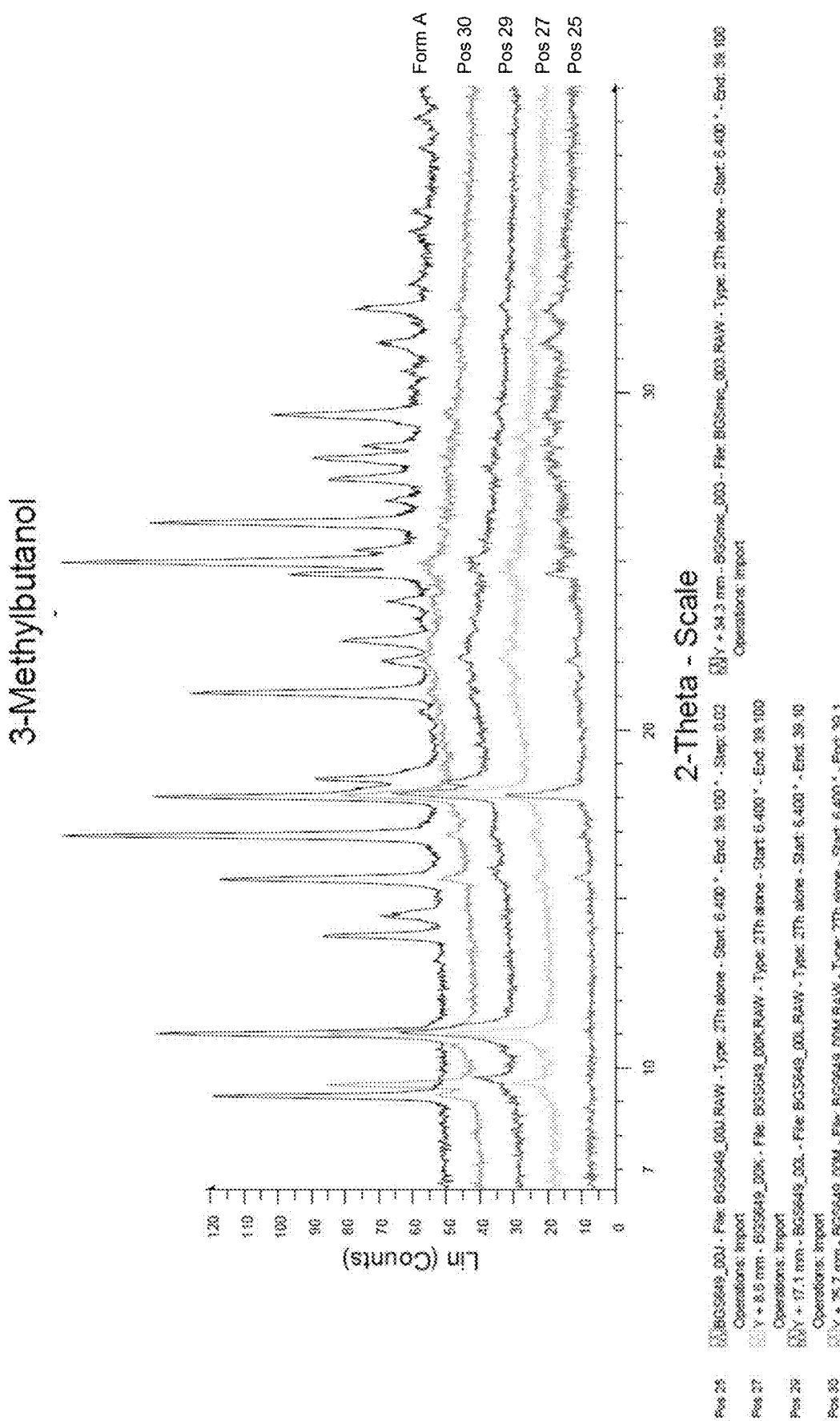
FIG. 19 is an exemplary X-ray powder diffractogram comparison between Form A leflutrozole and material obtained from recrystallization with solvent mixtures containing 3-methylbutanol.

Compared to other crystalline forms identified in this study, the Form A polymorph is notably more stable as determined by crystallinity, having the highest density at 1.412 g/cm$^3$. The Form B and Form C solvates had a density of 1.383 g/cm$^3$ and 1.378 g/cm$^3$, respectively. No solvates from this study were characterized by DSC on account of the tendency of solvates to destabilize upon high heating and deliver indistinct melting endotherms. Further evidence of superior stability of the Form A crystalline form is displayed by comparing the XRPD signatures obtained from ethanolic recrystallization with diffractograms obtained from material crystallized from other solvents and mixtures thereof, as shown in FIG. 16-FIG. 26. The crystals and/or amorphous material present in all other media tested lack definitive crystallinity based on the sharpness of the XRPD signatures. For instance, comparison of the material obtained from recrystallization from 100% methanol as in position 1 of Table 9 provided material of substantially worse crystallinity, with poorly defined peaks that lack agreement compared to Form A (FIG. 16). As part of this study, combinations of methanol with other solvents such as water (positions 2 and 3), hexane (position 4), heptane (position 5), methyl tert-butyl ether (position 6), or toluene (position 7) still yielded insufficiently crystalline material or a solid which lacked characteristic peaks for Form A. This trend held for combinations using ethanol and other solvents (FIG. 17), showing that recrystallization from ethanol as the solvent of choice is critical to obtain polymorph Form A with sufficient crystallinity and well-defined XRPD peaks. There is accordingly presented a method of preparing Form A of leflutrozole by recrystallization from ethanol. Use of toluene, tetrahydrofuran, ethyl acetate, or acetone may have given rise to crystalline material, but as these figures show, the material produced from these solvent systems is altogether different from the ethanol-produced Form A crystalline material due to the significant differences in peaks observed and is suggested to be less crystalline qualitatively through the obtained diffractograms.

The spectra obtained with solvate crystalline material from this study is significantly noisier in comparison to the ethanol-produced Form A crystals. The lower signal-to-noise ratio of the solvate forms of leflutrozole establishes that the choice of solvent for recrystallization effects the crystallinity of the solid obtained. Thus, recrystallization from ethanol provides the form with the highest stability relative to any other form obtained.

Example 2: Leflutrozole Polymorphism Screening

Materials and Methods

This Example describes the results of an additional, extended screen of leflutrozole crystal polymorphs, which was performed using larger-scale methods as compared to those of Example 1, above. Specifically, in this Example, two crystallization studies were conducted using either evaporative or cooling crystallization conditions. A third set of experiments identified crystal forms by way of slurrying. The sections below describe the results of these screens.

X-ray powder diffraction (XRPD) measurements for these experiments were performed using a Rigaku SmartLab diffractometer, at room temperature and atmospheric pressure, irradiating with Cu Kα (45 kV, 160 mA). Thermogravimetric analysis (TGA) was carried out using a Mettler Toledo TGA/DSC 3+ system (heating rate 5 K/min, range 25° C. to 300° C.), and operated with STARe software. Differential scanning calorimetry (DSC) was conducted under nitrogen atmosphere (20.0 mL/min), from 20° C. to 300° C. at 5 K/min using a Mettler Toledo DSC 3 device operated by STARe software.

Polymorph Screening—Evaporation Experiments

A set of evaporation experiments was performed to identify polymorphs of leflutrozole. A 100 mg sample of leflutrozole was dissolved in 3 mL of solvent; dissolution was achieved at room temperature or by heating to up to 50° C., followed by filtration of the sample to remove solid particles. The filtrate was then stored for up to 1 week for evaporation. Any resulting solid was characterized by XRPD, as presented in Table 14 for the first series of evaporation experiments.

TABLE 14

Series 1 evaporation experiments for crystallization of leflutrozole.

| Entry No. | Solvent | Soluble | Soluble w/heating? | XRPD | Polymorphic form |
|---|---|---|---|---|---|
| 1 | TBME | √ | — | — | |
| 2 | THF | X | X* | √ | Form D |
| 3 | DIPE | X | X* | — | |
| 4 | Dioxane | √ | — | √ | Form E |
| 5 | Acetone | √ | — | √ | Form A |
| 6 | MEK | √ | — | √ | Primarily Form A, partially amorphous |
| 7 | MIBK | X | √ | √ | Form F |
| 8 | Water | X | X* | — | |

TABLE 14-continued

Series 1 evaporation experiments for crystallization of leflutrozole.

| Entry No. | Solvent | Soluble | Soluble w/heating? | XRPD | Polymorphic form |
|---|---|---|---|---|---|
| 9 | Methanol | X | X* | √ | Form A |
| 10 | Ethanol | X | X* | √ | Form A |

TBME = tert-butylmethyl ether;
THF = tetrahydrofuran;
DIPE = diisopropyl ether;
MEK = methyl ethyl ketone;
MIBK = methyl isobutyl ketone;
* = suspension was filtered.

Figure 29:
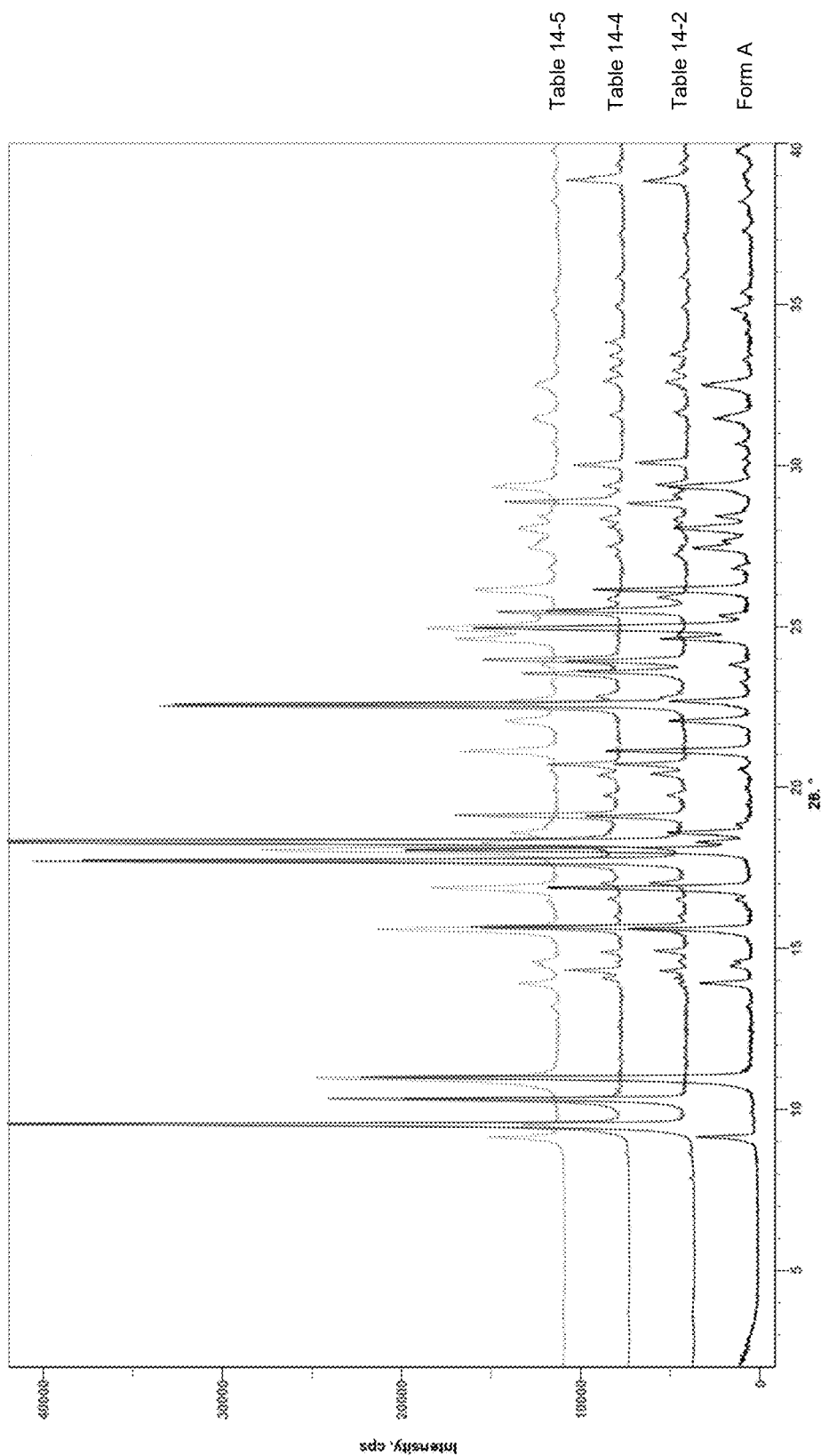
FIG. 29 is an X-ray powder diffractogram overlay of samples from the series 1 leflutrozole evaporation experiments, as described in the Examples, below. Samples, when identified as "Table X-Y", are hereinafter understood to refer to the corresponding experiment's Table number ("X") and Entry number ("Y") as identified elsewhere in the disclosure. This convention continues for any other figures herein using the "Table X-Y" designation to refer to Table and Entry numbers.
Figure 30:
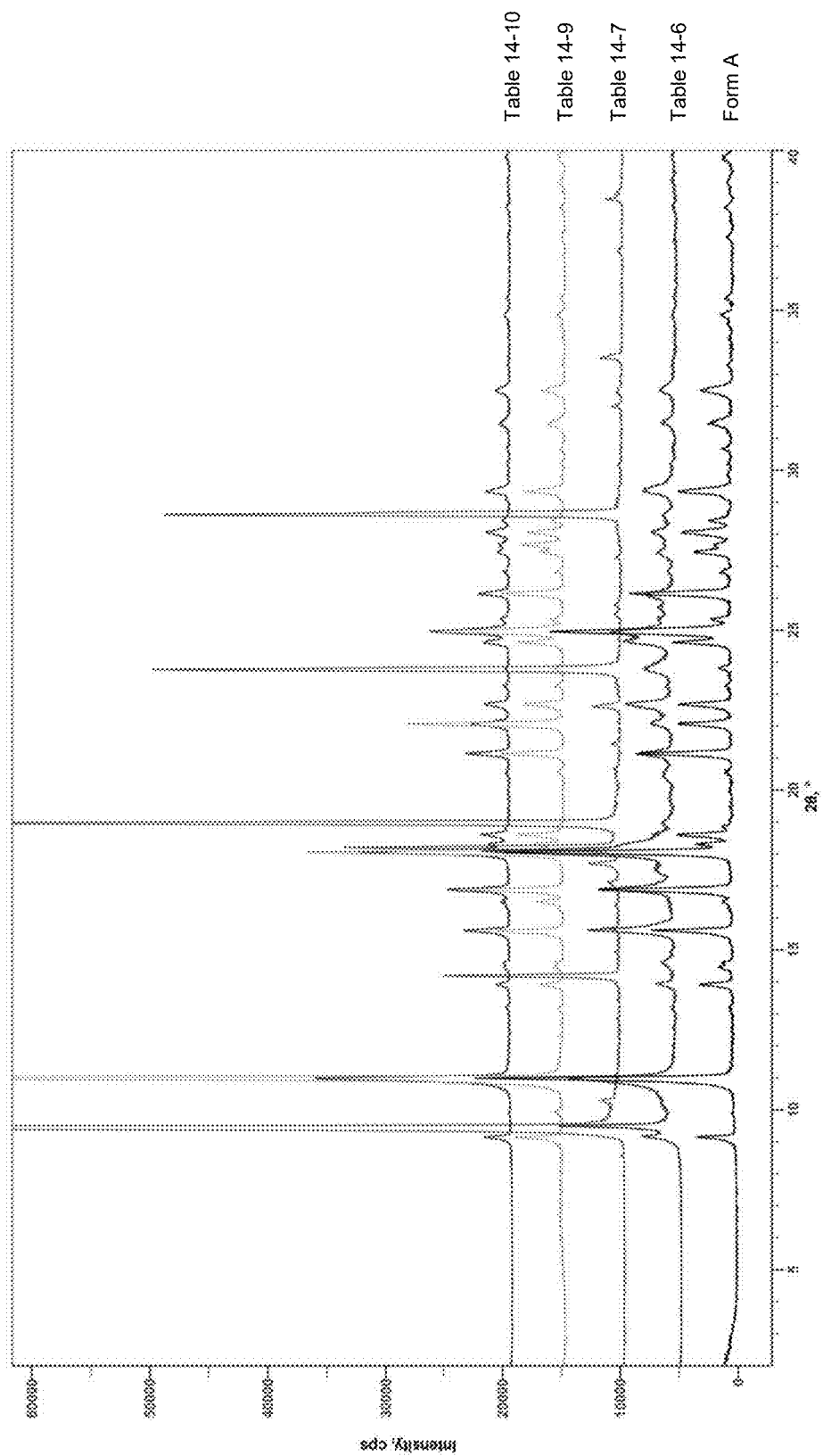
FIG. 30 is a second X-ray powder diffractogram overlay of samples from the series 1 leflutrozole evaporation experiments, as described in the Examples, below.

The crystalline material obtained using ethanol as the recrystallization solvent was characterized as leflutrozole Form A by XRPD. Additional crystalline forms, including Forms D, E, and F were identified from this series 1 screening. A comparison of various XRPD diffractograms collected from solid material in this screen is presented in FIG. 29-FIG. 30.

Additional sets of evaporation experiments were performed identically to the above procedures using different solvents. The results of the additional series 2 and series 3 evaporation experiments are shown in Table 15 and Table 16, respectively, below.

TABLE 15

Series 2 evaporation experiments for crystallization of leflutrozole.

| Entry No. | Solvent | Soluble | Soluble w/heating? | XRPD | Form |
|---|---|---|---|---|---|
| 1 | 2-Propanol | X | X* | — | — |
| 2 | 1-Propanol | X | X* | — | — |
| 3 | 1-Pentanol | X | X* | — | — |
| 4 | 2-Butanol | X | X | — | — |
| 5 | Isobutyl acetate | X | √ | √ | Form A |
| 6 | Ethyl acetate | √ | — | √ | Form A |
| 7 | Isopropyl acetate | X | √ | √ | Various forms |
| 8 | ACN | √ | — | √ | Various forms |
| 9 | MTHP | X | X* | √ | Form G |
| 10 | Chlorobenzene | X | √ | — | — |

ACN = acetonitrile;
MTHP = 4-Methyltetrahydropyran;
* = suspension was filtered.

TABLE 16

Series 3 evaporation experiments for crystallization of leflutrozole.

| Entry No. | Solvent | Soluble | Soluble w/heating? | XRPD | Form |
|---|---|---|---|---|---|
| 1 | DCM | √ | — | √ | Various forms |
| 2 | Toluene | X | X* | — | — |
| 3 | Methoxy-pentanol | X | X* | — | — |
| 4 | DCM/MeOH 7/3 | √ | — | √ | Form A |
| 5 | EtOH/Water 8/2 | X | X* | √ | Form A, partially amorphous |
| 6 | ACN/Water 8/2 | √ | — | √ | Form A |
| 7 | Toluene/THF 8/2 | X | √ | √ | Various forms |
| 8 | EtOAc/water 9/1 | X | √ | √ | Various forms |
| 9 | THF/Water 8/2 | √ | — | √ | Mostly Form A, highly amorphous |
| 10 | TBME + 10% MeOH | X | X* | √ | Mostly Form A, highly amorphous |

ACN = acetonitrile;
DCM = dichloromethane;
EtOH = ethanol;
EtOAc = ethyl acetate;
MeOH = methanol;
TBME = tert-butylmethyl ether;
THF = tetrahydrofuran;
* = suspension was filtered.

Figure 31:
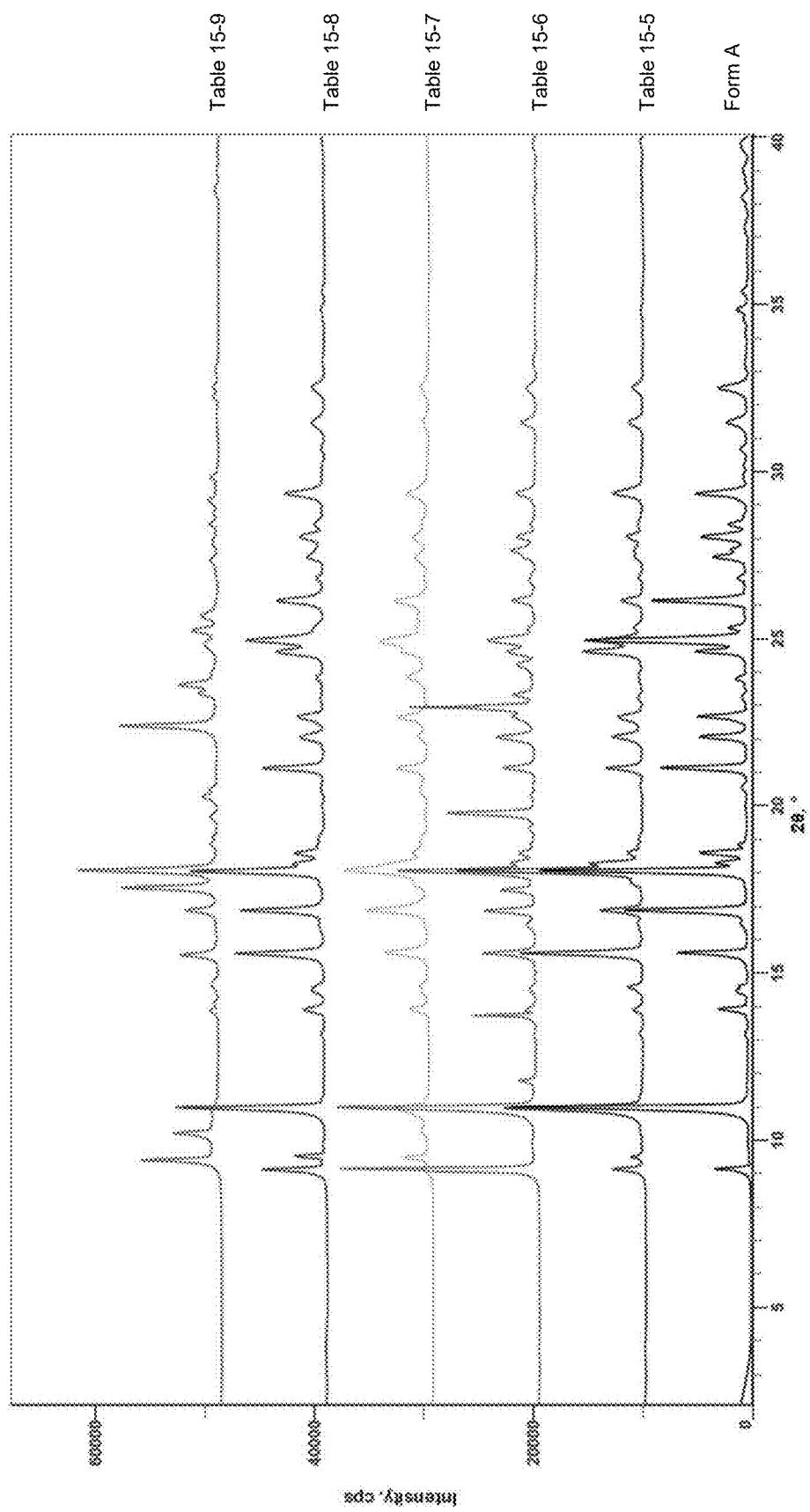
FIG. 31 is an X-ray powder diffractogram overlay of samples from the series 2 leflutrozole evaporation experiments, as described in the Examples, below.

Form A was isolated from the samples using isobutyl acetate or ethyl acetate as solvent, while various forms were isolated in isopropyl acetate and acetonitrile. Form G was isolated from the sample containing MTHP as solvent. A comparison of various XRPD diffractograms collected from solid material in the series 2 screen is presented in FIG. 31.

Figure 32:
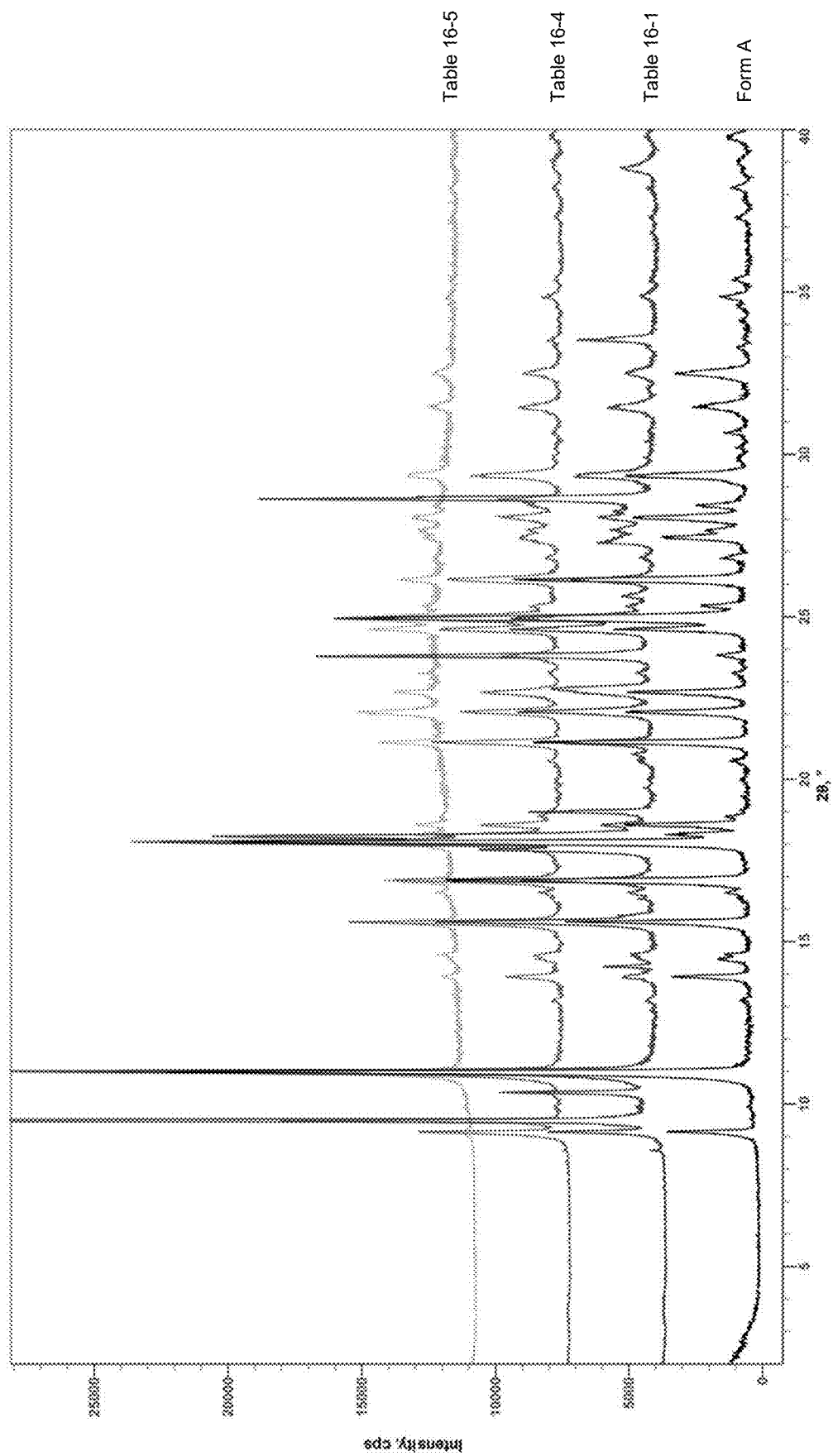
FIG. 32 is an X-ray powder diffractogram overlay of samples from the series 3 leflutrozole evaporation experiments, as described in the Examples, below.
Figure 33:
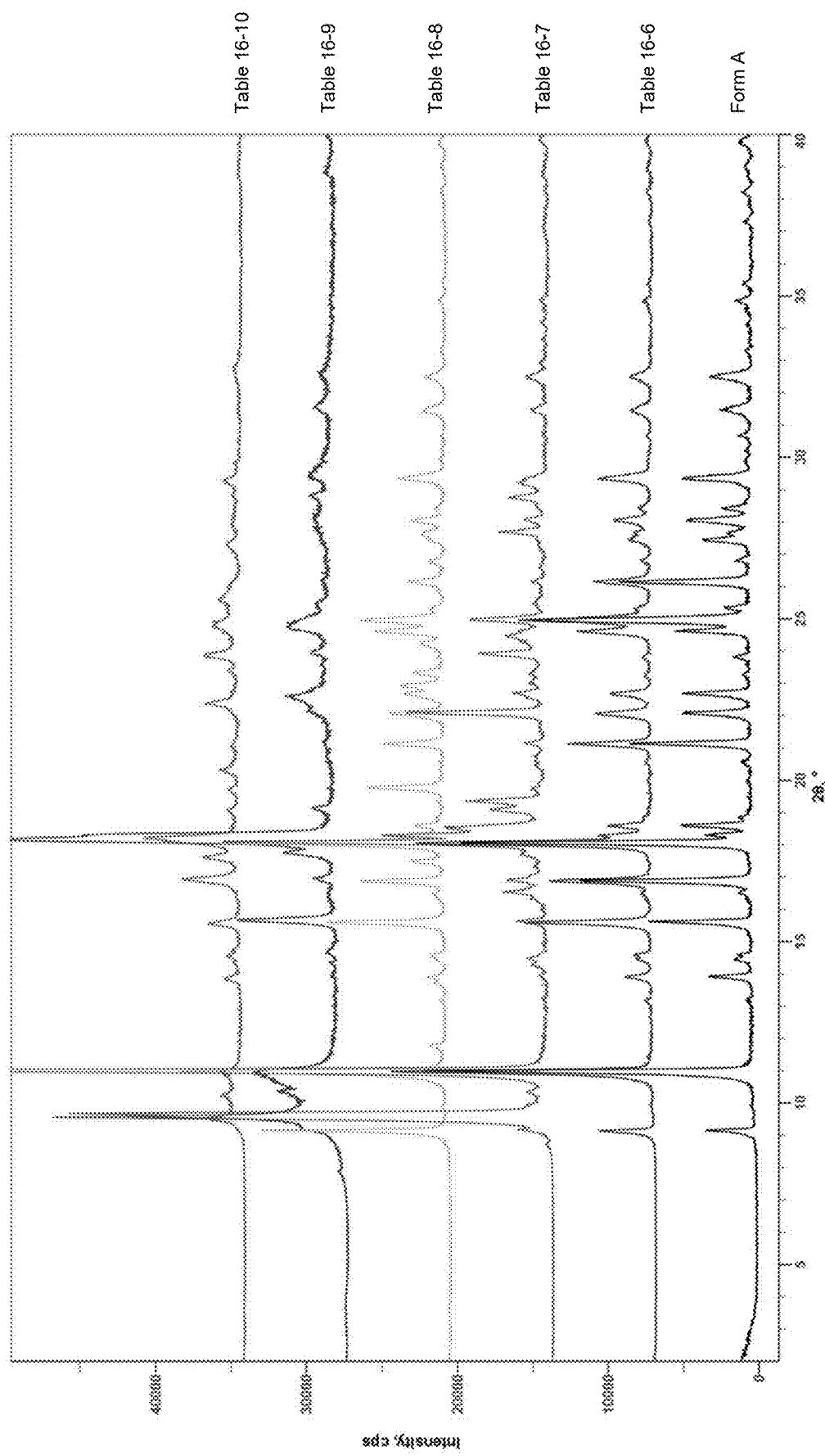
FIG. 33 is a second X-ray powder diffractogram overlay of samples from the series 3 leflutrozole evaporation experiments, as described in the Examples, below.

In the series 3 screen, Form A was isolated from several samples, though many isolates were either partially or highly amorphous. A mixture of several forms was identified in some samples. A comparison of various XRPD diffractograms collected from solid material in the series 3 screen is presented in FIG. 32-FIG. 33.

Polymorph Screening—Cooling Experiments

Crystallization studies using cold temperatures to induce solid formation were performed. Approximately 100 mg of leflutrozole was suspended in 3 mL of the indicated solvent and heated to near reflux. If complete dissolution was not achieved, the suspension was filtered, and the resulting filtrate cooled using a $CO_2$/EtOH bath. The suspension was alternatively decanted to remove the mother liquor, which was cooled by a $CO_2$/EtOH bath. The cooled solutions were filtered to remove potential precipitates, and any isolated solids were characterized by XRPD analysis. The results of these experiments are in Table 17.

TABLE 17

Cooling experiments for crystallization of leflutrozole.

| Entry No. | Solvent | Soluble | XRPD | Form | Remarks |
|---|---|---|---|---|---|
| 1 | DCM | √ (at RT) | √ | Amorphous material | — |
| 2 | Chlorobenzene | √ | √ | Form A | — |
| 3 | Acetone | √ (at RT) | — | — | no precipitation-discharged |
| 4 | Methanol | √ | √ | Form A | — |
| 5 | DIPE | √ | √ | Form A | — |
| 6 | Dioxane | √ (at RT) | — | — | only little precipitation on glass wall |
| 7 | 2-Propanol | √ | √ | Form A | — |
| 8 | ACN | √ (at RT) | — | — | no precipitation-discharged |
| 9 | TBME | √ | √ | Form A | — |
| 10 | Ethyl acetate | √ (at RT) | √ | Various forms | — |
| 11 | EtOAc/water 9/1 | √ (at RT) | — | — | only little precipitation on glass wall |

TABLE 17-continued

Cooling experiments for crystallization of leflutrozole.

| Entry No. | Solvent | Soluble | XRPD | Form | Remarks |
|---|---|---|---|---|---|
| 12 | THF/water 8/2 | √ (at RT) | — | — | thin suspension formed after storage |
| 13 | Isopropyl acetate | √ | √ | Various forms | partially amorphous |
| 14 | Toluene/THF 8/2 | √ | √ | Various forms | partially amorphous |
| 15 | DCM/MeOH 7/3 | √ (at RT) | — | — | no precipitation-discharged |

ACN = acetonitrile;
DCM = dichloromethane;
DIPE = diisopropyl ether;
EtOAc = ethyl acetate;
MeOH = methanol;
TBME = tert-butylmethyl ether;
THF = tetrahydrofuran.

Figure 34:
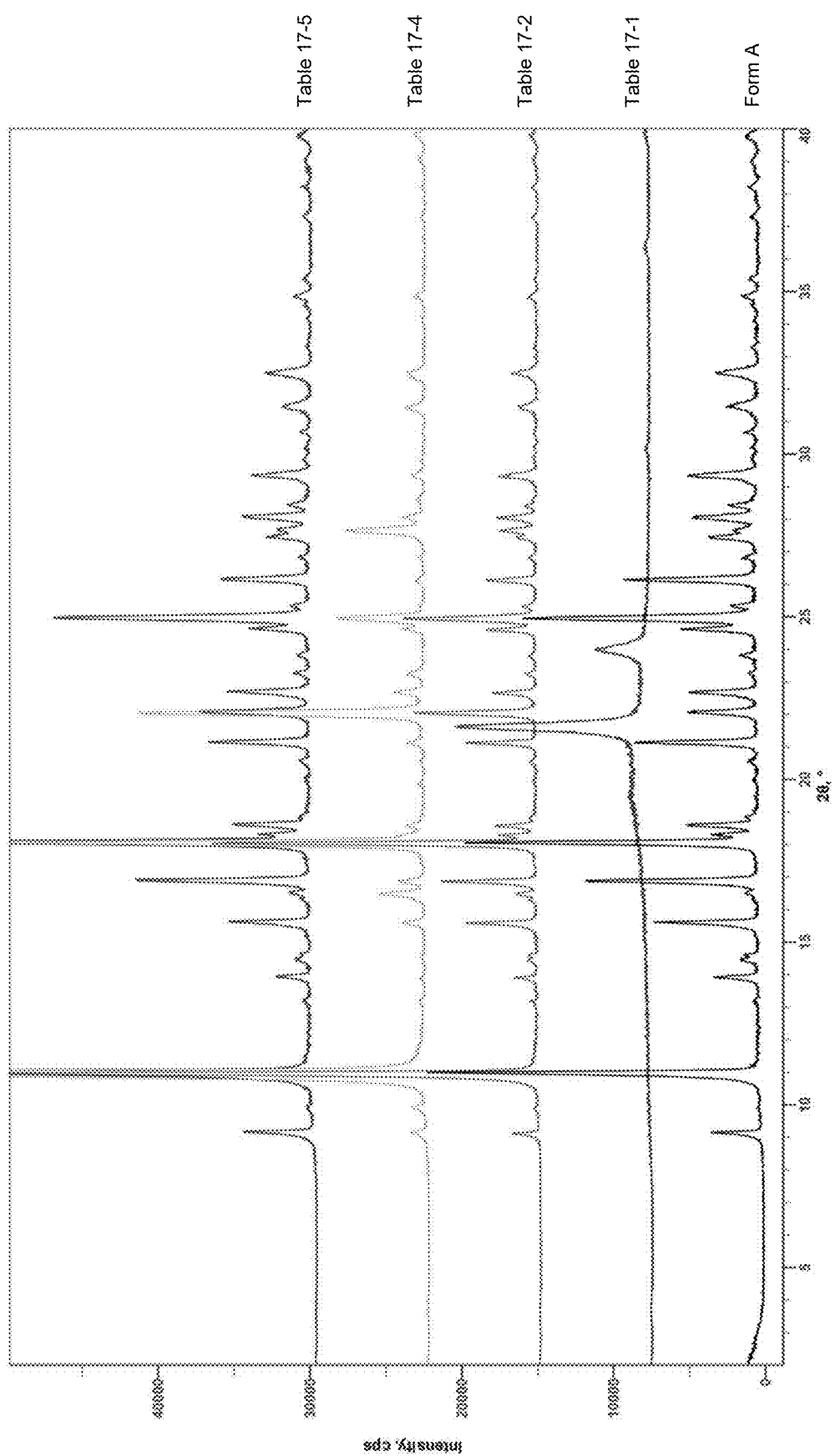
FIG. 34 is an X-ray powder diffractogram overlay of samples from the leflutrozole cooling experiments, as described in the Examples, below.
Figure 35:
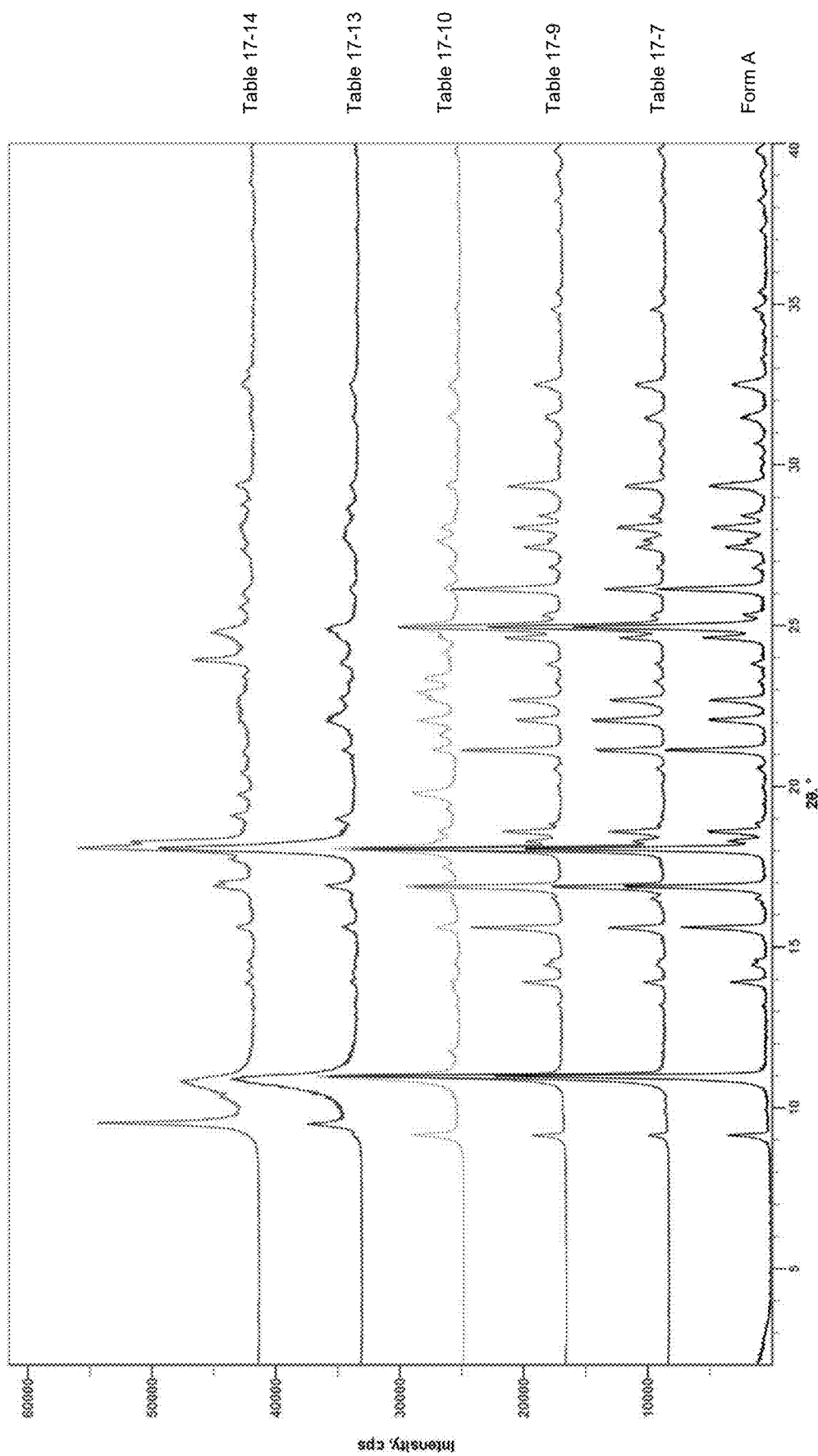
FIG. 35 is a second X-ray powder diffractogram overlay of samples from the leflutrozole cooling experiments, as described in the Examples, below.

In the crystallization screen using low temperature cooling to induce crystallization, Form A was isolated from several samples. A mixture of several forms was also identified in some samples. A comparison of various XRPD diffractograms collected using solid material from these experiments is presented in FIG. 34-FIG. 35.

Polymorph Screening—Slurry Experiments

Crystallization of leflutrozole under slurry conditions, to facilitate slow crystal growth at ambient conditions over a long period, was studied. Approximately 100 mg of leflutrozole was suspended in the indicated solvent at 400 μL volume to obtain a stirrable mixture. The mixture was shaken at room temperature for one week. The suspensions were subject to centrifugation, and the samples decanted and air dried. Any isolated solid material was characterized by XRPD analysis. The results of the series 1 slurry studies are summarized in Table 18 below.

TABLE 18

Series 1 slurry experiments for crystallization of leflutrozole.

| Entry No. | Solvent | XRPD | Form | Remarks |
|---|---|---|---|---|
| 1 | Pentanol | √ | Form A | mainly amorphous |
| 2 | MCH | √ | Form A | — |
| 3 | Toluene | √ | Form A | — |
| 4 | PEG400 | √ | Form A | very thick suspension, mainly amorphous |
| 5 | Chlorobenzene | √ | Form A | — |
| 6 | DCM | √ | Various forms | — |
| 7 | MEK | √ | Various forms | — |
| 8 | MIBK | √ | Form F | partially amorphous |
| 9 | Methoxy pentane | √ | Form A | — |
| 10 | DIPE | √ | Form A | — |

DCM = dichloromethane;
DIPE = diisopropyl ether;
MCH = methylcyclohexane;
MEK = methyl ethyl ketone;
MIBK = methyl isobutyl ketone;
PEG400 = polyethylene glycol 400.

Figure 36:
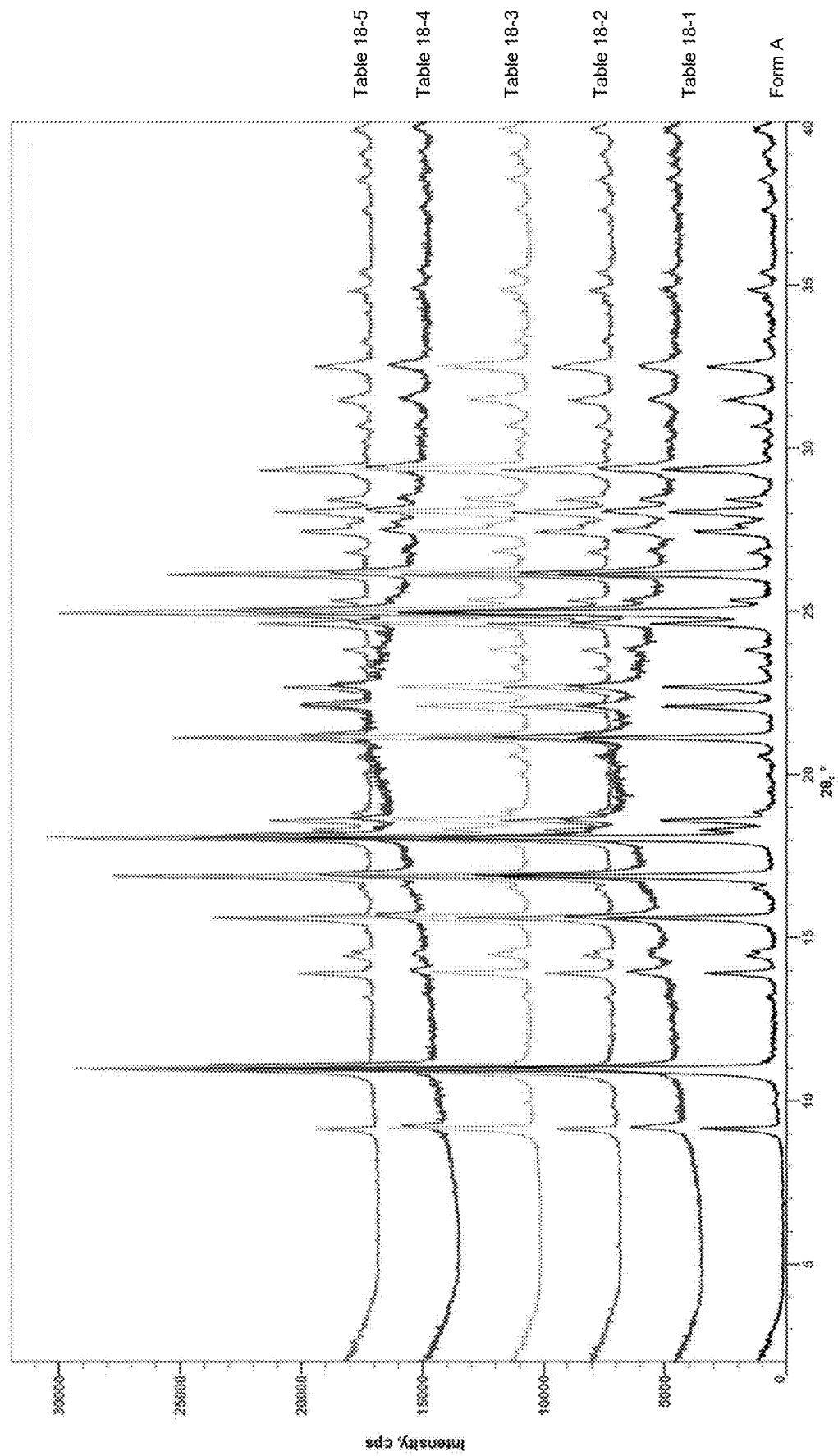
FIG. 36 is an X-ray powder diffractogram overlay of samples from the series 1 leflutrozole slurry experiments, as described in the Examples, below.
Figure 37:
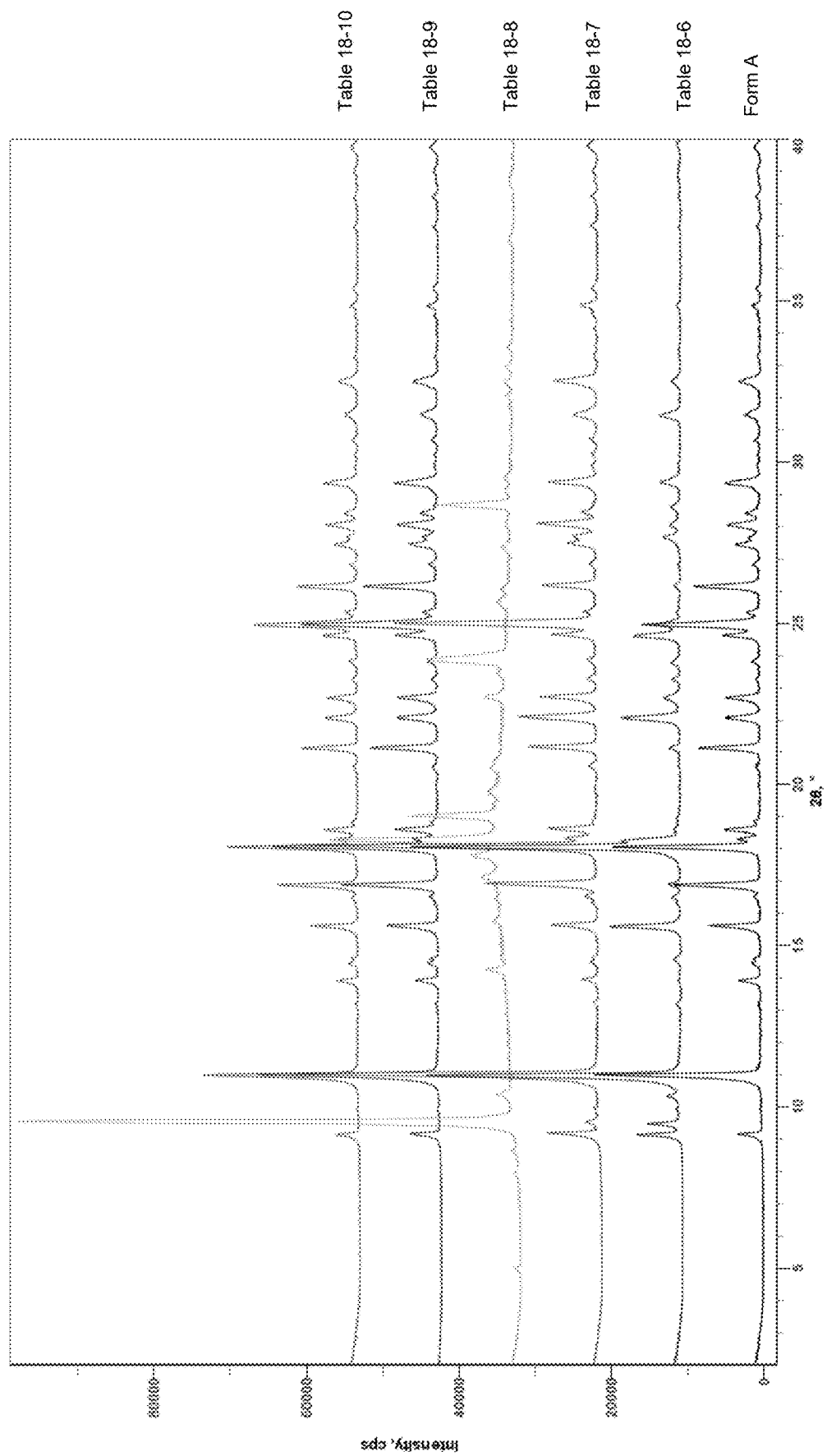
FIG. 37 is a second X-ray powder diffractogram overlay of samples from the series 1 leflutrozole slurry experiments, as described in the Examples, below.

In the crystallization screen slurry conditions to induce crystallization, Form A was isolated from several samples. A mixture of several forms was also identified in some samples. A comparison of various XRPD diffractograms collected using solid material from these experiments is presented in FIG. 36-FIG. 37.

Additional sets of slurry experiments were performed identically to the above procedures using different solvents.

The results of the additional series 2 and series 3 slurry experiments are shown in Table 19 and Table 20, respectively, below.

TABLE 19

Series 2 slurry experiments for crystallization of leflutrozole.

| Entry No. | Solvent | XRPD | Form | Remarks |
|---|---|---|---|---|
| 1 | MTHP | √ | Form G | — |
| 2 | TBME | √ | Form A | — |
| 3 | Dioxane | √ | Form E | — |
| 4 | 2-Me-THF | √ | Form I | — |
| 5 | CPME | √ | Form A | — |
| 6 | 1-Butanol | √ | Form A | — |
| 7 | 2-Propanol | √ | Form A | — |
| 8 | Ethyl acetate | √ | Various forms | — |
| 9 | Isopropyl acetate | √ | Form A | — |
| 10 | Isobutyl acetate | √ | Various forms | — |

CPME = cyclopentyl methyl ether;
2-Me-THF = 2-methyltetrahydrofuran;
MTHP = 4-methyltetrahydropyran;
TBME = tert-butyl methyl ether.

Figure 38:
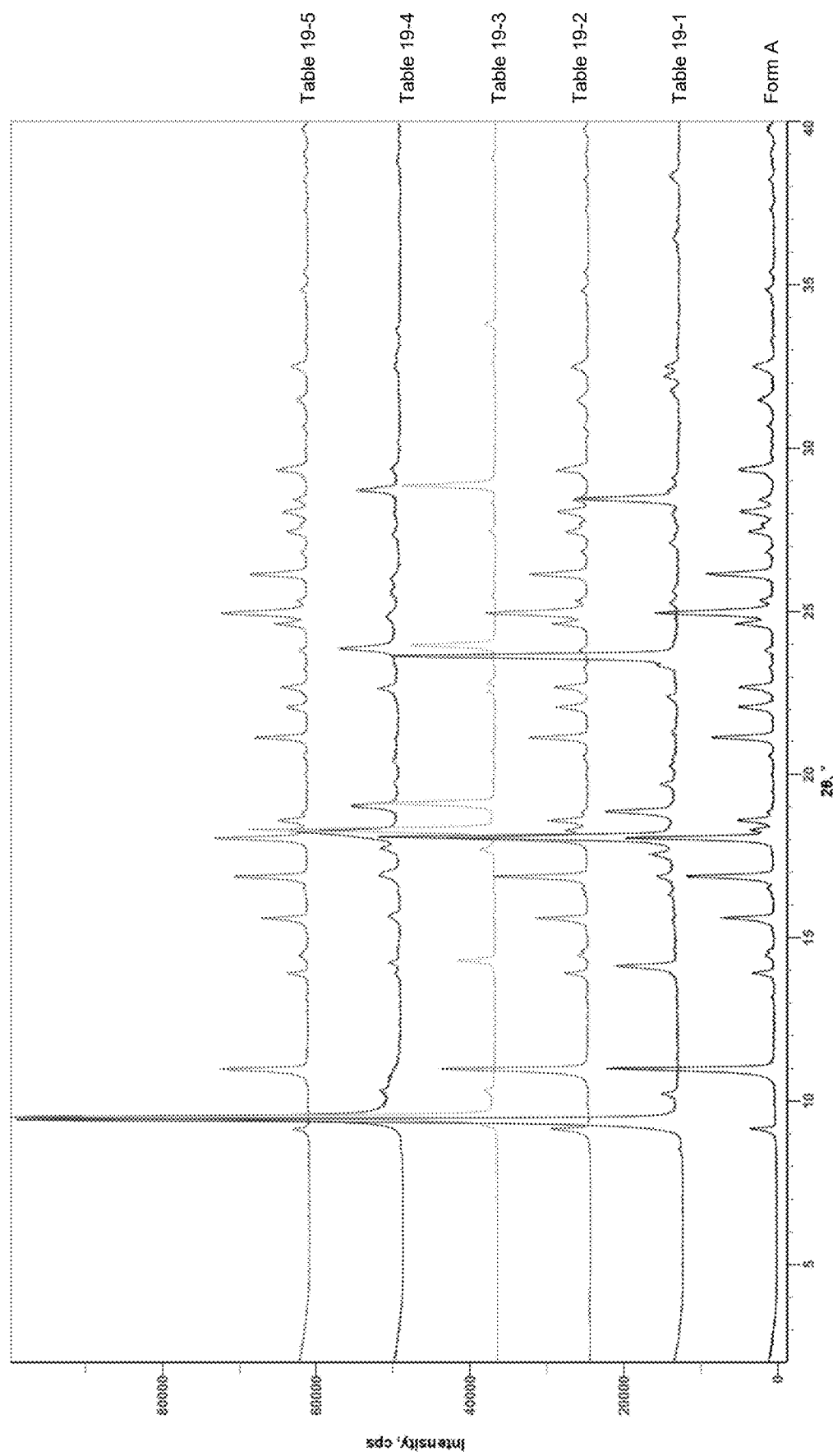
FIG. 38 is an X-ray powder diffractogram overlay of samples from the series 2 leflutrozole slurry experiments, as described in the Examples, below.
Figure 39:
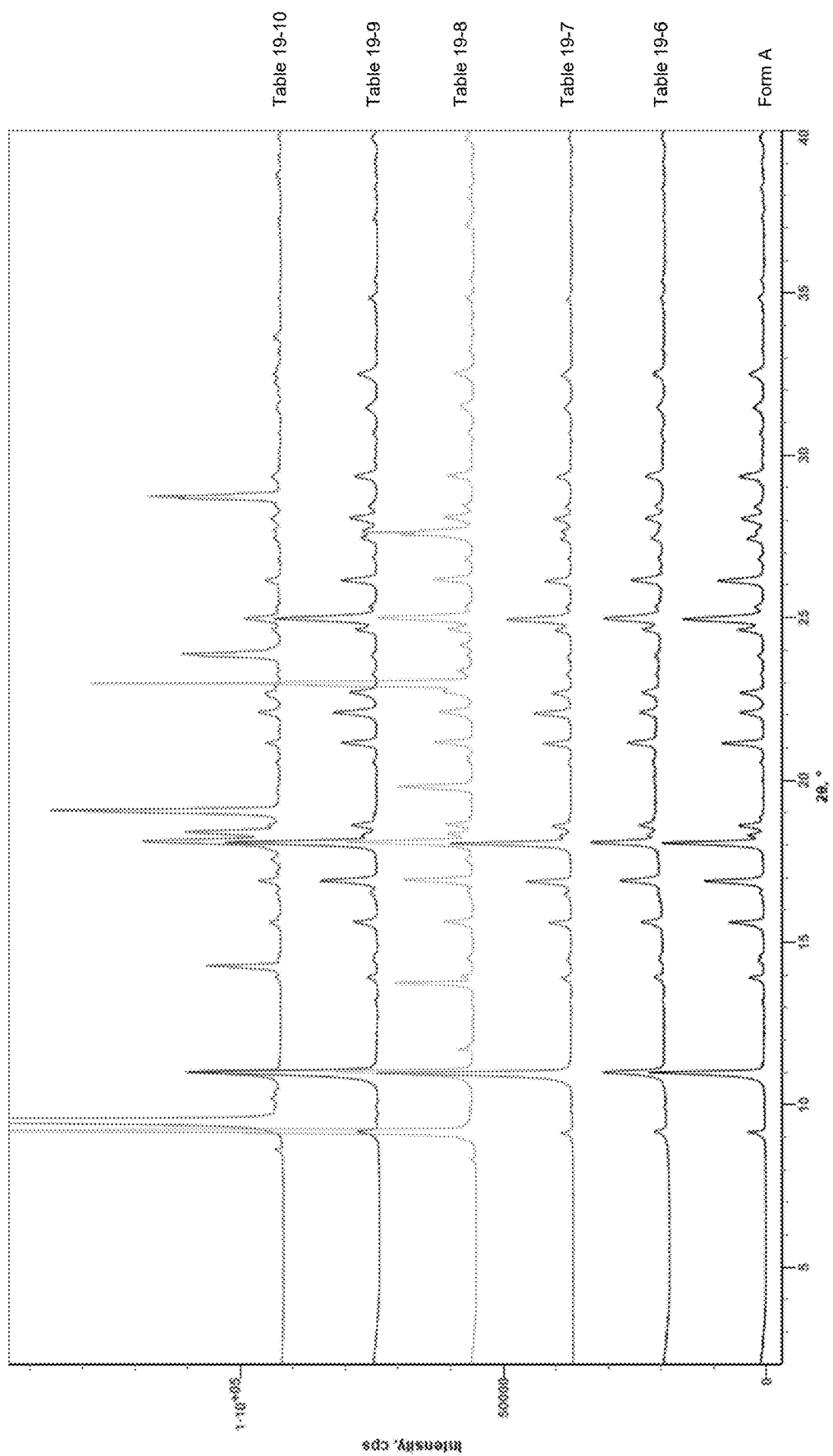
FIG. 39 is a second X-ray powder diffractogram overlay of samples from the series 2 leflutrozole slurry experiments, as described in the Examples, below.

In the slurry crystallization screen series 2, Form A was isolated from several samples. A mixture of several forms was also identified in some samples, as well as individual samples of crystalline Form E, G, or I of leflutrozole. A comparison of various XRPD diffractograms collected using solid material from these experiments is presented in FIG. 38-FIG. 39.

TABLE 20

Series 3 slurry experiments for crystallization of leflutrozole.

| Entry No. | solvent | XRPD | Form | Remarks |
|---|---|---|---|---|
| 1 | ACN | √ | Various forms | — |
| 2 | Ethyl Formate | √ | Various forms | — |
| 3 | Acetophenone | √ | Form A | — |
| 4 | DCM/MeOH 7/3 | √ | Various forms | — |
| 5 | DMF/TBME 5/5 | √ | Form H | — |
| 6 | DMSO/TBME 1/9 | √ | Form I | — |
| 7 | NMP/Heptane 1/9 | √ | Form J | — |
| 8 | EtOAc/water 8/2 | √ | Form A | — |
| 9 | EtOH/water 5/5 | √ | Form A | — |
| 10 | IPA/water 8/2 | √ | Form A | — |

ACN = acetonitrile;
DCM = dichloromethane;
DMF = dimethylformamide;
DMSO = dimethyl sulfoxide;
EtOAc = ethyl acetate;
EtOH = ethanol;
MeOH = methanol;
NMP = N-methyl-2-pyrrolidone.

Figure 40:
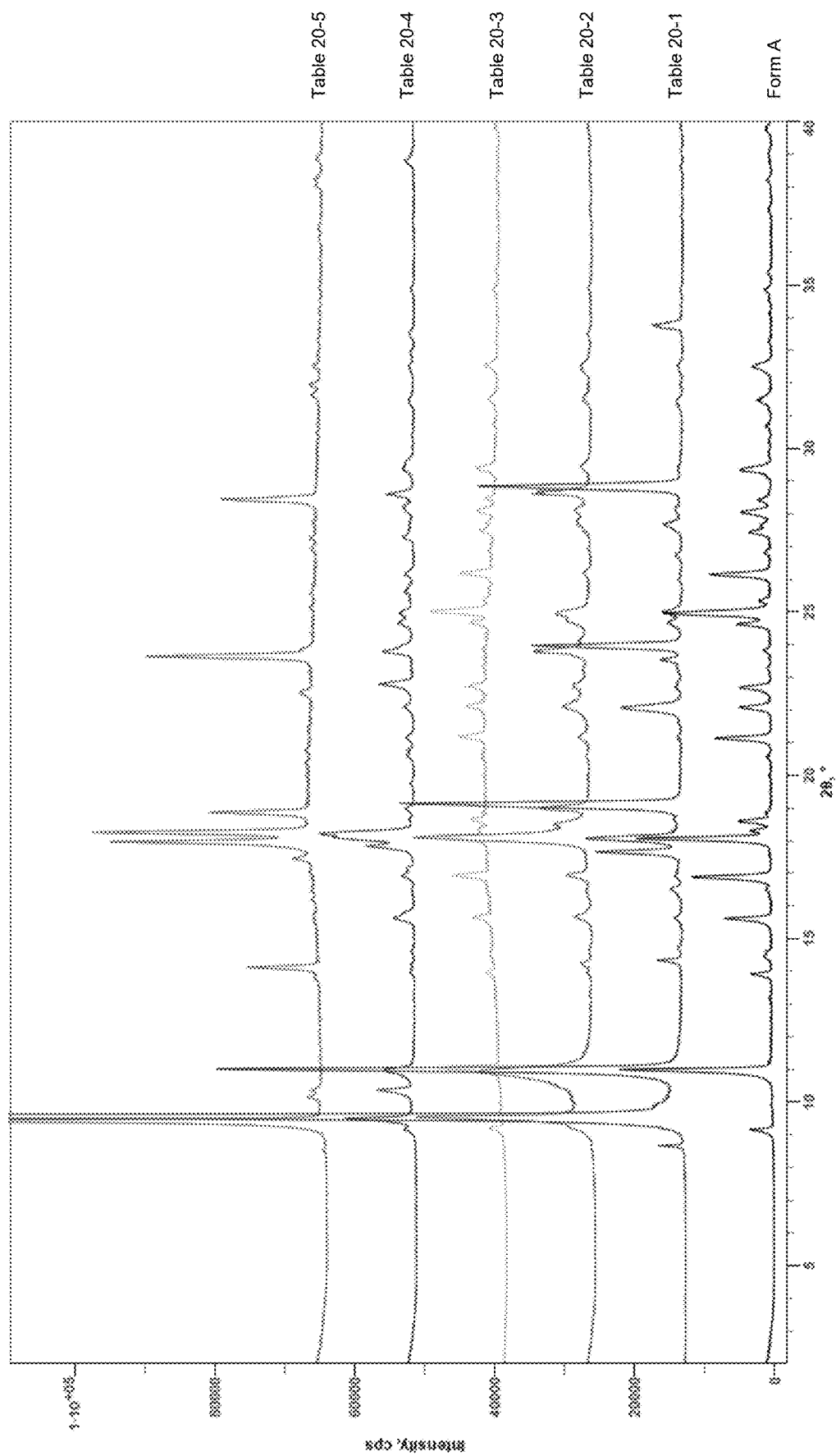
FIG. 40 is an X-ray powder diffractogram overlay of samples from the series 3 leflutrozole slurry experiments, as described in the Examples, below.
Figure 41:
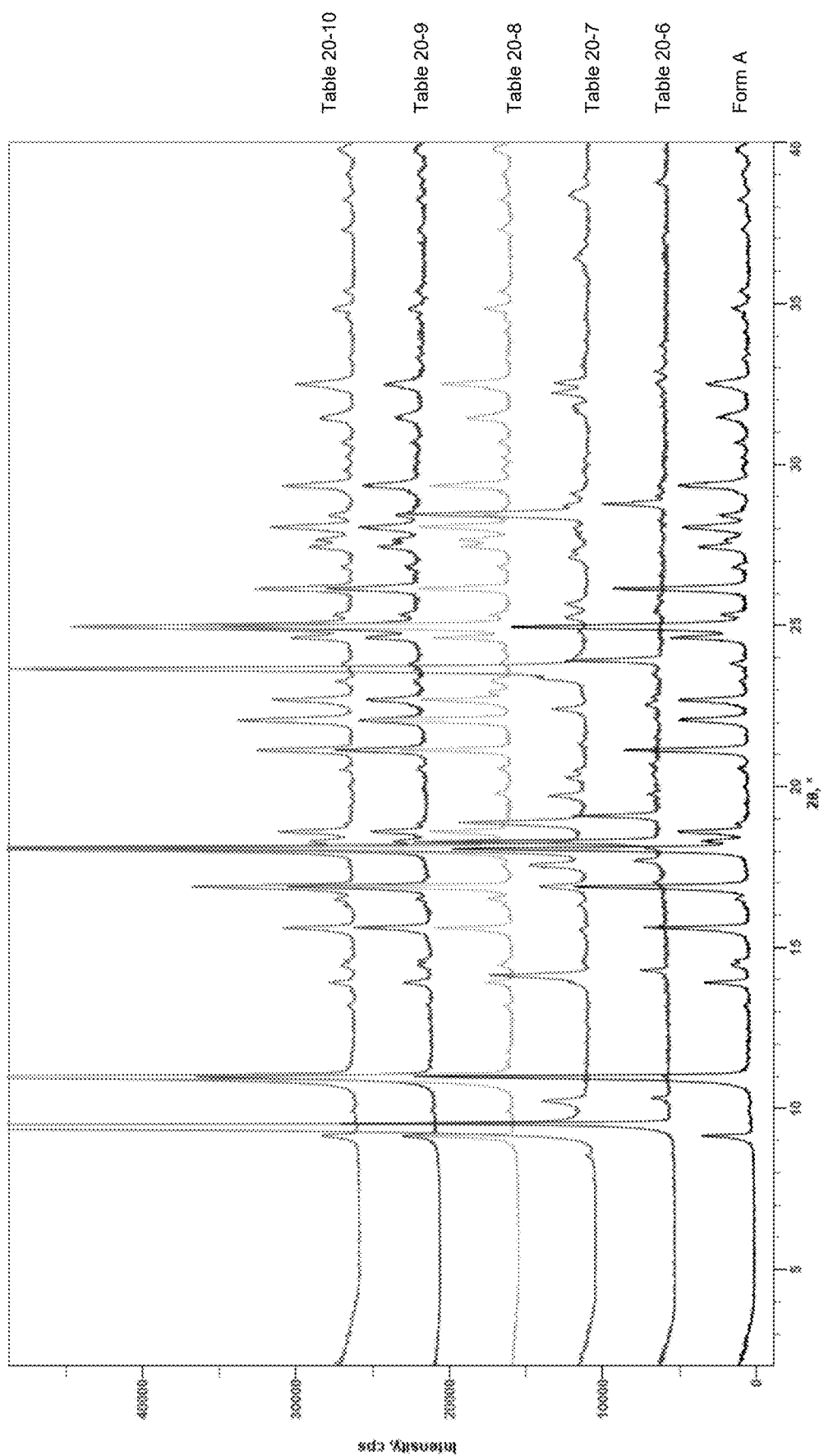
FIG. 41 is a second X-ray powder diffractogram overlay of samples from the series 3 leflutrozole slurry experiments, as described in the Examples, below.

In the slurry crystallization screen series 3, Form A was isolated from several samples. A mixture of several forms was also identified in some samples. Forms H, I, and J were also identified from samples which utilized mixtures of solvents. A comparison of various XRPD diffractograms collected using solid material from these experiments is presented in FIG. 40-FIG. 41.

Characterization and Comparison of Crystalline Polymorphs

It was determined that crystalline Form A of leflutrozole was anhydrous, whereas some other forms identified by this study were solvates. A summary of the collected data for the solvate crystalline forms identified in these studies is shown in Table 21.

TABLE 21

Comparison of crystalline Forms D-J of leflutrozole.

Figure 42:
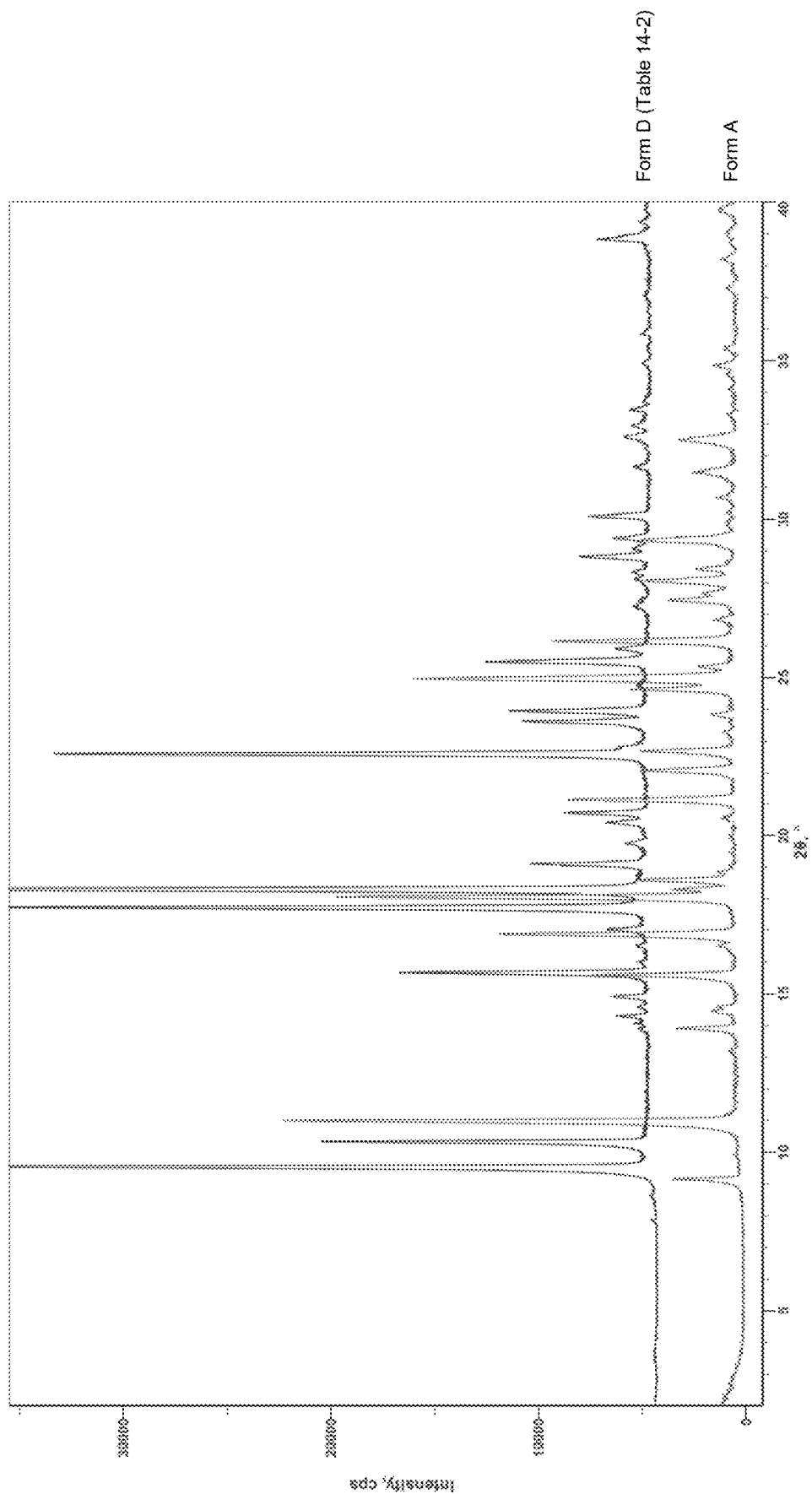
FIG. 42 is an X-ray powder diffractogram overlay of crystalline Form A of leflutrozole with crystalline Form D of leflutrozole.
Figure 43:
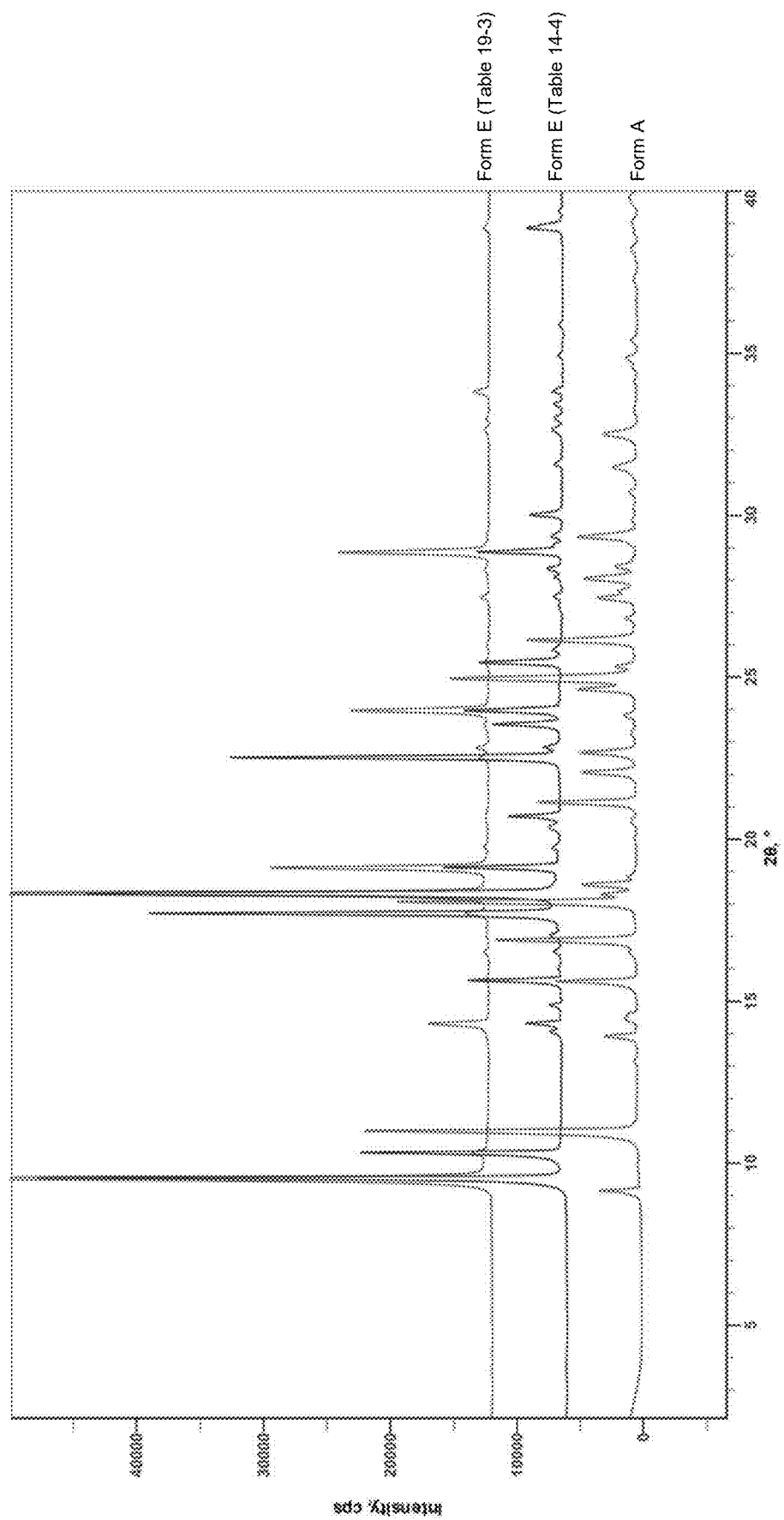
FIG. 43 is an X-ray powder diffractogram overlay of crystalline Form A of leflutrozole with crystalline Form E of leflutrozole.
Figure 44:
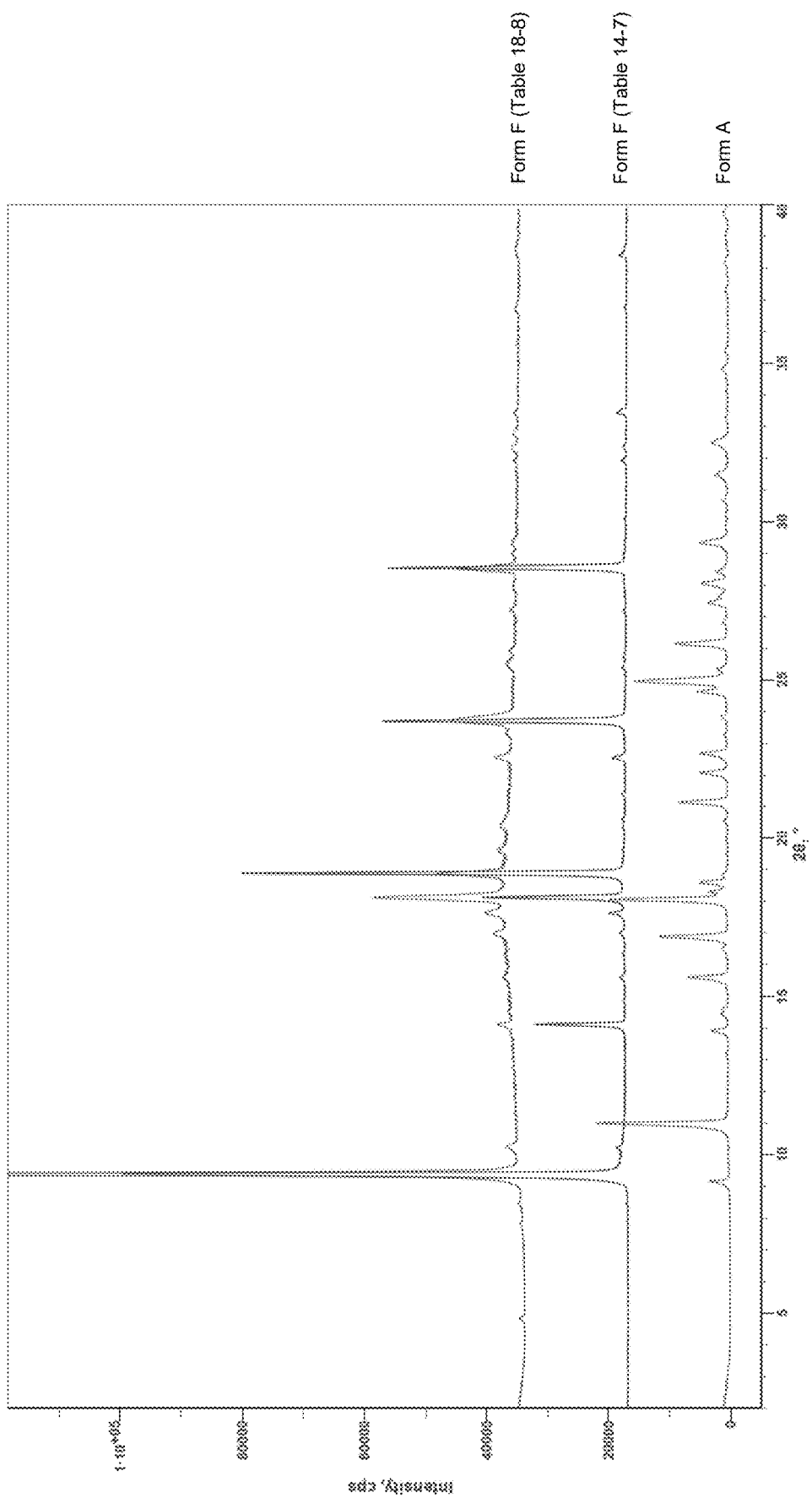
FIG. 44 is an X-ray powder diffractogram overlay of crystalline Form A of leflutrozole with crystalline Form F of leflutrozole.
Figure 45:
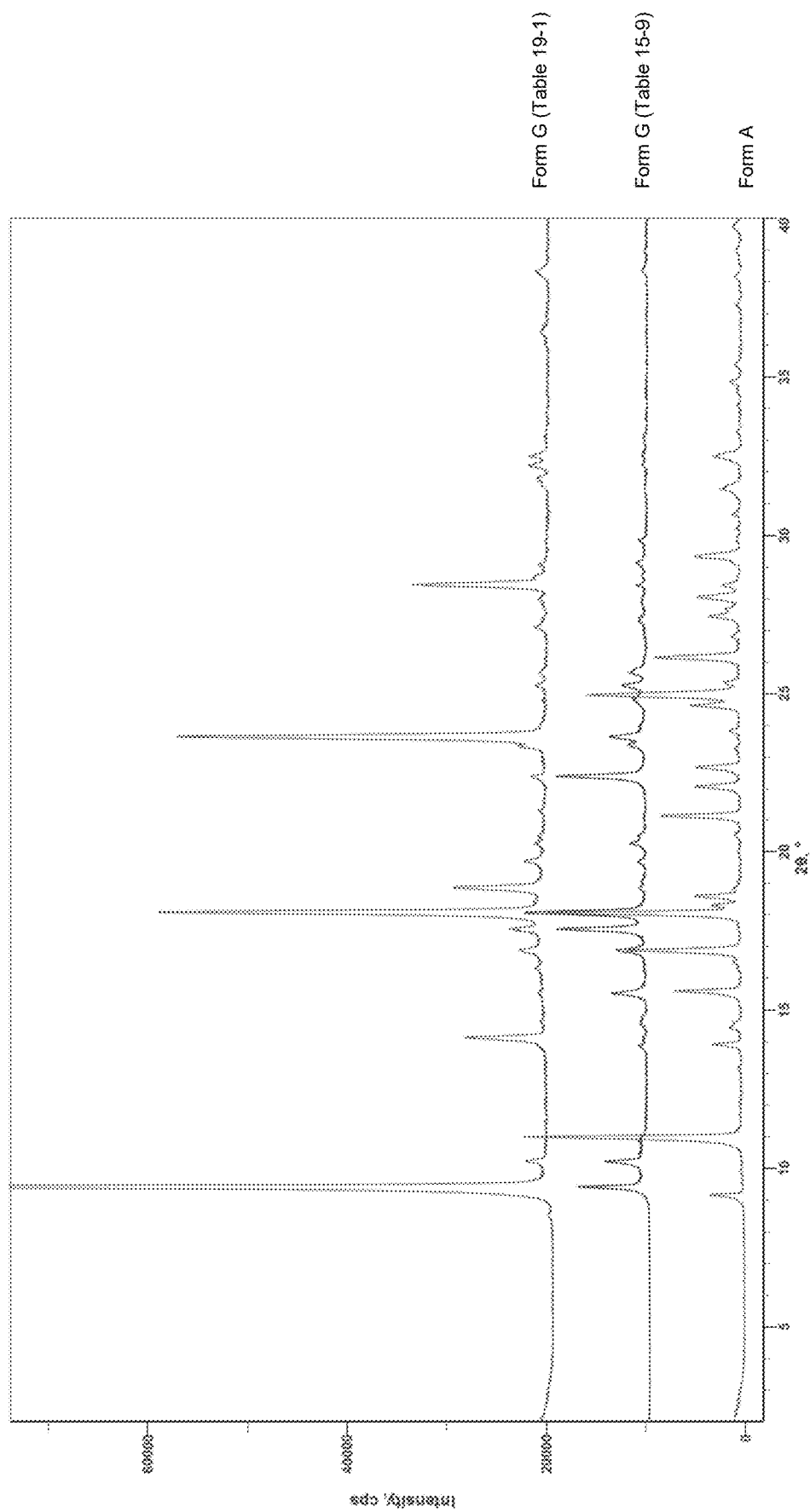
FIG. 45 is an X-ray powder diffractogram overlay of crystalline Form A of leflutrozole with crystalline Form G of leflutrozole.
Figure 46:
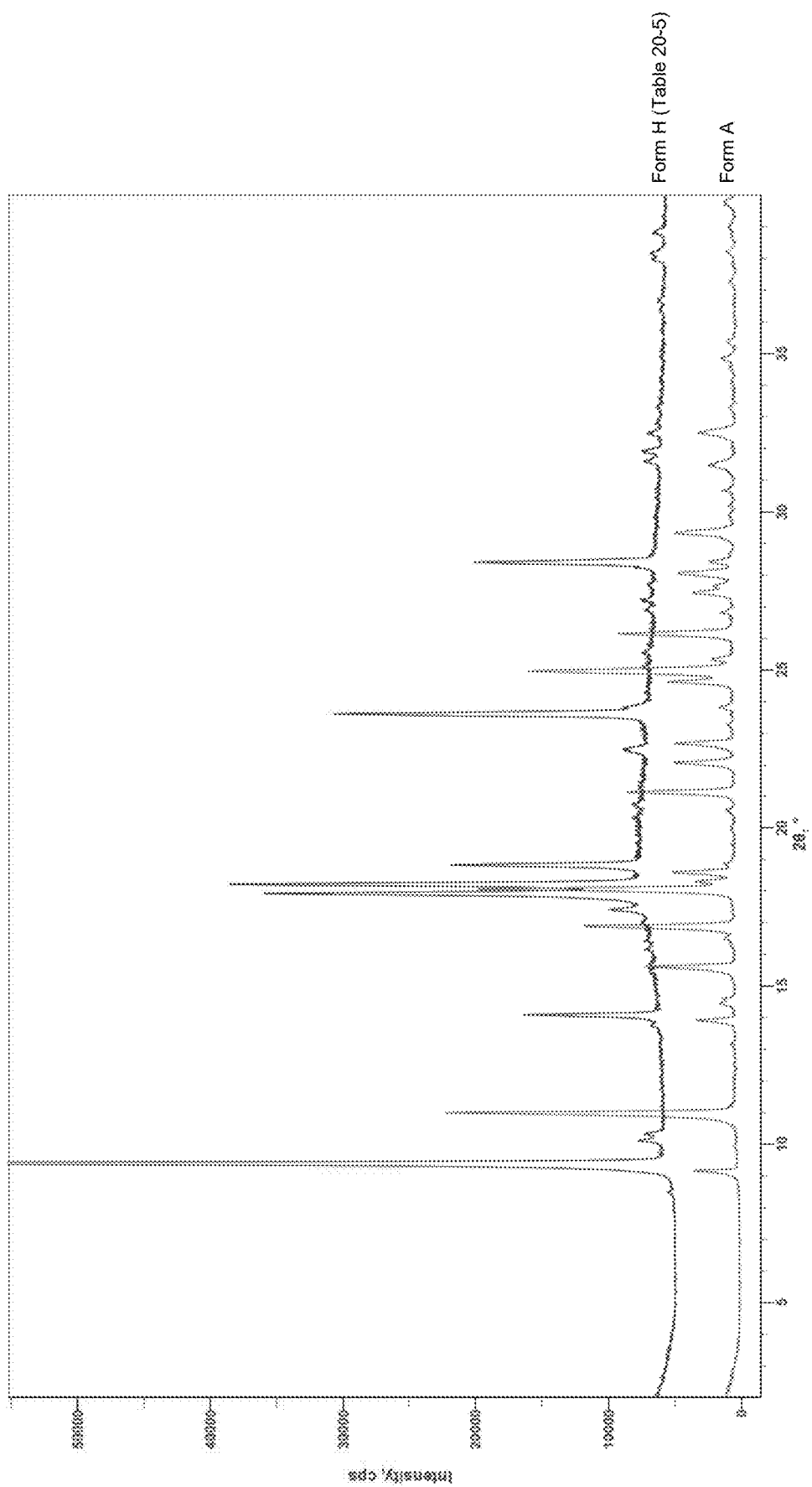
FIG. 46 is an X-ray powder diffractogram overlay of crystalline Form A of leflutrozole with crystalline Form H of leflutrozole.
Figure 47:
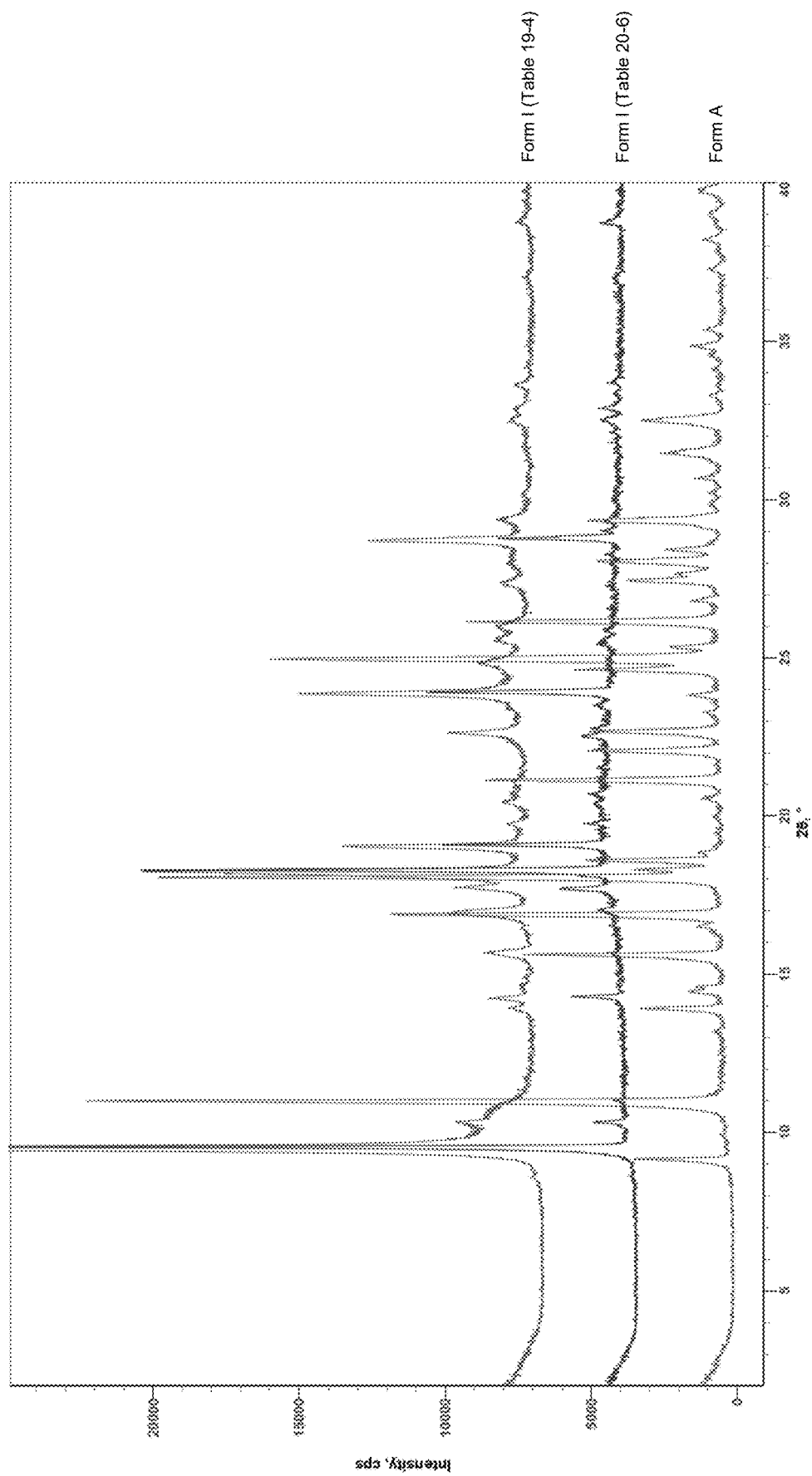
FIG. 47 is an X-ray powder diffractogram overlay of crystalline Form A of leflutrozole with crystalline Form I of leflutrozole.
Figure 48:
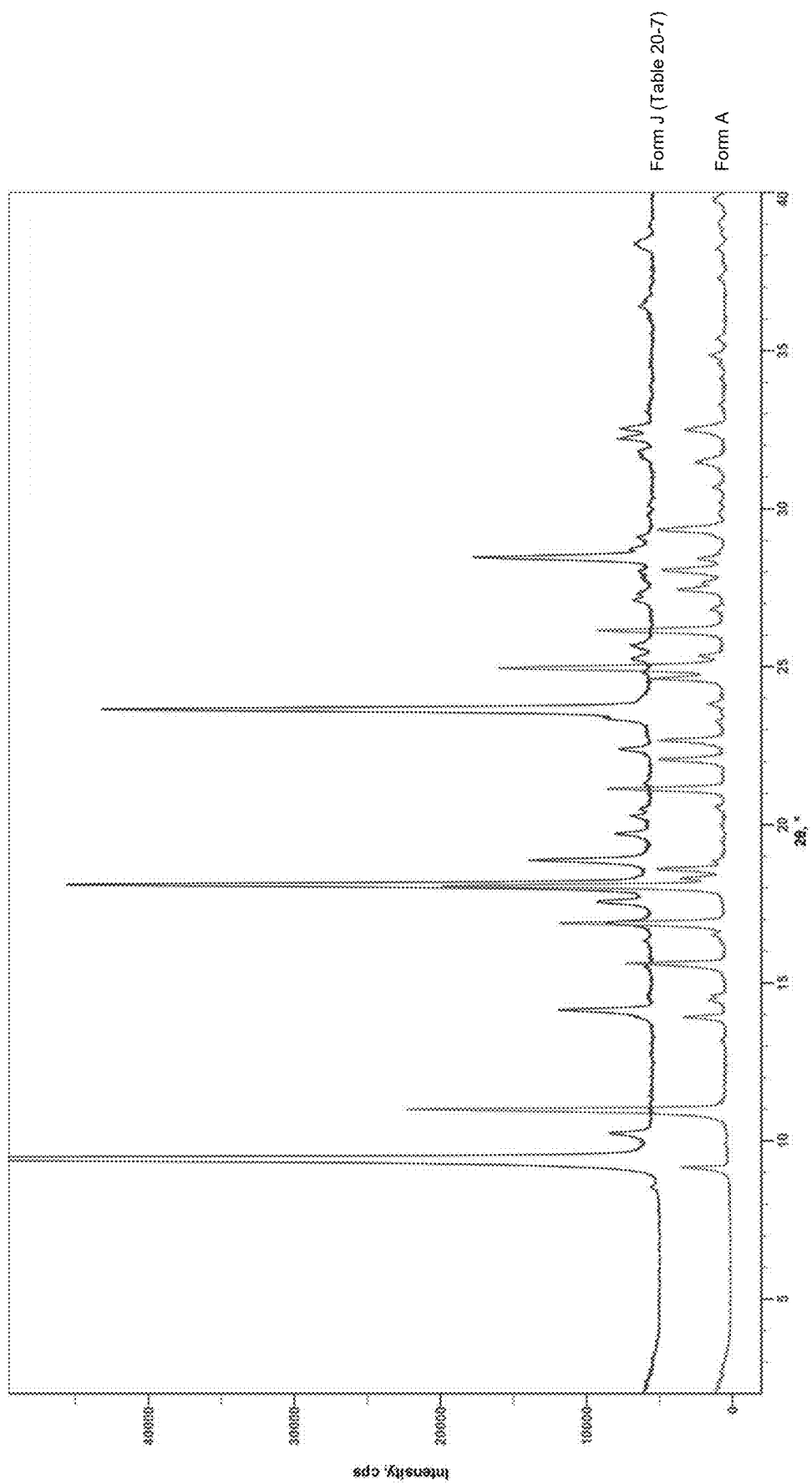
FIG. 48 is an X-ray powder diffractogram overlay of crystalline Form A of leflutrozole with crystalline Form J of leflutrozole.
Figure 51:
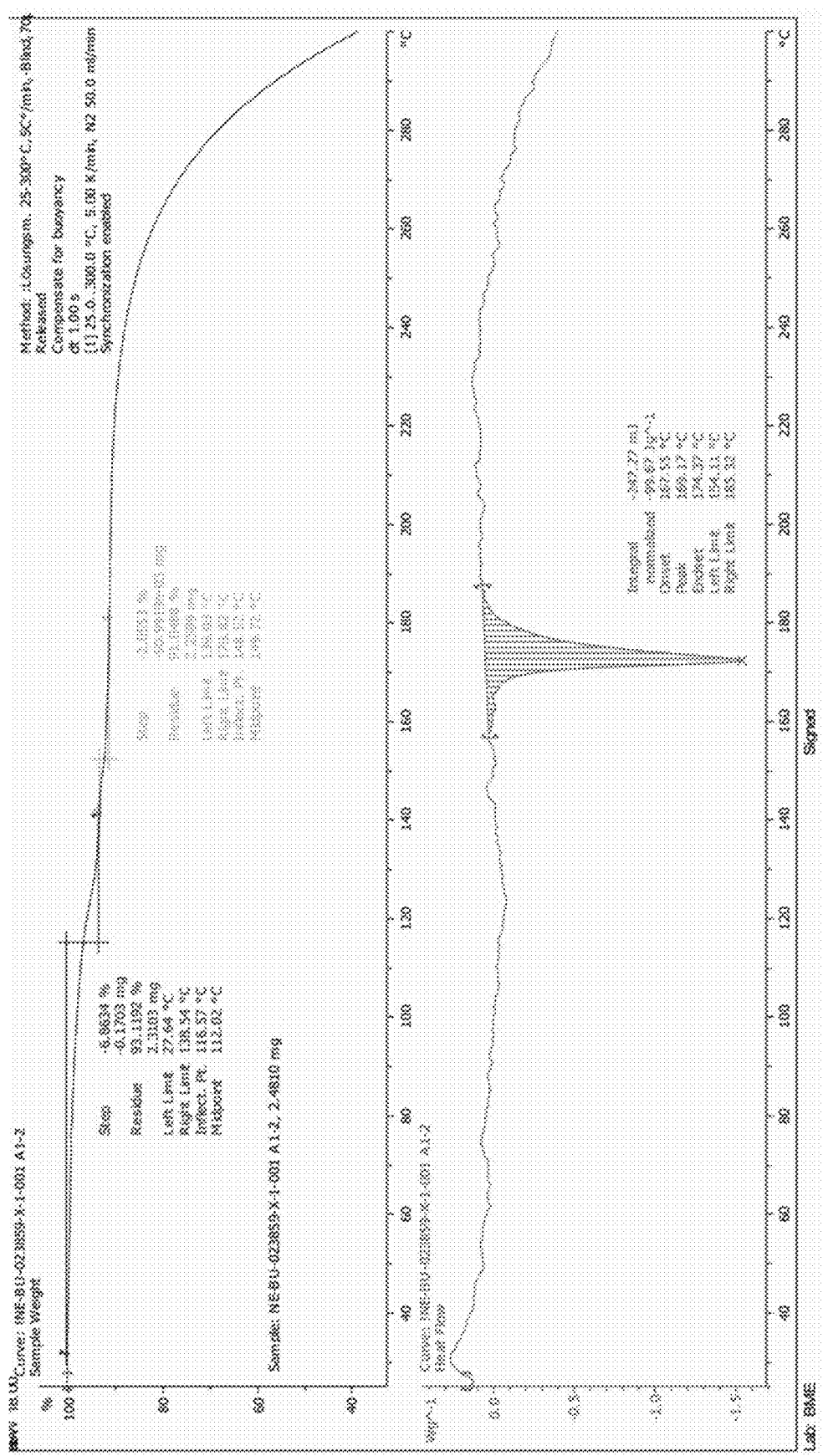
FIG. 51 is an exemplary thermogravimetric analysis curve for crystalline Form D of leflutrozole.
Figure 52:
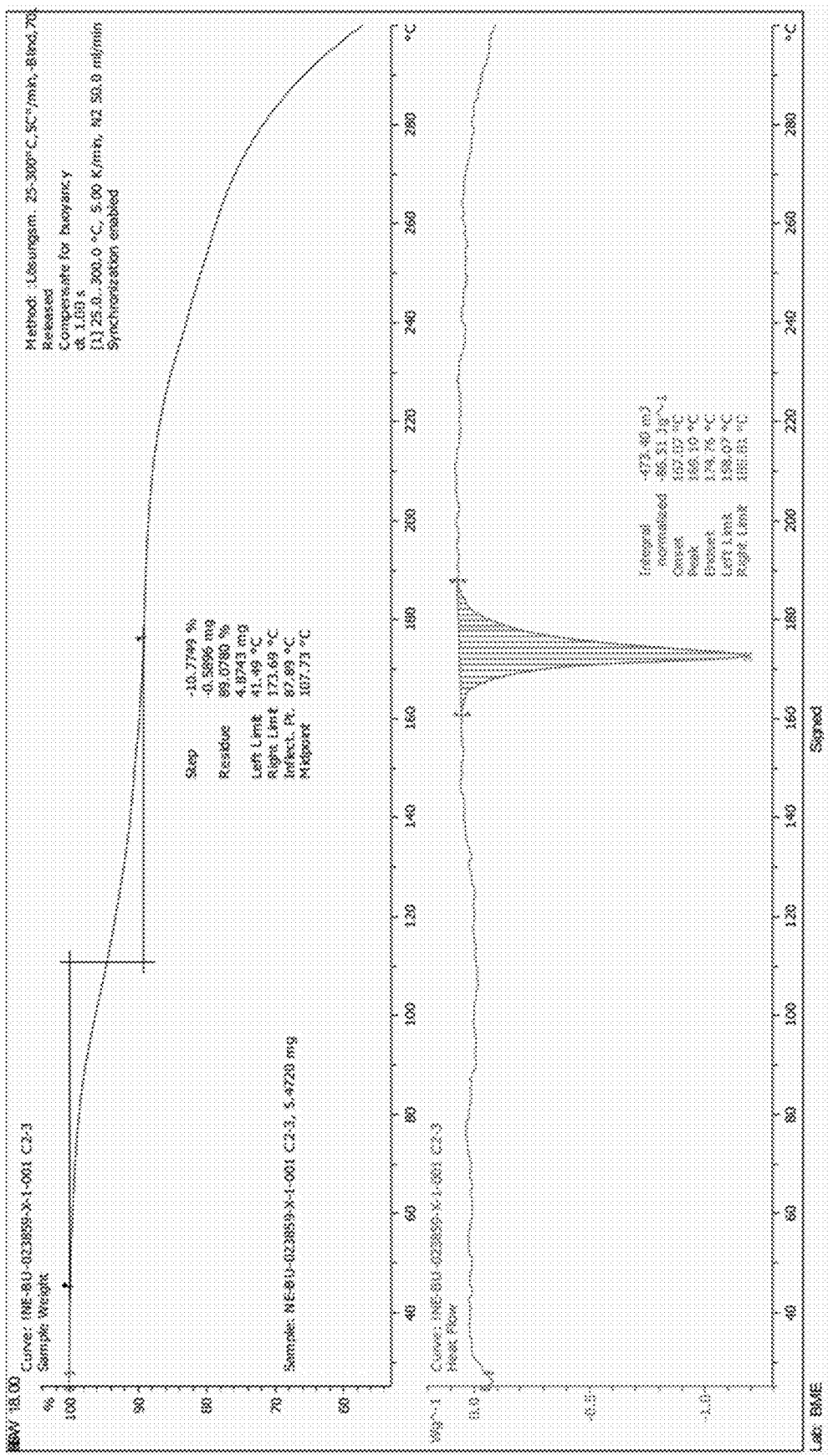
FIG. 52 is an exemplary thermogravimetric analysis curve for crystalline Form E of leflutrozole.
Figure 53:
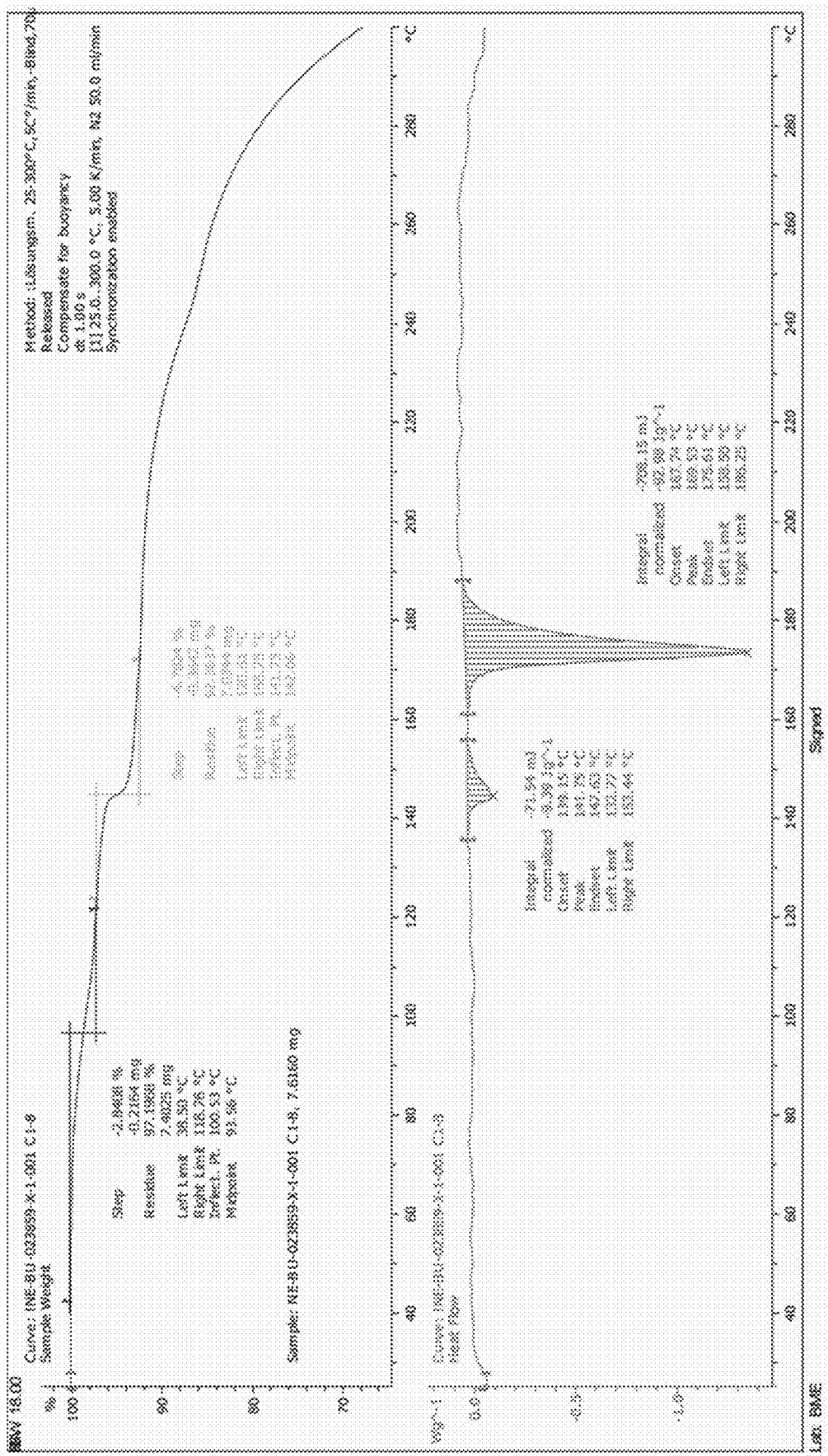
FIG. 53 is an exemplary thermogravimetric analysis curve for crystalline Form F of leflutrozole.
Figure 54:
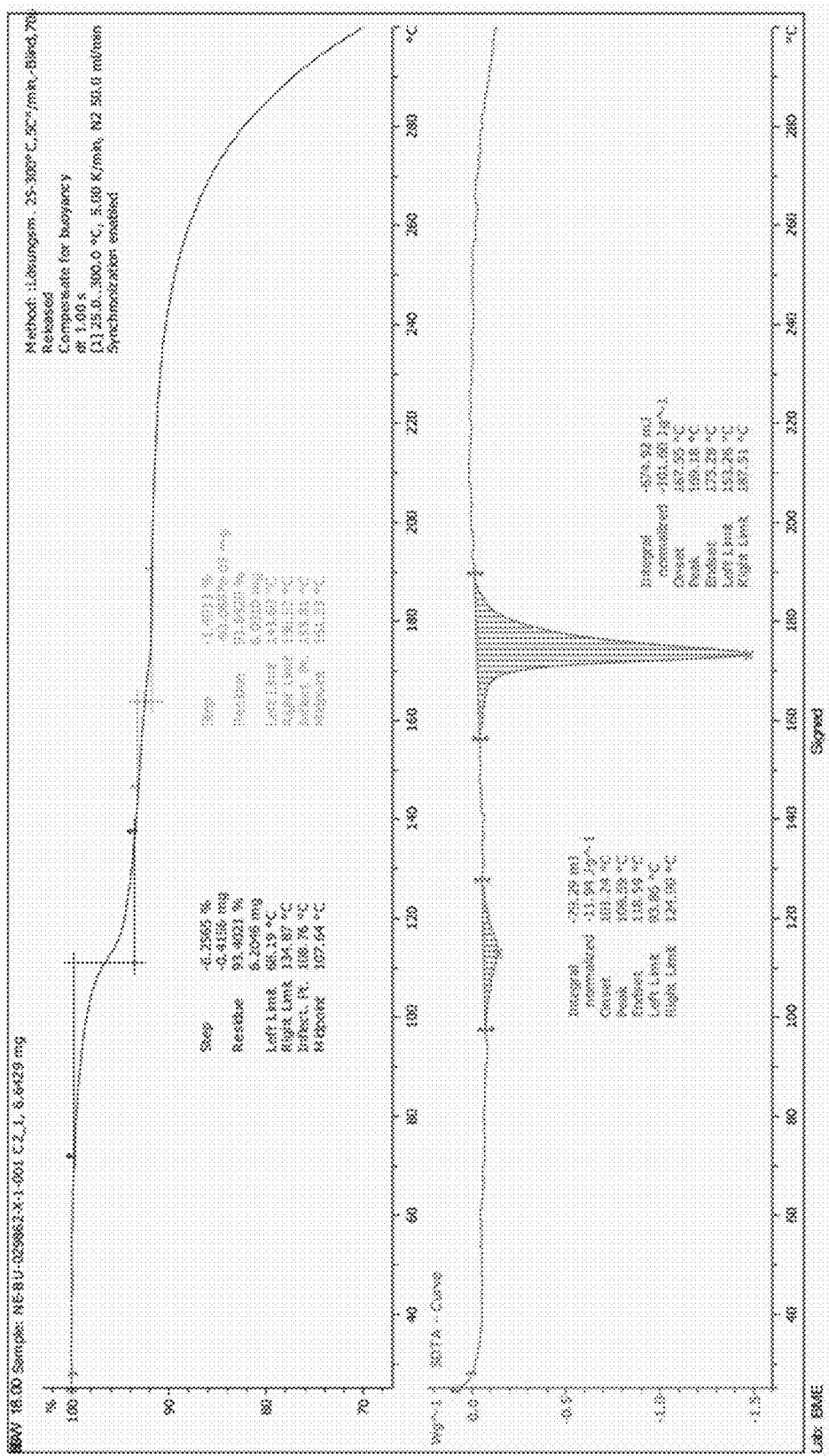
FIG. 54 is an exemplary thermogravimetric analysis curve for crystalline Form G of leflutrozole.
Figure 55:
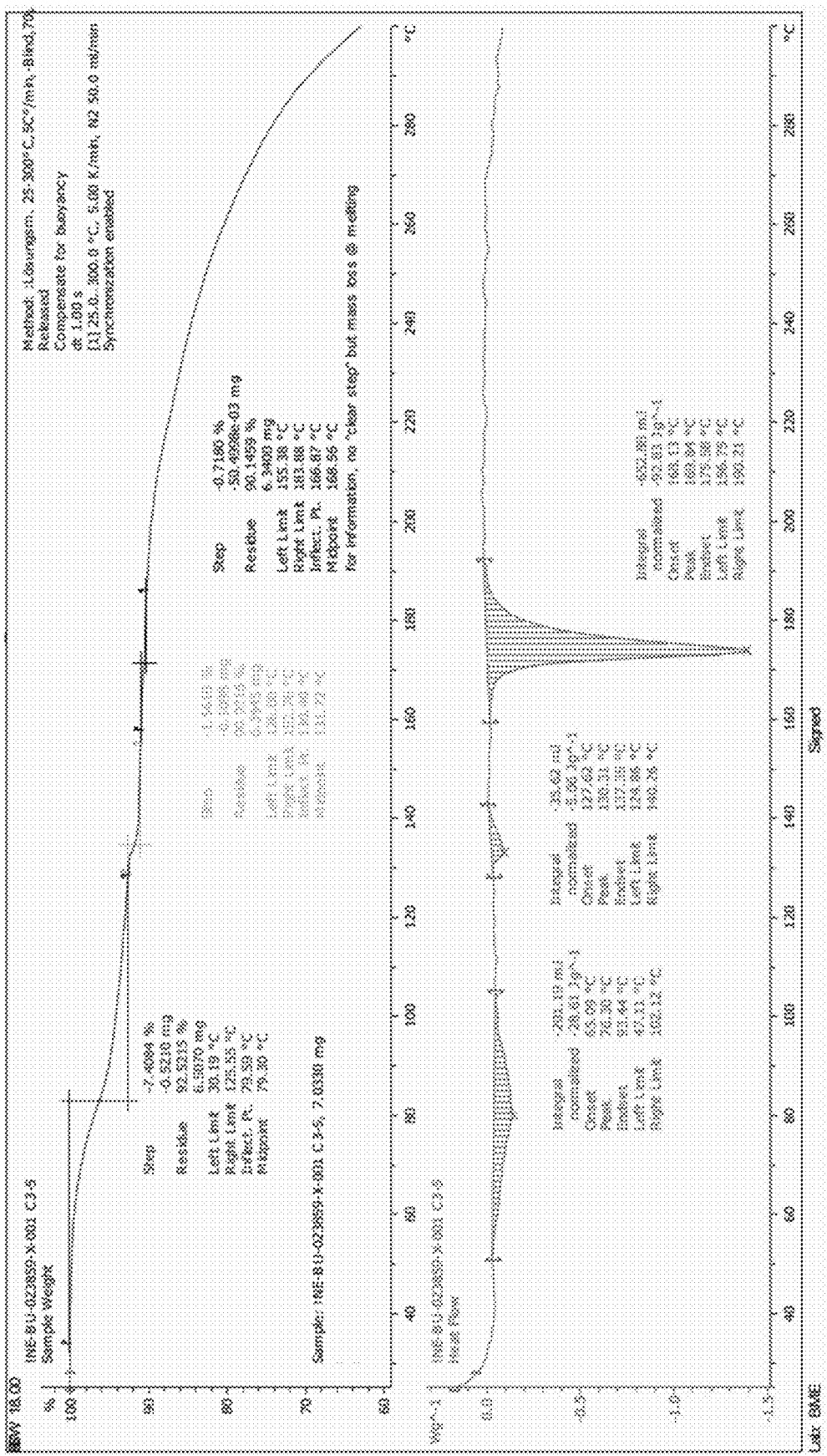
FIG. 55 is an exemplary thermogravimetric analysis curve for crystalline Form H of leflutrozole.

| Form | Experiments (Table-Entry No.) | Solvent | TGA data | Remarks |
|---|---|---|---|---|
| Form D | 14-2 | THF | Sample: 14-2<br>THF: 6.9%<br>MP: 169.2° C. | XRPD: FIG. 42<br>TGA: FIG. 51 |
| Form E | 14-4<br>19-3 | Dioxane | Sample: 19-3<br>Dioxane: 10.8%<br>MP: 169.1° C. | XRPD: FIG. 43<br>TGA: FIG. 52 |
| Form F | 14-7<br>18-8 | MIBK | Sample: 18-8<br>MIBK: 2.8%<br>MP: 169.5° C. | XRPD: FIG. 44<br>TGA: FIG. 53 |
| Form G | 15-9<br>19-1 | MTHP | Sample: 19-1<br>MTHP: 109.6° C./ 6.3%<br>MP: 169.2° C. | XRPD: FIG. 45<br>TGA: FIG. 54 |
| Form H | 20-5 | DMF/<br>TBME<br>5/5 | Sample: 20-5<br>TBME: 76.3° C./ 7.4%<br>DMF: 130.3° C./ 1.6%<br>MP: 169.8° C. | XRPD: FIG. 46<br>TGA: FIG. 55 |
| Form I | 20-6 | DMSO/<br>TBME<br>1/9 | No TGA* | XRPD: FIG. 47 |
|  | 19-4 | 2-Me-THF |  |  |
| Form J | 20-7 | NMP/<br>Heptane<br>1/9 | No TGA* | XRPD: FIG. 48 |

DMF = dimethylformamide;
DMSO = dimethyl sulfoxide;
THF = tetrahydrofuran;
2-Me-THF = 2-methyltetrahydrofuran;
MIBK = methyl isobutyl ketone;
MTHP = 4-methyltetrahydropyran;
NMP = N-methyl-2-pyrrolidone;
TBME = tert-butyl methyl ether;
MP = melting point;
* = not determined, basedon the recorded MP of Form D to H, no MP measurements for Form I and J were conducted-in view of these data it is expected that the leflutrozole crystalline Forms have indistinguishable MP.

Figure 49:
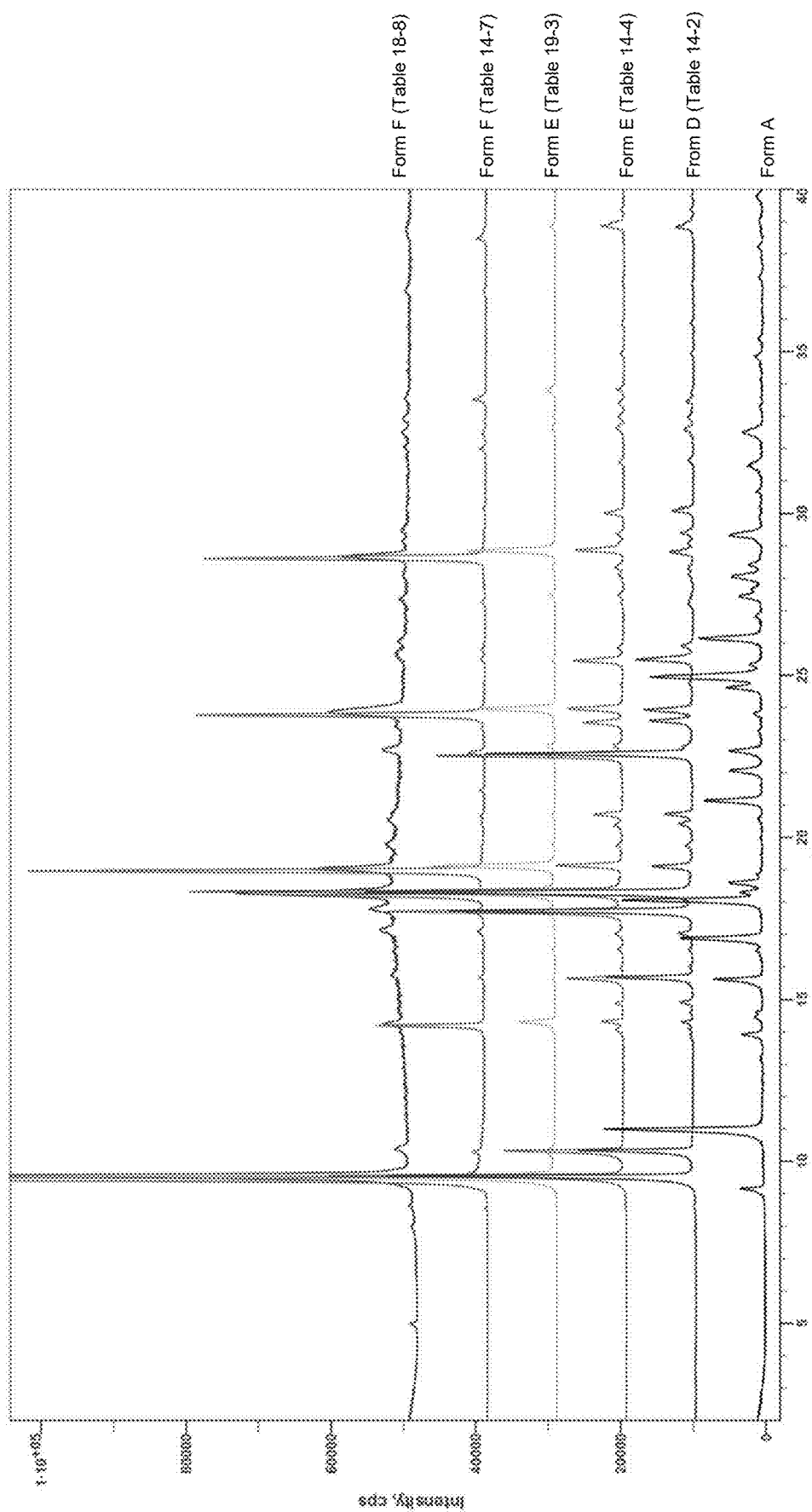
FIG. 49 is an X-ray powder diffractogram overlay of crystalline Form A of leflutrozole with crystalline Forms D, E, and F of leflutrozole.
Figure 50:
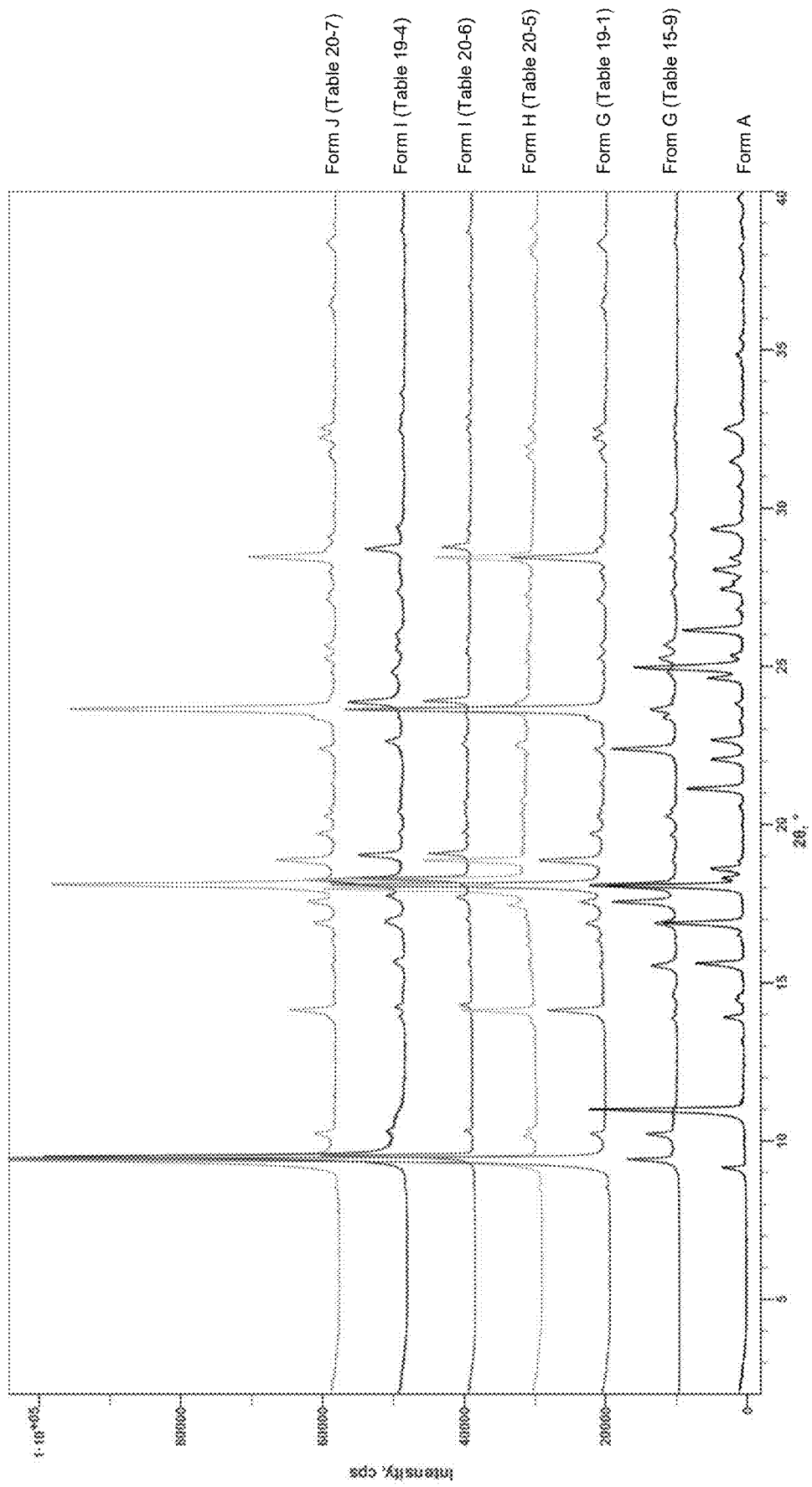
FIG. 50 is an X-ray powder diffractogram overlay of crystalline Form A of leflutrozole with crystalline Forms G, H, I, and J of leflutrozole.

The crystalline forms identified in Table 21 are distinct from Form A. To highlight these differences in diffraction pattern, overlays of the crystalline Form A with each of Form D-Form J are shown in FIG. 42-FIG. 48. Additional overlays highlighting the subtle differences in observed peaks for each of Form D-J are shown in FIG. 49-FIG. 50. Thermogravimetric analysis (TGA) data for crystalline Form D-Form H are provided in FIG. 51-FIG. 55.

Scale-Up and Stability Studies by Competitive Slurry and Drying

Scaled-up experiments were performed once various crystalline forms of leflutrozole had been characterized. About 500 mg of leflutrozole was suspended in the indicated solvent (at least 3 mL) to obtain a stirrable suspension, followed by heating to 40° C. for 1 hour. The samples were stirred at room temperature overnight, filtered, and dried without washing. The solids were then characterized by XRPD analysis, the results of which are described in Table 22.

TABLE 22

Scale-up experiments for crystallization of leflutrozole.

Figure 56:
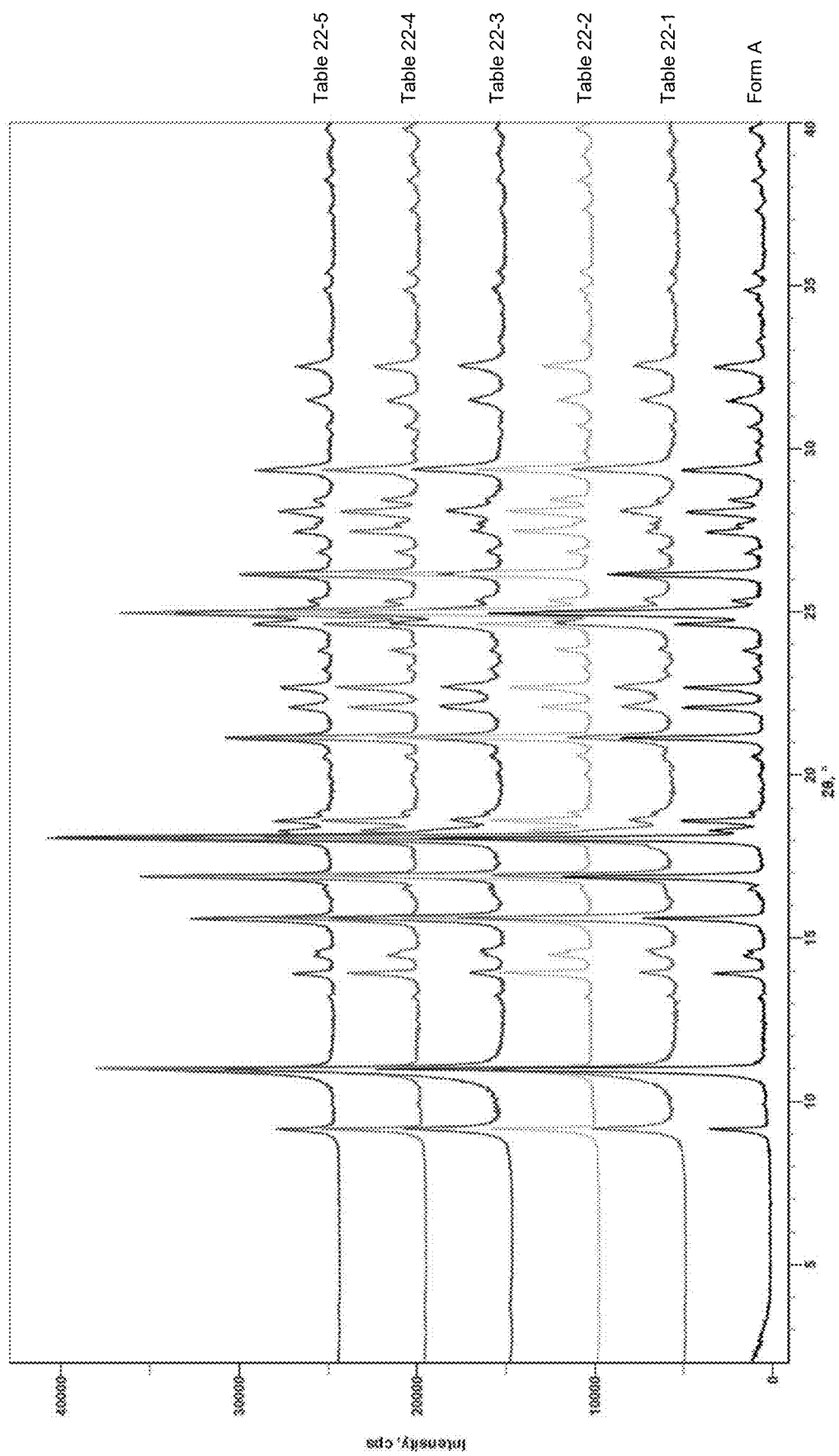
FIG. 56 is an X-ray powder diffractogram overlay of crystalline Form A of leflutrozole with isolated material from scale-up experiments.
Figure 57:
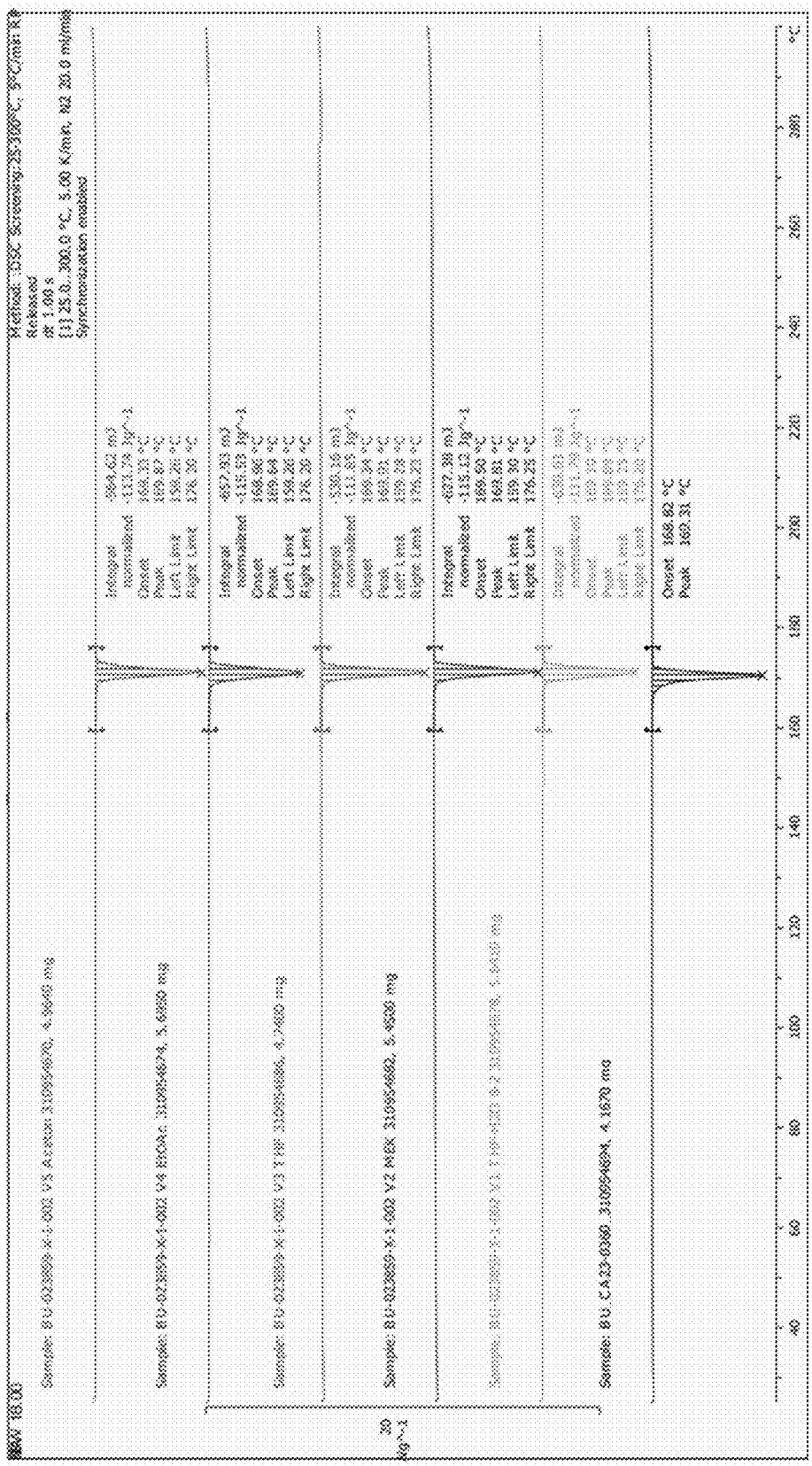
FIG. 57 is an overlay of differential scanning calorimetry data collected from the leflutrozole recrystallization scale-up experiments.

| Entry No. | Solvent | XRPD | Form | Remarks |
|---|---|---|---|---|
| 1 | THF/H$_2$O (8/2) | √ | Form A | XRPD: FIG. 56<br>DSC: FIG. 57 |
| 2 | MEK | √ | Form A | XRPD: FIG. 56<br>DSC: FIG. 57 |
| 3 | THF | √ | Form A | XRPD: FIG. 56<br>DSC: FIG. 57 |
| 4 | EtOAc | √ | Form A | XRPD: FIG. 56<br>DSC: FIG. 57 |
| 5 | Acetone | √ | Form A | XRPD: FIG. 56<br>DSC: FIG. 57 |

EtOAc = ethyl acetate;
MEK = methyl ethyl ketone;
THF = tetrahydrofuran.

With a view towards characterizing the stability of these forms, a set of drying experiments using scaled-up samples of various forms was performed. As shown by these results, Form A of leflutrozole demonstrates elevated thermodynamic stability in the dry state relative to each of the remaining crystal polymorphs identified in this Example. An overlay of the XRPD diffractograms comparing these samples to crystalline Form A is shown in FIG. 56. An overlay of DSC data collected for these samples is shown in FIG. 57. Given that multiple crystalline forms of leflutrozole are isolable from the indicated solvents at comparable scale, the isolation of leflutrozole Form A from each of these experiments is attributable to its greater stability relative to leflutrozole's other crystalline Forms.

Figure 58:
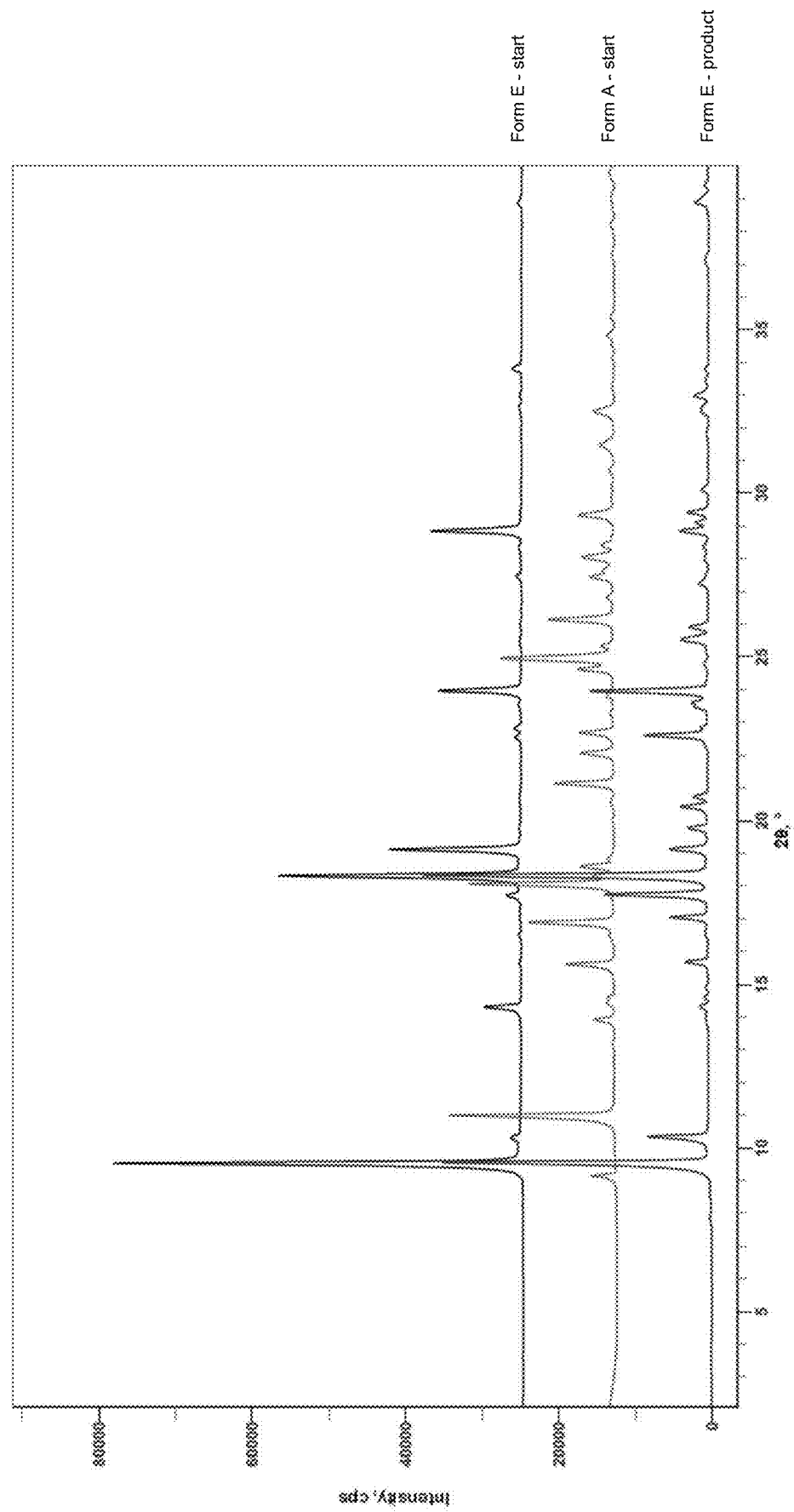
FIG. 58 is an X-ray powder diffractogram overlay of crystalline Forms A and E of leflutrozole and material isolated from a competitive slurry experiment.

To empirically compare the relative stability of Form A and leflutrozole's solvated polymorphs, a competitive slurry experiment was performed. A highly crystalline sample of leflutrozole Form E was mixed in a 1:1 ratio with isolated Form A in ethanol, stirred for 3 days at room temperature, and the resulting solids characterized by XRPD analysis without further drying. The results of these experiments (FIG. 58) demonstrate that the slurry experiment favors the formation of crystalline Form E in the wet state. Surprisingly, however, Form A is thermodynamically more stable than leflutrozole's solvated polymorphs in the dry state, as the experiment below demonstrates.

Figure 59:
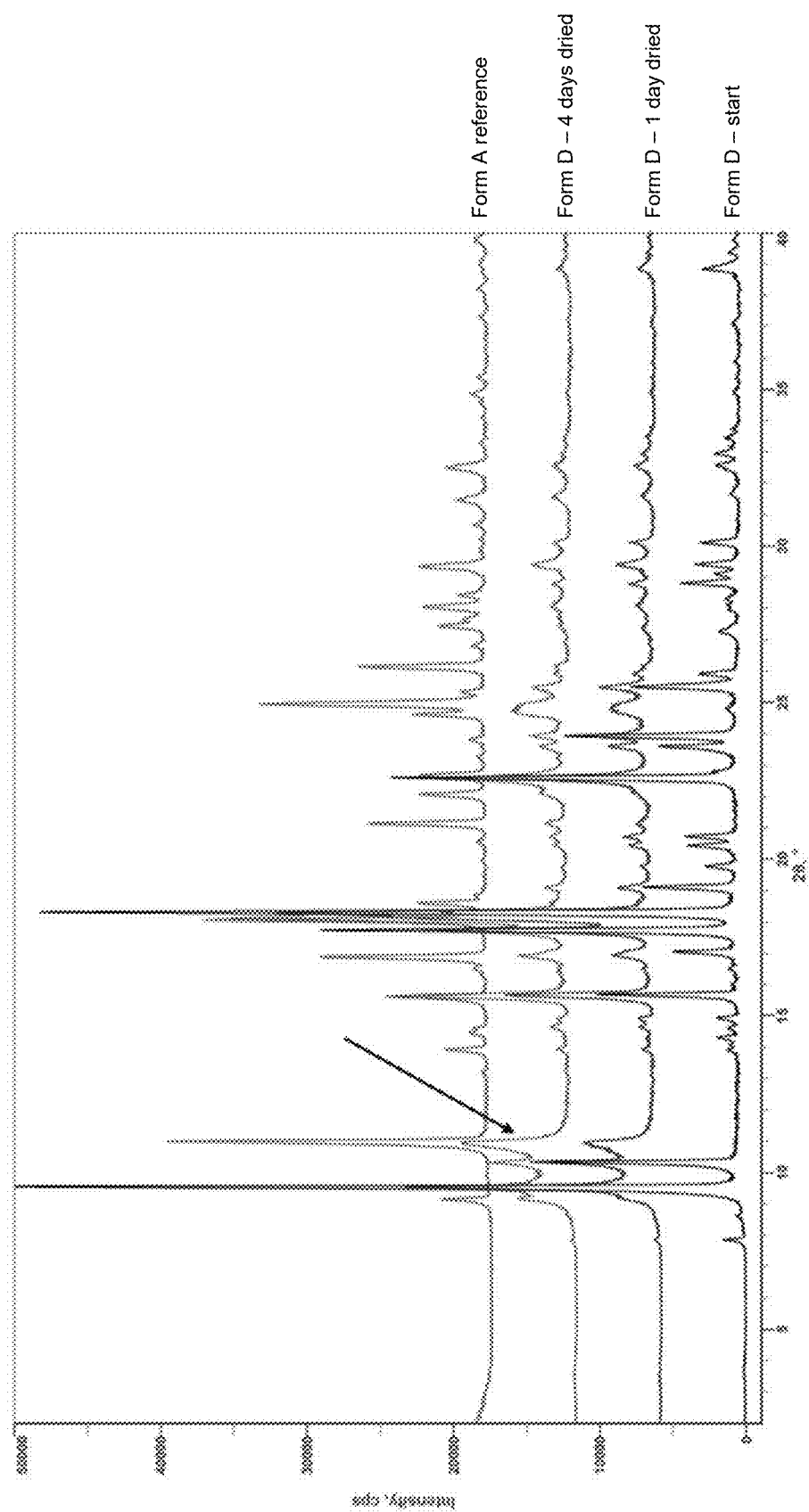
FIG. 59 is an X-ray powder diffractogram overlay of crystalline Forms A and D showing the higher thermodynamic stability of Form A versus Form D.
Figure 60:
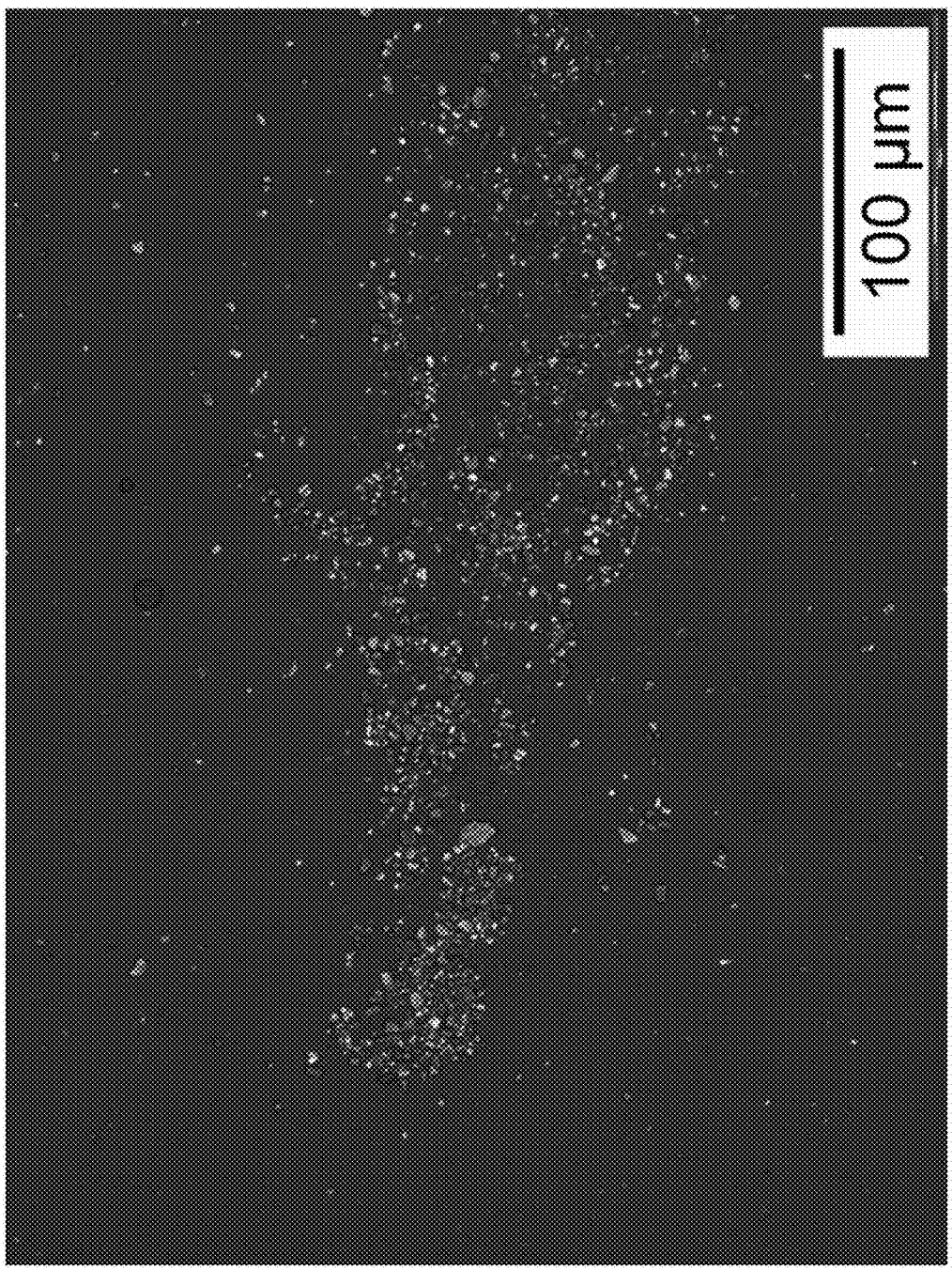
FIG. 60 is a photomicrograph of micronized Form A of leflutrozole.
Figure 61:
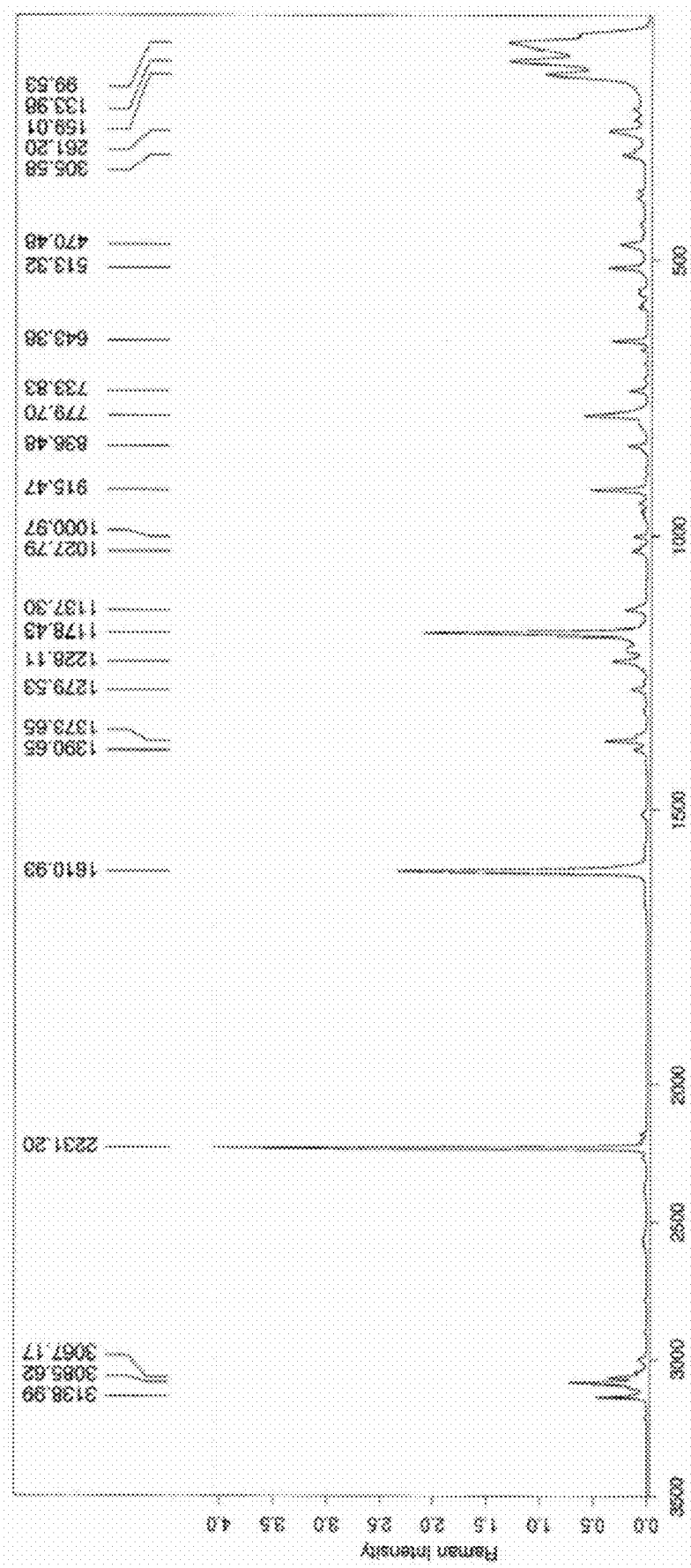
FIG. 61 is an exemplary Raman spectrum for crystalline Form A of leflutrozole.

Specifically, to understand the relative stabilities of Form A as compared to the solvated forms of leflutrozole in the dry state, a sustained drying process was applied to a crystalline leflutrozole Form D sample. A pure sample of crystalline Form D as reported in Table 19-2 was stored for 1 month at room temperature, followed by multiple days storage under high vacuum. XRPD analysis was performed on the sample after storage under vacuum for 1 day and after 4 days, and compared to crystalline Form A. The result of this experiment is presented in FIG. 59, which shows that Form D slowly converts to the more stable Form A under these conditions. Taken together, these experiments demonstrate the heightened stability of Form A relative to the solvated polymorphic forms of leflutrozole in the dry state.

Notably, from the above studies, Form B and C were not isolated by slow evaporation from acetone and ethyl acetate, as they were from the Example 1 study. Samples from Table-Entry Nos. 14-5, 15-6, 17-3, and 17-10 in Example 2 did not afford identical crystalline forms compared to those from Example 1. The experimental protocols differ in that those from the Example 1 study were subject to evaporation for <24 hours total, whereas the Example 2 samples were allowed to evaporate for up to 1 week. Thus, it is understood that the methods used to isolate crystalline forms of leflutrozole require precision for obtaining a particular form, and it is not a guarantee that leflutrozole Forms A-J are isolated unless specific crystallization conditions are employed.

Example 3: Optimization of Leflutrozole Synthesis

A variety of alternative conditions for the preparation of crystalline leflutrozole is presented in the table below.

was stable at −5° C. Formation of the impurity corresponding to Formula (II) occurred during the reagent addition because of local overheating when the portion size was too big and not due to instability of the reaction mixture; since the unquenched reaction mixture is relatively stable, this impurity mainly forms during deprotonation. A summary of impurities resulting from the reaction are summarized in the Table below. The major impurities are solvent addition adducts. The total amount of impurities is shown including other trace impurities that originate from starting materials and are not all products of the reaction conditions.

TABLE 24

Impurities detected by HPLC (% of total peak area) for synthesis batches. RRT = relative retention time.

| Run | (II, RRT 0.73, %) | (III, RRT 1.63, %) | Total Impurities (%) |
|---|---|---|---|
| 1 | 0.65 | 0.14 | 1.08 |
| 2 | 0.45 | 0.06 | 0.80 |
| 3 | 0.40 | 0.10 | 1.02 |
| 4 | 0.45 | 0.08 | 1.21 |

TABLE 23

Stoichiometry changes and its effect on leflutrozole purity and yield.

| Run | SelectFluor™ (eq.) | NaOEt (eq.) | DMF | Leflutrozole Purity (a/a%) | Leflutrozole Yield (%) |
|---|---|---|---|---|---|
| 1 | 1.25 | 1.15 | 0.01% water w/w | 98.92 | 97.41 |
| 2 | 1.25 | 1.15 | Spike water | 99.20 | 97.08 |
| 3 | 1.45 | 1.35 | Spike water | 98.98 | 97.64 |
| 4 | 1.45 | 1.35 | Spike water | 98.79 | 97.18 | a/a = area to area.

w/w = weight to weight

In run 1, the sodium ethoxide was added in 5 portions over 20 minutes and the Selectfluor™ was added in 5 portions over 30 minutes. In run 2, it was found that trace water (≤0.1%) water was tolerated. The sodium ethoxide was added in 5 portions over 27 minutes and the Selectfluor™ was added in 5 portions over 27 minutes. In run 3, the equivalents were corrected for water. Higher equivalents of sodium ethoxide and Selectfluor™ resulted in lower conversion. Selectfluor™ was added in 5 portions over 25 minutes, which resulted in a strong exotherm. In run 4, sodium ethoxide was added in 5 portions over 75 minutes and Selectfluor™ was added in 7 portions over 45 minutes. Reaction mixture after complete addition of Selectfluor™

It was also determined that impurity II was not always sufficiently purged to consistently remain beneath a limit of ≤0.20% after one recrystallization. Accordingly, additional recrystallizations may be necessary as determined by analysis of the recrystallized leflutrozole product.

The test for determination of the amount of related substance impurities uses reverse phase HPLC analysis with UV detection (230 nm). The solvents are acetonitrile/water/diammonium hydrogen phosphate buffer/O-phosphoric acid 85%. The column is Macherey Nagel, Nucleosil 100 C18HD (length=150 mm, internal diameter 3.0 mm) or equivalent L1 USP HPLC Columns.

Example 4: Long-term Stability of Crystalline Form A of Leflutrozole

Form A

Long term stability data of crystalline Form A leflutrozole was collected for storage of up to 24 months at −15° C. to −25° C., up to 12 months storage at 2 to 8° C. and up to 24 months storage at 25° C./60% RH. Stability data under accelerated conditions are for up to 6 months at 40° C./75% RH and up to 3 months at 50° C.≤30% RH. The drug substance was very stable under all storage conditions. Leflutrozole was stored in various containers according to the following packaging descriptions:

Packaging A: Double low density polyethylene bags in fiber drums; water permeation<14.0 mg/day/L.
Packaging D: Brown glass bottles type C sealed in triple laminated foil bags or quadruple laminated foil bags of type B; water permeation<0.5 mg/day/L.

Packaging H: Double polythene bags, sealed, in 400 mL mini-metallic drugs; water permeation 5 mg/day/L.

Packaging J: HDPE bottles from Nalgene (30 mL) with polypropylene screw caps and sealed in alubags of type B.

Packaging K: Polyethylene bag containing the drug inside quadruple laminated foil bags; water permeation<0.5 mg/day/L.

TABLE 25

Long term storage stability of crystalline Form A leflutrozole.

| Storage Conditions | Combined related substance impurities (%) | | | | |
|---|---|---|---|---|---|
| | Initial | 3 months | 6 months | 12 months | 24 months |
| −20° C. ± 5° C./ ambient RH in packaging D | 0.60 | — | 0.58 | 0.67 | — |
| −20° C. ± 5° C./ ambient RH in packaging K | 0.60 | 0.61 | 0.58 | 0.66 | 0.58 |
| 5° C. ± 3° C. in packaging D | 0.60 | — | 0.58 | 0.67 | — |
| 25° C./60% RH in packaging K | 0.60 | 0.60 | 0.58 | 0.67 | 0.68 |
| 40° C./75% RH in packaging A | 0.60 | 0.60 | — | — | — |
| 40° C./75% RH in packaging D | 0.60 | 0.63 | 0.59 | — | — |
| 40° C./75% RH in packaging K | 0.60 | 0.63 | 0.60 | — | — |
| 50° C./≤30% RH in packaging D | 0.60 | 0.62 | — | — | — |
| 50° C./≤30% RH in packaging K | 0.60 | 0.65 | — | — | — |

Additional stability testing was performed for a total of 36 months at room temperature (25° C.) in double polyethylene liner and a black polyethylene keg. The impurity profile at 25° C. showed 0.28% sum of all impurities when stored in these containers for 36 months. The two highest impurities after 36 months are a substance of unknown structure (Q2, 0.11% w/w) and the compound of formula (III) (0.14% w/w).

Studies were also conducted to evaluate the chemical stability of crystalline Form A of leflutrozole following storage in buffered solutions. The stress test conditions were bulk crystalline solid at room temperature (RT, about 25° C.) and 80° C. for one week or storage in buffer solutions of different pH (1, 4, and 7.4) at RT or at 80° C. for one week. Additional experiments were performed at 50° C. if degradation by more than 5% was observed during the analogous 80° C. experiment. The results of this study are presented in the table below.

TABLE 26

Chemical stability testing of crystalline Form A leflutrozole.

| Test Conditions | Leflutrozole Peak Area (% peak area; duplicate runs, ±0.2%) Before 99.7% After |
|---|---|
| Bulk Solid, RT, 1 week | 99.6% |
| Bulk solid, 80° C., 1 week | 99.7% |
| Suspension in buffer, pH 1, 50° C., 1 week | 79.8% |

TABLE 26-continued

Chemical stability testing of crystalline Form A leflutrozole.

| Test Conditions | Leflutrozole Peak Area (% peak area; duplicate runs, ±0.2%) Before 99.7% After |
|---|---|
| Suspension in buffer, pH 1, 80° C., 1 week | 18.5% |
| Suspension in buffer, pH 4, 50° C., 1 week | 94.3% |
| Suspension in buffer, pH 4, 80° C., 1 week | 0.6% |
| Suspension in buffer, pH 7.4, 50° C., 1 week | 95.5% |
| Suspension in buffer, pH 7.4, 80° C., 1 week | 1.1% |

This data shows that the bulk solid of Form A of leflutrozole is stable even at elevated temperatures. However, upon exposure to aqueous solutions and solubilization, all media tested resulted in chemical degradation after one week of storage. At 80° C., the bulk solid retained an HPLC peak area identical to the starting recrystallized sample at 99.7% of total peak area. In contrast, all suspensions tested showed >4% degradation after just 1 week at 50° C. For all suspensions tested, degradation was >80% when stored at 80° C. for 1 week irrespective of the buffer pH. Surprisingly, at 80° C. the less acidic suspensions degraded the crystalline leflutrozole to a greater extent than the most acidic (pH 1) buffer sample. The major decomposition product was determined from the sample stored at pH 7.4 and 80° C., which was identified by LC-MS with a negative mode m/z of 232. The structure is that of the compound of Formula (IV):

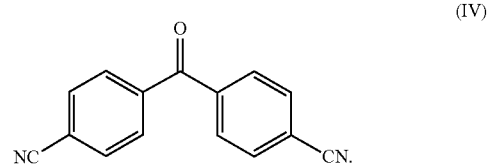 [SMILES: N#Cc1ccc(C(=O)c2ccc(C#N)cc2)cc1]

A stability program was initiated to investigate the degradation of Form A leflutrozole across an array of conditions, including buffered solution and bulk solid conditions as described above. Additional mixtures of Form A leflutrozole with one or more different exemplary excipients were evaluated for the formation of degradation products. The results of the different conditions studied are summarized in the table below. The mixtures of excipients used for this study are as follows: mixture 1 (maltodextrin, microcrystalline cellulose, sodium carboxymethylcellulose, Aerosil 200, Cutina HR; 64:29:5:0.5:1.5 ratio), mixture 2 (microcrystalline cellulose, spray dried lactose, sodium carboxylmethyl starch, Aerosil 200, magnesium stearate; 20:73.5:5:0.5:1 ratio), and mixture 3 (microcrystalline cellulose, mannitol, crospovidone, magnesium stearate; 15:79.5:4:1.5 ratio). The buffered solutions are aqueous.

TABLE 27

Degradation Product (DP) formation and Appearance (Color, CL) for Form A leflutrozole exposed to various conditions.

| Test Conditions | DP (%) | CL |
|---|---|---|
| 0.1% solutions or suspensions, 1 week, 80° C. | | |
| pH 1 | 96.1 | No change, suspension formed |
| pH 3 | 79.2 | No change, suspension formed |
| pH 5 | — | — |
| pH 7 | — | — |
| Water | 59.7 | No change, suspension formed |
| Ethanol | 1.0 | No change |
| Methanol | 3.5 | No change |
| 2% (or 5%) solutions or suspensions, 1 day, room temperature | | |
| 0.5% CMC | 0.0 | suspension formed |
| HPMC Cellulose 4000 0.5% | 0.0 | suspension formed |
| Solid-state, 1 week, 80° C., tight container | | |
| Bulk (HPLC) | 0.0 | No change |
| Bulk (DSC) | 168° C. onset; ΔH = 114 J/g | — |
| Solid-state, 1 week, 50° C., tight container | | |
| 1% in mixture 1 | 0.0 | No change |
| 1% in mixture 2 | 0.0 | No change |
| 1% in mixture 3 | 0.1 | No change |
| Solid-state, 1 week, 80° C., 75% RH | | |
| Bulk (HPLC) | 0.0 | No change |
| Bulk (DSC) | 168° C. onset; ΔH = 110.3 J/g | — |
| Solid-state, 1 week, 50° C., 75% RH | | |
| 1% in mixture 1 | 0.5 | No change |
| 1% in mixture 2 | 0.1 | No change |
| 1% in mixture 3 | 0.4 | No change |
| Xenon light (approx. 1200 kLuxh) | | |
| Bulk (HPLC) | 0.0 | No change |
| Bulk (DSC) | 168° C. onset; ΔH = 112.6 J/g | — |

This data demonstrates that across a range of conditions, crystalline Form A leflutrozole displays remarkable stability. However, aqueous solutions provided high amounts of degradation, possibly due to a breakdown of the stable solid-state structure followed by chemical degradation at elevated temperature. Forms of leflutrozole which were not Form A may be more susceptible to degradation. In contrast to other conditions studied for stressful solubilization, Form A leflutrozole retained stability in high temperature ethanol, having only 1.0% total degradation products form over the duration of the study.

Leflutrozole is clearly sensitive to the choice of conditions to which it is exposed. Form A of leflutrozole is expected to be sufficiently non-hygroscopic in comparison to alternative crystalline forms and absorbs minimal water by DVS experiments. Form A of leflutrozole absorbed <0.2% at 25° C., at up to 95% relative humidity (RH), whereas the Form B or Form C solvates may undergo a form change under high humidity conditions.

Oxidative degradation of leflutrozole is the primary pathway by which leflutrozole degrades outside of the synthesis process. Defluorination and oxidation that coincides with removal of the triazene moiety yields the compound of Formula IV. The effect of oxygen was determined by exposing the crystalline forms of leflutrozole to high oxygen content air or completely inert atmosphere ($N_2$) for a given period of time. The results suggest that Form A leflutrozole does not degrade readily when exposed to air.

The intrinsic dissolution rate is very low for Form A of leflutrozole, even in the presence of sodium dodecyl sulfate (SDS). The rate was determined in 0.1 N hydrochloric acid (HCl) and 0.001 N HCl. The measurements were performed on a VanKel instrument using a Cary 100 photometer and are summarized in the table below.

TABLE 28

Intrinsic dissolution rate data for Form A leflutrozole.

| Parameter | |
|---|---|
| Sample | Leflutrozole E16352RS023/1 |
| Sample mass | About 100 mg |
| Wavelength for detection | 230 nm |
| Rotation of disc | 50 rpm |
| Temperature | 37° C. |
| Measurement time | 720 min |
| Dissolution Medium | Intrinsic DR value mg/min/cm$^2$ |
| HCl 0.1 N + 1% SDS | 0.0162 |
| HCl 0.001N + 1% SDS | 0.0167 |

Dissolution experiments with capsules prepared with leflutrozole having particle sizes up to $D_{90} \leq 35$ μm have shown no relevant influence on dissolution.

Example 5. Comparative Stability of Leflutrozole Polymorphs

Competitive Slurry

To further characterize the relative stabilities of the various crystal forms that leflutrozole may adopt, one of skill in the art may perform a competitive slurry experiment. In this experiment, two or more polymorphs of leflutrozole are selected for suspension in a chosen solvent at a specific temperature and agitated for an equilibration period. Over the course of the equilibration period, e.g. several days to weeks, aliquots of the slurry mixture are taken for analysis, and over time the more stable of the crystalline forms increases in proportion relative to the others. The procedure may be repeated to compare multiple crystalline forms simultaneously and may also vary in the temperature and solvent conditions selected.

Form A crystalline leflutrozole may be compared to the Form B or Form C by competitive slurry. Equal amounts (1:1:1) of the three polymorphs may be suspended in an aqueous solution spiked with 5% v/v acetone and 5% v/v ethyl acetate, agitating the suspension at ambient temperature. Aliquots are withdrawn daily, and after one week the anhydrous form is expected to persist for longer than any solvate. The solid obtained following solvent removal is characterized by X-ray powder diffraction, and a result indicating the retention of only the Form A peaks would indicate that Form A is the most stable form. Such an experiment can be repeated and compare any two or more polymorphs by competition in a slurry, for example, as was conducted in FIGS. 58 and 59. Taken together, the predominance of Form A relative to the remaining crystal forms identified demonstrate the heightened thermodynamic stability of Form A relative to leflutrozole's other crystal polymorphs.

Liquid-Assisted Grinding

Another comparison of the relative stabilities of the various crystal forms that leflutrozole may adopt may be determined by one of skill in the art through a liquid-assisted grinding experiment. In this experiment, two solids are mechanically ground together in the presence of a small amount of solvent, and the resulting solid obtained is analyzed to determine the extent of form equilibration that occurs. For leflutrozole, crystalline Form A and Form B may be combined in a 1:1 ratio in a mortar and pestle, and 50% water/50% acetone can be added in a small amount (e.g. a drop). The solids are then ground together at room temperature and at a desired humidity for various time lengths. Samples ground for different lengths of time are then further characterized by XRPD to determine the dominant crystalline form.

The experiment may be repeated in a glove box under nitrogen ($N_2$) atmosphere and 0% relative humidity. In this scenario, the solvent utilized for comparing the polymorphs may instead comprise solely acetone so as to keep the atmosphere free of water. The more stable crystalline polymorph is expected to persist through the intense mechanical grinding in a mortar and pestle.

A typical result is the persistence of only one crystalline polymorph. A result such as the Form A polymorph persisting when initially combined as a mixture of Form A and one or more of Form B and C would indicate that Form A is a higher stability polymorph. The absent polymorphs have necessarily undergone a form change.

Solubility

When seeking to evaluate the stability of leflutrozole polymorphs, one of skill in the art may also perform comparative solubility studies. In these experiments, a lower solubility in a given media is indicative of higher thermodynamic stability. This coincides with the hypothesis that a lower stability crystalline form, having weaker lattice energy, is more easily solubilized and has a readily disrupted lattice structure.

For polymorphs of leflutrozole, Form A may be measured in its solubility as compared to the various solvates that have been observed, such as Form B. Leflutrozole Form A has a kinetic solubility at room temperature of ~0.0607 μg/mL in aqueous solutions across low and neutral pH ranges (between pH 1.0 and pH 6.8). Thermodynamic solubility information for leflutrozole Form A is presented in the table below.

TABLE 29

Thermodynamic solubility information for leflutrozole Form A.

| pH Solubility Profile: 0.05 M Buffers | Solubility (mg/mL) |
| --- | --- |
| pH 1-Potassium Chloride | <0.03 |
| pH 3-Potassium Biphthalate | <0.03 |
| pH 4.63-Sodium Acetate | <0.03 |
| pH 6.86-Potassium Phosphate | <0.03 |
| pH 7.4-Potassium Phosphate | <0.03 |
| pH 9-Boric Acid | <0.03 |
| pH 12-0.1 N Sodium Hydroxide | <0.03 |
| Simulated Gastrointestinal Fluids | |
| SGF | <0.03 |
| FaSSIF | <0.03 |
| FeSSIF | <0.03 |
| Aqueous/Non-aqueous medium | |
| Water | <0.03 |
| Ethanol | 3.84 |
| Polyethylene Glycol 400 | 6.23 |
| Propylene Glycol | 2.27 |
| 20% Sulfobutyl ether β-cyclodextrin (Captisol) in water | 1.05 |
| 20% Hydroxypropyl β-cyclodextrin in water | 0.87 |
| Surfactant | |
| Cremophor EL | 0.28 |
| 1% Cremophor EL in water | <0.03 |
| 10% Cremophor EL in water | 0.19 |
| 1% Sodium Lauryl Sulfate in water | 0.47 |
| 1% Sodium Dioctyl Sulfosuccinate in water | 0.17 |
| 1% Tween 80 in water | <0.03 |
| Oils | |
| Miglyol | 0.72 |
| Co-solvents (Binary) | |
| 10% Ethanol in water | <0.03 |
| 10% PEG400 in water | <0.03 |
| 10% PG in water | <0.03 |

Comparable measurements may be performed with the Form B or Form C solvates of leflutrozole. A higher solubility displayed by the solvates would be indicative of a lower thermodynamic stability of the more soluble crystalline form.

Chemical Degradation

One of skill in the art may evaluate the stability of leflutrozole polymorphs by subjecting them to stressful solvation and/or storage conditions. One may slurry the compound tested in aqueous hydrogen peroxide ($H_2O_2$), dilute acid, or dilute base, and observe from aliquots of the media over time how chemical degradation of leflutrozole occurs by HPLC. Repetition of the conditions with a leflutrozole solvate may indicate that the solvates more readily degrade under the stress-test conditions.

As above in Table 27, leflutrozole Form A does not degrade when exposed to a xenon lamp at all. A result where the Form B or Form C polymorphs show formation of impurities under identical conditions would indicate a lower stability of the tested polymorph.

Vapor Exposition

To further characterize the relative stabilities of the various crystal forms that leflutrozole may adopt, one of skill in the art may perform a vapor exposition experiment. Here, to determine if degradation of leflutrozole occurs under elevated temperatures and extreme humidities, one may subject leflutrozole crystals to 40° C. and 90% relative humidity, thereafter determining if a form change is triggered. A change in form under the test conditions is indicative that a higher stability and lower energy form is accessed.

For instance, leflutrozole Form A shows impressive stability when exposed to high temperature and humidity and furthermore does not undergo a form change (Table 27). Storage of leflutrozole Form A for 1 week at 80° C. and 75% relative humidity showed no appearance of impurities by HPLC and no detectable form change. Mixtures of 1% leflutrozole in a composition with various excipients furthermore degraded by minimal amounts over a comparable length of time, have only at most 0.5% impurities form over 1 week after storage at 50° C. and 75% relative humidity. A result for Form B or Form C which displays that these solvates undergo a form change under high temperature and humidity would indicate that Form A is the higher stability polymorph.

Example 6: Oral Solid Dosage Form Comprising Crystalline Leflutrozole and Excipients An immediate release solid dosage form suitable for oral administration was developed by formulating crystalline Form A of leflutrozole with common excipients. The manufacturing process includes milling, mixing, and subsequent encapsulation. Due to the low amounts of active drug substance required by any single unit dosage, careful control of the excipient quantities is required in order to generate uniform capsules for administration.

Crystalline leflutrozole may be further processed by sieving and milling in order to generate particles of more uniform size compared to the initially recrystallized solid. In this process, the leflutrozole solid is mixed, stirred, and agitated repeatedly with a small amount of an initial excipient. The steps utilized for production of the oral dosage form of anhydrous leflutrozole are presented below:

1. Place maize starch (part 1) in a suitable container.
2. Add crystalline leflutrozole to the material of step 1.
3. Add maize starch (part 2) to the material of Step 2.
4. Mix the material of Step 3.
5. Sieve the material of Step 4.
6. Mix the material of Step 5.
7. Sieve the material of Step 6 (as applicable).
8. Sieve maize starch (remaining as applicable), lactose monohydrate, cellulose microcrystalline, sodium starch glycolate and silica colloidal anhydrous into a suitable container and mix (as applicable) and add the material of Step 7 into this container.
9. Mix the material of Step 8.
10. Mix the material of Step 9.
11. Mix the material of Step 10.
12. Sieve the magnesium stearate and add to the material of step 11.
13. Mix the material of Step 12.
14. Fill the final blend from Step 13 to produce leflutrozole hard gelatin capsules.

Such a process yields a mixture of the active ingredient, anhydrous leflutrozole, with one or more inactive ingredients, i.e. excipients. Such a process can be translated to different drug substance amounts and formulations by adjusting the amount of each substance added, as well as the timing of their introduction to the formulation. For example, the following table describes the results of capsules generated by the formulation process for dosage amounts of leflutrozole in 0.1 mg, 1.0 mg, and 10.0 mg quantities. The capsule shell structure is comprised of titanium dioxide (E1717, CI 77891) in about 1.98% w/w, iron oxide (red, E172, CI 77491) in about 0.81%, and gelatin to fill.

TABLE 30

Encapsulated formulations of leflutrozole Form A and excipients for dosage amounts ranging from 0.1 mg to 10 mg.

| Ingredient | Amount per capsule (mg) | | | | |
|---|---|---|---|---|---|
| Capsule Content | 0.1 mg[a] | 0.1 mg[b] | 1.0 mg[b] | 10.0 mg | Function |
| Leflutrozole | 0.1 | 0.1 | 1.0 | 10.0 | Active Substance |
| Lactose monohydrate | 96.0 | 192.0 | 192.0 | 175.5 | Filler |

TABLE 30-continued

Encapsulated formulations of leflutrozole Form A and excipients for dosage amounts ranging from 0.1 mg to 10 mg.

| Ingredient | Amount per capsule (mg) | | | | |
|---|---|---|---|---|---|
| Capsule Content | 0.1 mg[a] | 0.1 mg[b] | 1.0 mg[b] | 10.0 mg | Function |
| Microcrystalline cellulose | 30.0 | 60.0 | 60.0 | 50.0 | Filler |
| Maize starch | 14.15 | 28.4 | 27.5 | 40.0 | Filler/Disintegrant |
| Sodium starch glycolate | 7.5 | 15.0 | 15.0 | 15.0 | Disintegrant |
| Magnesium stearate | 1.5 | 3.0 | 3.0 | 3.0 | Lubricant |
| Colloidal silicon dioxide | 0.75 | 1.5 | 1.5 | 1.5 | Glidant |
| Capsule Fill weight | 150.0 | 300.0 | 300.0 | 295.0 | |
| Empty Capsule Shell weight | 48.0 | 76.0 | 76.0 | 76.0 | |
| Total Capsule Weight | 198.0 | 376.0 | 376.0 | 371.0 | |

[a] = size 3 capsule.
[b] = size 1 capsule.

Example 7: Pharmacokinetic Parameters of Leflutrozole

Excretion/Elimination

The predominant mechanism of elimination of $^{14}$C-labeled leflutrozole in female rats was metabolism. Analysis of excretions following oral dosing indicated 28% of the radioactive dose and corresponded to 9% unchanged leflutrozole excreted via urine. By feces, 34% of the dose was excreted, of which 19% corresponded to unchanged parent compound. The half-life of leflutrozole in plasma of female rats was determined to be 78 hours, and after even 168 hours 33% of the original dose was still present.

Cellular Transport by Caco-2 Assay

Absorption in humans was assessed in vitro using the Caco-2 cell model which indicated a very high apparent permeability with rates form apical to basolateral (54.5 cm/sec×10-6) and from basolateral to the apical (23.2 cm/sec×10-6) side by passive diffusion. The ratio of B-A/A-B is 0.43.

These data indicate the leflutrozole is transported by passive diffusion and had no detectable contribution of efflux transporters such as P-glycoprotein. Leflutrozole was not determined to be an inhibitor of P-glycoprotein or of breast cancer resistance protein at concentrations above 200 M.

Drug-Drug Interactions

The ability of leflutrozole to inhibit human CYP enzyme activity was assessed by pooled human liver microsomes using enzyme selective probe substrates. No inhibition (determined by any $IC_{50}$ values being >50-100 μM) was observed for CYP1A2, CYP2C8, CYP2C9, CYP2C19, CYP2D6, CYP2E1, and CYP3A4/5 at concentrations of up to 100 μM. While inhibition of CYP2A6 (common substrates are coumarin and nicotine) was observed with a $K_i$ of 2.56 μM, the observed inhibition does not seem relevant given drug concentrations in plasma for any given dose level.

Metabolic Stability

The stability of leflutrozole was assessed by suspending the compound in solution with human liver microsomes. Leflutrozole has a $t_{1/2}$ of 201 minutes, an intrinsic clearance ($CL_{int}$) of 6.9 mL/min/kg, and a hepatic clearance ($CL_h$) of 3.3 mL/min/kg in a human microsomal stability study. In rat liver microsomes, leflutrozole had a respective $t_{1/2}$ of >300 minutes, $CL_{int}$ of <4.6 mL/min/kg, and a $CL_h$ of <3.8 mL/min/kg.

Pharmacokinetics in Rodents

The tables below present data for the pharmacokinetics of leflutrozole obtained in mice and rats. In rats, a dose of 1 mg/kg dosed as a solution showed a bioavailability of 88.6% ($f_{0-52\ h}$), and administration as a microsuspension was able to reach 100% bioavailability ($f_{0-168\ h}$). In rats, the half-life was measured as 101 hours.

TABLE 31

Pharmacokinetic data in naive female mice.

| Formulation | Dose mg/kg | Route | $C_{max}$ μmol/L | $T_{1/2}$ h | AUC 0-24[1]/48 [2]h h*μmol/L | AUC 0-inf h*μmol/L | CL L/h | BAV 0-48 h % | BAV 0-inf % |
|---|---|---|---|---|---|---|---|---|---|
| NMP-PEG300 10/90 | 1 | i.v. | na | 13 | 21[1] | 34 | 0.09 | | |
| NMP-PEG300 10/90 | 2.5 | p.o. | 2.927 | 13 | 61.7[2] | 70.2 | — | 81.3 | |

TABLE 32

Pharmacokinetic data in rats.

| Formulation | Dose mg/kg | Route | $C_{max}$ μmol/L | $T_{1/2}$ h | AUC 0-24[1]/48 [2]h h*μmol/L | AUC 0-inf h*μmol/L | CL L/h | BAV 0-48 h % | BAV 0-inf % |
|---|---|---|---|---|---|---|---|---|---|
| PEG200-0.9% Saline-solution 40/60 | 1 | i.v. | na | 33.1 | 79.4 | 123.0 | 0.023 | | |
| PEG200-water-solution 40/60 | 1 | p.o. | 1.75 | 49.7 | 70.23 | 142.9 | na | 88.6 | 115.4 |
| Suspension 0.5% HPC | 1 | p.o. | 1.81 | 100.7 | 162.8 | 244.7 | | ≥100 | |

Example 8: Randomized, Double-Blind, Phase II Trial of Leflutrozole in Treating OHH Men A randomized, double-blind, parallel-group, phase IIb trial assessing the efficacy, safety, and dose-response of oral leflutrozole on improving semen quality of obese and overweight men with hypogonadism and low total motile sperm count was performed. The primary objectives of this study were to evaluate the dose-response relationship between leflutrozole administration at three different dose strengths (0.1 mg, 0.3 mg, and 1.0 mg weekly) with improvements in testosterone levels in males with secondary hypogonadism. Secondary objectives included evaluating the efficacy of leflutrozole on improving semen quality in men with secondary hypogonadism, evaluating the efficacy of leflutrozole on normalizing testosterone levels in men with secondary hypogonadism, evaluating the endocrine changes associated with leflutrozole in patients with secondary hypogonadism, characterizing the pharmacokinetics of leflutrozole in plasma (population PK) and exposure in semen, evaluating the safety profile of leflutrozole including adverse event, routine safety laboratory parameters and electrocardiogram (ECG), evaluating the effect of leflutrozole on bone turnover markers, and evaluating the effect of leflutrozole on ambulatory blood pressure (substudy). Exploratory objectives included the plasma exposure relationship (PK/PD) of leflutrozole and serum hormones as well as semen parameters, as well as the relationship between said serum hormone levels and semen parameters.

The primary endpoint of the study is a change in testosterone levels after 24 weeks of treatment. The endpoint was met if >75% of subjects in the active treatment arms experienced normalization of testosterone by week 24 of the study. Normalization of testosterone, for the purposes of this trial, was considered to be between 300 and 1000 ng/dl (10.4 and 35 nmol/L, respectively). Levels above 1000 ng/dl are furthermore considered abnormal.

The primary endpoint was met in all leflutrozole treatment groups. After 24 weeks, 59 (88.1%), 62 (95.4%), and 63 (94.0%) of the subjects experienced normalized testosterone (levels between 300 and 1000 ng/dL) at doses of 0.1 mg, 0.3 mg, and 1.0 mg, respectively. In contrast, only 7 (9.9%) members of the placebo group experienced comparable normalization by week 24 of the study. Some subjects demonstrated normal testosterone levels at baseline but were considered to reflect normal variability of testosterone levels. No statistically significant differences at baseline between treatment groups were noted.

Testosterone normalization occurred as early as day 8 of treatment ($2^{nd}$ visit) with 80.6% of the 0.1 mg population, 89.1% of the 0.3 mg population, and 89.1% of the 1.0 mg population. A statistically significantly higher proportion of subjects in leflutrozole treatment groups demonstrated total testosterone normalization compared with placebo group continuous from visit 2 to visit 8 (day 8/week 2 continuously through week 24, all p<0.001). No statistically significant differences were observed between the three dosage strengths.

Luteinizing hormone (LH) and follicle stimulating hormone (FSH) both increased in the treatment groups compared with placebo. By week 24, mean LH increased by 2.108 mIU/mL, 3.560 mIU/mL, and 5.209 mIU/mL in the 0.1 mg, 0.3 mg, and 1.0 mg treatment groups respectively; the placebo arm displayed a change of LH by −0.043 mIU/mL at week 24. FSH increased by 4.836 mIU/mL, 6.183 mIU/mL, and 8.282 mIU/mL for the same treatment arms, and only by 0.038 mIU/mL in the placebo-treated group. The change in LH and FSH was statistically significant compared to placebo (p<0.001) for all treatment groups. Other semen parameter endpoints are further presented in Table 33.

TABLE 33

Change from baseline in semen parameters at Week 20.

| | Leflutrozole dose (mg) | | |
|---|---|---|---|
| | 0.1 mg | 0.3 mg | 1.0 mg |
| Semen Volume (mL) | | | |
| n | 31 | 23 | 24 |
| LS mean difference (95% CI) vs. placebo | 0.7 (−0.2, 1.6) | 0.8 (−0.2, 1.9) | 1.4 (0.4, 2.3) |
| Spermatozoa ($10^6$/ejaculate) | | | |
| n | 30 | 23 | 24 |
| LS mean difference (95% CI) vs. placebo | 130.4 (−65.3, 326.1) | 90.2 (−126.5, 306.8) | 270.1 (65.0, 475.2) |
| Sperm Concentration ($10^9$/mL) | | | |
| n | 29 | 20 | 22 |
| LS mean difference (95% CI) vs. placebo | 51.0 (6.5, 95.5) | 17.6 (−35.1, 1.9) | 58.5 (11.8, 105.1) |
| Sperm Motility (%) | | | |
| n | 31 | 23 | 24 |
| LS mean difference (95% CI) vs. placebo | 2.7 (−8.2, 13.5) | −0.1 (−12.3, 12.1) | −1.2 (−12.6, 10.2) |
| Total Motile Sperm Count ($10^6$/ejaculate) | | | |
| n | 29 | 19 | 22 |
| LS mean difference (95% CI) vs. placebo | 86.3 (−24.5, 197.1) | 54.2 (−77.3, 185.7) | 127.7 (12.6, 242.8) |
| Sperm Morphology (%) | | | |
| n | 31 | 23 | 22 |
| LS mean difference (95% CI) vs. placebo | −1.9 (−8.4, 4.7) | −2.6 (−9.8, 4.6) | −4.1 (−11.2, 3.0) | n = patients included at each measurement.

At weeks 12 and 20, sperm count increases were observed across all three treatment arms compared to placebo, with statistically significant improvements at week 20 (least square [LS] mean difference [95% CI]) in semen volume (1.37 [0.41, 2.34] mL, p=0.006, n=24), spermatozoa (270.1 [65.01, 475.2] $10^6$/ejaculate, p=0.011, n=23), and total motile sperm count (127.7 [12.61, 242.82] $10^6$/ejaculate, p=0.030, n=22) in the 1.0 mg dose group.

Consistent with the mechanism of action of aromatase inhibition, at week 24, estradiol levels in the 0.1 mg, 0.3 mg, and 1.0 mg had decreased by 11.75 pg/mL, 12.96 pg/mL, and 14.84 pg/mL, respectively. The results for lowering estradiol levels are summarized in the table below.

TABLE 34

Changes in estradiol levels for leflutrozole and placebo treatment groups.

| | Estradiol (pg/mL) | | |
|---|---|---|---|
| Treatment | Initial | Change | Week 24 Measurement |
| Placebo | 24.15 | +1.89 | 26.04 |
| 0.1 mg | 24.69 | −11.75 | 12.94 |
| 0.3 mg | 24.80 | −12.96 | 11.84 |
| 1.0 mg | 23.47 | −14.84 | 8.63 |

No statistically significant changes from baseline were shown compared with placebo in triglycerides, glycosylated hemoglobin (HbA1c), glucose, and C-reactive protein during the study (p>0.05). Consistent decreases in insulin and homeostatic assessment of insulin resistance (HOMA-IR) were observed in the leflutrozole treatment groups compared with placebo, but none met statistical significance. The mean (SD) HbA1c at screening was 6.13% (0.909), which may have impacted the sensitivity to demonstrate an improvement.

Patients provided semen samples for exploratory analysis. There were significant improvements in semen volume (least squares [LS] mean difference [95% confidence interval (CI)]) of 1.4 (0.4, 2.3) mL across all active treatment arms.

Example 9: Effects of Long-Term Leflutrozole Treatment

Subjects participating in an extension of treatment with leflutrozole received the identical dose as in Example 7, continuing for 48 total weeks.

Testosterone levels rose in a dose-dependent manner, with increases evident by week 2 and within 8 weeks. A flatline in serum testosterone levels occurred that was sustained for the remainder of the 48-week period. Levels were 494.9 ng/dl, 549.7 ng/dl, and 595.1 ng/dL in the respective 0.1 mg, 0.3 mg, and 1.0 mg treatment arms, and had a respective change from baseline of 243.0 ng/dl, 290.6 ng/dl, and 376.2 ng/dL.

Body composition changes in subjects are expected to be of concern, as suppression of estradiol levels has been previously shown to impact bone mineral density (BMD). At week 48, dual-energy x-ray absorptiometry (DEXA) scans showed decreases in lumbar density without evidence of dose dependence. The changes were significant, but no treatment group displayed a percentage decrease of lumbar BMD beyond-3%. Evaluations of BMD percentage change, absolute change, and change in T-score for all locations (hip, femoral neck, and lumbar spine) showed consistently similar results: no significant change in BMD for the hip or femoral neck were observed, and the only statistically significant change was in the lumbar spine.

Bone turnover markers (type I collage C-telopeptides, procollagen-1 N-terminal propeptide, and osteocalcin) showed increases in all leflutrozole treatment groups by week 48. Bone specific alkaline phosphatase showed a significant increase in the 0.1 mg leflutrozole treatment arm only. Reductions in BMD of the lumbar spine did not indicate clinically meaningful osteopenia or osteoporosis.

ENUMERATED EMBODIMENTS

The invention described herein is additionally characterized by the following non-limiting, enumerated embodiments:

E1. A crystalline Form A of leflutrozole having X-ray powder diffraction peaks at a diffraction angle 2θ (°) of 9.1±0.2, 16.8±0.2, and 26.1±0.2.

E2. The crystalline Form A of leflutrozole of embodiment 1, having additional X-ray powder diffraction peaks at a diffraction angle 2θ (°) of 13.9±0.2, 15.6±0.2, 21.1±0.2, and 24.9±0.2.

E3. The crystalline Form A of leflutrozole of embodiments 1 or 2 having additional X-ray powder diffraction peaks at a diffraction angle 2θ (°) of 10.9±0.2, 14.4±0.2, 18.0±0.2, 18.5±0.2, 24.6±0.2, 27.4±0.2, 28.0±0.2, and 29.3±0.2.

E4. The crystalline form of leflutrozole of any one of embodiments 1 to 3 having additional X-ray powder diffraction peaks at a diffraction angle 2θ (°) of 22.6±0.2, 23.8±0.2, 26.8±0.2, 28.4±0.2, 31.4±0.2, and 32.5±0.2.

E5. The crystalline Form A of leflutrozole of any one of embodiments 1 to 4, having the X-ray powder diffraction spectrum as shown in FIG. 1.

E6. The crystalline Form A of leflutrozole of any one of embodiments 1 to 5, wherein the peaks at diffraction angle 2θ (°) are collected by irradiating with Cu Kα.

E7. The crystalline Form A of leflutrozole of any one of embodiments 1 to 6, having a differential scanning calorimetry (DSC) endotherm at about 169° C.

E8. The crystalline Form A of leflutrozole of any one of embodiments 1 to 7, having the differential scanning calorimetry curve substantially as depicted in FIG. 3.

E9. The crystalline Form A of leflutrozole of any one of embodiments 1 to 8, exhibiting $^1$H nuclear magnetic resonance (NMR) peaks centered at a chemical shift (δ) of about 7.7 ppm, about 8.0, about 8.3, and about 8.7 ppm.

E10. The crystalline Form A of leflutrozole of any one of embodiments 1 to 9, wherein the crystalline Form A of leflutrozole is characterized by a $^1$H NMR spectrum substantially as depicted in FIG. 4.

E11. The crystalline Form A of leflutrozole of any one of embodiments 1 to 10, exhibiting infrared spectroscopy (FT-IR) absorbances of about 3131 cm$^{-1}$, about 3105 cm$^{-1}$, about 2925 cm$^{-1}$, about 2854 cm$^{-1}$, about 2230 cm$^{-1}$, about 1680 cm$^{-1}$, and about 1511 cm$^{-1}$.

Figure 5:
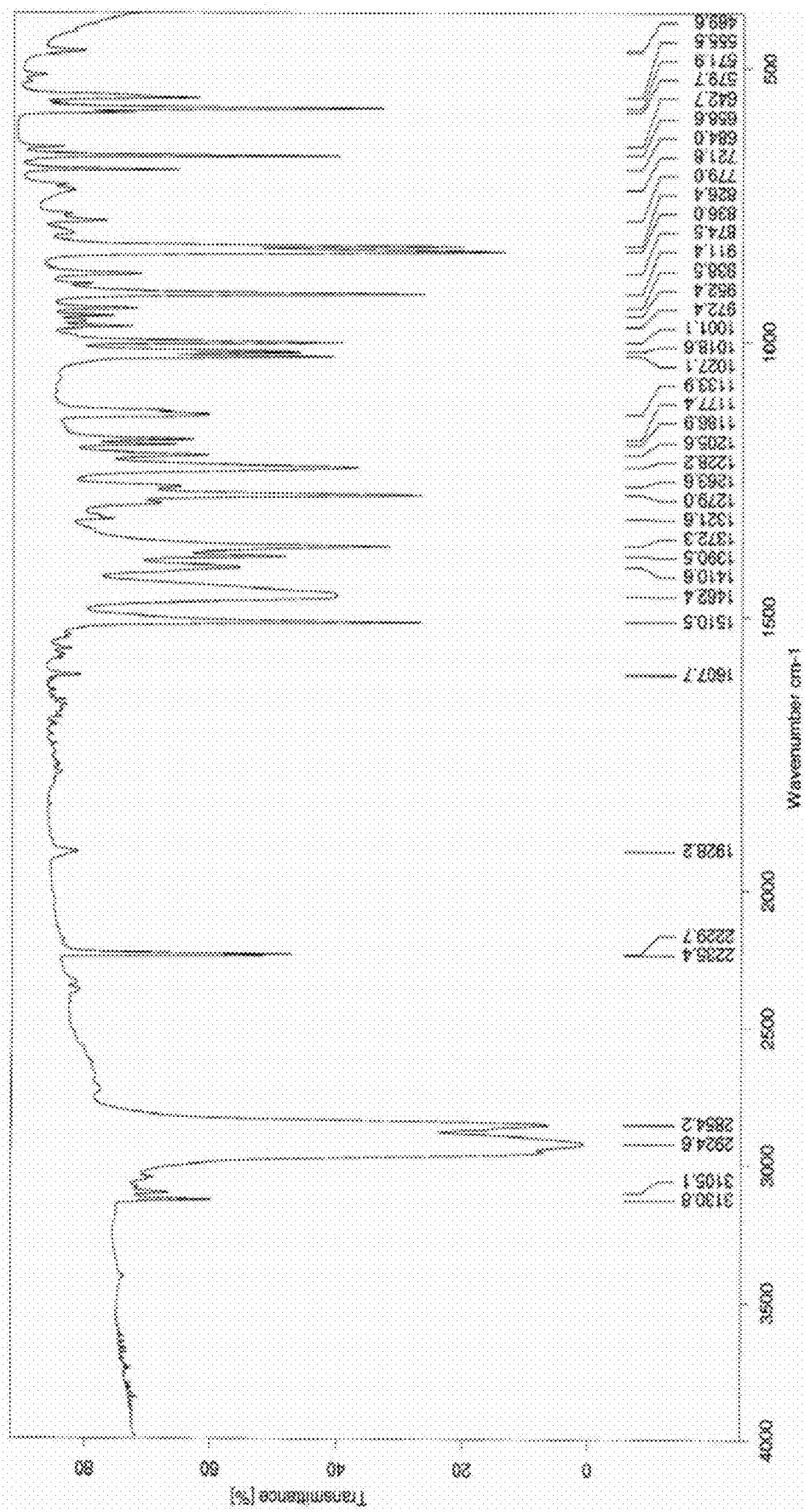
FIG. 5 is an exemplary infrared (IR) spectrum for crystalline Form A of leflutrozole.

E12. The crystalline Form A of leflutrozole of any one of embodiments 1 to 11, wherein the crystalline Form A of leflutrozole is characterized by the infrared spectrum substantially as depicted in FIG. 5.

E13. The crystalline Form A of leflutrozole of any one of embodiments 1 to 12, wherein the crystalline Form A of leflutrozole exhibits a weight loss of from 0.01% to 5% when heated from 30° C. to 300° C. as measured by thermogravimetric analysis.

E14. The crystalline Form A of leflutrozole of embodiment 13, wherein the crystalline Form A of leflutrozole exhibits a weight loss of about 0.05% when heated from 30° C. to 300° C. as measured by thermogravimetric analysis.

Figure 6:
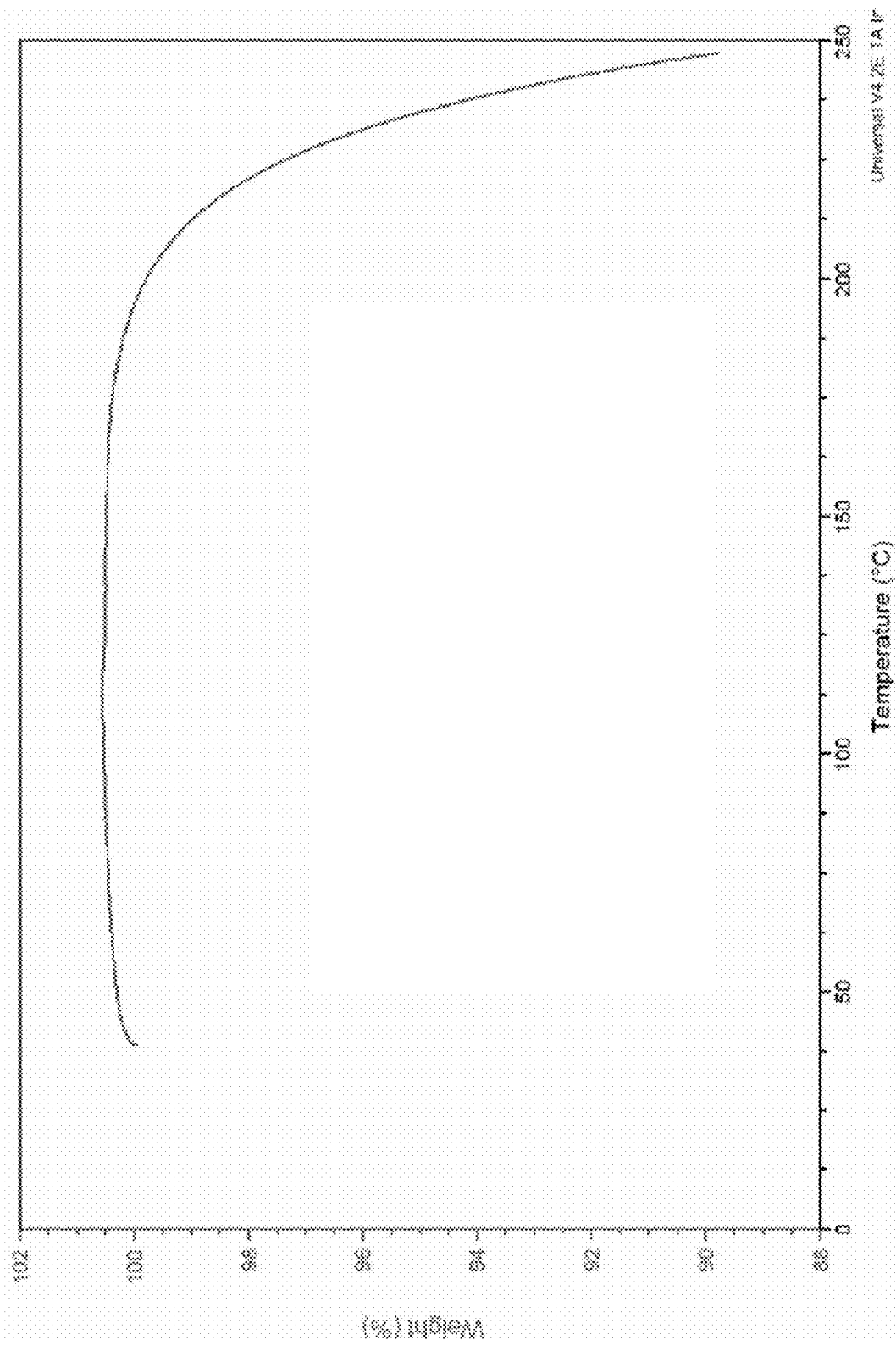
FIG. 6 is an exemplary thermogravimetric analysis curve for crystalline Form A of leflutrozole.

E15. The crystalline Form A of leflutrozole of any one of embodiments 1 to 14, wherein the crystalline Form A of leflutrozole exhibits a thermogravimetric analysis curve substantially as depicted in FIG. 6.

E16. The crystalline Form A of leflutrozole of any one of embodiments 1 to 15, wherein the crystalline Form A of leflutrozole has a particle size distribution ($D_{90}$) of less than 35 μm.

E17. The crystalline Form A of leflutrozole of any one of embodiments 1 to 16, wherein the crystalline Form A of leflutrozole has a particle size distribution of $D_{10}$ of about 1 μm, a $D_{50}$ of about 4 μm, and a $D_{90}$ of about 11 μm.

E18. The crystalline Form A of leflutrozole of any one of embodiments 1 to 17, wherein the crystalline Form A of leflutrozole is obtainable by recrystallization from a solvent.

E19. The crystalline Form A of leflutrozole of embodiment 18, wherein the crystalline Form A of leflutrozole is obtainable by recrystallization from ethanol.

E20. The crystalline Form A of leflutrozole of any one of embodiments 1 to 19, wherein the crystalline Form A of leflutrozole is anhydrous.

E21. Crystalline Form A of leflutrozole that exhibits a weight loss of from 0.01% to 5% when heated from 30° C. to 300° C. as measured by thermogravimetric analysis, optionally wherein the crystalline Form A of leflutrozole exhibits a weight loss of about 0.05% when heated from 30° C. to 300° C. as measured by thermogravimetric analysis.

E22. Crystalline Form A of leflutrozole having (a) the X-ray powder diffraction (XRPD) spectrum as shown in FIG. 1 and optionally at least one of the following properties:
  (a) an X-ray powder diffraction (XRPD) spectrum as shown in FIG. 1;
  (b) an X-ray powder diffraction (XRPD) pattern with characteristic peaks at a diffraction angle 2θ (°) of 9.1±0.2, 16.8±0.2, and 26.1±0.2;
  (c) the same X-ray powder diffraction (XRPD) pattern after storage at 80° C. and 75% relative humidity for at least a week;
  (d) the same XRPD pattern after storage at 25° C. and 95% relative humidity for at least a week;
  (e) a differential scanning calorimetry (DSC) endotherm at about 169° C.;
  (f) a differential scanning calorimetry curve substantially as depicted in FIG. 6;
  (g) $^1$H nuclear magnetic resonance (NMR) peaks centered at a chemical shift (δ) of about 7.7 ppm, about 8.0, about 8.3, and about 8.7 ppm;

(h) a $^1$H NMR spectrum substantially as depicted in FIG. 4;
(i) infrared spectroscopy (FT-IR) absorbances of about 3131 cm$^{-1}$, about 3105 cm$^{-1}$, about 2925 cm$^{-1}$, about 2854 cm$^{-1}$, about 2230 cm$^{-1}$, about 1680 cm$^{-1}$, and about 1511 cm$^{-1}$;
(j) an infrared spectrum substantially as depicted in FIG. 5;
(k) a weight loss of from 0.01% to 5% when heated from 30° C. to 300° C. as measured by thermogravimetric analysis;
(l) a thermogravimetric analysis curve substantially as depicted in FIG. 6;
(m) a particle size distribution (D$_{90}$) of less than 35 μm;
(n) non-hygroscopicity; or
(o) combinations thereof.

E23. A solid form of leflutrozole, comprising crystalline Form A of leflutrozole, wherein the crystalline Form A of leflutrozole is present at greater than about 80% by weight of the solid form.

E24. A solid form of leflutrozole, comprising crystalline Form A of leflutrozole, wherein the crystalline Form A of leflutrozole is present at greater than about 90% by weight of the solid form.

E25. A solid form of leflutrozole, comprising crystalline Form A of leflutrozole, wherein the crystalline Form A of leflutrozole is present at greater than about 95% by weight of the solid form.

E26. A solid form of leflutrozole, comprising crystalline Form A of leflutrozole, wherein the crystalline Form A of leflutrozole is present at greater than about 97% by weight of the solid form.

E27. Leflutrozole in crystalline form, having the formula C$_{17}$H$_{10}$FN$_5$, and being in the form of an asymmetric unit comprising four C$_{17}$H$_{10}$FN$_5$ formula units.

E28. Crystalline Form A of leflutrozole, characterized by unit cell parameters substantially equal to the following cell dimensions:
a=16.060 (4) Å
b=12.087 (3) Å
c=7.387 (2) Å
α=90 degrees
β=95.827 (15) degrees
γ=90 degrees
Space group=P2$_1$/c
molecules per asymmetric unit=4

E29. A pharmaceutical composition comprising crystalline Form A of leflutrozole and one or more pharmaceutically acceptable excipients, wherein the crystalline Form A of leflutrozole has a particle size distribution (D$_{90}$) of less than 35 μm.

E30. The pharmaceutical composition of embodiment 29, wherein the crystalline Form A of leflutrozole has X-ray powder diffraction peaks at a diffraction angle 2θ (°) of 9.1±0.2, 16.8±0.2, and 26.1±0.2.

E31. The pharmaceutical composition of embodiment 30, wherein the crystalline Form A of leflutrozole has additional X-ray powder diffraction peaks at a diffraction angle 2θ (°) of 13.9±0.2, 15.6±0.2, 21.1±0.2, and 24.9±0.2.

E32. The pharmaceutical composition of embodiment 30 or 31, wherein the crystalline Form A of leflutrozole has additional X-ray powder diffraction peaks at a diffraction angle 2θ (°) of 10.9±0.2, 14.4±0.2, 18.0±0.2, 18.5±0.2, 24.6±0.2, 27.4±0.2, 28.0±0.2, and 29.3±0.2.

E33. The pharmaceutical composition of any one of embodiments 30 to 32, wherein the crystalline Form A of leflutrozole has additional X-ray powder diffraction peaks at a diffraction angle 2θ (°) of 22.6±0.2, 23.8±0.2, 26.8±0.2, 28.4±0.2, 31.4±0.2, and 32.5±0.2.

E34. The pharmaceutical composition of any one of embodiments 29 to 33, wherein the crystalline Form A of leflutrozole has the X-ray powder diffraction spectrum as shown in FIG. 1.

E35. The pharmaceutical composition of any one of embodiments 29 to 34, wherein the crystalline Form A of leflutrozole has peaks at diffraction angle 2θ (°) collected by irradiating with Cu Kα.

E36. The pharmaceutical composition of any one of embodiments 29 to 35, wherein the crystalline Form A of leflutrozole has a differential scanning calorimetry (DSC) endotherm at about 169° C.

E37. The pharmaceutical composition of any one of embodiments 29 to 36, wherein the crystalline Form A of leflutrozole has the differential scanning calorimetry curve substantially as depicted in FIG. 3.

E38. The pharmaceutical composition of any one of embodiments 29 to 37, wherein the crystalline Form A of leflutrozole has $^1$H nuclear magnetic resonance (NMR) peaks centered at a chemical shift (δ) of about 7.7 ppm, about 8.0, about 8.3, and about 8.7 ppm.

E39. The pharmaceutical composition of any one of embodiments 29 to 38, wherein the crystalline Form A of leflutrozole is characterized by a $^1$H NMR spectrum substantially as depicted in FIG. 4.

E40. The pharmaceutical composition of any one of embodiments 29 to 39, wherein the crystalline Form A of leflutrozole exhibits infrared spectroscopy (FT-IR) absorbances of about 3131 cm$^{-1}$, about 3105 cm$^{-1}$, about 2925 cm$^{-1}$, about 2854 cm$^{-1}$, about 2230 cm$^{-1}$, about 1680 cm$^{-1}$, and about 1511 cm$^{-1}$.

E41. The pharmaceutical composition of any one of embodiments 29 to 40, wherein the crystalline Form A of leflutrozole is characterized by the infrared spectrum substantially as depicted in FIG. 5.

E42. The pharmaceutical composition of any one of embodiments 29 to 41, wherein the crystalline Form A of leflutrozole exhibits a weight loss of from 0.01% to 5% when heated from 30° C. to 300° C. as measured by thermogravimetric analysis.

E43. The pharmaceutical composition of any one of embodiments 29 to 42, wherein the crystalline Form A of leflutrozole exhibits a weight loss of about 0.05% when heated from 30° C. to 300° C. as measured by thermogravimetric analysis.

E44. The pharmaceutical composition of any one of embodiments 29 to 43, wherein the crystalline Form A of leflutrozole exhibits a thermogravimetric analysis curve substantially as depicted in FIG. 6.

E45. The pharmaceutical composition of any one of embodiments 29 to 44, wherein the crystalline Form A of leflutrozole has a particle size distribution of D$_{10}$ of about 1 μm, a D$_{50}$ of about 4 μm, and a D$_{90}$ of about 11 μm.

E46. The pharmaceutical composition of any one of embodiments 29 to 45, wherein the crystalline Form A of leflutrozole is obtainable by recrystallization from a solvent.

E47. The pharmaceutical composition of embodiment 46, wherein the crystalline Form A of leflutrozole is obtainable by recrystallization from ethanol.

E48. The pharmaceutical composition of any one of embodiments 29 to 47, wherein the crystalline Form A of leflutrozole is anhydrous.

E49. The pharmaceutical composition of any one of embodiments 29 to 48, wherein the crystalline Form A of leflutrozole has (a) the X-ray powder diffraction (XRPD) spectrum as shown in FIG. 1 and optionally at least one of the following properties:
  (a) an X-ray powder diffraction (XRPD) spectrum as shown in FIG. 1;
  (b) an X-ray powder diffraction (XRPD) pattern with characteristic peaks at a diffraction angle 2θ (°) of 9.1±0.2, 16.8±0.2, and 26.1±0.2;
  (c) the same X-ray powder diffraction (XRPD) pattern after storage at 80° C. and 75% relative humidity for at least a week;
  (d) the same XRPD pattern after storage at 25° C. and 95% relative humidity for at least a week;
  (e) a differential scanning calorimetry (DSC) endotherm at about 169° C.;
  (f) a differential scanning calorimetry curve substantially as depicted in FIG. 3;
  (g) $^1$H nuclear magnetic resonance (NMR) peaks centered at a chemical shift (δ) of about 7.7 ppm, about 8.0, about 8.3, and about 8.7 ppm;
  (h) a $^1$H NMR spectrum substantially as depicted in FIG. 4;
  (i) infrared spectroscopy (FT-IR) absorbances of about 3131 cm$^{-1}$, about 3105 cm$^{-1}$, about 2925 cm$^{-1}$, about 2854 cm$^{-1}$, about 2230 cm$^{-1}$, about 1680 cm$^{-1}$, and about 1511 cm$^{-1}$;
  (j) an infrared spectrum substantially as depicted in FIG. 5;
  (k) a weight loss of from 0.01% to 5% when heated from 30° C. to 300° C. as measured by thermogravimetric analysis;
  (l) a thermogravimetric analysis curve substantially as depicted in FIG. 6;
  (m) a particle size distribution ($D_{90}$) of less than 35 μm;
  (n) non-hygroscopicity; or
  (o) combinations thereof.

E50. The pharmaceutical composition of any one of embodiments 29 to 48, wherein the crystalline Form A of leflutrozole is present at greater than about 80% by weight of the solid form.

E51. The pharmaceutical composition of any one of embodiments 29 to 48, wherein the crystalline Form A of leflutrozole is present at greater than about 90% by weight of the solid form.

E52. The pharmaceutical composition of any one of embodiments 29 to 48, wherein the crystalline Form A of leflutrozole is present at greater than about 95% by weight of the solid form.

E53. The pharmaceutical composition of any one of embodiments 29 to 48, wherein the crystalline Form A of leflutrozole is present at greater than about 97% by weight of the solid form.

E54. The pharmaceutical composition of any one of embodiments 29 to 48, wherein the crystalline Form A has the formula $C_{17}H_{10}FN_5$, and is in the form of an asymmetric unit comprising four $C_{17}H_{10}FN_5$ formula units.

E55. The pharmaceutical composition of any one of embodiments 29 to 48, wherein the crystalline Form A of leflutrozole is characterized by unit cell parameters substantially equal to the following cell dimensions:
a=16.060 (4) Å
b=12.087 (3) Å
c=7.387 (2) Å
α=90 degrees
β=95.827 (15) degrees
γ=90 degrees
Space group=P2$_1$/c
molecules per asymmetric unit=4

E56. A pharmaceutical composition comprising the crystalline Form A of leflutrozole of any one of embodiments 1 to 28, and one or more pharmaceutically acceptable excipients.

E57. The pharmaceutical composition of any one of embodiments 29 to 56, wherein the pharmaceutical composition comprises from 0.02 to 3% of the crystalline Form A of leflutrozole by weight.

E58. The pharmaceutical composition of any one of embodiments 29 to 57, wherein the leflutrozole has a purity of at least 97%.

E59. The pharmaceutical composition of any one of embodiments 29 to 58, wherein the purity is determined by high performance liquid chromatography (HPLC).

E60. The pharmaceutical composition of any one of embodiments 29 to 59, wherein the leflutrozole is substantially free of the compound of formula (II):

(II)

E61. The pharmaceutical composition of any one of embodiments 29 to 60, wherein the leflutrozole is substantially free of the compound of formula (III):

(III)

E62. The pharmaceutical composition of any one of embodiments 29 to 61, wherein the leflutrozole is substantially free of the compound of formula (IV):

(IV)

E63. The pharmaceutical composition of any one of embodiments 29 to 62, wherein the leflutrozole is substantially free of the compound of formula (V):

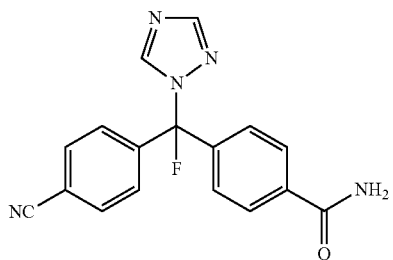

E64. The pharmaceutical composition of any one of embodiments 29 to 63, wherein the leflutrozole is substantially free of solvent.

E65. The pharmaceutical composition of embodiment 64, wherein the leflutrozole is substantially free of water.

E66. The pharmaceutical composition of embodiment 64 or 65, wherein the leflutrozole is substantially free of ethanol.

E67. The pharmaceutical composition of any one of embodiments 64 to 66, wherein the leflutrozole is substantially free of N,N-dimethylformamide (DMF).

E68. The pharmaceutical composition of any one of embodiments 29 to 67, wherein the pharmaceutical composition is formulated for oral administration to a subject.

E69. The pharmaceutical composition of embodiment 68, wherein the pharmaceutical composition is in the form of a capsule or tablet.

E70. The pharmaceutical composition of any one of embodiments 29 to 67, wherein the pharmaceutical composition is formulated for intravenous administration to a subject.

E71. The pharmaceutical composition of any one of embodiments 29 to 70, wherein the pharmaceutical composition comprises from 0.02 to 3% of the crystalline form of leflutrozole by weight.

E72. The pharmaceutical composition of embodiment 71, wherein the crystalline form of leflutrozole is present in an amount from 0.001 to 10.0 mg.

E73. The pharmaceutical composition of any one of embodiments 29 to 72, wherein the pharmaceutical composition comprises one or more fillers.

E74. The pharmaceutical composition of embodiment 73, wherein the one or more fillers is selected from lactose monohydrate, microcrystalline cellulose, and maize starch.

E75. The pharmaceutical composition of embodiments 73 or 74, wherein the composition comprises from 70 to 95% filler by weight.

E76. The pharmaceutical composition of embodiment 75, wherein the composition comprises from 55 to 70% lactose monohydrate by weight.

E77. The pharmaceutical composition of embodiment 75 or 76, wherein the composition comprises from 10 to 25% microcrystalline cellulose by weight.

E78. The pharmaceutical composition of any one of embodiments 75 to 77, wherein the composition comprises from 7.5 to 15% maize starch by weight.

E79. The pharmaceutical composition of any one of embodiments 29 to 78, wherein the pharmaceutical composition comprises from 4 to 6% disintegrant by weight.

E80. The pharmaceutical composition of embodiment 79, wherein the disintegrant is sodium starch glycolate.

E81. The pharmaceutical composition of any one of embodiments 29 to 80, wherein the pharmaceutical composition comprises about 5% sodium starch glycolate by weight.

E82. The pharmaceutical composition of any one of embodiments 29 to 81, wherein the pharmaceutical composition comprises from 0.02 to 2% lubricant by weight.

E83. The pharmaceutical composition of embodiment 82, wherein the lubricant is magnesium stearate.

E84. The pharmaceutical composition of any one of embodiments 29 to 83, wherein the pharmaceutical composition comprises about 1% magnesium stearate by weight.

E85. The pharmaceutical composition of any one of embodiments 29 to 84, wherein the pharmaceutical composition comprises from 0.01 to 1% glidant by weight.

E86. The pharmaceutical composition of any one of embodiments 29 to 85, wherein the glidant is colloidal silicon dioxide.

E87. The pharmaceutical composition of any one of embodiments 29 to 86, wherein the pharmaceutical composition comprises about 0.5% colloidal silicon dioxide by weight.

E88. A method of preparing the crystalline Form A of leflutrozole of any one of embodiments 1 to 28, the method comprising:
  i. reacting a solution of letrozole in a solvent with a base to generate a solution of letrozole carbanion;
  ii. treating the solution of letrozole carbanion with a fluorinating agent to yield a reaction mixture;
  iii. quenching the reaction mixture; and
  iv. isolating the crystalline Form A of leflutrozole.

E89. A method of preparing the crystalline Form A of leflutrozole of any one of embodiments 1 to 28, represented by formula (I):

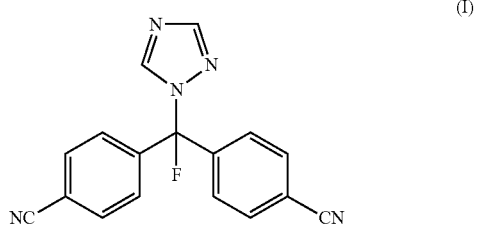 [SMILES: N#Cc1ccc(C(F)(c2ccc(C#N)cc2)n2cncn2)cc1]

wherein the method comprises reacting a precursor represented by formula (VI)

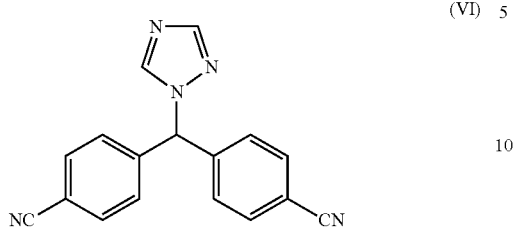

(VI)

with a fluorinating agent and a base in a solvent, thereby fluorinating the compound of formula VI to form an alkyl fluoride.

E90. The method of embodiment 88 or 89, wherein the base is added in at least 5 separate portions.

E91. The method of any one of embodiments 88 to 90, wherein the fluorinating agent is added in at least 5 separate portions.

E92. The method of embodiment 91, wherein the fluorinating agent is added in at least 10 separate portions.

E93. The method of any one of embodiments 88 to 92, wherein the reaction temperature is about −15° C.

E94. The method any one of embodiments 88 to 93, wherein the method is described by the more detailed steps of:
  i. adding a first portion of base to a solution of letrozole at about −15° C. under inert atmosphere;
  ii. monitoring the reaction temperature until the solution returns to about −15° C.;
  iii. adding the second portion of the base to the solution at about −15° C.;
  iv. repeating previous steps i.-iii. until all portions of the base have been added, thereby generating a solution of letrozole carbanion;
  v. adding a first portion of fluorinating agent to the solution of letrozole carbanion at about −15° C.;
  vi. monitoring the reaction temperature until the solution returns to about −15° C.;
  vii. adding the second portion of fluorinating agent to the solution at about −15° C.; and
  viii. repeating previous steps v.-vii. until all portions of the fluorinating agent have been added, thereafter generating a reaction mixture;
  ix. quenching the reaction mixture; and
  x. isolating the leflutrozole.

E95. The method of any one of embodiments 88 to 94, wherein the method further comprises recrystallization of the leflutrozole.

E96. The method of embodiment 95, wherein the recrystallization is from ethanol.

E97. The method of embodiment 95 or 96, wherein the recrystallization is performed a second time.

E98. The method of embodiment 95 or 96, wherein the recrystallization is repeated until the total amount of impurities is ≤2.0% as determined by HPLC peak area.

E99. The method of any one of embodiments 88 to 98, wherein the base is sodium ethoxide.

E100. The method of any one of embodiments 88 to 99, wherein the fluorinating agent is 1-(Chloromethyl)-4-fluoro-1,4-diazabicyclo[2.2.2]octane-1,4-diium ditetrafluoroborate.

E101. The method of any one of embodiments 88 to 100, wherein the solvent is N,N-dimethylformamide (DMF).

E102. The method of embodiment 101, wherein the DMF has less than 0.1% water content by weight.

E103. The method of any one of embodiments 88 to 102, wherein the quenching of the reaction mixture is an inverse quench.

E104. The method of any one of embodiments 88 to 103, wherein the reaction is quenched with a solution of aqueous ammonium chloride.

E105. The method of any one of embodiments 88 to 104, wherein the ratio of letrozole to sodium ethoxide is from 1:1 to 1:1.4.

E106. The method of embodiment 105, wherein the ratio of letrozole to sodium ethoxide is from 1.15 to 1.35.

E107. The method of any one of embodiments 88 to 106, wherein the ratio of letrozole to fluorinating agent is from 1.2 to 1.5.

E108. The method of embodiment 107, wherein the ratio of letrozole to fluorinating agent is from 1.25 to 1.45.

E109. The method of any one of embodiments 88 to 108, wherein the method further comprises micronizing the leflutrozole.

E110. The method of embodiment 109, wherein the micronization is performed by jet milling.

E111. The method of embodiment 109 or 110, wherein the leflutrozole is micronized to a particle size distribution ($D_{90}$) of less than 35 μm.

E112. A method of treating a disease or disorder in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E113. The method of embodiment 112, wherein the disease or disorder is selected from infertility, decreased libido, erectile dysfunction, sleep apnea, low bone mineral density, loss of body hair, fatigue, impaired cognition, depression, insulin resistance, glucose intolerance, lipid abnormalities, and endometriosis.

E114. The method of embodiment 113, wherein the disease or disorder is infertility.

E115. The method of embodiment 114, wherein the infertility is male infertility.

E116. The method of embodiment 115, wherein the subject is diagnosed as having oligospermia.

E117. The method of embodiment 116, wherein the subject is diagnosed as having hypogonadism.

E118. The method of embodiment 116, wherein the hypogonadism is a primary hypogonadism.

E119. The method of embodiment 116, wherein the hypogonadism is a secondary hypogonadism.

E120. The method of embodiment 119, wherein the secondary hypogonadism is hypogonadotropic hypogonadism.

E121. The method of embodiment 120, wherein the hypogonadotropic hypogonadism is obesity-associated.

E122. The method of embodiment 115, wherein the male infertility is caused by oligospermia.

E123. The method of embodiment 122, wherein the oligospermia is caused by hypogonadism.

E124. The method of embodiment 123, wherein the hypogonadism is a primary hypogonadism.

E125. The method of embodiment 123, wherein the hypogonadism is a secondary hypogonadism.

E126. The method of embodiment 125, wherein the secondary hypogonadism is hypogonadotropic hypogonadism.

E127. The method of any one of embodiments 112 to 126, wherein the subject is diagnosed as having erectile dysfunction.

E128. The method of embodiment 114, wherein the infertility is female infertility.

E129. The method of embodiment 128, wherein the subject is diagnosed as having endometriosis.

E130. The method of embodiment 129, wherein the endometriosis is refractory endometriosis.

E131. The method of embodiment 128, wherein the subject is diagnosed as being post-menopausal.

E132. The method of embodiment 128, wherein the infertility is caused by endometriosis.

E133. The method of embodiment 132, wherein the endometriosis is refractory endometriosis.

E134. The method of embodiment 128, wherein the infertility is caused by being post-menopausal.

E135. The method of embodiments 114 to 134, wherein the subject is diagnosed as having a decreased libido.

E136. The method of embodiments 114 to 135, wherein the subject is diagnosed as having sleep apnea.

E137. The method of embodiments 114 to 136, wherein the subject is diagnosed as having low bone mineral density.

E138. The method of embodiments 114 to 137, wherein the subject is diagnosed as experiencing loss of body hair.

E139. The method of embodiments 114 to 138, wherein the subject is diagnosed as having fatigue.

E140. The method of embodiments 114 to 139, wherein the subject is diagnosed as having impaired cognition.

E141. The method of embodiments 114 to 140, wherein the subject is diagnosed as having depression.

E142. The method of embodiments 114 to 141, wherein the subject is diagnosed as having insulin resistance.

E143. The method of embodiments 114 to 141, wherein the subject is diagnosed as having glucose intolerance.

E144. The method of embodiments 114 to 143, wherein the subject is diagnosed as having lipid abnormalities.

E145. The method of embodiment 113, wherein the disease or disorder is decreased libido.

E146. The method of embodiment 113, wherein the disease or disorder is erectile dysfunction.

E147. The method of embodiment 113, wherein the disease or disorder is sleep apnea.

E148. The method of embodiment 113, wherein the disease or disorder is low bone mineral density.

E149. The method of embodiment 113, wherein the disease or disorder is loss of body hair.

E150. The method of embodiment 113, wherein the disease or disorder is fatigue.

E151. The method of embodiment 113, wherein the disease or disorder is impaired cognition.

E152. The method of embodiment 113, wherein the disease or disorder is depression.

E153. The method of embodiment 113, wherein the disease or disorder is endometriosis.

E154. The method of embodiment 113, wherein the disease or disorder is insulin resistance.

E155. The method of embodiment 113, wherein the disease or disorder is glucose intolerance.

E156. The method of embodiment 113, wherein the disease or disorder is lipid abnormalities.

E157. A method of increasing the level of testosterone in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E158. The method of embodiment 157, wherein the testosterone level becomes normalized in the subject.

E159. The method of embodiment 158, wherein the normalization occurs within 1 week.

E160. A method of reducing the level of estradiol in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E161. A method of increasing the level of luteinizing hormone (LH) in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E162. A method of increasing the level of follicle stimulating hormone (FSH) in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E163. A method of increasing the total motile sperm count in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E164. A method of increasing the semen volume of a subject in need thereof, the method comprising administering to the subject a therapeutically effective amount of the crystalline Form A of leflutrozole of any one of embodiments 1 to 28, or the pharmaceutical composition of any one of embodiments 29 to 87.

E165. A method of inhibiting aromatase (CYP19) activity in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E166. The method of any one of embodiments 157 to 165, wherein the subject is diagnosed as having oligospermia.

E167. The method of any one of embodiments 157 to 166, wherein the subject is diagnosed as having erectile dysfunction.

E168. The method of any one of embodiments 157 to 165, wherein the subject is diagnosed as having endometriosis.

E169. The method of any one of embodiments 157 to 168, wherein the subject is diagnosed as having decreased libido.

E170. The method of any one of embodiments 157 to 169, wherein the subject is diagnosed as having sleep apnea.

E171. The method of any one of embodiments 157 to 170, wherein the subject is diagnosed as having low bone mineral density.

E172. The method of any one of embodiments 157 to 171, wherein the subject is diagnosed as experiencing loss of body hair.

E173. The method of any one of embodiments 157 to 172, wherein the subject is diagnosed as having fatigue.

E174. The method of any one of embodiments 157 to 173, wherein the subject is diagnosed as having impaired cognition.

E175. The method of any one of embodiments 157 to 174, wherein the subject is diagnosed as having depression.

E176. The method of any one of embodiments 157 to 175, wherein the subject is diagnosed as having insulin resistance.

E177. The method of any one of embodiments 157 to 175, wherein the subject is diagnosed as having glucose intolerance.

E178. The method of any one of embodiments 157 to 177, wherein the subject is diagnosed as having lipid abnormalities.

E179. A method of treating a disease or disorder selected from oligospermia, erectile dysfunction, decreased libido, sleep apnea, low bone mineral density, loss of body hair, fatigue, impaired cognition, depression, insulin resistance, glucose intolerance, lipid abnormalities, and endometriosis in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E180. A method of treating a disease or disorder selected from hypogonadism and refractory endometriosis in a subject in need thereof, the method comprising administering to the subject a therapeutically effective amount of the crystalline Form A of leflutrozole of any one of embodiments 1 to 28, or the pharmaceutical composition of any one of embodiments 29 to 87.

E181. The method of any one of embodiments 112 to 180, wherein the subject is human.

E182. The method of any one of embodiments 112 to 127 and 157 to 167, wherein the subject is male.

E183. The method of any one of embodiments 112 to 182, wherein the subject has a body-mass index (BMI) of at least 25 kg/m².

E184. The method of any one of embodiments 112 to 183, wherein the subject has a serum testosterone level of less than 300 ng/dl prior to the administering.

E185. The method of embodiment 184, wherein the testosterone level in the subject is increased from less than 300 ng/dl to between 300 and 1000 ng/dL.

E186. The method of any one of embodiments 112 to 185, wherein the estradiol level in the subject is decreased from more than 20 μg/mL to less than 15 μg/mL.

E187. The method of any one of embodiments 112 to 186, wherein the level of luteinizing hormone in the subject is increased from less than 0.75 mlU/mL to between 0.75 and 15 mlU/mL.

E188. The method of any one of embodiments 112 to 187, wherein the level of follicle stimulating hormone in the subject is increased from less than 1 mlU/mL to between 1 and 15 mlU/mL.

E189. The method of any one of embodiments 112 to 188, wherein the semen volume of the subject is increased by between 0.5 and 2.0 mL.

E190. The method of any one of embodiments 112 to 189, wherein the total motile sperm count in the subject is increased from less than $15 \times 10^6$/mL to more than $20 \times 10^6$/mL.

E191. The method of any one of embodiments 112 to 190, wherein the level of inhibin B in the subject is increased by 7 to 15 ng/L.

E192. The method of any one of embodiments 112 to 191, wherein the effective amount of crystalline leflutrozole is from 0.01 to 10 mg.

E193. The method of embodiment 192, wherein the effective amount of crystalline leflutrozole is about 0.1 mg.

E194. The method of embodiment 192, wherein the effective amount of crystalline leflutrozole is about 1.0 mg.

E195. The method of embodiment 192, wherein the effective amount of crystalline leflutrozole is about 3 mg.

E196. The method of embodiment 192, wherein the effective amount of crystalline leflutrozole is up to 10 mg.

E197. The method of any one of embodiments 112 to 196, wherein the administration occurs once weekly.

E198. The method of any one of embodiments 112 to 197, wherein the administration continues for at least 12 weeks.

E199. The method of any one of embodiments 112 to 198, wherein the administration continues for up to 36 weeks.

E200. The method of any one of embodiments 112 to 199, wherein the bone mineral density in the lumbar spine of the subject decreases by less than 5% during the treatment period.

E201. The method of embodiment 200, wherein the bone mineral density in the lumbar spine of the subject decreases by less than 3% during the treatment period.

OTHER EMBODIMENTS

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims. Other embodiments are within the claims.

The invention claimed is:

1. A crystalline Form A of leflutrozole characterized by an X-ray powder diffraction (XRPD) patten with peaks at 9.1±0.2, 13.9±0.2, 15.6±0.2, 16.8±0.2, 21.1±0.2, 24.9±0.2, and 26.1±0.2 degrees 2θ when measured using Cu Kα radiation.

2. The crystalline Form A of leflutrozole of claim 1, wherein the XRPD pattern further comprises peaks at 10.9±0.2, 14.4±0.2, 18.0±0.2, 18.5±0.2, 24.6±0.2, 27.4±0.2, 28.0±0.2, and 29.3±0.2 degrees 2θ when measured using Cu Kα radiation.

3. The crystalline Form A of leflutrozole of claim 2, wherein the XRPD pattern further comprises peaks at 22.6±0.2, 23.8±0.2, 26.8±0.2, 28.4±0.2, 31.4±0.2, and 32.5±0.2 degrees 2θ when measured using Cu Kα radiation.

4. The crystalline Form A of leflutrozole of claim 1, further characterized by a Fourier transform infrared spectroscopy (FTIR) spectrum with peaks at about 3131 $cm^{-1}$, about 3105 $cm^{-1}$, about 2925 $cm^{-1}$, about 2854 $cm^{-1}$, about 2230 $cm^{-1}$, about 1680 $cm^{-1}$, and about 1511 $cm^{-1}$.

5. The crystalline Form A of leflutrozole of claim 1, wherein the crystalline Form A has a particle size distribution ($D_{90}$) of less than 35 μm.

6. The crystalline Form A of leflutrozole of claim 5, wherein the crystalline Form A of leflutrozole has a particle size distribution of: (i) a $D_{10}$ of about 1 μm; (ii) a $D_{50}$ of about 4 μm; and (iii) a $D_{90}$ of about 11 μm.

7. A pharmaceutical composition comprising the crystalline Form A of leflutrozole of claim 1, further comprising one or more pharmaceutically acceptable excipients.

8. The pharmaceutical composition of claim 7, wherein the crystalline Form A of leflutrozole has a particle size distribution of: (i) a $D_{10}$ of about 1 μm; (ii) a $D_{50}$ of about 4 μm; and (iii) a $D_{90}$ of about 11 μm.

\* \* \* \* \*